US005166499A

United States Patent [19]

Holland et al.

[11] Patent Number: 5,166,499

[45] Date of Patent: Nov. 24, 1992

[54] FOUR MONITOR AND CHECKPOINT DESIGNATING SYSTEM

[75] Inventors: Richard F. Holland, Evanston; Jeffrey P. Coney, Chicago, both of Ill.

[73] Assignee: Facility Management Systems, Inc., Morton Grove, Ill.

[21] Appl. No.: 767,268

[22] Filed: Sep. 27, 1991

Related U.S. Application Data

[62] Division of Ser. No. 305,963, Feb. 19, 1989, Pat. No. 5,120,942.

[51] Int. Cl.[5] ........................ G06F 15/21; G06F 15/40

[52] U.S. Cl. .................................... 235/376; 235/375; 235/385; 364/402

[58] Field of Search ............... 235/375, 376, 377, 385, 235/472, 462; 340/825.30, 825.31, 572; 364/409, 401, 402

[56] References Cited

U.S. PATENT DOCUMENTS

| | | | |
|---|---|---|---|
| 3,736,561 | 5/1973 | Rumpel . | |
| 3,791,945 | 12/1973 | Ellul . | |
| 3,990,067 | 11/1976 | Van Dusen et al. . | |
| 4,296,408 | 10/1981 | Neuringer . | |
| 4,628,193 | 12/1986 | Blum . | |
| 4,688,026 | 8/1987 | Scribner et al. | 340/572 |
| 4,801,786 | 1/1989 | Stobbe | 235/377 |
| 4,850,009 | 7/1989 | Zook et al. | 235/375 |

FOREIGN PATENT DOCUMENTS

| | | |
|---|---|---|
| 2156128 | 10/1985 | United Kingdom . |
| 2161967 | 1/1986 | United Kingdom . |

OTHER PUBLICATIONS

"Now Available Easy-To-Use, Credit Card Sized Asset Protection Systems" No Date Known.
"Patrol Command Systems" No Date Known.
"SIS-Fireguard" No Date Known.
"Guard Card Instructions" No Date Known.
"SIS-Tourgard" No Date Known.
"Guard Card Specifications" No Date Known.
"Guard Card Instructions, SIS Patrol" No Date Known.
"SIS-SIS Patrol" No Date Known.
"Protrac-System" No Date Known.
"The Morse Watchman's #50-5 Data Recorder With Built In Touch Pad", No Date Known.
"Morse Guard Tour Tour Report" No Date Known.
"Morse Watchman Inc. Feature List" No Date Known.
"Security Business" Sep. 1, 1988.
"Gas Protrac System" No Date Known.

(List continued on next page.)

*Primary Examiner*—Robert Weinhardt
*Attorney, Agent, or Firm*—William Brinks Olds Hofer Gilson & Lione

[57] ABSTRACT

A tour monitor system includes a portable tour monitor and a central programming/report generating computer. The tour monitor includes a bar code reader, an alphanumeric display, and an alphanumeric keyboard. The tour is organized into zones, each including a set of checkpoints, wherein each checkpoint is labeled by a bar code. The tour monitor is programmed to prompt the guard through the tour by displaying the names of successive zones. In addition, individual checkpoints can be designated as higher or lower priority checkpoints, and the tour monitor is programmed to alert the guard if higher priority checkpoints are missed, and to require the guard either to scan the missed higher priority checkpoint or to provide an override signal. The tour monitor also allows the guard to enter alphanumeric messages which are stored in combination with the scanned checkpoint codes in a log. This log is then transmitted to the programming/report generating computer for analysis. Preferably, reports are organized in terms of zones, and reports specifically highlight higher priority checkpoints which were missed. By organizing the tour into zones and checkpoints, the tour monitor can be programmed more efficiently.

9 Claims, 13 Drawing Sheets

OTHER PUBLICATIONS

"Patrol Manager", No Date Known.
"Protrac System" No Date Known.
"Guard Control System (PC Version)" No Date Known.
"Computerized Patrol Recorder-Amano" No Date Known.
"The Morse Watchman" No Date Known.
"Sector Technology Guarded Tour Management" No Date Known.
Hasler Personnel Protection Systems by R. Petersen, No Date Known.
"Securitas-The Ultimate Security Concept", 30 Pages Including Round Information System 9000, 1985.
"Cappa Newsletter", Issue 40, Nov. 1987.
"Diester Electronics USA System Specifications WK-1000 and WK-1100" No Date Known.
"New Detex Computour 2000 Electronic Watch Tour System", No Date Known.
"Computour Electronic Watch Tour System", No Date Known.

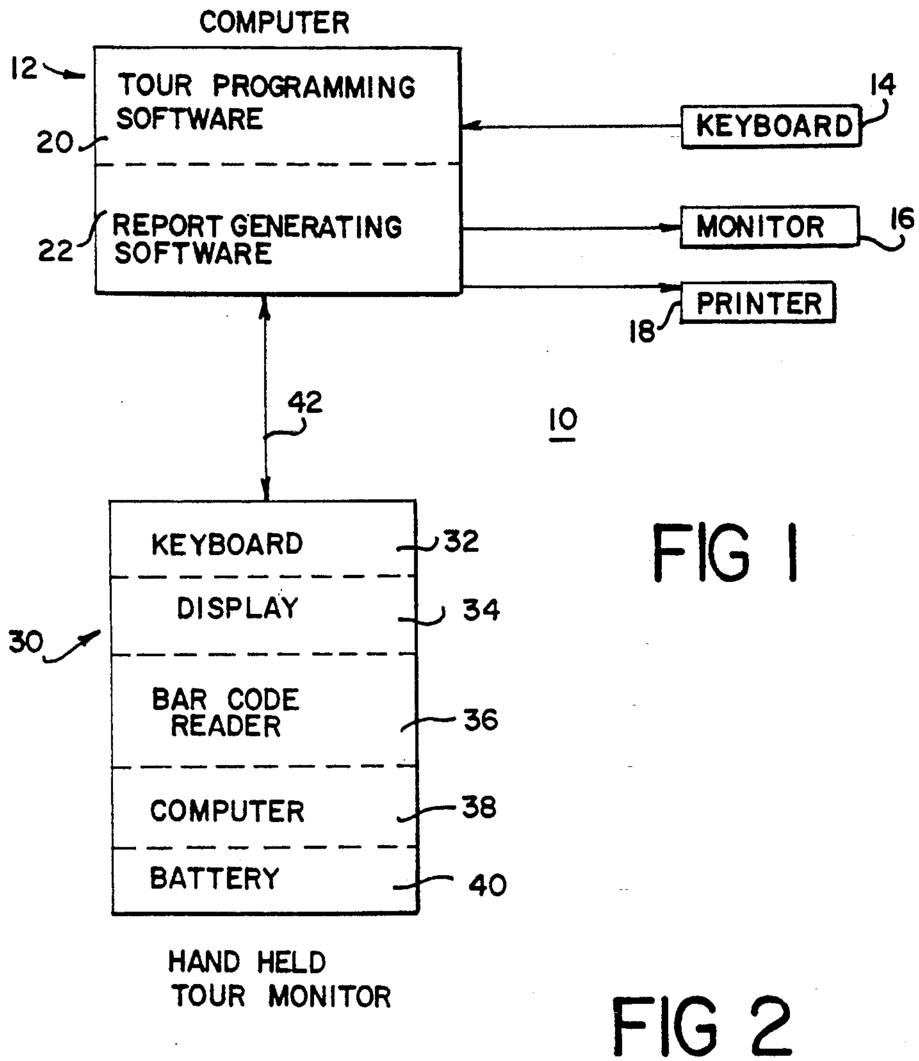
FIG 1
FIG 2
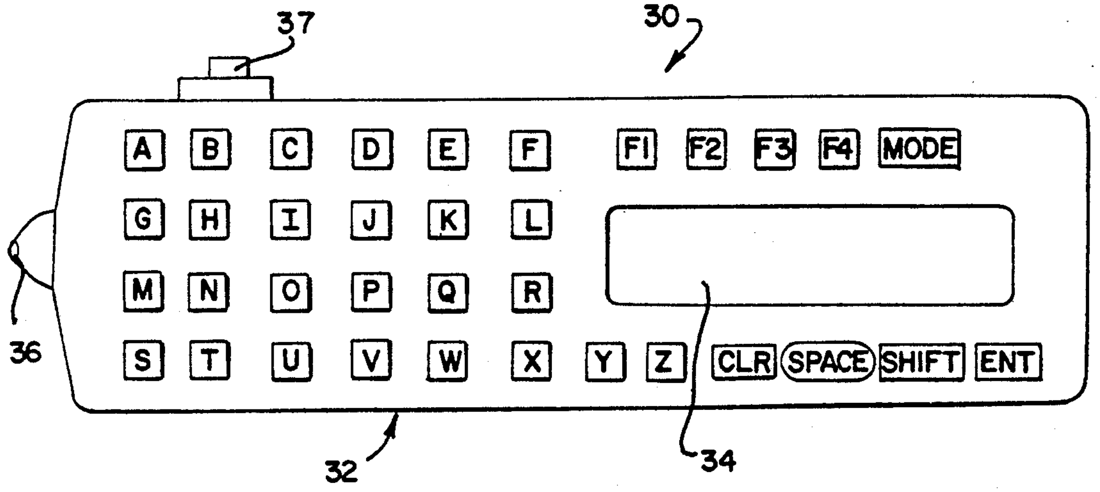

STARTUP

DATA MENU

MAIN MENU

MISC MENU

BEGIN TOUR

DISPLAY ZONES

REQUEST ADVANCE

REVIEW MISSED MUST SCANS

FILE MAINTENANCE

FOUR MONITOR AND CHECKPOINT DESIGNATING SYSTEM

This is a division of application Ser. No. 07/305,963, filed Feb. 2, 1989, now U.S. Pat. No. 5,120,942.

BACKGROUND OF THE INVENTION

This invention relates to an improved tour monitor system that can be used for example by a guard or night watchman to record the time at which various checkpoints on a tour are checked by the guard.

Tour monitors have advanced significantly since the early mechanical clocks which used paper tape recording systems to time stamp events of a tour. One class of modern tour monitors includes a bar code reader in a portable, hand-held device. Bar code labels are attached to each checkpoint along the tour, and the tour monitor includes means for recording consecutive bar code readings along with a time stamp for each reading. At the end of the tour, the recorded list of bar code readings and time stamps can then be transmitted to a report generating computer Such tour monitors offer certain advantages, particularly in that the checkpoint labels can be made inconspicuous and inexpensive to attach and the associated reports can be generated in a flexible format that is easy to use. However, tour monitors of the type described above provide few additional operational features for the guard beyond those provided by the original mechanical clock systems.

The present invention is directed to an improved tour monitor and associated programming and report generating system that improve the efficiency with which the tour monitor can be programmed, the efficiency with which the guard or other service individual can use the tour monitor, and the usefulness of reports generated to summarize the monitored tours.

SUMMARY OF THE INVENTION

The tour monitor system described below provides a number of important new features which cooperate to provide a particularly efficient system. Of course, it is not necessary in all applications that all of these features be used together, and selected ones of the features can be used alone or in various subcombinations in some applications.

The tour monitor of this invention includes a modular, portable device which is adapted to be carried through a tour which comprises a plurality of checkpoints, each labelled with a respective checkpoint code. This portable device includes sensor means for reading the checkpoint codes during the tour and for generating time stamped sensor signals in response to these codes. The device also includes memory means for storing the time stamped sensor signals.

A first feature of this invention relates to a system for prompting the user of the tour monitor to move through the tour. According to this first feature, a tour monitor of the type described above is provided with means for storing a plurality of messages, each associated with a respective one of a plurality of successive zones included in the tour, wherein each of the zones is associated with a set of the checkpoints of the tour. The portable device includes display means operative when the sensor means has read selected checkpoint codes associated with a selected zone for displaying the message associated with the next successive zone. In this way, the guard or other user of the tour monitor is prompted to move from one zone to the next. This makes it easier for a new guard or other user of the tour monitor to conduct an unfamiliar tour, and it reduces inefficiencies associated with the need for an experienced guard to learn a new tour.

According to a second feature of this invention, a portable tour monitor of the general type described above is provided with means for designating first ones of the checkpoints of the tour as higher priority checkpoints and second ones of the checkpoints of the tour as lower priority checkpoints. A sequence of sets of checkpoint signals is stored, preferably in the portable tour monitor itself, along with means for comparing the sensor signals with the checkpoint signals and for displaying a warning message when the sensor signals indicate that one of the higher priority checkpoints has been missed in the sequence.

This feature of the invention alerts the guard or other user of the tour monitor when a higher priority checkpoint has been missed. In the preferred embodiment described below, the guard has the choice of either scanning the missed checkpoint or commanding an override of the warning message. This allows a supervisor reviewing the tour monitor log to be certain that a higher priority checkpoint was not inadvertently missed or forgotten. Furthermore, this feature allows checkpoints to be divided into higher and lower priority checkpoints, thereby increasing flexibility to the guard in conducting the tour.

According to a third feature of this invention, a tour monitor of the general type described above is provided with an alphanumeric keyboard which generates alphanumeric key signals. Means are provided for storing the alphanumeric key signals in association with selected time stamped sensor signals. This feature of the invention allows the guard or other user of the tour monitor to write alphanumeric messages into the log maintained by the tour monitor. For example, the guard can record the name of an unexpected person found at one of the checkpoints during the tour. In this way, the need for hand written notes or other supplements to the log can be largely eliminated.

The tour monitor described in detail below is programmable, and a computer system is provided for programming the tour monitor for a tour. According to a fourth feature, this programming device includes means for storing a plurality of user definable zone records. Each zone record comprises a set of checkpoint entries, and one or more of these sets comprise a plurality of checkpoint entries. Each checkpoint entry in turn comprises a checkpoint code associated with a respective checkpoint. The programming device of this invention includes means for creating a tour defining record comprising a user selectable plurality of zone records, and means for transmitting the tour defining record to a programmable tour monitor.

Because the programming device organizes the checkpoint entries into zone records, the tour defining record can be assembled quickly and efficiently by a user who simply selects the desired zone records to make up a tour. Once the zone records have been defined, the user often does not need to enter individual checkpoint entries when a tour defining record is to be modified, as, for example, when one zone, is substituted for another.

Once a tour has been completed and a tour monitor of the type described above has generated a tour log, the tour monitor report generating system of this invention can be used to generate reports for later analysis. According to a fifth feature of the invention, such a tour monitor report generating system includes means for receiving a log from a tour monitor, wherein the log comprises a plurality of time stamped sensor signals, at least some of the sensor signals associated with respective checkpoint codes associated with respective checkpoints The report generating system also includes means for generating a report comparing the received sensor signals with a plurality of desired checkpoint signals intended to be included in a predefined tour, wherein some of the checkpoint signals in the predefined tour are designated as higher priority checkpoints and others are designated as lower priority checkpoints. The report generating means also includes means for indicating in the report when the received sensor signals indicate that one of the higher priority checkpoints was missed. By dividing the checkpoints of the tour into higher and lower priority checkpoints and specifically flagging missed higher priority checkpoints, the report generating system of this invention allows supervisory personnel to monitor the performance of the guard or other user of the tour monitor more effectively.

The invention itself, together with further objects and attendant advantages, will best be understood by reference to the following detailed description, taken in conjunction with the accompanying drawings.

BRIEF DESCRIPTION OF THE DRAWINGS

FIG. 1 is a block diagram of a tour monitor system that incorporates the presently preferred embodiment of this invention.

FIG. 2 is a plan view of the portable tour monitor of FIG. 1.

DETAILED DESCRIPTION OF THE PRESENTLY PREFERRED EMBODIMENTS

Figure 4:
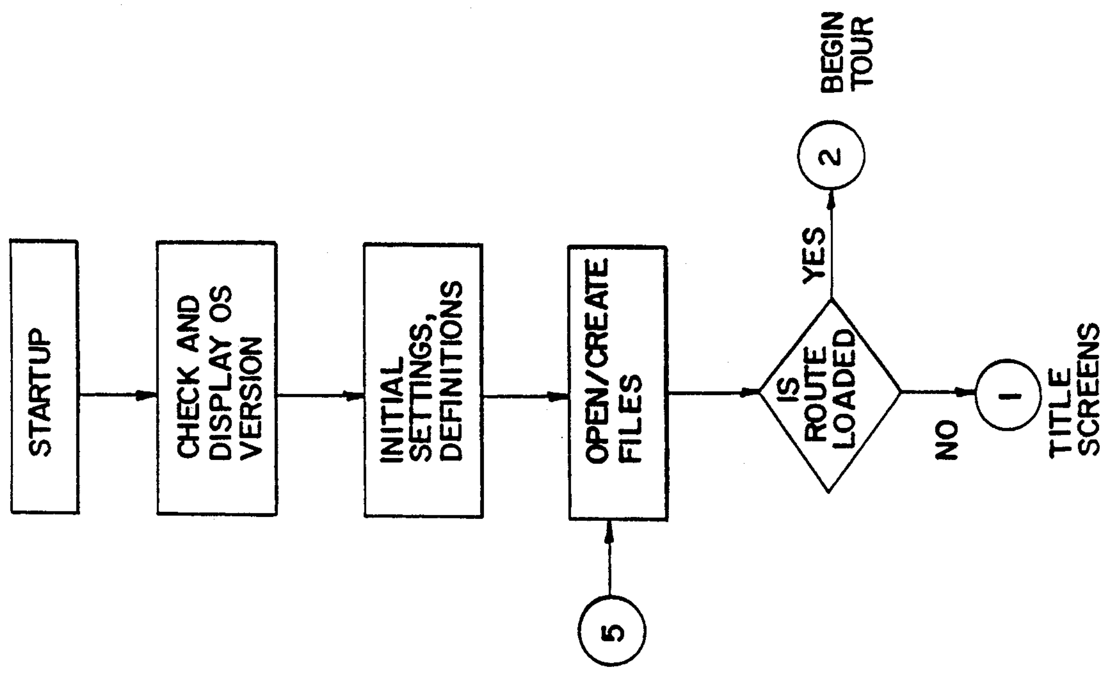
FIG. 4 is a flow chart of the Start-Up Routine executed by the tour monitor 30.

Turning now to the drawings, FIG. 1 shows a block diagram of a tour monitor system 10 that incorporates each of the five features of the invention outlined above. This system 10 includes a computer 12 which may for example be a conventional IBM compatible PC. The computer 12 is coupled to a conventional keyboard 14, monitor 16 and printer 18. As described in detail below in conjunction with FIGS. 14–16, the computer 10 incorporates both tour programming software 20 and report generating software 22.

The system 10 also includes at least one portable tour monitor 30. Each monitor 30 is a hand-held device which includes a keyboard 32, a display 34, a sensor such as a bar code reader 36, a computer 38 and a battery 40. A cable 42 can be used to interconnect the monitor 30 with the computer 12 when desired to transfer programming information from the computer 12 to the monitor 30, or to transmit a tour log back from the monitor 30 to the computer 12. When the tour monitor 30 is actually being carried through a tour, it is of course disconnected from a computer 12 and used as a stand alone unit.

A wide variety of portable computers can be used for the tour monitor 30, but the hand-held computer marketed under the tradename MICRO-WAND III by Hand Held Products, Inc. of Charlotte, N.C. has been found suitable. FIG. 2 shows a plan view of the preferred tour monitor 30 In this embodiment, the keyboard 32 is a full alphanumeric keyboard and the display 34 includes two sixteen-character lines, wherein each of the characters is formed of a respective dot matrix that allows any desired alphanumeric character to be displayed. A control button 37 is mounted on the side of the monitor 30 to activate the bar code reader 36.

Figure 3:
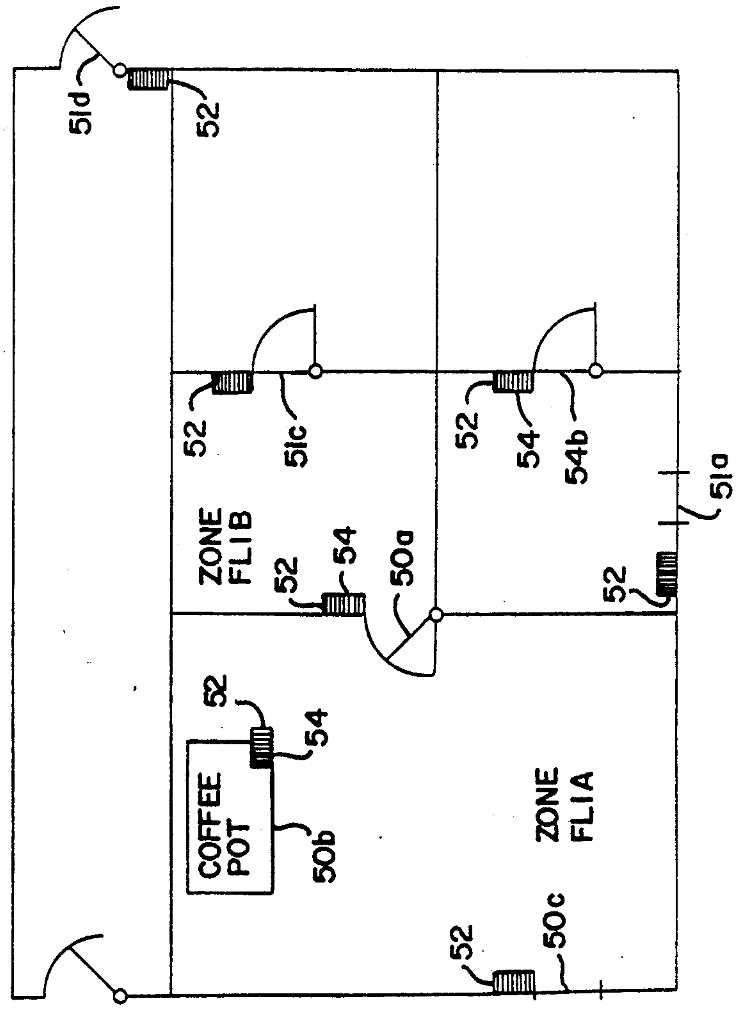
FIG. 3 is a plan view of a sample tour used for illustrative purposes.

The tour monitor 30 is used to record progress of an individual such as a guard through a tour such as a security guard tour. FIG. 3 shows a plan view of a building and will be used to outline the basic features of a highly simplified tour. The tour in this example is made up of two zones. Zone FL1A includes three separate checkpoints: entry door 50A, coffee pot 50B and window 50C. Zone FL1B includes four separate checkpoints: window 51A and doors 51B, 51C, 51D. Each of the checkpoints 50, 51 is marked with a respective checkpoint label, shown in a highly schematic form at 52. Each of the checkpoint labels 52 encodes a respective checkpoint code 54, which in this embodiment is a bar code. In actual use, the checkpoint labels 52 can be inconspicuous, adhesively secured strips. Preferably, the labels 52 are uniform in visual appearance. They can for example be conventional bar code labels that appear unfeatured to the naked eye so that they are not readily apparent as bar code labels.

Within the tour shown in FIG. 3, selected ones of the checkpoints 50, 51 are designated as higher priority checkpoints. For example, the coffee pot 50P and the doors 51C and 51D can be designated as higher priority checkpoints and the remaining checkpoints can be designated as lower priority checkpoints. As pointed out below, the tour monitor 30 is programmed to process these two different priorities of checkpoints differently.

In this preferred embodiment the zones of the tour are ordered. That is, the guard is intended to check Zone FL1A before he checks Zone FL1B. However, within any one zone, the individual checkpoints are unordered, and the guard is free to check them in any order that he desires. This increases flexibility and efficiency, because it may not always be convenient for a guard to check the checkpoints Within a given zone in the same order. For example, a tour may be interrupted and it may be more convenient and efficient to resume the tour at some point within a zone other than that at which the tour was interrupted.

FIGS. 4–13 will be used to describe the operation of the tour monitor 30. The detailed discussion will then turn to the operation of the tour programming software 20 and the report generating software 22.

Prior to the start of any tour, the tour monitor 30 is programmed with a tour defining record that includes the following information:

1. The system date and time;
2. A password that can be used by a supervisor for various functions including programming the tour monitor 30 and transmitting a recorded log from the tour monitor 30 to the computer 12;
3. The number of the route defined by the tour defining record;
4. An ordered list of zone records, each zone record made up of a zone number and a zone name;
5. A list of checkpoint entries, each checkpoint entry including the zone number and the bar code of the respective checkpoint;

6. A list of higher priority checkpoint entries, each including the zone number, the bar code and the name of the respective checkpoint; and
7. A list of guard identification numbers.

Figure 6:
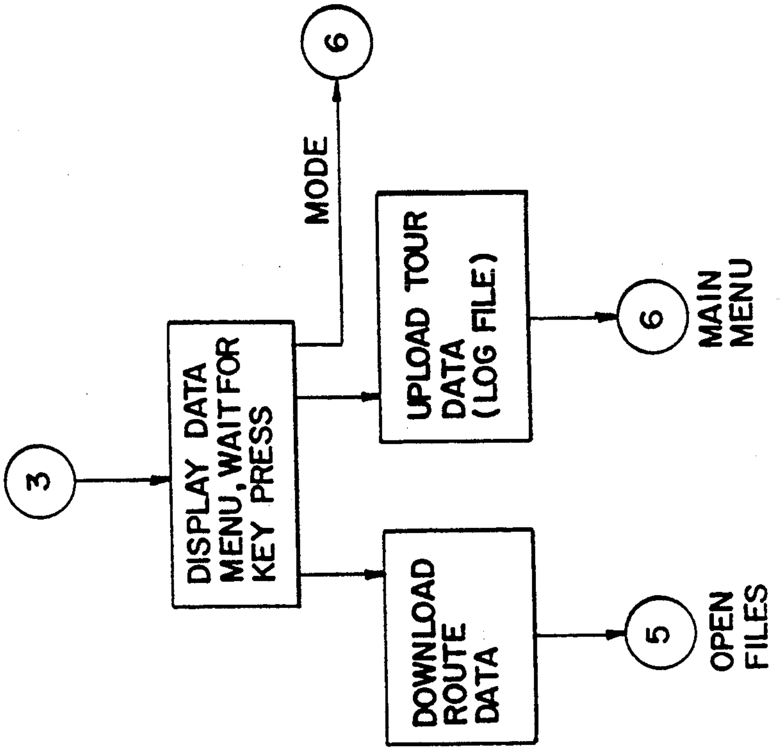

As shown in FIG. 4, on start up the monitor 30 displays an initial operating system screen and then initializes various settings and functions and opens or creates appropriate files. The monitor 30 then checks to determine whether a route has been loaded. If not, control branches to the main menu routine of FIG. 5, where title screens are displayed on the display 34 and the routine waits for an appropriate key press. The key F3 causes execution of the Data Menu routine as shown in FIG. 6. Once the data menu has been displayed in the Data Menu routine, the routine then waits for appropriate key presses either to initiate the down loading of a tour defining record from the computer 12 to the monitor 30 or up loading of a log of tour data recorded by the monitor 30 from the monitor 30 to the computer 12.

Figure 5:
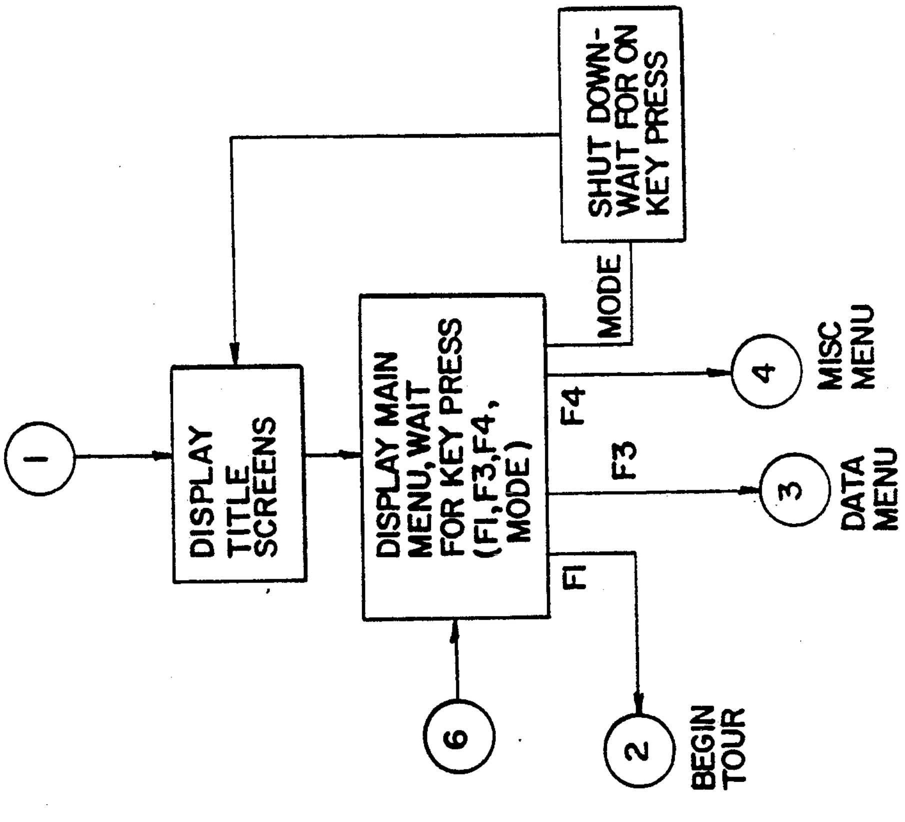
FIG. 5 is a flow chart of the Main Menu Routine executed by the tour monitor 30.
Figure 7:
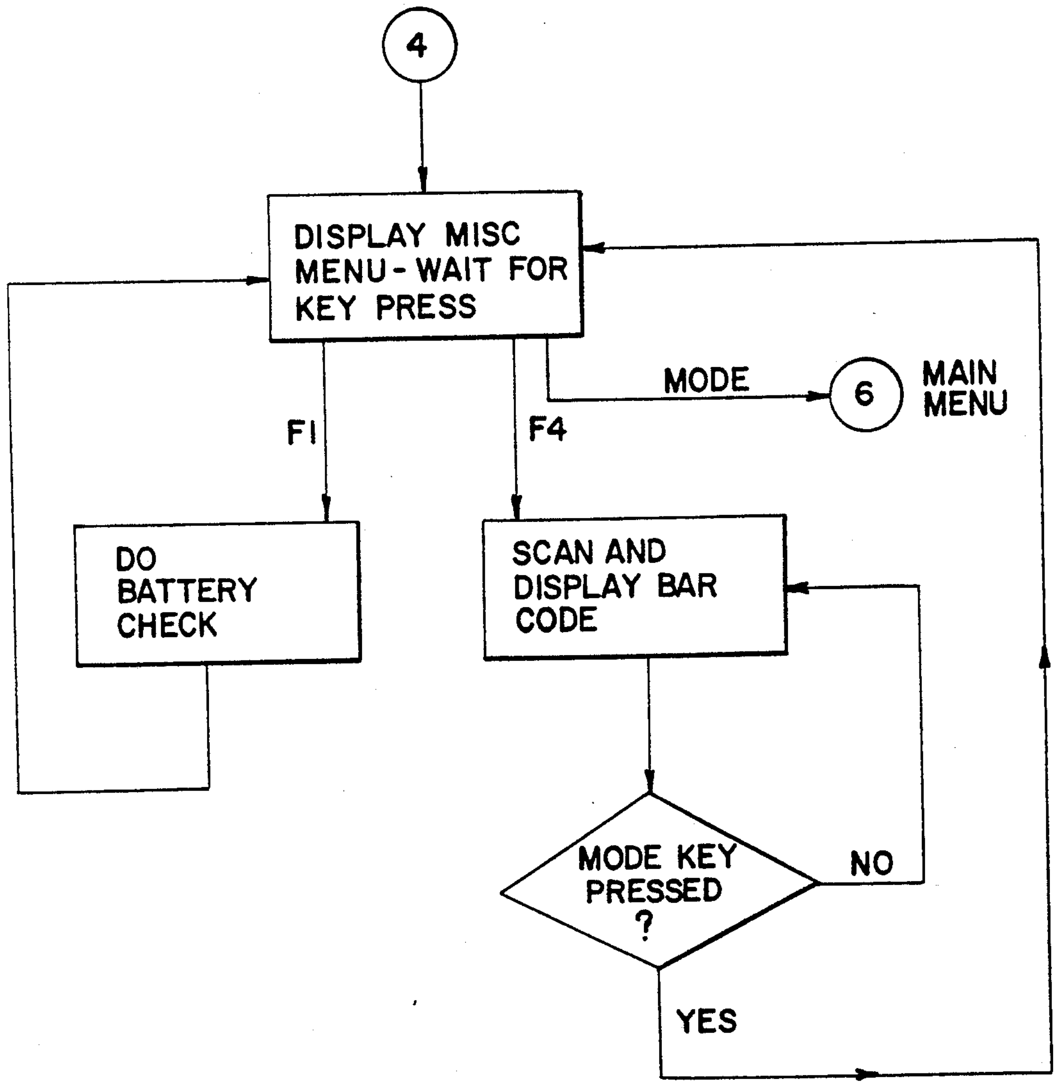

When the F4 key is pressed in the main menu of FIG. 5, the monitor 30 executes the Miscellaneous Menu routine of FIG. 7. In the Miscellaneous Menu routine, a miscellaneous menu is displayed and the routine then waits for appropriate keys. In response to the F1 key, a battery check routine is executed. In response to the F4 key the monitor 30 will display bar codes scanned by the user to check operation of the bar code reader. The mode key can be used to return to the main menu of FIG. 5.

Figure 8:
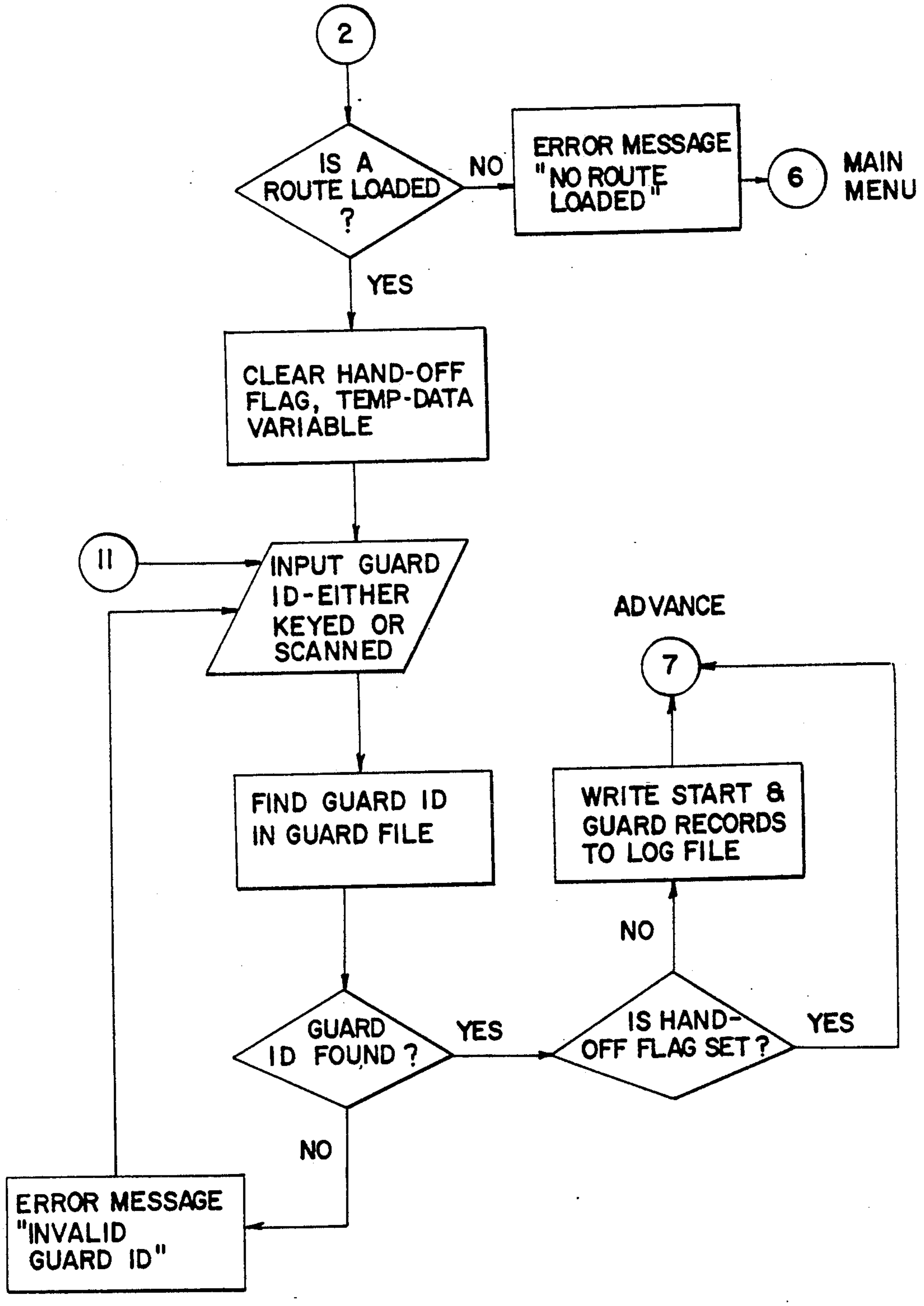

When it is desired to start a tour, the F1 key is pressed from the main menu of FIG. 5. This causes control to branch to a Begin Tour routine as shown in FIG. 8. In this routine, the monitor 30 checks to confirm that a route as defined by a tour defining record has been loaded. Once this has been confirmed HAND-OFF and TEMP-DATA are reset. The routine then waits for a guard ID to be input, either via the keys of the keyboard 32 or a scan from an appropriate bar code. Once a guard ID has been input the monitor 30 reviews the list of acceptable guard ID's included in the tour defining record. If the guard ID that was input cannot be found in this list, an error message is displayed and the routine waits for another guard ID to be input. Otherwise, the routine checks HAND-OFF. HAND-OFF is a variable which is set when one guard hands-off to another guard within a tour. If HAND-OFF is set, no further action is taken in the routine of FIG. 5. Otherwise, the initial records of the tour log are written into the memory of the monitor 30.

The tour log includes six different types of entries as shown in the following table:

TABLE 1

| Record Type | Log Data | Time Stamp |
|---|---|---|
| Start | Route Number | Date, Time |
| Guard | Guard ID Number | Date, Time |
| Enter Zone | Zone Number | Date, Time |
| Leave Zone | Zone Number | Date, Time |
| Read | Bar Code | Date, Time |
| Finish | Route Number | Date, Time |

At the beginning of each tour, a Start record and a Guard record are entered into the log.

Figure 9:
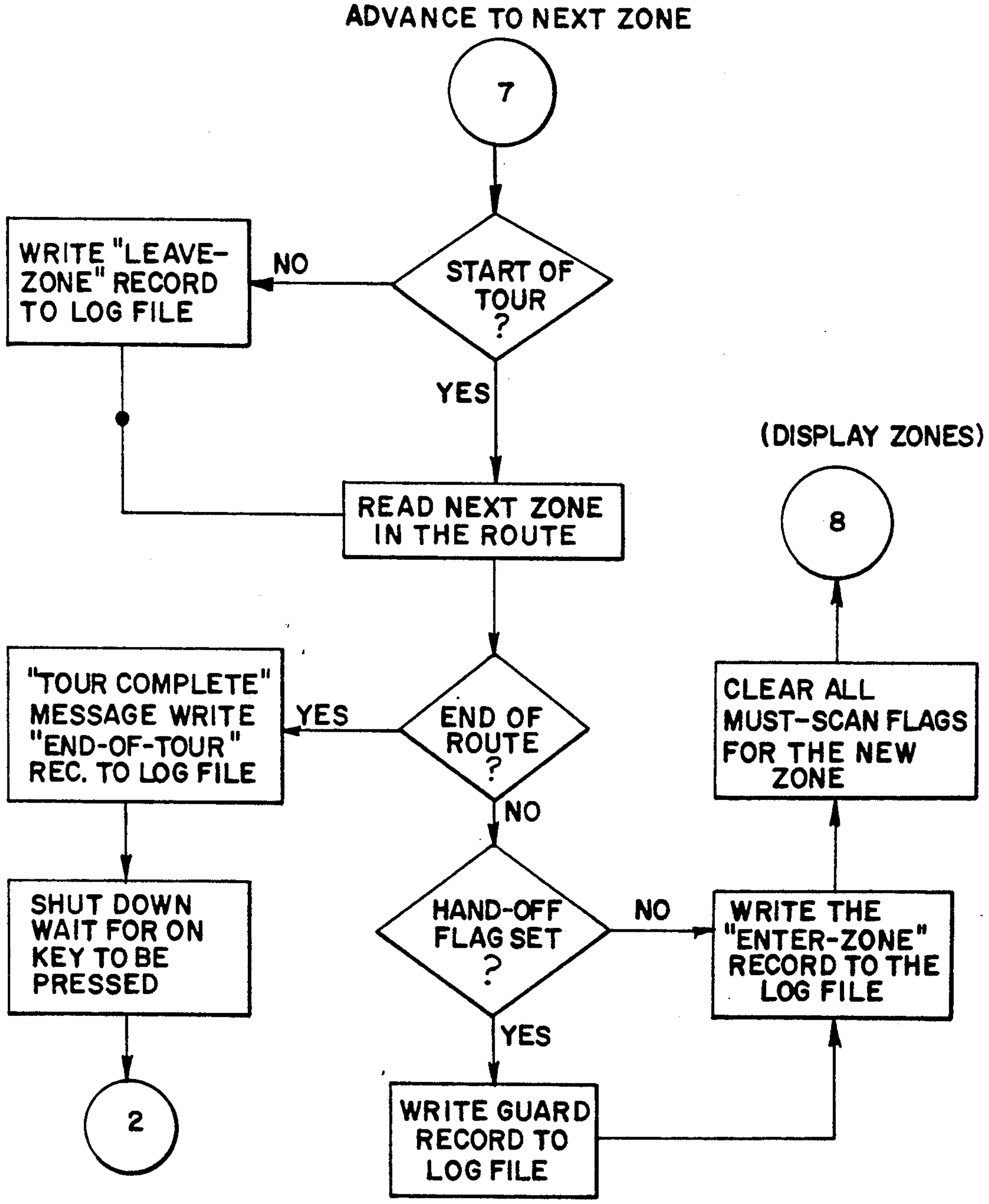

Once this has been accomplished, control is transferred to the Advance to Next Zone routine of FIG. 9. This routine first checks to determine whether this is the first zone of the tour. If not, a Leave Zone record is entered into the log. In any case, the routine then reads the next zone in the route and checks to determine whether the tour has been completed. If so, a tour complete message is displayed on the display 34 and a Finish record is entered into the log. The routine then shuts down the monitor 30 and awaits for a next key to be pressed.

Assuming that this is not the end of the tour, the routine then checks to see if HAND-OFF is set. If so, a Guard record is entered int he log and in any case an Enter Zone record is entered into the log and flags are cleared for all of the higher priority checkpoints in the new zone. These higher priority checkpoints are referred to as "must scan" checkpoints in the figures. Control is then transferred to the Display Zones routine of FIG. 10.

Figure 10:
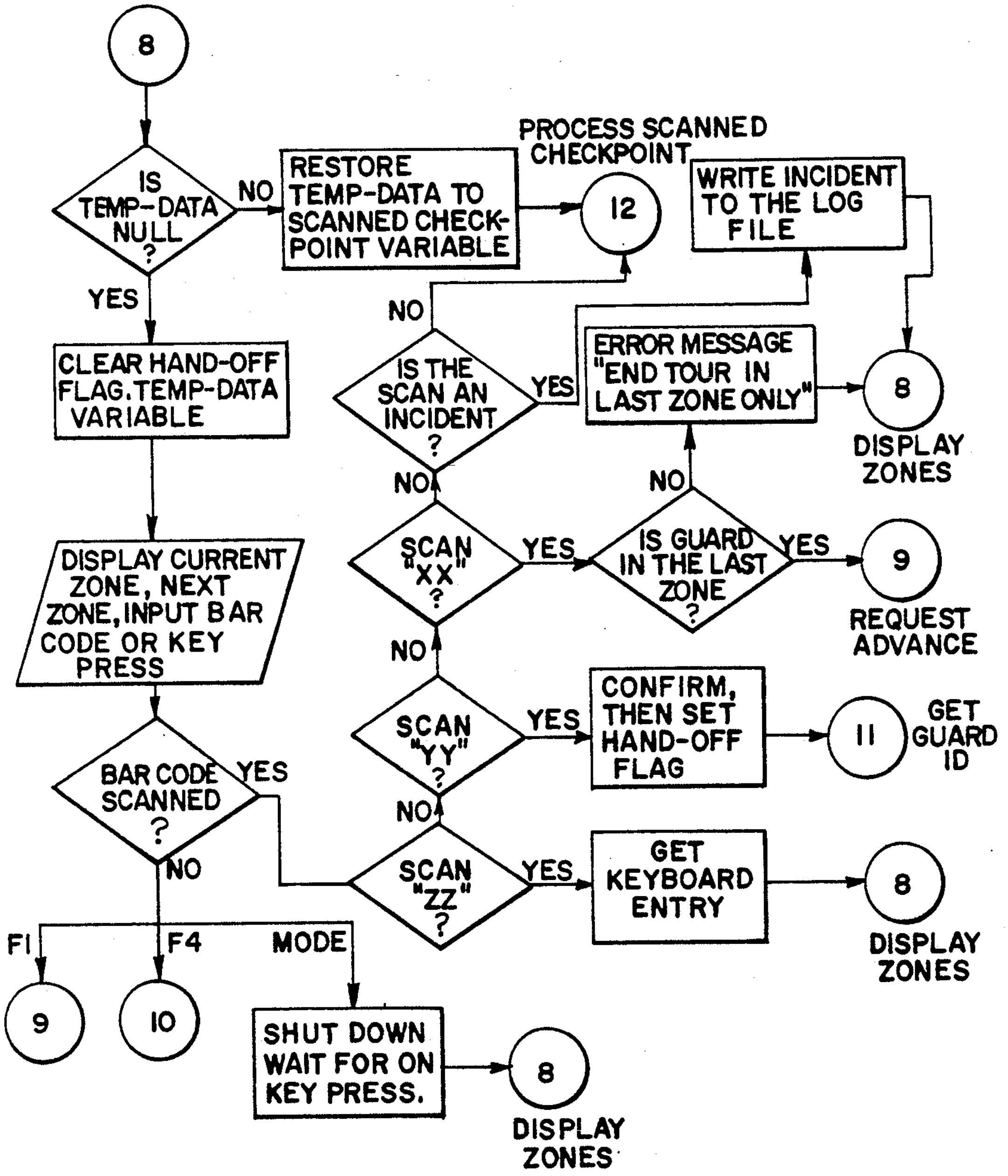

The Display Zones routine of FIG. 10 first checks TEMP-DATA. TEMP-DATA is a temporary storage location that is used to store a scanned bar code when the scanned bar code is outside of the current zone. Thus, TEMP-DATA will be equal to zero in the event the scanned bar code is inside the current zone. If TEMP-DATA is not equal to zero, TEMP-DATA is set equal to the scanned checkpoint variable and control is transferred to the Process Scanned Checkpoint routine of FIG. 13. Otherwise, HAND-OFF and TEMP-DATA are cleared and both the current zone and the next zone of the tour are displayed on the display 34. For example, when the guard enters Zone FL1A of FIG. 3, the display 34 is caused to display the messages "1ST FLOOR-W/1ST FLOOR-E". The routine then waits for the input of a bar code from the bar code reader 36 or a key input from the keyboard 32. If either the F1 or F4 key is pressed, control branches to the routines of FIGS. 11 and 12, respectively. If the mode key is pressed, the monitor 30 is shut down to wait for additional key inputs.

Assuming that a bar code has been scanned, the routine then checks for specific scanned codes. If the scanned code is equal to "ZZ", the routine stores an alphanumeric keyboard entry from the keyboard 32 and returns to the start of the Display Zones routine of FIG. 10. If the scanned code is equal to "YY", the routine confirms that the user is requesting a hand-off, and then sets HAND-OFF and branches to node 11 of FIG. 8. If the scanned bar code is equal to "XX" the routine branches to the Request Advance routine of FIG. 11 if the guard is in the last zone, otherwise an error, message is displayed and control is returned to the start of the Display Zones routine of FIG. 10.

Finally, if the scanned code is an incident code, the scanned code is simply written into the log as a Read entry before control is returned to the start of the Display Zones routine. Assuming that the scanned code is equal to none of the tested values, control branches to the Process Scanned Checkpoint routine of FIG. 13.

Figure 11:
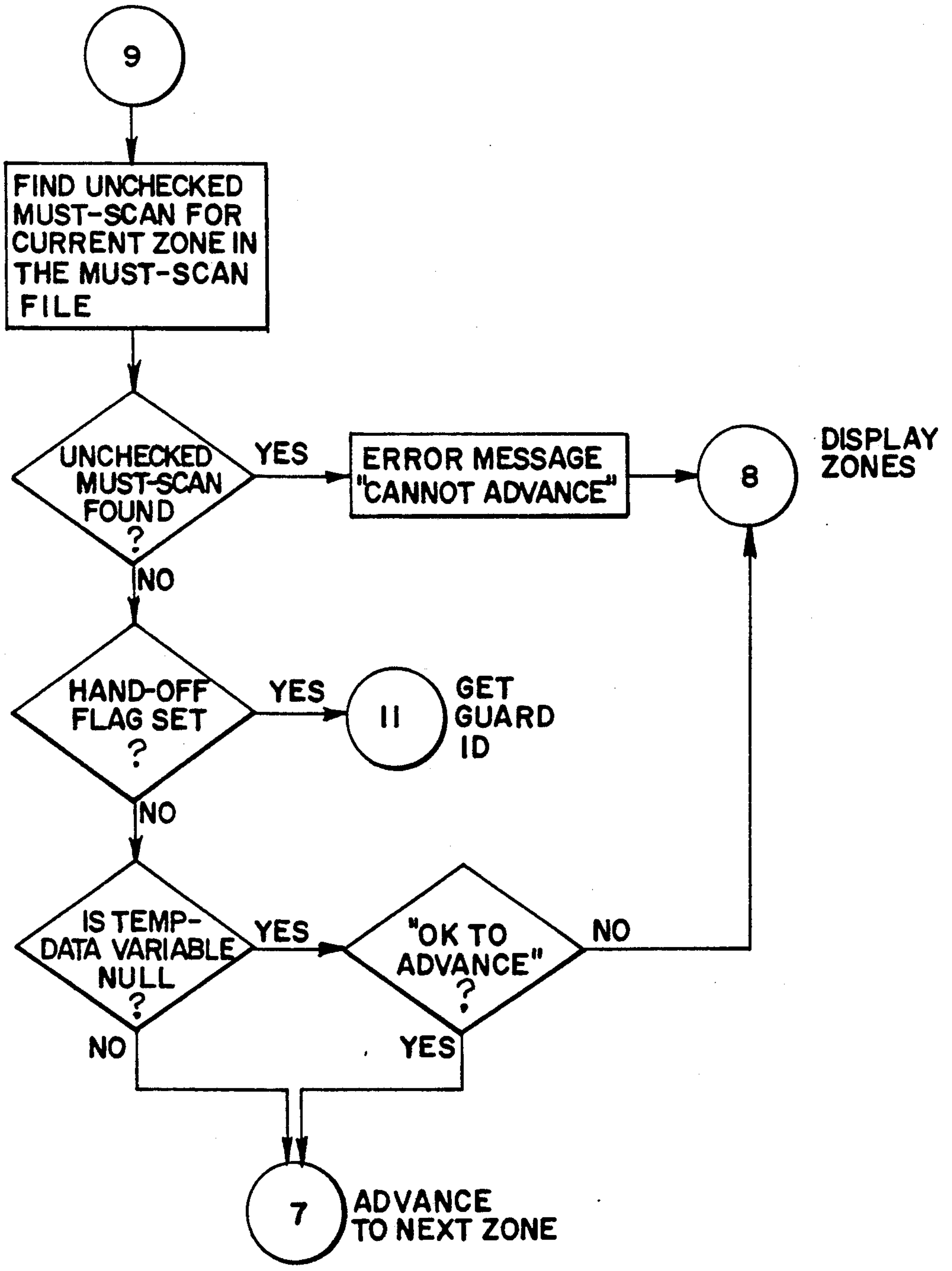

FIG. 11 shows the Request Advance routine that can be reached from the Display Zones routine of FIG. 10. This routine first checks to determine whether all of the higher priority or must scan checkpoints in the current zone have been scanned. If some of the must scan checkpoints have not be scanned, then an error message "MISSED MUST-SCAN/CANNOT ADVANCE/-HIT F4 TO REVIEW/MISSED MUST-SCAN" is presented on the display 34 and control is returned to the Display Zones routine of FIG. 10. Otherwise HAND-OFF is checked. If it is set, control is transferred to node 11 of FIG. 8 to get the new guard ID. Otherwise, TEMP-DATA is checked. If it is not equal to zero (indicating that the scanned code is outside of the current zone), control is transferred to the Advance to Next Zone routine of FIG. 9. Similarly, if TEMP-DATA is equal to zero and the o.k. to advance test is met, control is transferred to the Advance to Next Zone of FIG. 9. Otherwise, control is returned to the Display Zones routine of FIG. 10.

Figure 12:
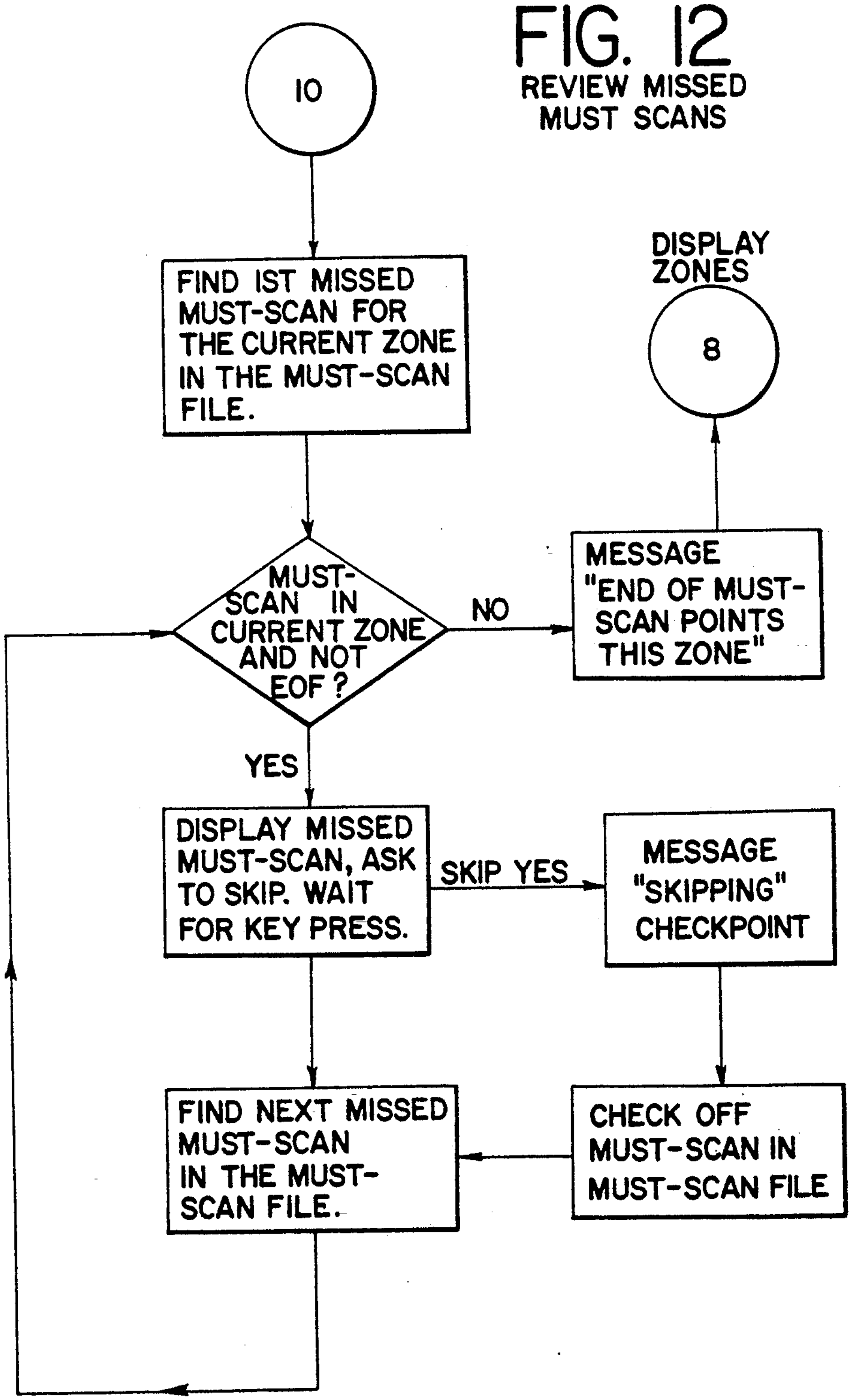

FIG. 12 shows the Review Missed Must-Scans routine that is entered by use of the F4 key in the Display Zones routine of FIG. 10. The first step is to search for any higher priority or must scan checkpoints which were missed in the current zone. If there are no such checkpoints, a message is displayed ("END OF MUST-SCAN/POINTS THIS ZONE") and control is returned to the Display Zones routine of FIG. 10. Otherwise, the name of the missed must-scan checkpoint is displayed and the user is asked whether he wishes to skip this must scan checkpoint. If the received keyboard entry indicates the user wishes to skip the must scan checkpoint, then an appropriate message is displayed and the fact that the user or guard has provided an override signal to skip the checkpoint is recorded. The routine then finds the next missed must scan checkpoint and repeats the process.

Figure 13:
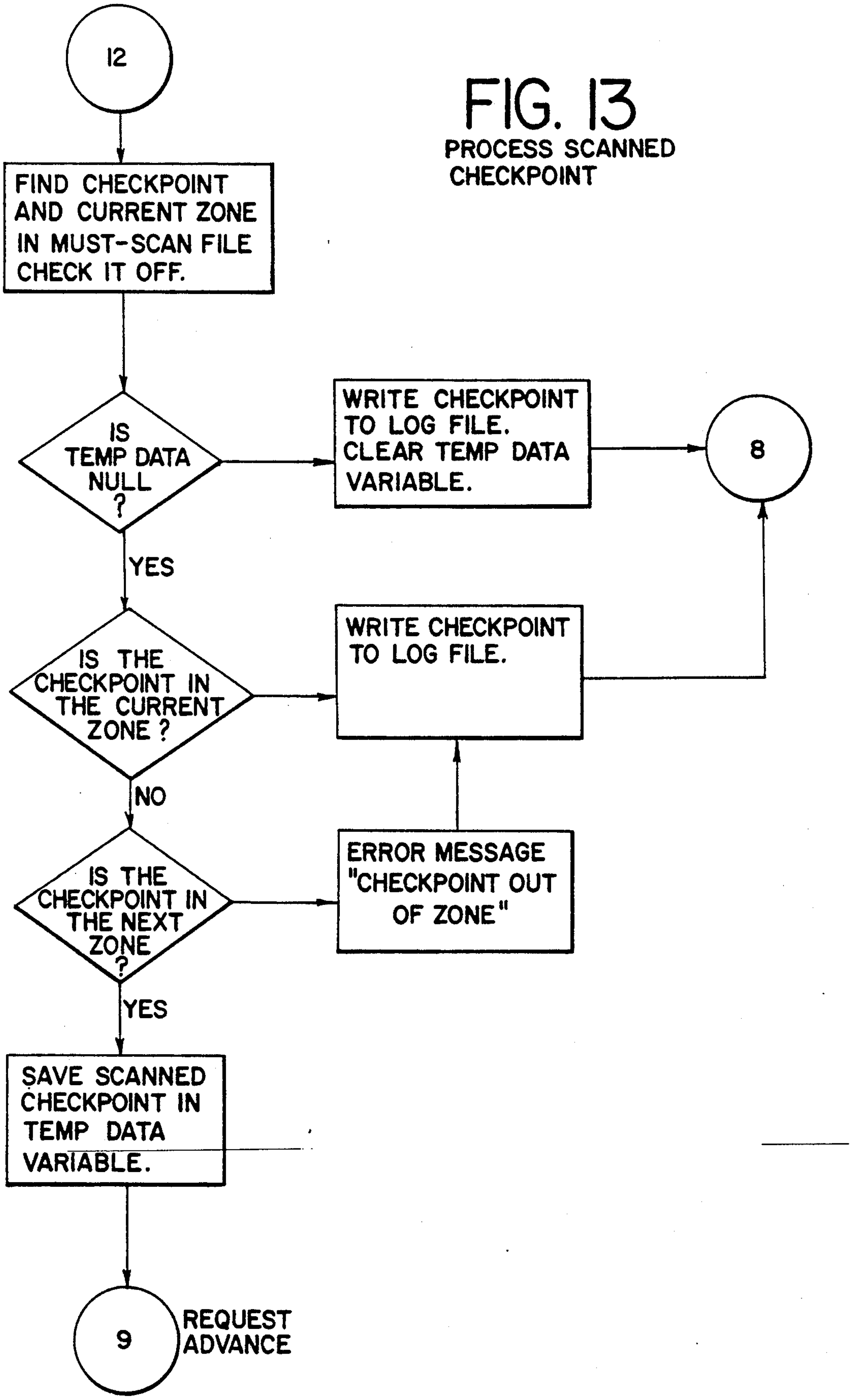

FIG. 13 shows the Process Scanned Checkpoint routine that is called by the Display Zones routine of FIG. 10. The Process Scanned Checkpoint routine first determines whether the scanned bar code corresponds to one of the higher priority checkpoints in the current zone. If so, this higher priority checkpoint is indicated as having been scanned. Then TEMP-DATA is checked. If TEMP-DATA is not equal to zero the scanned bar code is date stamped and recorded in the log as a Read record, and TEMP-DATA is cleared before control is returned to the Display Zones routine of FIG. 10. If TEMP-DATA is equal to zero, the checkpoint corresponding to the most recently scanned bar code is checked to determine whether that checkpoint is in the current zone. If so, a Read record is recorded in the log. If the most recently scanned checkpoint is outside of the current zone, the routine then determines whether the scanned checkpoint is in the next zone. If not, an error message is displayed on the display 34 and a Read record is entered into the log before control is returned to the Display Zones routine of FIG. 10. If the scanned checkpoint is in the next zone, the scanned checkpoint is stored in TEMP-DATA and control branches to the Request Advance routine of FIG. 11.

Table 2 provides a sample log as created by the tour monitor 30 during a tour of the routine illustrated in FIG. 3.

TABLE 2

SAMPLE LOG

| | LOG ENTRIES | | |
|---|---|---|---|
| 1 | S | R002 | 890113150622 |
| 2 | G | CEB | 890113150622 |
| 3 | E | FL1A | 890113150622 |
| 4 | R | F50A | 890113151019 |
| 5 | R | F50B | 890113151042 |
| 6 | R | F50C | 890113151105 |
| 7 | L | FL1A | 890113151210 |
| 8 | E | FL1B | 890113151210 |
| 9 | R | F51A | 890113151220 |
| 10 | R | ZZ | 890113151235 |
| 11 | R | F51D | 890113151350 |
| 12 | L | FL1B | 890113151410 |
| 13 | F | R002 | 890113151410 |
| | MESSAGES | | |

TABLE 2-continued

SAMPLE LOG

| | LOG ENTRIES |
|---|---|
| 14 | WINDOW OPEN |

In Table 2, the route is designated R002.

The checkpoint codes for checkpoints 50*a*–50*c* and 51*a*–51*d* are F50A–F50C and F51A–F51D, respectively. The date stamp is a twelve digit number in the form year-month-day-hour-minute-second. Note in the log of Table 2 that the guard has failed to scan the 51*b* and 51*c* cheokpoints. Of these the 51*c* checkpoint is a higher priority, must scan checkpoint. Also at line 10 of the log the guard has scanned the bar code ZZ from a pocket reference card and then has entered the alphanumeric message "WINDOW OPEN", which is shown schematically at line 14.

A number of important operational features of the tour monitor 30 have been illustrated by the flowcharts of FIGS. 4–13. In particular, it should be noted that the monitor 30 displays on the display 34 both the name of the current zone and the name of the next zone in the tour. These zone identifying messages assist a new guard in conducting the tour in the order intended, and they also assist an experienced guard in learning a new tour.

Second, the monitor 30 is pre-programmed by the tour defining record for a tour made up of an ordered sequence of zones, wherein each zone includes a set of checkpoints that are not ordered within the set. This allows the guard to check the checkpoints within each zone in any order he desires while enforcing an overall sequence of zones in the tour.

Third, the checkpoints within each zone are designated as either higher priority (must scan) checkpoints or lower priority checkpoints. The monitor 30 does not take any action if lower priority checkpoints are not scanned during the tour. However, in the event any higher priority checkpoints are not scanned, the monitor 30 does not advance to the next zone until the guard has been reminded that the higher priority checkpoints were not scanned and the guard has indicated an intention to override this warning by skipping rather than scanning the missed checkpoints. This allows flexibility during the tour, because the guard can scan only a varying number of the lower priority checkpoints in each tour. Nevertheless, the guard is reminded that each of the higher priority checkpoints is to be scanned each tour. For example, potential fire sources such as coffee pots can be designated as higher priority checkpoints so that in each tour each coffee pot in a building is checked to ensure that it is unpowered and therefore not a fire hazard.

Another important advantage is that the monitor 30 allows the guard to record any desired alphanumeric message (within the allowed length) at any point within the tour. This is done by scanning a bar code that designates an alphanumeric message is to follow, and then entering the alphanumeric message via the keyboard 32. The keyboard 32 generates key signals which are then stored by the monitor in association with the bar codes of the log for later transmission to the computer 12. This feature provides an important degree of flexibility in the log which allows the guard to record unexpected events.

Figure 14:
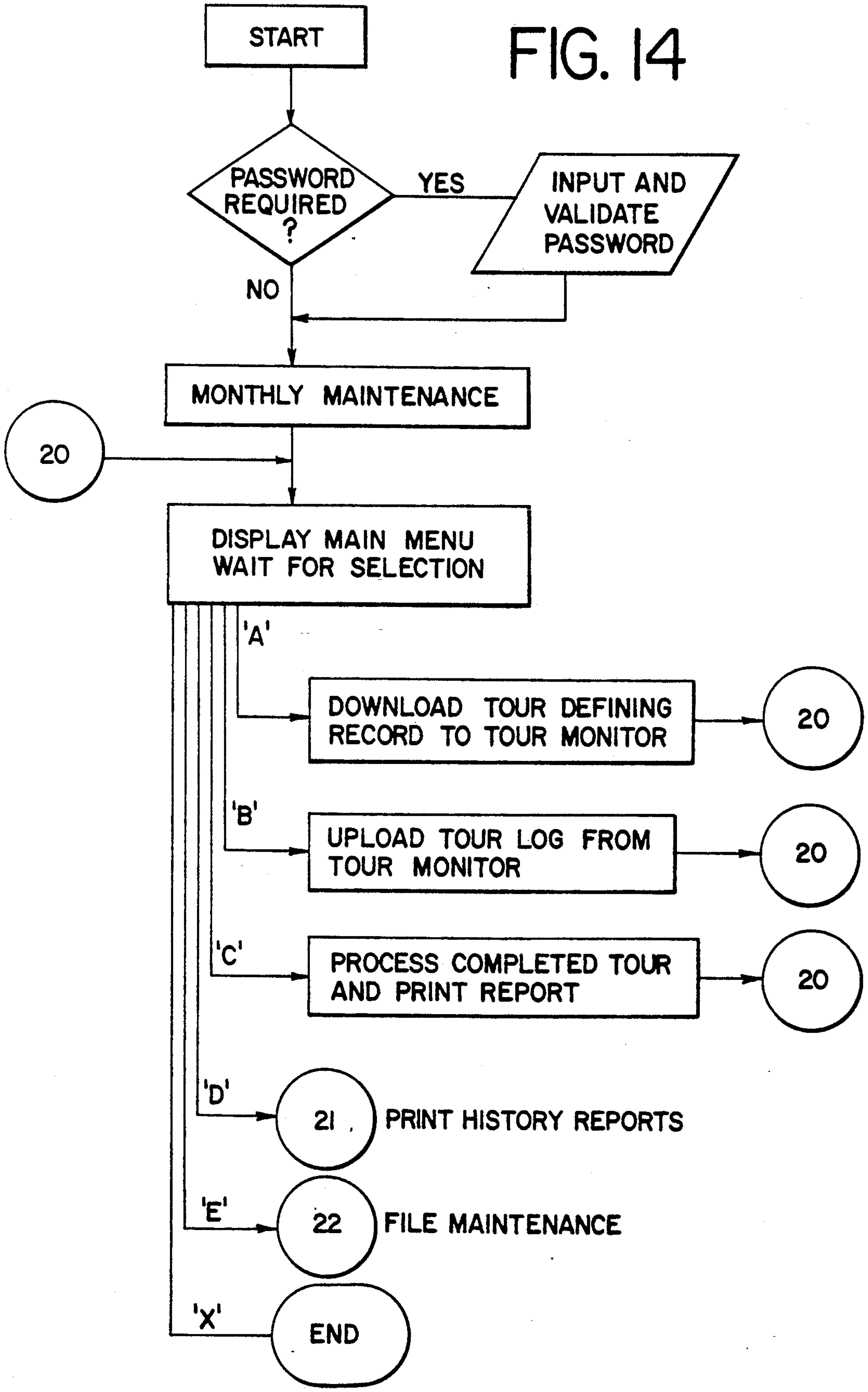
Figure 15:
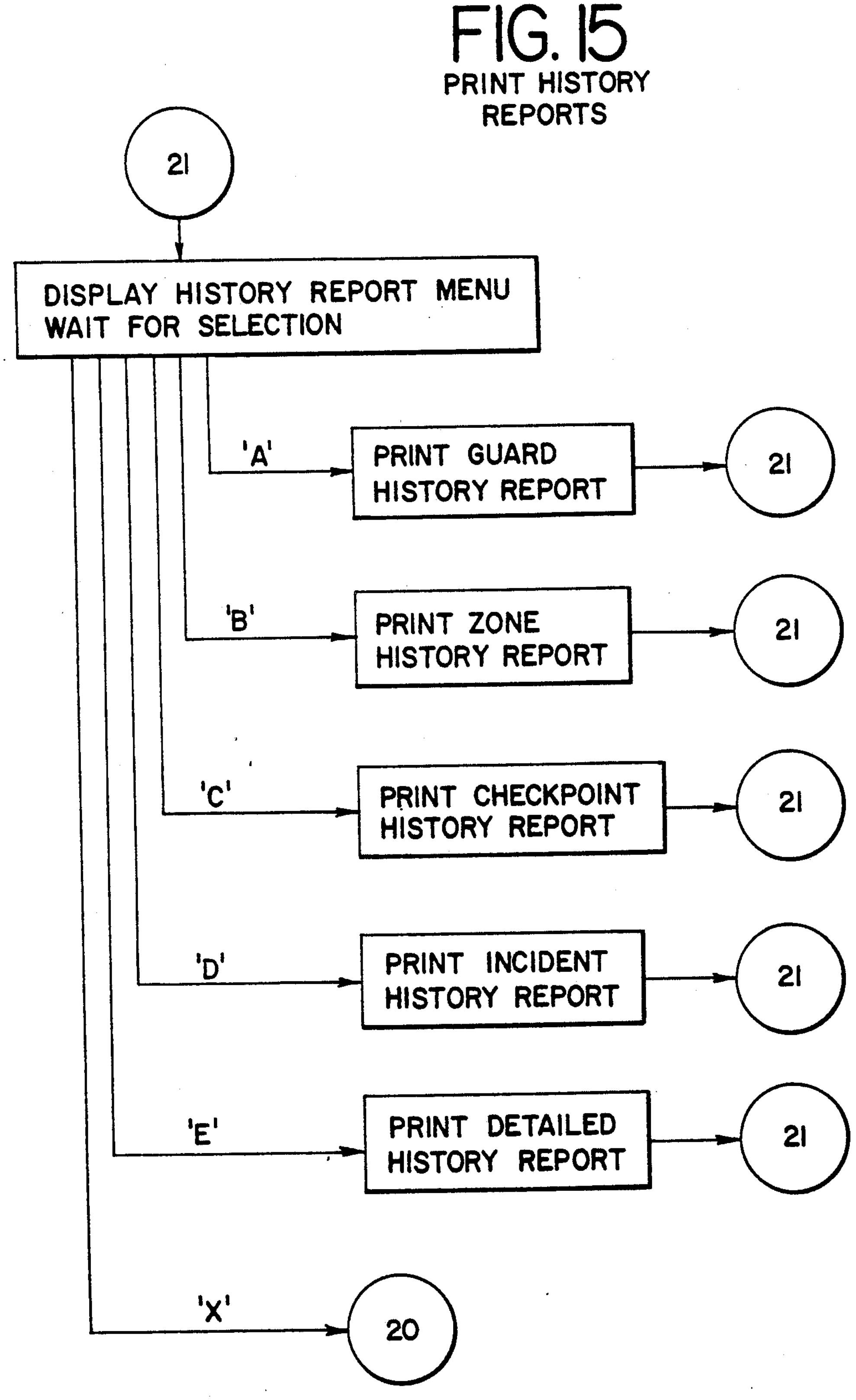
Figure 16:
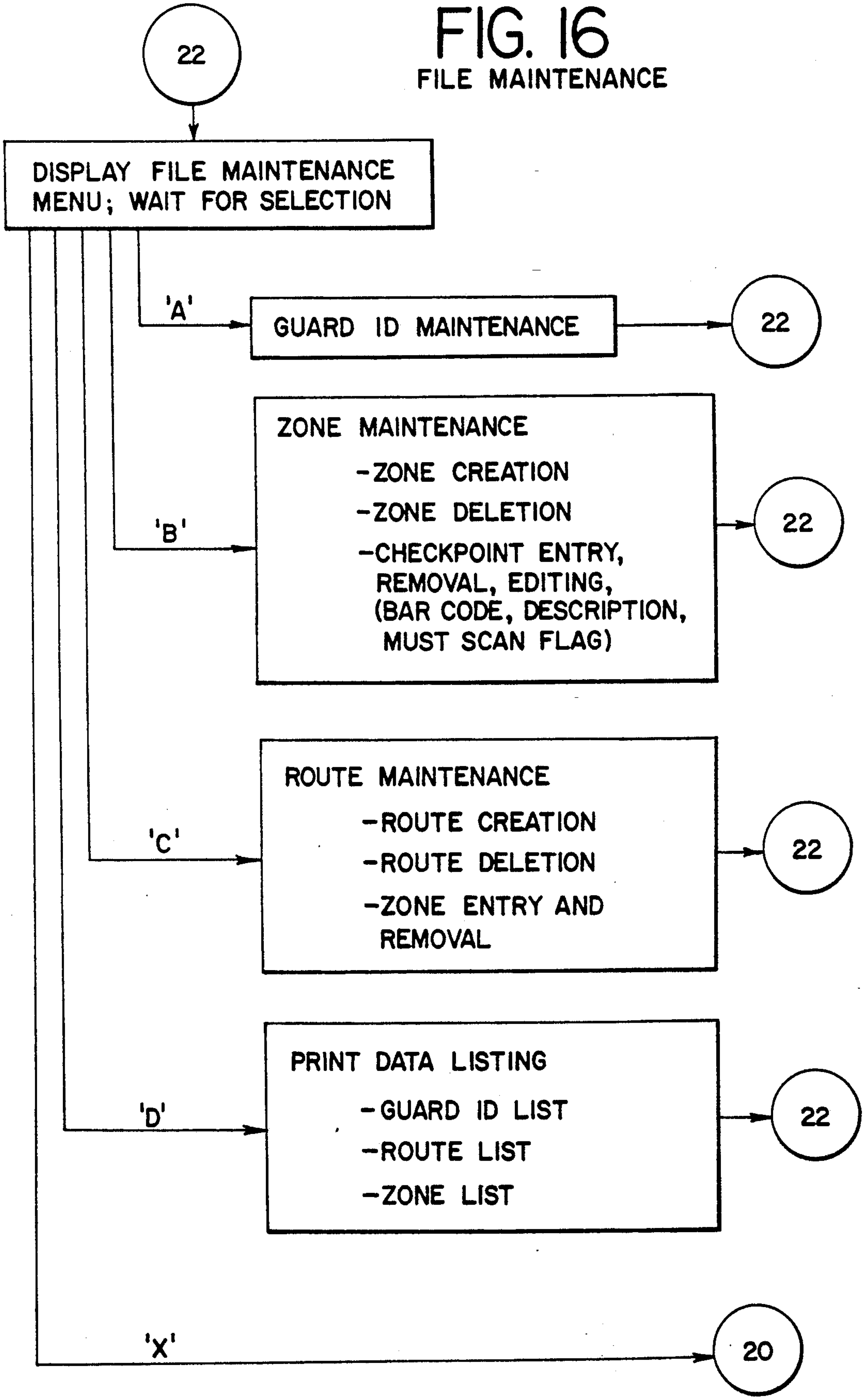

Turning now to FIGS. 14–16, the tour programming software 20 and the report generating software 22 of the computer 12 will now be described.

FIG. 14 shows an overall flowchart of the software of the computer 12. The software requires a password of the user and then after monthly maintenance displays a main menu and waits for a selection. As shown in FIG. 14 there are four basic sets of routines available to the user.

The first is a down-load routine that downloads a tour defining record to the tour monitor 30. The tour defining record is of the type described above prior to the discussion of the program of FIG. 4, and it includes a route record which is created with the program of FIG. 16 described below.

The user can also select from the main menu an up-load routine that up-loads a completed tour log (as for example that shown in Table 2) from the tour monitor 30.

The letter "C" can be used to select processing routines that process a completed tour log and print a tour report. Table 3 is an example of a report that may, for example, be printed in response to the tour log of Table 2. This report provides a summary of the information included in the log, in a format that is readily understood by supervisory personnel.

TABLE 3

DETAIL ROUTE REPORT

| | |
|---|---|
| Guard Name: John Doe | Check In: 1-13-89 15:06 |
| Route Name: Route No. 2 | Check Out: 1-13-89 15:14 |
| | Total Time: 0 Hr. 8 Min. |
| Zones Checked: 2 of 2 | Total In Zone Points: 7 |
| In Zones: 0 Hr. 8 Min. | In Zone Points Checked: 5 |
| Between Zones: 0 Hr. 0 Min. | Percent Checked: 71% |
| | Must Scans Missed: 1 |

* = Out of Zone
! = Missed Must Scan

| Zone No. | Check Point | Bar Code | Check Time | Between Time | Incident |
|---|---|---|---|---|---|
| | Check In | | 15:06 | | |
| Enter Zone FL1A - 1st Floor-W | | | 15:06 | 00:00 | |
| FL1A | Suite 100-Kitchen | F50A | 15:10 | 00:04 | |
| FL1A | Coffee Pot | F50B | 15:11 | 00:01 | |
| FL1A | Window | F50C | 15:11 | 00:00 | |
| | Leave Zone | | | | |
| Enter Zone FL1B - 1st Floor-E | | | 15:12 | 00:01 | |
| FL1B | Hall Window | F51A | 15:12 | 00:00 | WINDOW OPEN |
| ! | Suite 102 | F51C | | | |
| FL1B | Hall Door | F51D | 15:14 | 00:02 | |
| | Leave Zone | | 15:14 | 00:00 | |
| | Check Out | | 15:14 | 00:00 | |

Note in particular that for each checkpoint that was scanned during the tour the report includes a description of the checkpoint along with the checkpoint's zone number, bar code and the time the checkpoint was scanned. As shown in Table 3, the report is divided into sections corresponding to the separate zones of the tour. This allows supervisory personnel to focus on particular zones easily.

Another important feature of the report of Table 3 is that it includes the alphanumeric messages that were keyed by the guard after the bar code "ZZ" was scanned. Note, for example, the "WINDOW OPEN" message in the incident column.

A third important feature of the report of Table 3 is that higher priority checkpoints that were not scanned by the guard are highlighted, while missed lower priority checkpoints are not indicated. Note the exclamation point at the line associated with Suite 102, bar code F51C. The exclamation point indicates that the guard missed this higher priority checkpoint. Also, the header of the report summarizes the total number of higher priority or must-scan checkpoints which were missed.

By pressing the letter "D" in the main menu, the user can select the print history reports routine shown in FIG. 15. This routine first displays a history report menu and then waits for the user to select one of five possible history reports. For example, the system can be commanded to prepare and print reports summarizing the history of a particular guard, a particular zone or zones, a particular checkpoint or checkpoints, and incidents reported by guards. Finally, detailed history reports are also available.

By typing the letter "E" in the main menu of FIG. 14, the user can select the file maintenance routines shown in FIG. 16. The file maintenance routines allow the user to create, delete and edit entries in a guard ID file, a set of zone files, and a set of route files.

The guard ID file maintains a list of authorized guard codes. Once the guard ID file has been created and updated as necessary in the routine of FIG. 16, this file is included in the tour defining record (Item 7).

In the zone maintenance portion of the routine of FIG. 16 a user can create or delete a zone and add, delete or edit checkpoints within the zone. Within each zone, a bar code, description and must-scan flag are entered by the user to define each checkpoint of the zone. The bar code identifies the bar code associated with the checkpoint; the description is used by the tour monitor 30 in the event of a missed higher priority checkpoint and by the report generating software; the must scan flag designates the checkpoint as either a higher priority or a lower priority checkpoint. None, some, or all of the checkpoints within any zone can be designated as higher priority checkpoints. Each zone can be thought of as a set of checkpoints, and if desired a zone can have no checkpoints (the empty set). Such a zone is in effect merely a message displayed to the guard at a selected point in the tour.

The route maintenance portion of the routine of FIG. 16 allows the user to create and delete a route and to add and delete zones within a route.

Finally, the print data listing portion of the routine of FIG. 16 allows the user to print out a list of guards, zones and routes.

The file maintenance routine of FIG. 16 is used by a user first to create a number of zones. In the example of Route No. 2 shown in FIG. 3, the user creates two zones, FL1A and FL1B. For each checkpoint in each zone, the user enters the checkpoint bar code, description, and must-scan flag for that checkpoint.

The user then uses the route maintenance portion of the routine of FIG. 16 to actually create the route. In this case, the user merely indicates that Route 2 is to include zones FL1A and FL1B.

Individual zones may appear in more than one route or more than once in a route, and individual checkpoints may appear in more than one zone. This allows a high degree of flexibility in programming the tour monitor 30. For example, a user can change the order in which zones are inspected, or move individual zones from one route to another, simply and easily, without re-entering individual checkpoints. This flexibility is directly attributable to the fact that each route is a set of zones, and that each zone is a set of checkpoints. This arrangement has been found to simplify the programming of the tour monitor 30 when routes are being modified.

Simply by way of example in order better to define the presently preferred embodiment of this invention, Appendices 1-1 and 2-1 list the programs executed by the computer 12 and the tour monitor 30, respectively. Appendix 3-1 provides instructions for usihg these listings, and Appendices 1-2, 1-3 and 1-4 are also referenced in Appendix 3-1. In each case the listing is to be regarded as the primary disclosure of the presently preferred embodiment. In the event of any inconsistency between the listing and the flowcharts the listing is to govern. In the event of any inconsistency between the flowcharts and the written description, the flowcharts are to govern.

Of course, it should be understood that a wide range of changes and modifications can be made to the preferred embodiments described above. For example, this invention is not limited to use in security tours, but can readily be adapted for other types of tours such as the tours to inspect or perform janitorial activities such as housekeeping activities. Furthermore, this invention is not limited to the specific hardware used in the foregoing examples. For example, magnetic code readers, character recognition devices and the like can be substituted for the bar code reader described above. Furthermore, it is not essential in all embodiments that a cable 42 be used to interconnect the monitor 30 with the computer 12. A wide variety of communication approaches can be used, including modems, radios, and optical communication systems. In the event remote transmission capabilities are provided to the monitor 30, it is not essential that the log be stored in memory until the tour is completed prior to transmission of portions of the log back to the computer 12. Of course, a wide variety of reports can be generated utilizing the information transmitted from the monitor 30 to the computer 12.

It is therefore intended that the foregoing detailed description be regarded as illustrative rather than limiting, and that it be understood that it is the following claims, including all equivalents, which were intended to define the scope of this invention.

```
* MAINTLIB.PRG
* COPYRIGHT 1989, 1988 COMPUTER SYSTEMS DESIGN, INC.

PROCEDURE DISASTER
SET COLOR TO &HILIT
CLEAR SCREEN
HEADER('RECOVER FROM PROCESSING ERROR',-1)
MESG(10,'If an error occurred the last time PROCESS COMPLETED TOURS was run.')
MESG(11,'this routine will re-build the history data files.  All data will')
MESG(12,'appear as if the last batch of completed tours was never processed.')
MESG(18,'ESC to Quit')
SET CURSOR ON
IF CONFIRM(15,'N') .AND. LASTKEY()#27
  CLR(10)
  CLOSE DATABASES
  FUSE('CONFIG/CO')
  XZHIST=ZHIST
  XGHIST=GHIST
  XCHIST=CHIST
  USE
  SET COLOR TO &BLUELIT
  @ 6,10 CLEAR TO 12,70
  SET COLOR TO &BLUELIT
  @ 6,10 TO 12,70 DOUBLE
  SET COLOR TO &HILIT
  @ 7,17  SAY 'Zone History File Being Restored.       Working.'
  FUSE('XZHISTORY/ZH')
  GO XZHIST
  SKIP
  DELETE WHILE ! EOF()
  USE
  SET COLOR TO &LOLIT
  @ 7,17  SAY 'Zone History File Restored.             Done.   '
  SET COLOR TO &HILIT
  @ 9,17  SAY 'Guard History File Being Restored.      Working.'
  FUSE('XGHISTORY/ZH')
  GO XGHIST
  SKIP
  DELETE WHILE !EOF()
  USE
  SET COLOR TO &LOLIT
  @ 9, 17 SAY 'Guard History File Restored.            Done.   '
  SET COLOR TO &HILIT
  @ 11,17 SAY 'Checkpoint History File Being Restored. Working.'
  FUSE('XCHISTORY/ZH')
  GO XCHIST
  SKIP
  DELETE WHILE !EOF()
  USE
```

```
SET COLOR TO &LOLIT
@ 11,17 SAY 'Checkpoint History File Restored.       Done.'
SET COLOR TO &HILIT
MESS(14,'All History files have been restored.')
MESS(15,'Reindexing will begin next.')
XJUNK=INKEY(5)
FUSE('DATAFILE/DA')
SET FILTER TO DRECOVER
GO TOP
XOLD=''
CLR(6)
SET COLOR TO &HILIT
MESS(18,'Reindexing restored files. This may take awhile.')
XXLP=7
XINDXNUM=0
XLASTFIL = NFILE
@ 6,10 CLEAR TO 12,70
SET COLOR TO &BLUELIT
@ 6,10 TO 12,70 DOUBLE
SET COLOR TO &HILIT
DO WHILE ! EOF()
  NNFILE='X'+TRIM(NFILE)
  XINDXNUM=XINDXNUM+1
  IF XLASTFIL<>NFILE
    SET COLOR TO &BLUELIT
    @ XXLP,17 SAY 'Reindexing File: '+XLASTFIL+' Done.
    SET COLOR TO &HILIT
    XLASTFIL=NFILE
    XINDXNUM=1
    XXLP=XXLP+1
    IF XXLP>11
      XXLP=7
      CLR(6)
      SET COLOR TO &HILIT
      @ 7,11 CLEAR TO 11,69
    ENDIF
  ELSE
    SELECT DA
    SET COLOR TO &HILIT
    @ XXLP,17 SAY 'Reindexing File: '+NFILE+' On Index # '+TRANSFORM(XINDXNUM,'999')
  ENDIF
  IIFILE=TRIM(IFILE)
  SELECT 2
  FUSE('&NNFILE/AA/&IIFILE')
  IF NNFILE<>XOLD
    SELECT DA
    SET COLOR TO &HILIT
    @ XXLP,17 SAY 'Reindexing File: '+NFILE+' On Index # '+TRANSFORM(XINDXNUM,'999')
    SELECT AA
    PACK
    XOLD=NNFILE
  ELSE
    SELECT DA
    SET COLOR TO &HILIT
    @ XXLP,17 SAY 'Reindexing File: '+NFILE+' On Index # '+TRANSFORM(XINDXNUM,'999')
    SELECT AA
    REINDEX
  ENDIF
  USE
  SELECT DA
  SKIP
ENDDO
SET COLOR TO &BLUELIT
@ XXLP,17 SAY 'Reindexing File: '+XLASTFIL+' Done.
SET COLOR TO &HILIT
CLOSE DATABASES
MESS(18,'Reindexing of files is complete. Recovery is complete.')
XJUNK=INKEY(5)
ENDIF
SET COLOR TO &HILIT
RETURN
PROCEDURE RNDXPROG
IXFILNAME = 'DATAFILE'
HEADER('REINDEX FILES',-1)
```

```
MESG(10,'This selection reindexes ALL data files.')
SET CURSOR ON
IF ! CONFIRM(12,'N') .OR. LASTKEY()=27
  CLOSE DATABASES
  SET DELETE ON
  SET DELIMITERS ON
  SET CURSOR ON
  RETURN
ENDIF
CLR(5)
SET DELETE ON
FUSE('X'+IXFILNAME+'/DA')
COUNT FOR ! EMPTY(SFILE) TO TRECCOUNT
IF (TRECCOUNT = 0)
  ERRMESG(10,'Error, no index list found.')
  CLOSE DATABASES
  SET DELETE ON
  SET DELIMITERS ON
  SET CURSOR ON
  RETURN
ENDIF
SORT ON NFILE TO TEMP FOR ! EMPTY(SFILE)
SET DELETE OFF
FUSE('XTEMP/DA')
GO TOP
SELECT DA
GO TOP
N = 0
SET COLOR TO &HILIT
@ 6,5 CLEAR TO 17,75
SET COLOR TO &BLUELIT
@ 6,5 TO 17,75 DOUBLE
SET COLOR TO &HILIT
YOLDFILE = SPACE(1)
DO WHILE ! EOF()
  N=N+1
  IF N > 10
    N=1
    SET COLOR TO &HILIT
    @ 7,6 CLEAR TO 16,74
  ENDIF
  SET COLOR TO &HILIT
  @ N+6,7 SAY NFILE+'  '+IFILE+'  '+RTRIM(SFILE)
  @ N+6,64 SAY 'Reindexing'
  NF='X'+TRIM(NFILE)
  SF=TRIM(SFILE)
  IFL=TRIM(IFILE)
  SELECT 2
  FUSE('&NF/NF')
  IF YOLDFILE <> DA->NFILE
    YOLDFILE = DA->NFILE
    SELECT DA
    @ N+6,7 SAY NFILE+'  '+IFILE+'  '+RTRIM(SFILE)
    @ N+6,64 SAY 'Packing...'
    SELECT NF

    PACK
    SELECT DA
    @ N+6,7 SAY NFILE+'  '+IFILE+'  '+RTRIM(SFILE)
    @ N+6,64 SAY 'Reindexing'
    SELECT NF
  ENDIF
  INDEX ON &SF TO &IFL
  USE
  SELECT DA
  SET COLOR TO &BLUELIT
  @ N+6,7 SAY NFILE+'  '+IFILE+'  '+RTRIM(SFILE)
  @ N+6,64 SAY 'Done.
  SET COLOR TO &HILIT
  SKIP
ENDDO
SET DELETE ON
SET COLOR TO &HILIT
CLOSE DATABASES
MESG(19,'Reindexing of files is complete.')
```

```
XJUNK=INKEY(5)
SET DELIMITERS ON
SET CURSOR ON
DELETE FILE('TEMP.DBF')
RETURN
FUNCTION UPKDATE
PARAMETERS F0
XYY=SUBSTR(STR(ASC(F0)+150,3),2)
XMM=SUBSTR(STR(ASC(SUBSTR(F0,2))+68,3),2)
XDD=SUBSTR(STR(ASC(SUBSTR(F0,3))+68,3),2)
RETURN XMM+'/'+XDD+'/'+XYY
FUNCTION PKTIME
PARAMETERS F0
XHH=CHR(VAL(F0)+32)
XMM=CHR(VAL(SUBSTR(F0,4))+32)
RETURN XHH+XMM
FUNCTION UPKTIME
PARAMETERS F0
XHH=SUBSTR(STR(ASC(F0)+68,3),2)
XMM=SUBSTR(STR(ASC(SUBSTR(F0,2))+68,3),2)
IF XHH='25'
  RETURN '  :  '
ENDIF
RETURN XHH+':'+XMM
FUNCTION UPKTITLE
PARAMETERS F0
XT=''
FOR N=35 TO 1 STEP -1
  XT=XT+CHR(122-ASC(SUBSTR(F0,N)))
NEXT
RETURN XT
FUNCTION OKDATE
PARAMETER ADATE,P2ARM
IF LASTKEY()=27 .OR. LASTKEY()=5
  RETURN .T.
ENDIF
IF EMPTY(ADATE)
  ERRMESG(P2ARM,'Date must not be empty.')
  MESG(P2ARM,'ESC to exit.')
  RETURN .F.
ENDIF
RETURN .T.
FUNCTION PKDATE
PARAMETERS F0
XDD=CHR(DAY(F0)+32)
XMM=CHR(MONTH(F0)+32)
XYY=YEAR(F0)%100
XYY=CHR(XYY+IIF(XYY>=82,-50,50))
RETURN XYY+XMM+XDD
* DETREP3.PRG
* COPYRIGHT 1989, 1988 COMPUTER SYSTEMS DESIGN, INC.

FUNCTION SCANMISS
PARAMETER RTINE,RRORRC
SELECT &RRORRC
LZNREC   = RECNO()
ALLPNTIZONE = 0
SELECT BC
SET ORDER TO 2
SEEK XCURZ
DO WHILE (ZNUM = XCURZ) .AND. ! EOF()
  ALLPNTIZONE = ALLPNTIZONE + 1
  IF MUSTCHECK = 'Y'
    SELECT &RRORRC
    GO ZNREC
    DO WHILE (RECNO() <> LZNREC) .AND. ! EOF()
      IF LEN(TRIM(LOGDATA)) = 2 .AND. TYPE='R'
        IF TRIM(LOGDATA) = 'ZZ'
          SKIP
        ENDIF
      ELSE
        IF LOGDATA = BC->BARCODE
          EXIT
        ENDIF
      ENDIF
```

```
      SKIP
    ENDDO
    IF (LOGDATA <> BC->BARCODE) .OR. EOF()
      DO CASE
      CASE RTINE = 1
        TMISSCHK = TMISSCHK + 1
      CASE RTINE = 2
        L = L+1
        @ L,0 SAY '!'
        @ L,10 SAY BC->DESC
        @ L,28 SAY BC->BARCODE
      CASE RTINE = 3
        MISSCHK = MISSCHK + 1
      CASE RTINE = 4
        IF (L = 0) .OR. (L > LMAX)
          IF L <> 0
            EJECT
          ENDIF
          DO MSCANHEAD
        ENDIF
        @ L,0  SAY XRNUM
        @ L,8  SAY XGNAME
        @ L,33 SAY BC->BARCODE
        @ L,40 SAY BC->DESC
        @ L,57 SAY XCURZ
        @ L,65 SAY XZNAME
        L = L + 1
      ENDCASE
    ENDIF
  ENDIF
  SELECT BC
  SKIP
ENDDO
SELECT BC
SET ORDER TO 1
SELECT ERRORREC
GO LZNREC
RETURN ALLPNTIZONE
PROCEDURE CALCTOTZPNT
PARAMETER XROUTE
SELECT RTD
SEEK XROUTE
DO WHILE RNUM = XROUTE .AND. ! EOF()
  SELECT ZN
  SEEK RTD->ZNUM
  IF ! EOF()
    TPNTIZONE = TPNTIZONE + POINTS
  ENDIF
  SELECT RTD
  ZTOTAL = ZTOTAL + 1
  SKIP
ENDDO
RETURN
PROCEDURE NORMHEAD
@ 1, 0 SAY DATE()
@ 1,40-.5*(LEN(TRIM(HEAD))) SAY HEAD
@ 1,71 SAY 'Page: '+STR(XPG,3)
@ 2, 0 SAY TIME()
IF ISROAM
  IF ISFORDET
    @ 2,31 SAY 'DETAIL ROAM REPORT'
  ELSE
    @ 2,31 SAY 'SUMMARY ROAM REPORT'
  ENDIF
ELSE
  IF ISFORDET
    @ 2,31 SAY 'DETAIL ROUTE REPORT'
  ELSE
    @ 2,31 SAY 'SUMMARY ROUTE REPORT'
  ENDIF
ENDIF
@ 2,69 SAY 'Report: '+STR(XPNTPG,3)
@ 3,25 SAY 'The TourWatch Manager (C) 1989'
@ 4, 0 SAY 'Guard Name : '+ XGNAME
@ 4,38 SAY 'Route Name : '+XROUTE
```

```
IF ISFORDET
  @ 6,0 SAY 'Zone                        Bar         Check      Between'
  @ 7,0 SAY 'Number  Checkpoint          Code        Time         Time      Incident'
ELSE
  @ 6,0 SAY 'Zone                   Enter  Leave  Total In-Zone In-Zone  Percent  Must-scans'
  @ 7,0 SAY 'Number  Zone Name       Time   Time   Time  Points Pts Chkd Checked      Missed'
ENDIF
@ 8,0 SAY REPLICATE('-',80)
L = 9
RETURN
PROCEDURE MISSCAN
L     = 0
XRNUM = SPACE(6)
SET DEVICE TO PRINT
SELECT RC
GO TOP
DO WHILE !EOF()
  DO WHILE TYPE <> 'G' .AND. !EOF()
    SKIP
  ENDDO
  IF EOF()
    EXIT
  ELSE
    SKIP -1
    IF !EOF() .AND. TYPE = 'S'
      XRNUM = LOGDATA
    ENDIF
    SKIP
    SELECT GN
    SEEK UPPER(RC->LOGDATA)
    IF EOF()
      XGNAME = 'Undefined guard'
    ELSE
      XGNAME = GNAME
    ENDIF
  ENDIF
  SELECT RC
  SKIP
  DO WHILE TYPE <> 'G' .AND. !EOF()
    DO WHILE !(TYPE $ 'EG') .AND. !EOF()
      SKIP
    ENDDO
    IF TYPE = 'E' .AND. !EOF()
      ZNREC = RECNO()
      XCURZ = LOGDATA
      SELECT ZN
      SEEK XCURZ
      IF EOF()
        XZNAME = 'Undefined zone'
      ELSE
        XZNAME = SDESC
      ENDIF
      SELECT RC
      SKIP
      DO WHILE (TYPE = 'R') .AND. ! EOF()
        SKIP
      ENDDO
      SCANMISS(4,'RC')
    ENDIF
  ENDDO
ENDDO
IF L = 0
  SET DEVICE TO PRINT
  DO MSCANHEAD
  @ L+2,0 SAY 'No must-scan checkpoints were missed.'
ENDIF
EJECT
SET DEVICE TO SCREEN
RETURN
PROCEDURE MSCANHEAD
XPG = XPG + 1
@ 1, 0 SAY DATE()
@ 1,40-(INT(LEN(HEAD)/2)) SAY HEAD
@ 1,71 SAY 'Page: '+STR(XPG,3)
```

```
@ 2, 0 SAY TIME()
@ 2,28 SAY 'MISSED MUST-SCANS REPORT'
@ 3,25 SAY 'The Tourwatch Manager (C) 1988'
@ 5, 0 SAY 'Route   Guard                    Bar                     Zone    Zone'
@ 6, 0 SAY 'Number  Name                     Code   Checkpoint       Number  Name'
@ 7, 0 SAY REPLICATE('-',80)
L = 8
RETURN
PROCEDURE INCIDSUM
L=0
FOR J=1 TO 2
  SET DEVICE TO SCREEN
  IF J=1
    XALIAS1 = 'RC'
    SELECT 1
    FUSE('RECORD/RC/RCNUMX')
  ELSE
    XALIAS1 = 'RR'
    SELECT 1
    FUSE('ROAMREC/RR/ROAMIX')
  SET ORDER TO
ENDIF
LOCATE FOR LEN(TRIM(LOGDATA))=2 .AND. TYPE = 'R'
IF !EOF()
  SET DEVICE TO PRINT
  LMAX = 52
  IF L=0 .OR. L>LMAX
    DO INCIDHEAD
  ENDIF
  DUPLICATES = .F.
  SAMEZONES  = 0
  INCIDQTY   = 0
  DO WHILE .NOT. EOF()
    DO WHILE LEN(TRIM(LOGDATA))<>2 .AND. !EOF()
      SKIP
    ENDDO
    IF EOF()
      EXIT
    ENDIF
    IF TYPE<>'R'
      SKIP
      LOOP
    ENDIF
    XRECNO=RECNO()
    SKIP -1
    IF J=2 .AND. LEN(TRIM(LOGDATA))<>2 .AND. !DUPLICATES
      OLDRECNO = RECNO()
      OLDRCNUM = RCNUM
      SELECT BC
      SEEK &XALIAS1->LOGDATA
      SAMEZONES = 0
      INCIDQTY  = 0
      DO WHILE BARCODE=&XALIAS1->LOGDATA .AND. !EOF()
        SAMEZONES = SAMEZONES+1
        SKIP
      ENDDO
      SELECT &XALIAS1
      IF SAMEZONES>=2
        DUPLICATES = .T.
        SKIP
        DO WHILE RCNUM=OLDRCNUM.AND.TYPE='R'.AND.LEN(TRIM(LOGDATA))=2.AND.!EOF()
          IF TRIM(LOGDATA)='ZZ'
            INCIDQTY=INCIDQTY+1
            SKIP
          ENDIF
          INCIDQTY=INCIDQTY+1
          SKIP
        ENDDO
      ELSE
        DUPLICATES=.F.
      ENDIF
      GO OLDRECNO
    ENDIF
    XXBARCODE=&XALIAS1->LOGDATA
    SELECT BC
```

```
    SEEK XXBARCODE
    IF EOF()
      XCHKPOINT='Undefined'
    ELSE
      XCHKPOINT=SUBSTR(DESC,1,15)
    ENDIF
    SELECT &XALIAS1
    DO WHILE TYPE<>'R' .AND. !EOF()
      SKIP -1
    ENDDO
    SELECT GN
    SEEK UPPER(&XALIAS1->LOGDATA)
    IF EOF()
      XGNAME='Undefined'
    ELSE
      XGNAME=SUBSTR(GNAME,1,24)
    ENDIF
    SELECT &XALIAS1
    GO XRECNO
    DO WHILE LEN(TRIM(LOGDATA))=2 .AND. TYPE='R' .AND. !EOF()
      IF L > LMAX
        IF ! CHNGPAGE('INCIDHEAD')
          CLEAR
          CLOSE DATABASES
          RETURN
        ENDIF
      ENDIF
      @ L, 0 SAY XXBARCODE
      @ L, 7 SAY XCHKPOINT
      @ L,24 SAY DATE
      @ L,33 SAY TIME
      @ L,40 SAY XGNAME
      IF LOGDATA='ZZ'
        SKIP
        SELECT OH
        SEEK &XALIAS1->LOGDATA
      ELSE
        SELECT EC
        SEEK TRIM(&XALIAS1->LOGDATA)
      ENDIF
      IF !EOF()
        IF ALIAS()<>'OH'
          @ L,65 SAY SUBSTR(EDESC,1,15)
        ELSE
          @ L,65 SAY SUBSTR(COMMENT,1,15)
        ENDIF
      ELSE
        @ L,65 SAY 'Undefined'
      ENDIF
      SELECT &XALIAS1
      SKIP
      L = L+1
    ENDDO
    IF DUPLICATES .AND. LEN(TRIM(LOGDATA))<>2 .AND. !EOF()
      SKIP INCIDQTY*(SAMEZONES-1) + (SAMEZONES-1)
      DUPLICATES=.F.
    ENDIF
   ENDDO
   EJECT
  ENDIF
NEXT
IF L = 0
  SET DEVICE TO PRINT
  DO INCIDHEAD
  @ L+2,0 SAY 'There were no incidents to print.'
  EJECT
ENDIF
SET DEVICE TO SCREEN
RETURN
PROCEDURE INCIDHEAD
XPG = XPG + 1
@ 1, 0 SAY DATE()
@ 1,40-INT(LEN(HEAD)/2) SAY HEAD
@ 1,71 SAY 'Page: '+STR(XPG,3)
```

```
@ 2, 0 SAY TIME()
@ 2,29 SAY 'INCIDENT SUMMARY REPORT'
@ 3,25 SAY 'The Tourwatch Manager (C) 1988'
@ 5, 0 SAY 'Bar                     Check  Check'
@ 6, 0 SAY 'Code   Checkpoint       Date   Time   Guard Name            Incident'
@ 7, 0 SAY REPLICATE('-',80)
L = 8
RETURN
* TMMENU.PRG
* COPYRIGHT 1989, 1988 COMPUTER SYSTEMS DESIGN, INC.


SET CONFIRM ON
SET EXCLUSIVE OFF
SET BELL OFF
SET INTENSITY OFF
SET TALK OFF
SET DELETE ON
SET SAFETY OFF
SET DELIMITERS TO '[]'
SET WRAP ON
SET EXACT ON
SET SOFTSEEK OFF
CLOSE DATABASES
SLINE=REPLICATE(CHR(196),80)
DLINE=REPLICATE(CHR(205),80)
LINE=SUBSTR(SLINE,1,60)
FRAME=CHR(213)+CHR(205)+CHR(184)+CHR(179)+CHR(217)+CHR(196)+CHR(192)+CHR(179)
LBLOCK=REPLICATE(CHR(205),5)+' '
RBLOCK=' '+REPLICATE(CHR(205),5)
XLEFT=CDOW(DATE())
UPLEFT='Tourwatch Manager'
L=0
DATE=CMONTH(DATE())+' '+STR(DAY(DATE()),2)+', '+STR(YEAR(DATE()),4)
XPIC='99,999,999.99'
HLPVAR = 0
IF ISCOLOR()
  INVRS    = '+GR+/B'
  LOLIT    = '+BG/B,+W/BG,,,+GR+/B'
  HILIT    = '+GR+/B,+W/BG,,,+GR+/B'
  SCORELIT = '+BG/N,+W/BG,,,+GR+/B'
  PASSWD   = '+GR+/B,B/B,,,B/B'
  PASSWND  = '+BG/B'
  REDLIT   = '+R/B'
  BLUELIT  = '+BG/B'
  HMENU    = '+GR+/B,+W/BG,,,+GR+/B'
  BLNKWIND = '+W/N'
  F2WIND   = 'W/N,'
  F2INVRS  = '+GR+/N'
  HEADLIT  = 'BG/B,+W/BG,,,+BG/B'
ELSE
  INVRS    = 'N/W'
  HILIT    = '+W/N'
  LOLIT    = 'W/N'
  SCORELIT = 'U'
  PASSWND  = '+W/N'
  PASSWD   = '+W/N,X,,,X'
  HMENU    = '+W/N'
  F2WIND   = '+W/N'
  F2INVRS  = 'N/W'
  REDLIT   = '+W/N'
  BLUELIT  = 'W/N'
  BLNKWIND = '+W/N'
  HEADLIT  = 'W/N'
ENDIF
SET COLOR TO &HILIT
SET CURSOR ON
XWINDREC = 0
STA='1'
SETCANCEL(.F.)
SET KEY 3 TO NULL_FUNC
SET KEY 18 TO NULL_FUNC
SET MESSAGE TO 14
FUSE('CONFIG/CD')
```

```
HEAD=TRIM(UPKTITLE(CBUFFER))
KEYBOARD ''
XTMPASS=SPACE(6)
IF TMCHK1<>SPACE(6)
  SET EXACT ON
  CLR(0)
  SET COLOR TO &PASSWND
  @ 9,21 TO 11,59
  SET COLOR TO &PASSWD
  SET CONSOLE OFF
  SET DELIM ON
  SET INTEN ON
  @ 10,23 SAY 'TourWatch Manager Password' GET XTMPASS PICTURE '@!'
  READ
  SET COLOR TO
  SET COLOR TO &HILIT
  SET CONSOLE ON
  IF LASTKEY()=27
    CLOSE DATABASES
    SET COLOR TO +W/N
    CLEAR SCREEN
    QUIT
  ELSE
    IF (XTMPASS<>TMCHK1)
      MESG(12,'Access to the TourWatch Manager is denied.')
      INKEY(5)
      SET COLOR TO +W/N
      CLEAR SCREEN
      CLOSE DATABASES
      QUIT
    ENDIF
  ENDIF
ENDIF
CLEAR
SHEAD=HEAD
HEADPOS=CENTERP(TRIM(UPKTITLE(CBUFFER)))
IF THISMONTH<>SUBSTR(DTOC(DATE()),1,2) .AND. !FIRSTTIME
  USE
  MESG(10,'Performing monthly file maintenance.  Please wait....')
  SET CURSOR OFF
  FUSE('CONFIG/CO')
  LOCKF('CONFIG')
  REPLACE THISMONTH WITH SUBSTR(DTOC(DATE()),1,2)
  UNLOCK
  USE
  FUSE('DATAFILE/DA')
  SET FILTER TO MOPACK
  GO TOP
  XOLD=''
  DO WHILE ! EOF()
    NNFILE='X'+TRIM(NFILE)
    IIFILE=TRIM(IFILE)
    MESG(12,TRIM(NFILE))
    SELECT 2
    FUSE('&NNFILE/AA/&IIFILE')
    IF XOLD<>NNFILE
      PACK
      XOLD=NNFILE
    ELSE
      REINDEX
    ENDIF
    USE
    SELECT DA
    SKIP
  ENDDO
  CLOSE DATABASES
  SET CURSOR ON
ENDIF
FUSE('CONFIG/CO')
IF FIRSTTIME
  LOCKF('CONFIG')
  REPLACE FIRSTTIME WITH .F.
  REPLACE THISMONTH WITH SUBSTR(DTOC(DATE()),1,2)
  UNLOCK
```

```
ENDIF
CLEAR
USE
DO WHILE .T.
  CLOSE DATABASES
  SET INTEN ON
  SET CURSOR ON
  SET DELIM ON
  SET COLOR TO &HILIT
  MS1='A  LOAD NEW ROUTE INTO MICRO-WAND     '
  MS2='B  GET COMPLETED TOURS FROM MICRO-WAND'
  MS3='C  PROCESS COMPLETED TOURS            '
  MS4='D  PRINT HISTORY REPORTS              '
  MS5='E  MAINTAIN FILES                     '
  MS6='X  EXIT FROM TourWatch Manager        '
  M61='Transfer New Route to Micro-Wand'
  M62='Transfer Completed Tour Information from Micro-Wand to Computer'
  M63='Print Route Reports for Completed Tours and Update History Files'
  M64='Print History Reports'
  M65='Maintain Guard, Zone and Route Information'
  M66='Quit'
  RES1=HEADER('M A I N   M E N U',6)
  CLEAR SCREEN
  BEGIN SEQUENCE
  DO CASE
  CASE RES1=1
    DO DOWNLOAD
  CASE RES1=2
    DO UPLOAD
  CASE RES1=3
    DO DETREP
  CASE RES1=4
    DO REPORTS
  CASE RES1=5
    DO MAINT
  CASE RES1=6
    SET CURSOR ON
    CLOSE DATABASES
    SET COLOR TO +W/N
    XX=0
    FOR YY=12 TO 0 STEP -1
      @ YY,0 CLEAR TO YY+XX,80
      FOR LITTLEWT=1 TO 17
      NEXT LITTLEWT
      XX=XX+2
    NEXT YY
    QUIT
  ENDCASE
  END
ENDDO
RETURN

* DOWNLOAD.PRG
* COPYRIGHT 1989, 1958 COMPUTER SYSTEMS DESIGN, INC.
CLEAR
CLOSE DATABASES
SET DELIMITERS ON
HEADER('LOAD ROUTE INTO MICRO-WAND',-1)
FUSE('RSUM/RTS/RNUM2X')
SELECT 2
FUSE('RDET/RTD/RNUM1X')
DUMD=' '
DUMT=' '
DO WHILE .T.
  CLR(10)
  XRNUM = SPACE(6)
  MESG(24,'F2 to display ROUTES.  ESC to exit.')
  @ 10,25 SAY 'Enter ROUTE number: ' GET XRNUM PICTURE '!!!!!!'
  SET KEY -1 TO GENWIND
  READ
  SET KEY -1 TO
  IF LASTKEY() = 27
    CLOSE DATABASES
    RETURN
  ENDIF
```

```
  IF EMPTY(XRNUM)
    LOOP
  ENDIF
  IF XRNUM = 'ROAM  '
    EXIT
  ENDIF
  SELECT RTS
  SEEK XRNUM
  IF EOF()
    ERRMESG(24,'This ROUTE number does not exist.')
  ELSE
    SELECT RTD
    SEEK XRNUM
    IF EOF()
      ERRMESG(24,'There is no data for this ROUTE.')
    ELSE
      EXIT
    ENDIF
  ENDIF
ENDDO
CLR(10)
MESG(10,'Please wait while preparing files...')
IF XRNUM<>'ROAM  '
  SELECT RTD
  XREC=RECNO()
  COPY TO TEMPRTD WHILE RNUM=XRNUM
  GO XREC
  SELECT 3
  FUSE('XTEMPRTD/TRTD')
  SET UNIQUE ON
  INDEX ON ZNUM TO TEMPRTDX
  SET UNIQUE OFF
ENDIF
USE
FUSE('GUARD/GD/GRDX')
IF XRNUM<>'ROAM  '
  SELECT 4
  FUSE('ZONE/ZN/ZNUMIX')
  SELECT 5
  FUSE('BARCODE/BARCODE/ZNUMIX')
  COPY TO TEMPBARC FOR MUSTCHECK = 'Y'
  SELECT 6
  FUSE('XTEMPBARC/BC')
  INDEX ON ZNUM TO TBX
  SELECT RTD
  SET RELATION TO ZNUM INTO ZN
  GO TOP
ENDIF
SELECT 7
FUSE('CONFIG/CG')
XCOMPORT=COMPORT
XPORT=VAL(XCOMPORT)
CLOSECOMM(XPORT)
RXSIZE=2048
TXSIZE=2048
X=OPENCOMM(XPORT,RXSIZE,TXSIZE)
IF X < 0
  MESG(10,'COM PORT '+XCOMPORT+' ERROR')
  MESG(11,'ERROR NUMBER '+STR(X))
  MESG(12,'PRESS ANY KEY TO CONTINUE')
  DO WHILE INKEY() = 0
  ENDDO
  CLOSE DATABASES
  CLOSECOMM(XPORT)
  RETURN
ENDIF
DO WHILE .T.
  CLR(10)
  DD = DTOS(DATE())
  @ 10,30 SAY 'The date is: ' + SUBSTR(DD,5,2)+'/'+SUBSTR(DD,7,2)+'/'+SUBSTR(DD,3,2)
  @ 11,30 SAY 'The time is: ' + TIME()
  MESG(19,'ESC to exit.')
  MESG(15,'Enter N to Change Date and Time of Micro-Wand')
  CONFIRMED = CONFIRM(13)
```

```
 IF LASTKEY()=27
   EXIT
 ENDIF
 IF CONFIRMED
   DUMD=DTOS(DATE())
   DUMT=TIME()
   EXIT
 ENDIF
 DO WHILE .T.
   CLR(12)
   NEWDATE = CTOD('  /  /  ')
   NEWTIME = SPACE(5)
   SET DELIM ON
   @ 13,28 SAY 'Enter new date' GET NEWDATE VALID OKDATE(NEWDATE,19)
   @ 14,29 SAY 'Enter new time' GET NEWTIME PICTURE '99:99' VALID OKTIME(NEWTIME)
   MESG(16,"Changing the Date/Time will reset the Micro-wand's Date/Time")
   MESG(17,"but will leave the PC's Date/Time unchanged.")
   MESG(19,'ESC to exit.')
   READ
   IF LASTKEY() = 27
     EXIT
   ENDIF
   CLR(16)
   MESG(19,'ESC to exit.')
   CONFIRMED = CONFIRM(16)
   IF LASTKEY()=27
     EXIT
   ENDIF
   IF CONFIRMED
     EXIT
   ENDIF
 ENDDO
 IF LASTKEY()=27
   EXIT
 ENDIF
 IF CONFIRMED
   DUMD=DTOS(NEWDATE)
   DUMT=NEWTIME+':00'
   EXIT
 ENDIF
ENDDO
IF LASTKEY()=27
  CLOSE DATABASES
  CLOSECOMM(XPORT)
  DELETE FILE('TEMPRTD.DBF')
  DELETE FILE('TEMPRTDX.NTX')
  DELETE FILE('TEMPBARC.DBF')
  DELETE FILE('TBX.NTX')
  RETURN
ENDIF
SET CURSOR OFF
PNUM=31
CLR(10)
@ 10,9 SAY 'To transfer route '+TRIM(XRNUM)+' to the Micro-Wand:'
@ 12,9 SAY '   1. Bring up the main supervisor menu on the Micro-Wand.'
@ 13,9 SAY '   2. Select DATA MENU on the wand (F3 key)'
@ 14,9 SAY '   3. Select LOAD ROUTE on the wand (F1 key)'
@ 15,9 SAY '   4. Press the red ENT key on the wand to begin transmission'
IF CONNECT(XPORT)
  CLR(08)
  MESG(08,'Loading Route '+TRIM(XRNUM)+'.')
  MESG(10,'Initializing Date/Time in Micro-Wand')
  OUTSTR='DATE'
  PNUM=INCPNUM(PNUM)
  PTYPE='F'
  OUTSTR=BUILD_PACKET(OUTSTR,PNUM,PTYPE)
  IF ! SEND_PACKET(XPORT,OUTSTR)
    COMERROR()
    RETURN
  ENDIF
  PTYPE='D'
  OUTSTR=SUBSTR(DUMD,3,6)+SUBSTR(DUMT,1,2)+SUBSTR(DUMT,4,2)+SUBSTR(DUMT,7,2)
  PNUM=INCPNUM(PNUM)
  OUTSTR=BUILD_PACKET(OUTSTR,PNUM,PTYPE)
```

```
IF ! SEND_PACKET(XPORT,OUTSTR)
  COMERROR()
  RETURN
ENDIF
PNUM=INCPNUM(PNUM)
OUTSTR=CHR(PNUM)+'E'
IF ! SEND_PACKET(XPORT,OUTSTR)
  COMERROR()
  RETURN
ENDIF
MESG(10,'Initializing Password in Micro-Wand')
OUTSTR='PASSWORD'
PNUM=INCPNUM(PNUM)
PTYPE='F'
OUTSTR=BUILD_PACKET(OUTSTR,PNUM,PTYPE)
IF ! SEND_PACKET(XPORT,OUTSTR)
  COMERROR()
  RETURN
ENDIF
SELECT DG
PTYPE='D'
OUTSTR=MWCH.1
PNUM=INCPNUM(PNUM)
OUTSTR=BUILD_PACKET(OUTSTR,PNUM,PTYPE)
IF ! SEND_PACKET(XPORT,OUTSTR)
  COMERROR()
  RETURN
ENDIF
PNUM=INCPNUM(PNUM)
OUTSTR=CHR(PNUM)+'E'
IF ! SEND_PACKET(XPORT,OUTSTR)
  COMERROR()
  RETURN
ENDIF
MESG(10,'Sending Guard Data to Micro-Wand.')
OUTSTR='GUARD'
PNUM=INCPNUM(PNUM)
PTYPE='F'
OUTSTR=BUILD_PACKET(OUTSTR,PNUM,PTYPE)
IF ! SEND_PACKET(XPORT,OUTSTR)
  COMERROR()
  RETURN
ENDIF
PTYPE='D'
SELECT GD
GO TOP
DO WHILE ! EOF()
  OUTSTR=GNUM
  PNUM=INCPNUM(PNUM)
  OUTSTR=BUILD_PACKET(OUTSTR,PNUM,PTYPE)
  IF ! SEND_PACKET(XPORT,OUTSTR)
    COMERROR()
    RETURN
  ENDIF
  SKIP
ENDDO
PNUM=INCPNUM(PNUM)
OUTSTR=CHR(PNUM)+'E'
IF ! SEND_PACKET(XPORT,OUTSTR)
  COMERROR()
  RETURN
ENDIF
MESG(10,'Sending Route Data to Micro-Wand.')
OUTSTR=XRNUM
PNUM=INCPNUM(PNUM)
PTYPE='F'
OUTSTR=BUILD_PACKET(OUTSTR,PNUM,PTYPE)
IF ! SEND_PACKET(XPORT,OUTSTR)
  COMERROR()
  RETURN
ENDIF
PTYPE='D'
IF XRNUM = 'ROAM  '
  OUTSTR='ROAM  '+SPACE(15)
  PNUM=INCPNUM(PNUM)
```

```
  OUTSTR=BUILD_PACKET(OUTSTR,PNUM,PTYPE)
  IF ! SEND_PACKET(XPORT,OUTSTR)
    COMERROR()
    RETURN
  ENDIF
ELSE
  SELECT RTD
  SEEK XRNUM
  DO WHILE RNUM = XRNUM .AND. ! EOF()
    OUTSTR=ZNUM+ZN->SDESC
    PNUM=INCPNUM(PNUM)
    OUTSTR=BUILD_PACKET(OUTSTR,PNUM,PTYPE)
    IF ! SEND_PACKET(XPORT,OUTSTR)
      COMERROR()
      RETURN
    ENDIF
    SKIP
  ENDDO
ENDIF
PNUM=INCPNUM(PNUM)
OUTSTR=CHR(PNUM)+'E'
IF ! SEND_PACKET(XPORT,OUTSTR)
  COMERROR()
  RETURN
ENDIF
MESG(10,'Sending Must-Scan Data to Micro-Wand.')
OUTSTR='MUSTSCAN'
PNUM=INCPNUM(PNUM)
PTYPE='F'
OUTSTR=BUILD_PACKET(OUTSTR,PNUM,PTYPE)
IF ! SEND_PACKET(XPORT,OUTSTR)
  COMERROR()
  RETURN
ENDIF
IF XRNUM<>'ROAM  '
  PTYPE='D'
  SELECT 3
  FUSE('TEMPRTD/TE/TEMPRTDX')
  DO WHILE !EOF()
    SELECT BC
    SEEK TE->ZNUM
    DO WHILE ZNUM=TE->ZNUM .AND. !EOF()
      OUTSTR= ZNUM+BARCODE+DESC
      PNUM=INCPNUM(PNUM)
      OUTSTR=BUILD_PACKET(OUTSTR,PNUM,PTYPE)
      IF ! SEND_PACKET(XPORT,OUTSTR)
        COMERROR()
        RETURN
      ENDIF
      SKIP
    ENDDO
    SELECT TE
    SKIP
  ENDDO
ENDIF
PNUM=INCPNUM(PNUM)
OUTSTR=CHR(PNUM)+'E'
IF ! SEND_PACKET(XPORT,OUTSTR)
  COMERROR()
  RETURN
ENDIF
MESG(10,'Sending Checkpoint Data to Micro-Wand.')
OUTSTR='BARC'
PNUM=INCPNUM(PNUM)
PTYPE='F'
OUTSTR=BUILD_PACKET(OUTSTR,PNUM,PTYPE)
IF ! SEND_PACKET(XPORT,OUTSTR)
  COMERROR()
  RETURN
ENDIF
IF XRNUM<>'ROAM  '
  PTYPE='D'
  SELECT RTD
  SEEK XRNUM
  DO WHILE RNUM=XRNUM .AND. !EOF()
```

```
      XZNUM = ZNUM
      XLSTREC = RECNO()
      SKIP -1
      DO WHILE RNUM=XRNUM .AND. !EOF()
        IF ZNUM=XZNUM
          EXIT
        ENDIF
        SKIP 1
      ENDDO
      IF RNUM=XRNUM .AND. !BOF()
        GO XLSTREC
          SKIP
          LOOP
        ENDIF
        GO XLSTREC
        SELECT BARCODE
        SEEK XZNUM
        IF !EOF()
          OUTSTR='*'+XZNUM+'*'
          PNUM=INCPNUM(PNUM)
          OUTSTR=BUILD_PACKET(OUTSTR,PNUM,PTYPE)
          IF !SEND_PACKET(XPORT,OUTSTR)
            COMERROR()
            RETURN
          ENDIF
        ENDIF
        DO WHILE ZNUM=XZNUM .AND. !EOF()
          OUTSTR=BARCODE
          PNUM=INCPNUM(PNUM)
          OUTSTR=BUILD_PACKET(OUTSTR,PNUM,PTYPE)
          IF !SEND_PACKET(XPORT,OUTSTR)
            COMERROR()
            RETURN
          ENDIF
          SKIP
        ENDDO
        SELECT RTD
        SKIP
      ENDDO
    ENDIF
    PNUM=INCPNUM(PNUM)
    OUTSTR=CHR(PNUM)+'E'
    IF ! SEND_PACKET(XPORT,OUTSTR)
      COMERROR()
      RETURN
    ENDIF
    PNUM=INCPNUM(PNUM)
    OUTSTR=CHR(PNUM)+'X'
    SEND_PACKET(XPORT,OUTSTR)
    TIMER(3)
    CLR(10)
    ERRMESG(10,'End of transmission...')
ENDIF
CLOSE DATABASES
CLOSECOMM(XPORT)
DELETE FILE('TEMPRTD.DBF')
DELETE FILE('TEMPRTDX.NTX')
DELETE FILE('TEMPBARC.DBF')
DELETE FILE('TBX.NTX')
RETURN
FUNCTION COMERROR
CLR(14)
MESG(14,'Communications Error')
MESG(15,'Press any key to continue...')
? CHR(7)
DO WHILE INKEY()=0
ENDDO
CLOSE DATABASES
CLOSECOMM(XPORT)
DELETE FILE('TEMPRTD.DBF')
DELETE FILE('TEMPRTDX.NTX')
DELETE FILE('TEMPBARC.DBF')
DELETE FILE('TBX.NTX')
RETURN .T.
* UPLOAD.PRG
* COPYRIGHT 1989, 1988 COMPUTER SYSTEMS DESIGN, INC.
```

MICRO=

```
HEADER('GET COMPLETED TOUR FROM WAND',-1)
SET CURSOR OFF
CLOSE DATABASES
FUSE('CONFIG/CN')
GO TOP
XRCNUM=VAL(RCNUM) - 1
XCOMPORT=COMPORT
XPORT=VAL(XCOMPORT)
CLOSE DATABASES
DO WHILE .T.
  CLR(8)
  CLOSECOMM(XPORT)
  RXSIZE=2048
  TXSIZE=2048
  X=OPENCOMM(XPORT,RXSIZE,TXSIZE)
  IF X < 0
    MESG(10,'COM PORT '+XCOMPORT+' ERROR')
    MESG(11,'ERROR NUMBER '+STR(X))
    MESG(12,'PRESS ANY KEY TO CONTINUE')
    DO WHILE INKEY() = 0
    ENDDO
    CLOSE DATABASES
    CLOSECOMM(XPORT)
    IF FILE('TEMPRC.DBF')
      DELETE FILE('TEMPRC.DBF')
    ENDIF
    IF FILE('TEMPRR.DBF')
      DELETE FILE('TEMPRR.DBF')
    ENDIF
    IF FILE('TEMPOH.DBF')
      DELETE FILE('TEMPOH.DBF')
    ENDIF
    IF FILE('TEMPOHIX.NTX')
      DELETE FILE('TEMPOHIX.NTX')
    ENDIF
    RETURN
  ENDIF
  MESG(10,'Please wait while setting up files...')
  CLOSE DATABASES
  SELECT 1
  FUSE('CONFIG/CN')
  GO TOP
  SELECT 2
  FUSE('EXCEPT/EC/EXCX')
  SELECT 3
  FUSE('XRECORD/RC')
  COPY TO TEMPRC STRU
  USE
  FUSE('XTEMPRC/RC')
  SELECT 4
  FUSE('XROAMREC/RR')
  COPY TO TEMPRR STRU
  USE
  FUSE('XTEMPRR/RR')
  SELECT 5
  FUSE('XOHISTORY/OH/OHISTIX')
  GO BOTT
  IF EOF()
    XLASTOH = 0
  ELSE
    XLASTOH = VAL(OCODE)+1
  ENDIF
  COPY TO TEMPOH STRU
  USE
  FUSE('XTEMPOH/OH')
  INDEX ON OCODE TO TEMPOHIX
  XALIAS='RC'
  CLR(10)
  @ 10,9 SAY 'To transfer completed tour information:'
  @ 12,9 SAY '   1. Bring up the main supervisor menu on the Micro-Wand'
  @ 13,9 SAY '   2. Select DATA MENU on the wand (F3 key)'
  @ 14,9 SAY '   3. Select SEND LOG on the wand (F4 key)'
  @ 15,9 SAY '   4. Press the red ENT key on the wand to begin transmission'
  IF CONNECT(XPORT)
    CLR(10)
    MESG(10,'Transferring data packets.  Please wait.')
    LPNUM=31
```

```
EOT=.F.
RETRY=0
DO WHILE (INSTR <> 'TIMEOUT') .AND. (RETRY<=5)
  TEMPSTR=INSTR+SPACE(100)
  PNUM=ASC(SUBSTR(TEMPSTR,1,1))
  PTYPE=SUBSTR(TEMPSTR,2,1)
  DO CASE
  CASE PTYPE='F'
    CHECKSUM=CALCHECK(TEMPSTR)
    PLEN=ASC(SUBSTR(TEMPSTR,3,1))-32
    XPNUM=INCPNUM(LPNUM)
    IF (SUBSTR(TEMPSTR,PLEN+4,1)=CHR(CHECKSUM)).AND.((PNUM=LPNUM).OR.(PNUM=XPNUM))
      ACK(XPORT,PNUM)
      IF PNUM=INCPNUM(LPNUM)
        LPNUM=PNUM
        TEMPSTR = SUBSTR(INSTR,4,PLEN)
      ENDIF
    ELSE
      NAK(XPORT,PNUM)
    ENDIF
  CASE PTYPE='D'
    CHECKSUM=CALCHECK(TEMPSTR)
    PLEN=ASC(SUBSTR(TEMPSTR,3,1))-32
    IF (SUBSTR(TEMPSTR,PLEN+4,1)=CHR(CHECKSUM)) .AND. (PNUM<=INCPNUM(LPNUM))
      ACK(XPORT,PNUM)
      IF PNUM=INCPNUM(LPNUM)
        LPNUM=PNUM
        TEMPSTR=SUBSTR(INSTR,4,PLEN)
        IF SUBSTR(TEMPSTR,1,1) = 'S'
          XRCNUM = XRCNUM + 1
          IF SUBSTR(TEMPSTR.2.5)='ROAM'
            XALIAS='RR'
          ELSE
            XALIAS='RC'
          ENDIF
        ENDIF
        SELECT &XALIAS
        APPEND BLANK
        REPLACE TYPE WITH SUBSTR(TEMPSTR.1.1)
        REPLACE LOGDATA WITH SUBSTR(TEMPSTR,2,6)
        REPLACE DATE WITH CTOD(SUBSTR(TEMPSTR,10,2)+'/'+SUBSTR(TEMPSTR,12,2)+'/'+SUBSTR(TEMPSTR,8,2))
        REPLACE TIME WITH SUBSTR(TEMPSTR,14,2)+':'+SUBSTR(TEMPSTR,16,2)
        REPLACE RCNUM WITH STR(XRCNUM,4)
        IF (LOGDATA='ZZ    ') .AND. (TYPE='R')
          SELECT OH
          APPEND BLANK
          REPLACE OCODE WITH SUBSTR(STR(1000000+XLASTOH,7),2)
          REPLACE COMMENT WITH SUBSTR(TEMPSTR,20,15)
          SELECT &XALIAS
          APPEND BLANK
          REPLACE TYPE WITH 'R'
          REPLACE LOGDATA WITH SUBSTR(STR(1000000+XLASTOH,7),2)
                           CTOD(                                         +SUBSTR
          REPLACE DATE WITH CT   SUBSTR(TEMPSTR,10,2)+'/'+SUBSTR(TEMPSTR,12,2)+'/ +SUBSTR(TEMPSTR,8,2))
          REPLACE TIME WITH S.    .(TEMPSTR,14,2)+':'+SUBSTR(TEMPSTR,16,2)
          REPLACE RCNUM WITH STR(XRCNUM,4)
          XLASTOH = XLASTOH + 1
        ENDIF
      ENDIF
    ELSE
      NAK(XPORT,PNUM)
    ENDIF
  CASE PTYPE='E'
    IF ((PNUM=LPNUM) .OR. (PNUM=INCPNUM(LPNUM))) .AND. (LEN(INSTR)=2)
      ACK(XPORT,PNUM)
      LPNUM=PNUM
    ELSE
      NAK(XPORT,PNUM)
    ENDIF
  CASE PTYPE='X'
    IF ((PNUM=LPNUM) .OR. (PNUM=INCPNUM(LPNUM))) .AND. (LEN(INSTR)=2)
      ACK(XPORT,PNUM)
      LPNUM=PNUM
      EOT=.T.
```

```
    ELSE
      NAK(XPORT,PNUM)
    ENDIF
  OTHERWISE
    NAK(XPORT,PNUM)
  ENDCASE
  INSTR=GETPACKET(XPORT,5)
ENDDO
IF !ECT
  MESG(12,'Data transfer errors.')
  MESG(14,'Please wait...')
  CLOSECOMM(XPORT)
  ? CHR(7)
  INKEY(7)
  MESG(14,'Press any key to continue...')
  DO WHILE INKEY()=0
  ENDDO
ELSE
  CLOSECOMM(XPORT)
  SET CURSOR OFF
  MESG(12,'Data transfer complete.')
  MESG(14,'Please wait while checking files...')
  ? CHR(7)
  SELECT RC
  XALIAS='RC'
  GO TOP
  DO DATCHECK
  SELECT RR
  XALIAS='RR'
  GO TOP
  DO DATCHECK
  SELECT 6
  FUSE('XROAMREC/REALRR/ROAMIX')
  SELECT 7
  FUSE('BARCODE/BC/BNUMX')
  SELECT RR
  GO TOP
  XCHECKPOINT=SPACE(6)
  DO WHILE !EOF()
    IF TYPE<>'R'
      DO RRREC WITH 0
      SKIP
      LOOP
    ENDIF
    POINTRECNO=RECNO()
   XCHECKPOINT=LOGDATA
   SELECT BC
   SEEK XCHECKPOINT
   IF EOF()
     DO RRREC WITH 0
     SKIP
     LOOP
   ENDIF
   DO WHILE BARCODE=XCHECKPOINT .AND. !EOF()
     DO RRREC WITH 1
     SKIP
     DO WHILE TYPE='R' .AND. LEN(TRIM(LOGDATA))=2 .AND. !EOF()
       DO RRREC WITH 1
       IF TRIM(LOGDATA)='ZZ'
         SKIP
         DO RRREC WITH 1
       ENDIF
       SKIP
     ENDDO
     NEXTRECNO=RECNO()
     GO POINTRECNO
     SELECT BC
     SKIP
   ENDDO
   SELECT RR
   GO NEXTRECNO
  ENDDO
  SELECT CN
  LOCKF('CONFIG')
```

```
        REPLACE RCNUM WITH STR(XRCNUM+1,4)
        UNLOCK
        SELECT RC
        USE
        FUSE('XRECORD/RC/RCNUMX')
        APPEND FROM TEMPRC
        SELECT OH
        USE
        FUSE('XOHISTORY/OH/OHIST1X')
        APPEND FROM TEMPOH
        SET CURSOR ON
        EXIT
      ENDIF
    ELSE
      EXIT
    ENDIF
ENDDO
CLOSE DATABASES
CLOSECOMM(XPORT)
IF FILE('TEMPRC.DBF')
  DELETE FILE('TEMPRC.DBF')
ENDIF
IF FILE('TEMPRR.DBF')
  DELETE FILE('TEMPRR.DBF')
ENDIF
IF FILE('TEMPOH.DBF')
  DELETE FILE('TEMPOH.DBF')
ENDIF
IF FILE('TEMPOH1X.NTX')
  DELETE FILE('TEMPOH1X.NTX')
ENDIF
RETURN
PROCEDURE DATCHECK
DO WHILE !EOF()
  DO WHILE TYPE<>'S' .AND. !EOF()
    IF (TRIM(LOGDATA)=='ZZ') .AND. (TYPE='R')
      DELETE
    SKIP
  · IF (TYPE='R') .AND. !EOF()
      SELECT OH
      SEEK &XALIAS->LOGDATA
      IF !EOF()
        DELETE
      ENDIF
      SELECT &XALIAS
    ENDIF
  ENDIF
  IF TYPE<>'S' .AND. !EOF()
    DELETE
    SKIP
  ENDIF
ENDDO
IF EOF()
  EXIT
ENDIF
XTOUR     = RCNUM
TEMPRECNO = RECNO()
SKIP
IF (TYPE<>'G') .OR. (RCNUM<>XTOUR) .OR. EOF()
  GO TEMPRECNO
  DELETE
  SKIP
  LOOP
ENDIF
SKIP
IF (TYPE<>'E') .OR. (RCNUM<>XTOUR) .OR. EOF()
  GO TEMPRECNO
  DELETE
  SKIP
  LOOP
ENDIF
SKIP
DO WHILE LEN(TRIM(LOGDATA))=2.AND.TYPE='R'.AND.RCNUM=XTOUR.AND.!EOF()
  IF TRIM(LOGDATA)='ZZ'
    DELETE
```

```
    SKIP
    IF TYPE='R'.AND.RCNUM=XTOUR.AND.!EOF()
      SELECT OH
      SEEK &XALIAS->LOGDATA
      IF !EOF()
        DELETE
      ENDIF
      SELECT &XALIAS
      DELETE
      SKIP
    ENDIF
  ELSE
    DELETE
    SKIP
  ENDIF
ENDDO
BADTOUR=.F.
DO WHILE (RCNUM = XTOUR) .AND. !EOF()
  DO CASE
  CASE TYPE = 'L'
    SKIP -1
    IF TYPE='R'
      XTIME=TIME
      XDATE=DATE
      SKIP
      REPLACE TIME WITH XTIME
      REPLACE DATE WITH XDATE
    ELSE
    SKIP
  ENDIF
  SKIP
  IF (EOF()) .OR. (RCNUM<>XTOUR) .OR. !(TYPE $ 'EF6')
    BADTOUR=.T.
    EXIT
  ENDIF
CASE TYPE='R'
  SKIP
CASE TYPE='F'
  SKIP - 1
  IF TYPE<>'L'
    BADTOUR=.T.
    EXIT
  ENDIF
  SKIP 2
  IF RCNUM=XTOUR .AND. !EOF()
    BADTOUR=.T.
    EXIT
  ENDIF
CASE TYPE='6'
  IF XALIAS='RR'
    BADTOUR=.T.
    EXIT
  ENDIF
  SKIP -1
  IF TYPE<>'L'
    BADTOUR=.T.
    EXIT
  ENDIF
  SKIP 2
  IF TYPE<>'E'
    BADTOUR=.T.
    EXIT
  ENDIF
CASE TYPE='E'
  IF XALIAS='RR'
    BADTOUR=.T.
    EXIT
  ENDIF
  SKIP -1
  IF TYPE<>'L' .AND. TYPE<>'6'
    BADTOUR=.T.
    EXIT
  ENDIF
  SKIP 2
```

```
  DO WHILE LEN(TRIM(LOGDATA))=2.AND.TYPE='R'.AND.RCNUM=XTOUR.AND.!EOF()
    IF TRIM(LOGDATA)='ZZ'
      DELETE
      SKIP
      IF TYPE='R'.AND.RCNUM=XTOUR.AND.!EOF()
        SELECT OH
        SEEK &XALIAS->LOGDATA
        IF !EOF()
          DELETE
        ENDIF
        SELECT &XALIAS
        DELETE
        SKIP
      ENDIF
    ELSE
      DELETE
      SKIP
    ENDIF
  ENDDO
OTHERWISE
      BADTOUR=.T.
      EXIT
    ENDCASE
  ENDDO
  IF BADTOUR
    GO TEMPRECNO
    DELETE
    SKIP
  ENDIF
ENDDO
RETURN
PROCEDURE RRREC
PARAMETER FO
SELECT REALRR
APPEND BLANK
REPLACE RCNUM WITH RR->RCNUM
REPLACE TYPE WITH RR->TYPE
REPLACE LOGDATA WITH RR->LOGDATA
REPLACE DATE WITH RR->DATE
REPLACE TIME WITH RR->TIME
IF FO=1
  REPLACE ZONE WITH BC->ZNUM
ENDIF
SELECT RR
RETURN
FUNCTION GETPACKET
PARAMETERS PORT,PWT
PACKSTR=GETSTR(PORT,PWT)
MESG(12,'PACKET '+STR(INCPNUM(LPNUM)-32,3))
RETURN PACKSTR

* DETREP.PRG
* COPYRIGHT 1989, 1988 COMPUTER SYSTEMS DESIGN, INC.

CLOSE DATABASES
HEADER('PROCESS COMPLETED TOURS',-1)
MESG(10,'This function will process the last batch of tour data that were')
MESG(11,'transferred from the Micro-wands.  A set of reports will be printed,')
MESG(12,'after which the various history files will be updated.')
MESG(14,'These procedures may take a few minutes.')
FUSE('ROAMREC/RR/ROAM1X')
XXX=EOF()
USE
FUSE('RECORD/RC/RCNUMX')
IF EOF() .AND. XXX
  CLOSE DATABASES
  MESGWAIT(19,'No new route data to print.')
  RETURN
ENDIF
SELECT 2
FUSE('CONFIG/CO')
XPDETAIL = PDETAIL
IF !XPDETAIL
  MESG(1600,'WARNING: The Detail and Summary Route Report will NOT be printed!')
```

```
  MESG(1700,'Use the System Maintenance Program to change this configuration.')
ENDIF
MESG(22,'ESC to exit.')
IF !CONFIRM(19) .OR. LASTKEY()=27
  CLOSE DATABASES
  RETURN
ENDIF
CLR(9)
MESG( 9,'Please prepare printer for printing.')
MESG(10,'ESC to exit. Press any other key to continue.')
DO WHILE INKEY() = 0
ENDDO
IF LASTKEY() = 27
  CLEAR
  CLOSE DATABASES
  RETURN
ENDIF
CLR(5)
SET COLOR TO &HILIT
@ 6,5 CLEAR TO 20,75
SET COLOR TO &BLUELIT
@ 6,5 TO 20,75 DOUBLE
SET COLOR TO &HILIT
@ 7,7 SAY 'Please wait while setting up files.'
@ 7,63 SAY 'Working...'
USE
FUSE('GUARD/GN/GRDX')
SELECT 3
FUSE('ZONE/ZN/ZNUM1X')
SELECT 4
FUSE('BARCODE/BC/BNUMX,ZNUM2X')
SELECT 5
FUSE('OHISTORY/OH/OHIST1X')
SET COLOR TO &HILIT
@ 7,7 SAY 'Please wait while setting up files.'
@ 7,63 SAY 'Files Open'
XPG      = 0
LMAX     = 52
YPRINTIT = .T.
XTOUR    = SPACE(4)
IF XPDETAIL
  SET COLOR TO &HILIT
  @ 8,7 SAY 'Printing Detail Route Report.'
  @ 8,63 SAY 'Working...'
  SET DEVICE TO PRINT
  XPNTPG   = 0
  ISFORDET = .T.
  ISROAM   = .F.
  SELECT RC
  DO MAINLOOP WITH 'REPDETAIL'
  SET DEVICE TO SCREEN
  SET COLOR TO &BLUELIT
  @ 8,7 SAY 'Printing Detail Route Report.'
  @ 8,63 SAY 'Done.      '
  SET COLOR TO &HILIT
  @ 9,7 SAY 'Printing Detail Roam Report.'
  @ 9,63 SAY 'Working...'
  SELECT 6
  FUSE('EXCEPT/EC/EXCX')
  SELECT 1
  FUSE('ROAMREC/RR/ROAM1X')
  SET DEVICE TO PRINT
  ISROAM   = .T.
  DO ROAMLOOP WITH 'DETROAM'
  SET DEVICE TO SCREEN
  SET COLOR TO &BLUELIT
  @ 9,7 SAY 'Printing Detail Roam Report.'
  @ 9,63 SAY 'Done.      '
  SET COLOR TO &HILIT
  @ 10,7 SAY 'Printing Summary Route Report.'
  @ 10,63 SAY 'Working...'
  SELECT 1
  FUSE('RECORD/RC/RCNUMX')
  SET DEVICE TO PRINT
```

```
  XFNTPE   = 0
  ISFORDET = .F.
  ISROAM   = .F.
  DO MAINLOOP WITH 'SUMREP'
  SET DEVICE TO SCREEN
  SET COLOR TO &BLUELIT
  @ 10,7 SAY 'Printing Summary Route Report.'
  @ 10,63 SAY 'Done.      '
  SET COLOR TO &HILIT
  @ 11,7 SAY 'Printing Summary Roam Report.'
  @ 11,63 SAY 'Working...'
  SELECT 6
  FUSE('EXCEPT/EC/EXCX')
  SELECT 1
  FUSE('ROAMREC/RR/ROAMIX')
  SET DEVICE TO PRINT
  ISROAM   = .T.
  DO ROAMLOOP WITH 'SUMROAM'
  SET DEVICE TO SCREEN
  SET COLOR TO &BLUELIT
  @ 11,7 SAY 'Printing Summary Roam Report.'
  @ 11,63 SAY 'Done.      '
  SET COLOR TO &HILIT
ENDIF
@ 12,7 SAY 'Printing Incident Summary Report.'
@ 12,63 SAY 'Working...'
SELECT 6
IF ALIAS() <> 'EC'
  FUSE('EXCEPT/EC/EXCX')
ENDIF
DO INCIDSUM
SET DEVICE TO SCREEN
SET COLOR TO &BLUELIT
@ 12,7 SAY 'Printing Incident Summary Report.'
@ 12,63 SAY 'Done.      '
SET COLOR TO &HILIT
@ 13,7 SAY 'Printing Missed Must-Scans Summary Report.'
@ 13,63 SAY 'Working...'
SELECT 1
FUSE('RECORD/RC/RCNUMX')
DO MISSCAN
SET DEVICE TO SCREEN
SET COLOR TO &BLUELIT
@ 13,7 SAY 'Printing Missed Must-Scans Summary Report.'
@ 13,63 SAY 'Done.      '
@ 7,7 SAY 'Please wait while setting up files.'
@ 7,63 SAY '- CLOSED -'
@ 15,27 SAY 'Done With Report Printing.'
SET COLOR TO &HILIT
KEYBOARD ''
INKEY(7)
SET DELIMITERS ON
SET COLOR TO &HILIT
@ 7,6 CLEAR TO 19,74
@ 8,12 SAY 'Please verify that the reports are printed okay.'
@ 12,16 SAY 'If you enter "Y", this same data WILL NOT appear'
@ 13,16 SAY '    the next time you process completed tours.'
@ 16,16 SAY 'If you enter "N", this same data WILL appear'
@ 17,16 SAY '    the next time you process completed tours.'
XDUMVAR=' '
DO WHILE .T.
  @ 10,25 SAY 'Are the reports okay? (Y/N) ' GET XDUMVAR PICTURE '!' VALID XDUMVAR $ 'YN'
  READ
  IF LASTKEY() = 27
    LOOP
  ENDIF
  EXIT
ENDDO
IF XDUMVAR='Y'
  SET COLOR TO &HILIT
  @ 7,6 CLEAR TO 19,74
  DO POST
ENDIF
SET DELIMITERS ON
CLOSE DATABASES
```

```
RETURN
PROCEDURE MAINLOOP
PARAMETER RPTNAME
DO WHILE !EOF()
  IF (RCNUM = XTOUR) .AND. (TYPE = 'G')
    ISHANDOFF = .T.
  ELSE
    ISHANDOFF = .F.
  ENDIF
  XPG    = XPG+1
  XPNTPG = XPNTPG+1
  XDCHKIN = DATE
  XTCHKIN = TIME
  IF !ISHANDOFF
    XTOUR = RCNUM
    XRNUM = LOGDATA
    SET DEVICE TO SCREEN
    SELECT 6
    IF ALIAS() <> 'RTS'
      FUSE('RSUM/RTS/RNUM2X')
    ENDIF
    SET DEVICE TO PRINT
    SEEK XRNUM
    IF EOF()
      XROUTE = 'Undefined route'
    ELSE
      XROUTE = DESC
    ENDIF
    SELECT RC
    SKIP
    XOLDGNAME = ''
    SELECT GN
    SEEK RC->LOGDATA
    IF EOF()
      XGNAME = 'Undefined guard'
    ELSE
      XGNAME = GNAME
    ENDIF
  ENDIF
  SELECT RC
  SKIP
  XFIRSTREC = RECNO()
  DO PROCTOUR
  SELECT RC
  GOTO XFIRSTREC
  IF (RCNUM = XTOUR) .AND. (!TYPE $ 'SG') .AND. ! EOF()
    DO &RPTNAME
    DO &RPTNAME
  ENDIF
ENDDO
RETURN
PROCEDURE PROCTOUR
BETZ    = .T.
XTOTINT = 0
TBETZ   = 0
TMISSCHK= 0
ZCHECK  = 0
TPNTCHK = 0
ZTOTAL  = 0
TPNTIZONE=0
TCHKZNPNT=0
XCURZ   = SPACE(6)
ZNREC   = 0
LZNREC  = 0
XCHKPNT = SPACE(6)
XTOLD   = XTCHKIN
XDOLD   = XDCHKIN
XTDIFF  = 0
SET DEVICE TO SCREEN
SELECT 5
FUSE('RDET/RTD/RNUM1X')
DO CALCTOTZPNT WITH XRNUM
FUSE('OHISTORY/OH/OHIST1X')
SET DEVICE TO PRINT
SELECT RC
```

```
DO WHILE (RCNUM = XTOUR) .AND. (!TYPE $ 'SG') .AND. ! EOF()
 XTDIFF = CETIME(-1,0,XTOLD,XDOLD,TIME,DATE)
 XDOLD = DATE
 XTOLD = TIME
 DC CASE
 CASE TYPE = 'E'
   BETZ   = .F.
   ZNREC  = RECNO()
   XCURZ  = LOGDATA
   ZCHECK = ZCHECK + 1
   SELECT ZN
   SEEK XCURZ
   IF !EOF()
     TCHKZNPNT = TCHKZNPNT + POINTS
   ENDIF
 CASE TYPE = 'L'
   BETZ   = .T.
   SCANMISS(1,'RC')
 CASE TYPE = 'R'
   XCHKPNT = TRIM(LOGDATA)



   IF LEN(XCHKPNT) = 2
     IF XCHKPNT = 'ZZ'
       SKIP
     ENDIF
   ELSE
     XCHKPNT = XCHKPNT + SPACE(6-LEN(XCHKPNT))
     IF BETZ
       TBETZ = TBETZ + XTDIFF
     ELSE
       SELECT RC
       SEEK XCHKPNT+XCURZ
       IF ! EOF()
         SELECT RC
         LZNREC = RECNO()
         GO ZNREC
         SKIP
         DO WHILE (LOGDATA <> XCHKPNT) .AND. (RECNO() <> LZNREC)
           SKIP
         ENDDO
         IF (RECNO() = LZNREC)
           TPNTCHK = TPNTCHK + 1
         ELSE
         ENDIF
         GO LZNREC
       ENDIF
     ENDIF
   ENDIF
 CASE TYPE = 'F'
   SKIP
   EXIT
 ENDCASE
 SELECT RC
 SKIP
ENDDO
IF TYPE = 'G'
 XDCHKOUT = DATE
 XTCHKOUT = TIME
 SKIP - 1
ELSE
 SKIP -1
 XDCHKOUT = DATE
 XTCHKOUT = TIME
ENDIF
XTOTINT = CETIME(-1,0,XTCHKIN,XDCHKIN,XTCHKOUT,XDCHKOUT)
IF !BETZ
 SCANMISS(1,'RC')
ENDIF
SKIP
@ 1, 0 SAY DATE()
@ 1,40-INT(LEN(LTRIM(TRIM(HEAD)))/2) SAY HEAD
@ 1,71 SAY 'Page: '+STR(XPG,3)
@ 2, 0 SAY TIME()
```

```
IF ISFORDET
  @ 2,31 SAY 'DETAIL ROUTE REPORT'
ELSE
  @ 2,31 SAY 'SUMMARY ROUTE REPORT'
ENDIF
@ 2,69 SAY 'Report: '+STR(XPNTPG,3)
@ 3,25 SAY 'The TourWatch Manager (C) 1988'
@ 5, 0 SAY 'Guard Name : '+SUBSTR(XGNAME,1,24)
@ 5,38 SAY 'Check In    : '+DTOC(XDCHKIN)+'  '+XTCHKIN
@ 6, 0 SAY 'Route Name : '+XROUTE
@ 6,38 SAY 'Check Out   : '+DTOC(XDCHKOUT)+'  '+XTCHKOUT
@ 7,38 SAY 'Total Time : '+CETIME(XTOTINT,2)
@ 10,0 SAY  'Zones Checked : '
@ 10,16 SAY LTRIM(STR(ZCHECK,5))+' of '+LTRIM(STR(ZTOTAL,5))
IF ISHANDOFF .OR. (TYPE = '6' .AND. RCNUM = XTOUR .AND. ! EOF())
  TPNTIZONE = TCHKZNPNT
ENDIF
@ 10,38 SAY 'Total In-Zone Points   : '+STR(TPNTIZONE,5)
@ 11,00 SAY 'In-Zones      : '+CETIME(XTOTINT-TBETZ,2)
@ 11,38 SAY 'In-Zone Points Checked : '+STR(TPNTCHK,5)
@ 12,00 SAY 'Between Zones : '+CETIME(TBETZ,2)
IF TPNTIZONE <> 0
  XPER = INT(TPNTCHK/TPNTIZONE*100)
ELSE
  XPER = 0
ENDIF
@ 12,38 SAY 'Percent Checked        : '+STR(XPER,5)+'%'
@ 13,38 SAY 'Must-scans Missed      : '+STR(TMISSCHK,5)
IF ISFORDET
  @ 15,0 SAY '* Out of Zone'
  @ 17,0 SAY '! Must-scan Missed'
ENDIF
IF ISFORDET
  @ 19,0 SAY 'Zone                          Bar        Check      Between'
  @ 20,0 SAY 'Number  Checkpoint            Code        Time          Time      Incident'
  @ 21,0 SAY REPLICATE('-',80)
  L = 22
ELSE
  @ 15,0 SAY 'Zone                     Enter  Leave  Total In-Zone In-Zone  Percent  Must-scans'
  @ 16,0 SAY 'Number  Zone Name         Time   Time   Time  Points Pts Chkd Checked     Missed'
  @ 17,0 SAY REPLICATE('-',80)
  L = 19
ENDIF
RETURN
PROCEDURE REPDETAIL
SET DEVICE TO SCREEN
SELECT 6
IF ALIAS() <> 'EC'
  FUSE('EXCEPT/EC/EXCX')
ENDIF
SET DEVICE TO PRINT
SELECT RC
BETZ    = .T.
XTOTINT = 0
TBETZ   = 0
TMISSCHK= 0
ZCHECK  = 0
ZTOTAL  = 0
TPNTIZONE=0
XCURZ   = SPACE(6)
ZNREC   = 0
LZNREC  = 0
XCHKPNT = SPACE(6)
XTOLD   = XTCHKIN
XDOLD   = XDCHKIN
XTDIFF  = 0
IF ISHANDOFF
  @ L,5 SAY 'Continuing hand off tour from guard '+XOLDGNAME+'.'
  L = L+2
ENDIF
@ L,5 SAY 'Check In'
@ L,41 SAY XTCHKIN
DO WHILE (RCNUM = XTOUR) .AND. (!TYPE $ 'S6') .AND. ! EOF()
  XZNUM   = ''
  XDESCR  = ''
```

```
XCHKPNT = ''
XEXCPT  = ''
ISEXCEPT= .F.
XTDIFF  = GETIME(-1,0,XTOLD,XDOLD,TIME,DATE)
XTOLD   = TIME
XDOLD   = DATE
DO CASE
CASE TYPE = 'E'
  BETZ = .F.
  ZNREC = RECNO()
  XCURZ= LOGDATA
  SELECT ZN
  SEEK XCURZ
  IF EOF()
    XDESCR = 'Enter Zone '+XCURZ+' - unidentifiable'
  ELSE
    XDESCR = 'Enter Zone '+XCURZ+' - '+SDESC
  ENDIF
  SELECT RC
  SKIP -1
  IF TYPE <> 'L'
    L = L+1
  ENDIF
  SKIP
CASE TYPE = 'L'
  BETZ   = .T.
  XDESCR = 'Leave Zone'
  SCANMISS(2,'RC')
CASE TYPE = 'R'
  XCHKPNT = TRIM(LOGDATA)
  IF LEN(XCHKPNT) = 2
    IF XCHKPNT <> 'ZZ'
      SELECT EC
      SEEK XCHKPNT
    IF EOF()
      XEXCPT = 'Undefined'
    ELSE
      XEXCPT = SUBSTR(EDESC,1,15)
    ENDIF
  ELSE
    SKIP
    XCHKPNT = LOGDATA
    SELECT CH
    SEEK XCHKPNT
    IF EOF()
      XEXCPT = 'Undefined'
    ELSE
      XEXCPT = SUBSTR(COMMENT,1,15)
    ENDIF
  ENDIF
  ISEXCEPT = .T.
ENDIF
IF ! ISEXCEPT
  XCHKPNT = XCHKPNT+SPACE(6-LEN(XCHKPNT))
  SELECT BC
  SEEK XCHKPNT
  IF EOF()
    XDESCR = '  Undefined barcode'
  ELSE
    XDESCR = '  '+DESC
  ENDIF
  IF BETZ
    XZNUM = '*'
  ELSE
    DO WHILE (XCHKPNT = BARCODE) .AND. (XCURZ <> ZNUM) .AND. ! EOF()
      SKIP
    ENDDO
    IF (XCHKPNT = BARCODE) .AND. (XCURZ = ZNUM) .AND. ! EOF()
      XZNUM = XCURZ
    ELSE
      XZNUM = '*'
    ENDIF
  ENDIF
  SELECT RC
```

```
ELSE
 SELECT RC
 SKIP -1
 IF TRIM(LOGDATA) = 'ZZ'
  SKIP -1
  XTOLD = TIME
  XDOLD = DATE
  SKIP
 ELSE
  XTOLD = TIME
  XDOLD = DATE
 ENDIF
 SKIP
 @ L,65 SAY SUBSTR(XEXCPT,1,15)
 L = L + 1
 SKIP
 XCHKPNT = TRIM(LOGDATA)
 DO WHILE LEN(XCHKPNT) = 2 .AND. TYPE='R' .AND. !EOF()
  IF XCHKPNT = 'ZZ'
   SKIP
   XCHKPNT = LOGDATA
   SELECT CH
   SEEK XCHKPNT
   IF EOF()
    @ L,65 SAY 'Undefined'
   ELSE
                  COMMENT
     @ L,65 SAY SUBSTR(     ,1,15)
    ENDIF
   ELSE
    SELECT EC
    SEEK XCHKPNT
    IF EOF()
     @ L,65 SAY 'Undefined'
    ELSE
     @ L,65 SAY SUBSTR(EDESC,1,15)
    ENDIF
   ENDIF
   L = L + 1
   SELECT RC
   SKIP
   XCHKPNT = TRIM(LOGDATA)
  ENDDO
  SELECT RC
  SKIP - 1
  L = L - 1
 ENDIF
CASE TYPE = 'F'
 XDESCR = 'Check Out'
ENDCASE
SELECT RC
IF ! ISEXCEPT
 L = L+1
 IF L > LMAX
  XPG   = XPG + 1
  CHNGPAGE('NORMHEAD')
 ENDIF
 IF ! EMPTY(SUBSTR(XDESCR,1,2))
  @ L,5 SAY XDESCR
 ELSE
  @ L,0 SAY XZNUM
  @ L,8 SAY XDESCR
 ENDIF
 IF ! EMPTY(XCHKPNT)
  @ L,28 SAY XCHKPNT
 ENDIF
 @ L,41 SAY TIME
 @ L,54 SAY CETIME(XTDIFF,1)
 IF TYPE = 'L'
  L = L+1
 ENDIF
ENDIF
SKIP
ENDDO
SKIP -1
```

```
IF TYPE <> 'F'
  IF !BETZ
    SCANMISS(2,'RC')
  ENDIF
  L = L + 1
  SKIP
  IF TYPE = 'G'
    XOLDGNAME = TRIM(XGNAME)
    SELECT GN
    SEEK RC->LOGDATA
    IF EOF()
      XGNAME = 'Undefined guard'
    ELSE
      XGNAME = GNAME
    ENDIF
    @ L,5 SAY 'Hand off tour to guard '+TRIM(XGNAME)+'.'
    SELECT RC
  ELSE
    @ L,5 SAY 'Incomplete Tour'
  ENDIF
ELSE
  SKIP
ENDIF
CHNGPAGE('')
RETURN
PROCEDURE SUMREP
BETZ    = .T.
XZDESCR = SPACE(15)
XCURZ   = SPACE(6)
XTOLD   = XTCHKIN
XDOLD   = XDCHKIN
XNEWT   = XTCHKIN
XNEWD   = XDCHKIN
ZNREC   = 0
LZNREC  = 0
PNTCHK  = 0
PNTIZONE= 0
MISSCHK = 0
XCHKPNT = SPACE(6)
IF ISHANDOFF
  @ L,8 SAY 'Continuing hand off tour from previous guard.'
  L = L+1
ENDIF
@ L,8 SAY 'Check In'
@ L,24 SAY XTCHKIN
L = L + 1
DO WHILE (RCNUM = XTOUR) .AND. (!TYPE $ 'SG') .AND. ! EOF()
  DO CASE
  CASE TYPE = 'E'
    BETZ   = .F.
    PNTCHK = 0
    ZNREC  = RECNO()
    XTOLD  = TIME
    XDOLD  = DATE
    XCURZ  = LOGDATA
    SELECT ZN
    SEEK XCURZ
    IF EOF()
      XZDESCR = 'Undefined zone'
    ELSE
      XZDESCR = ZDESC
    ENDIF
  CASE TYPE = 'L'
    BETZ   = .T.
    LZNREC = RECNO()
    XNEWT  = TIME
    XNEWD  = DATE
    MISSCHK  = 0
    PNTIZONE = SCANMISS(3,'RC')
    IF L > LMAX
      XPG    = XPG + 1
      CHNGPAGE('NORMHEAD')
    ENDIF
    @ L,0 SAY XCURZ
    @ L,8 SAY XZDESCR
```

```
  @ L,24 SAY XTOLD
  @ L,31 SAY XNEWT
  @ L,38 SAY CETIME(-1,1,XTOLD,XDOLD,XNEWT,XNEWD)
  @ L,47 SAY PNTIZONE PICTURE '9999'
  @ L,56 SAY PNTCHK PICTURE '9999'
  IF PNTIZONE <> 0
    XPER = INT(PNTCHK/PNTIZONE*100)
  ELSE
    XPER = 0
  ENDIF
  @ L,63 SAY XPER PICTURE '9999'
  @ L,67 SAY '%'
  @ L,76 SAY MISSCHK PICTURE '9999'
  L = L+1
CASE TYPE = 'R'
  IF ! BETZ
    XCHKPNT = TRIM(LOGDATA)
    IF LEN(XCHKPNT) = 2
      IF XCHKPNT = 'ZZ'
        SKIP
      ENDIF
    ELSE
      XCHKPNT = XCHKPNT+SPACE(6-LEN(XCHKPNT))
      SELECT BC
      SEEK XCHKPNT+XCURZ
      IF ! EOF()
        SELECT RC
        LZNREC = RECNO()
        GO ZNREC
        SKIP
        DO WHILE (LOGDATA <> XCHKPNT) .AND. (RECNO() <> LZNREC)
          SKIP
        ENDDO
        IF (RECNO() = LZNREC)
          PNTCHK = PNTCHK + 1
        ELSE
        ENDIF
        GO LZNREC
      ENDIF
    ENDIF
  ENDIF
ENDCASE
SELECT RC
SKIP
ENDDO
SELECT RC
SKIP -1
IF TYPE <> 'F'
  IF ! BETZ
    XNEWT  = TIME
    XNEWD  = DATE
    MISSCHK  = 0
    PNTIZONE = SCANMISS(3,'RC')
    IF L > LMAX
      XPG    = XPG + 1
      CHNGPAGE('NORMHEAD')
    ENDIF
    @ L,0 SAY XCURZ
    @ L,8 SAY XZDESCR
    @ L,24 SAY XTOLD
    @ L,38 SAY CETIME(-1,1,XTOLD,XDOLD,XNEWT,XNEWD)
    @ L,47 SAY PNTIZONE PICTURE '9999'
    @ L,56 SAY PNTCHK PICTURE '9999'
    IF PNTIZONE <> 0
      XPER = INT(PNTCHK/PNTIZONE*100)
    ELSE
      XPER = 0
    ENDIF
    @ L,63 SAY XPER PICTURE '9999'
    @ L,67 SAY '%'
    @ L,76 SAY MISSCHK PICTURE '9999'
    L = L + 1
  ENDIF
  SELECT RC
  SKIP
```

```
  IF TYPE = 'G'
    XOLDGNAME = TRIM(XGNAME)
    SELECT GN
    SEEK RC->XLOGDATA
    IF EOF()
      XGNAME = 'Undefined guard'
    ELSE
      XGNAME = GNAME
    ENDIF
    @ L,5 SAY 'Hand off tour to guard '+TRIM(XGNAME)+'.'
    SELECT RC
  ELSE
    @ L,8 SAY 'Incomplete Tour'
  ENDIF
ELSE
  @ L,8 SAY 'Check Out'
  @ L,31 SAY TIME
  IF L > LMAX - 1
    XPG    = XPG + 1
    CHNGPAGE('NORMHEAD')
  ENDIF
  SELECT RC
  SKIP
ENDIF
CHNGPAGE('')
RETURN

* REPORTS.PRG
* COPYRIGHT 1989, 1988 COMPUTER SYSTEMS DESIGN, INC.

DO WHILE .T.
  CLOSE DATABASES
  MS1='A  GUARD HISTORY REPORT      '
  MS2='B  ZONE HISTORY REPORT       '
  MS3='C  CHECKPOINT HISTORY REPORT'
  MS4='D  INCIDENT HISTORY REPORT   '
  MS5='E  DETAILED HISTORY REPORT   '
  MS6='X  RETURN TO MAIN MENU       '
  ME1='Print Guard History for a Time Period'
  ME2='Print Zone History for and Time Period'
  ME3='Print Checkpoint History for a Time Period'
  ME4='Print History of Incidents for a Time Period'
  ME5='Print Chronological History of Activity by Guard for a Time Period'
  ME6='Return to the Main Menu'
  RES2=HEADER('PRINT HISTORY REPORTS',6)
  CLEAR
  DO CASE
  CASE RES2=1
    DO GHISTRPT
  CASE RES2=2
    DO ZHISTRPT
  CASE RES2=3
    DO CHISTRPT
  CASE RES2=4
    DO IHISTRPT
  CASE RES2=5
    DO DHISTRPT
  CASE RES2=6
    CLOSE DATABASES
    RETURN
  ENDCASE
ENDDO

* MAINT.PRG
* COPYRIGHT 1989, 1988 COMPUTER SYSTEMS DESIGN, INC.
DO WHILE .T.
  HLPVAR = 0
  CLOSE DATABASES
  MS1='A  GUARD MAINTENANCE  '
  MS2='B  ZONE MAINTENANCE   '
  MS3='C  ROUTE MAINTENANCE  '
  MS4='D  PRINT LISTS        '
  MS5='X  RETURN TO MAIN MENU'
  ME1='Add/Modify/Delete Guards'
  ME2='Add/Modify/Delete Zones'
```

```
 MG3='Add/Modify/Delete Routes'
 MG4='Print Files to Printer'
 MG5='Return to the Main Menu'
 RES2 = ''
 DO WHILE TYPE('RES2') <> 'N'
   RES2=HEADER('MAINTAIN FILES',5)
 ENDDO
 CLEAR
 SET KEY 279
 SET KEY 275
 DO CASE
 CASE RES2=1
   HLPVAR = 1
   DO GUARD
 CASE RES2=2
   HLPVAR = 3
   DO ZONE
 CASE RES2=3
   HLPVAR = 2
   DO ROUTE
 CASE RES2=4
   DO PNTFILE
 CASE RES2=5
   CLEAR
   CLOSE DATABASES
   RETURN
 ENDCASE
ENDDO
RETURN

* POST.PRG
* COPYRIGHT 1989, 1986 COMPUTER SYSTEMS DESIGN, INC.

SET CURSOR OFF
CLOSE DATABASES
FUSE('RECORD/RC/RCNUMX')
N=0
XXX=EOF()
FUSE('ROAMREC/RR')
IF EOF() .AND. XXX
  CLOSE DATABASES
  SET CURSOR ON
  RETURN
ENDIF
COPY STRUC FIELDS ZONE,LOGDATA TO USEDBC
SELECT 2
SET COLOR TO &HILIT
@ 7,6 CLEAR TO 19,74
@ 7,7 SAY 'Preparing Needed Data Files.'
@ 7,49 SAY '# of Records'
@ 7,63 SAY 'Working...'
FUSE('XUSEDBC/UBC')
INDEX ON LOGDATA+ZONE TO TEMPBC1X
INDEX ON ZONE+LOGDATA TO TEMPBC2X
SET INDEX TO TEMPBC1X,TEMPBC2X
SELECT 3
FUSE('BARCODE/BC/BNUMX,BC2X')
SELECT 4
FUSE('ZONE/ZN/ZNUM1X')
BLANKDATE=CTOD('  /  /  ')
BLANKTIME='00:00'
SET COLOR TO &BLUELIT
@ 7,7 SAY 'Preparing Needed Data Files.'
@ 7,49 SAY '# of Records'
@ 7,63 SAY 'Files Open'
SET COLOR TO &HILIT
@ 9,7 SAY 'Updating Checkpoint History.'
@ 9,49 SAY TRANSFORM(N,'9999')
@ 9,63 SAY 'Working...'
SET COLOR TO &BLUELIT
SELECT 5
FUSE('CHISTORY/CH/CHIST1X,CHIST2X,CHIST3X')
FOR J=1 TO 2
  IF J=1
```

```
  ALIAS1='RC'
  SELECT 1
  FUSE('RECORD/RC/RCNUMX')
ELSE
  ALIAS1='RR'
  SELECT 1
  FUSE('ROAMREC/RR')
  SET COLOR TO &HILIT
  @ 10,7 SAY 'Updating Checkpoint Roam History.'
  @ 10,49 SAY TRANSFORM(N,'9999')
  @ 10,63 SAY 'Working...'
ENDIF
N = 0
XBNUM = SPACE(6)
SELECT &ALIAS1
GO TOP
DO WHILE !EOF()
  DISPNUM(8+2)
  DO CASE
  CASE TYPE='B'
    XBNUM=LOGDATA
    SELECT &ALIAS1
    SKIP
  CASE TYPE='R'
    DUPCOUNT = 0
    INCIDQTY = 1
    DO CPOSTDATA
    IF ALIAS1='RR' .AND. LEN(TRIM(LOGDATA))<>2
      SKIP -1
      IF TRIM(LOGDATA)<>'ZZ'
        SKIP
        SELECT BC
        SEEK RR->LOGDATA
        IF !EOF()
          SELECT CH
          LOCKF('Checkpoint History')
          REPLACE BARCODE WITH BC->SERNUM
          UNLOCK
          SELECT BC
          SKIP
          DO WHILE (BARCODE=RR->LOGDATA) .AND. ! EOF()
            DUPCOUNT = DUPCOUNT + 1
            SKIP
          ENDDO
        ENDIF
      ELSE
        SKIP
      ENDIF
      ELSE
        IF ALIAS1='RC'.AND.LEN(TRIM(LOGDATA)
          SKIP -1
          IF TRIM(LOGDATA)<>'ZZ'
            SKIP
            SELECT BC
            SEEK RC->LOGDATA
            IF !EOF()
              SELECT CH
              LOCKF('Checkpoint History')
              REPLACE BARCODE WITH BC->SERNUM
              UNLOCK
            ENDIF
          ELSE
            SKIP
          ENDIF
        ENDIF
      ENDIF
      SELECT &ALIAS1
      SKIP
      DO WHILE LEN(TRIM(LOGDATA))=2 .AND. TYPE='R' .AND. !EOF()
        INCIDQTY = INCIDQTY + 1
        DO CPOSTDATA
        IF TRIM(LOGDATA) = 'ZZ'
          SKIP
          INCIDQTY = INCIDQTY + 1
          DO CPOSTDATA
```

```
ENDIF
SKIP
ENDDO
SKIP (DUPCOUNT + INCIDQTY)
OTHERWISE
SELECT &ALIAS1
SKIP
ENDCASE
ENDDO
IF J=1
SET COLOR TO &BLUELIT
@ 9,7 SAY 'Updating Checkpoint History.'
@ 9,49 SAY TRANSFORM(N,'9999')
@ 9,63 SAY 'Done.      '
SET COLOR TO &HILIT
ENDIF
NEXT
SET COLOR TO &BLUELIT
IF N>0
@ 10,7 SAY 'Updating Checkpoint Roam History.'
@ 10,49 SAY TRANSFORM(N,'9999')
@ 10,63 SAY 'Done.      '
ELSE
@ 10,7 SAY 'There was NO Checkpoint Roam History.'
@ 10,49 SAY '    '
@ 10,63 SAY 'No update.'
ENDIF
SET COLOR TO &HILIT
@ 11,7 SAY 'Updating Guard History.'
@ 11,63 SAY 'Working...'
SELECT USD
ZAP
SELECT 5
FUSE('GHISTORY/GH/GHIST1X,GHIST2X,GHIST3X')
FOR J=1 TO 2
IF J=1
ALIAS1='RC'
SELECT 1
FUSE('RECORD/RC/RCNUMX')
ELSE
ALIAS1='RR'
SELECT 1
FUSE('ROAMREC/RR')
SET COLOR TO &HILIT
@ 12,7 SAY 'Updating Guard Roam History.'
@ 12,49 SAY TRANSFORM(N,'9999')
@ 12,63 SAY 'Working...'
ENDIF
N           = 0
ZONECNT     = 0
POINTCNT    = 0
ROUTEZNS    = 0
ROUTEPTS    = 0
CHPOINT     = 0
INZPCHECKED = 0
INZONE      = .F.
XCHECKIND   = BLANKDATE
STORE SPACE(6) TO XGNUM,XRNUM,XZONE
STORE BLANKTIME TO XCHECKINT,XCHECKOUT
SELECT &ALIAS1
GO TOP
DO WHILE !EOF()
DISPNUM(10+J)
DO CASE
CASE TYPE='S'
SKIP -1
IF BOF()
GO TOP
ELSE
IF TYPE<>'F'
IF ALIAS1='RR'
DO GHISTTOTALS
DO GRDREC WITH ZONECNT,POINTCNT
ELSE
DO GRDREC WITH ROUTEZNS,ROUTEPTS
```

```
      ENDIF
     ENDIF
     SKIP
    ENDIF
    SELECT &ALIAS1
    XRCNUM = RCNUM
    XRNUM  = LOGDATA
    INZONE = .F.
    IF ALIAS1='RC'
      DO ROUTE_TOT WITH XRNUM
    ENDIF
  CASE TYPE='B'
    SKIP -1
    IF ALIAS1 = 'RC' .AND. RCNUM = XRCNUM .AND. TYPE <> 'S'
      DO BRDREC WITH ZONECNT,POINTCNT
      ROUTEPTS = ROUTEPTS - POINTCNT
      ROUTEZNS = ROUTEZNS - ZONECNT
    ENDIF
    SELECT &ALIAS1
    SKIP
    XGNUM      = LOGDATA
    XCHECKIND = DATE
    STORE TIME TO XCHECKINT,XCHECKOUT
    STORE 0 TO POINTCNT,ZONECNT,INZPCHECKED,CHPOINT
    SELECT UBC
    ZAP
  CASE TYPE='E'
    INZONE   = .T.
    XZONE    = LOGDATA
    XCHECKOUT= TIME
    IF ALIAS1='RC'
      ZONECNT=ZONECNT+1
      SELECT ZN
      SEEK XZONE
      IF !EOF()
        POINTCNT=POINTCNT+POINTS
      ENDIF
    ENDIF
  CASE TYPE='R'
    IF LEN(TRIM(LOGDATA)) = 2
      IF TRIM(LOGDATA)='ZZ'
        SKIP
      ENDIF
    ELSE
      CHPOINT=CHPOINT+1
      IF INZONE
        IF ALIAS1='RC'
          SEARCH=LOGDATA+XZONE
          SELECT BC
          SEEK SEARCH
          IF !EOF()
            IF NEWSCAN(SEARCH,XZONE,'RC')
              INZPCHECKED=INZPCHECKED+1
            ENDIF
          ENDIF
        ELSE
          SEARCH=LOGDATA
          SELECT BC
          SEEK SEARCH
          DO WHILE BARCODE=SEARCH .AND. !EOF()
            IF NEWSCAN(SEARCH,ZNUM,'RS')
              INZPCHECKED=INZPCHECKED+1
            ENDIF
            SELECT BC
            SKIP
          ENDDO
        ENDIF
      ENDIF
    ENDIF
    SELECT &ALIAS1
    XCHECKOUT=TIME
  CASE TYPE='L'
    INZONE = .F.
  CASE TYPE='F'
    XCHECKOUT=TIME
```

```
    IF ALIAS1='RS'
      DO GHISTTOTALS
    ENDIF
    DO GRDREC WITH ZONECNT,POINTCNT
  ENDCASE
  SELECT &ALIAS1
  SKIP
ENDDO
IF N<>0
  SKIP -1
  IF TYPE<>'F'
    IF ALIAS1='RS'
      DO GHISTTOTALS
      DO GRDREC WITH ZONECNT,POINTCNT
    ELSE
      DO GRDREC WITH ROUTEZNS,ROUTEPTS
    ENDIF
  ENDIF
ENDIF
IF J=1
  SET COLOR TO &BLUELIT          HISTORY
    @ 11,7 SAY 'Updating Guard Wa
    @ 11,49 SAY TRANSFORM(N,'9999')
    @ 11,63 SAY 'Done.      '
  ENDIF
NEXT
IF N>0
  SET COLOR TO &BLUELIT
  @ 12,7 SAY 'Updating Guard Roam History.'
  @ 12,49 SAY TRANSFORM(N,'9999')
  @ 12,63 SAY 'Done.      '
ELSE
  SET COLOR TO &BLUELIT
  @ 12,7 SAY 'There was NO Guard Roam Activity.'
  @ 12,49 SAY '     '
  @ 12,63 SAY 'No Update.'
ENDIF
SET COLOR TO &HILIT
@ 13,7 SAY 'Updating Zone History.'
@ 13,63 SAY 'Working...'
SELECT UBC
ZAP
SELECT 5
FUSE('ZHISTORY/ZH/ZHIST1X')
INZONE = .F.
XZ1DAT=BLANKDATE
STORE 0 TO N,INZPCHECKED
STORE BLANKTIME TO XZ1TIM,XZ2TIM
STORE SPACE(6) TO XZ1NUM,XGNUM,XRCNUM
SELECT 1
FUSE('RECORD/RC/RCNUMX')
GO TOP
DO WHILE !EOF()
  DISPNUM(13)
  DO CASE
  CASE TYPE='S'
    SKIP -1
    IF EOF()
      GO TOP
    ELSE
      IF INZONE
        SELECT ZH
        LOCKF('Zone History')
        REPLACE INZPCHECK WITH INZPCHECKED
        UNLOCK
      ENDIF
      SELECT RC
      SKIP
    ENDIF
    INZONE=.F.
    XRNUM=LOGDATA
    STORE 0 TO INZPCHECKED,ZONECNT,POINTCNT
  CASE TYPE='G'
    XGNUM=LOGDATA
  CASE TYPE='E'
```

```
  SELECT UBC
  ZAP
  SELECT RC
  INZONE = .T.
  XZ1NUM=LOGDATA
  XZ1DAT=DATE
  XZ1TIM=TIME
  XZ2TIM='25:00'
  INZPCHECKED = 0
  DO ZNREC
CASE TYPE='R'
  IF LEN(TRIM(LOGDATA)) = 2
    IF LOGDATA='ZZ'
     SKIP
    ENDIF
   ELSE
    IF INZONE
      SEARCH=LOGDATA+XZ1NUM
      SELECT RC
      SEEK SEARCH
      IF !EOF()
        IF NEWSCAN(SEARCH,XZ1NUM,'RC')
          INZPCHECKED = INZPCHECKED + 1
        ENDIF
      ENDIF
    ENDIF
   ENDIF
 CASE TYPE='L'
   INZONE = .F.
   SKIP - 1
   XZ2TIM=TIME
   SKIP
   SELECT ZH
   LOCKF('Zone History')
   REPLACE LEAVE WITH FKTIME(XZ2TIM)
   REPLACE INZPCHECK WITH INZPCHECKED
   UNLOCK
   SELECT RC
 ENDCASE
 SELECT RC
 SKIP
ENDDO
IF N<>0
  SKIP -1
  IF !BOF() .AND. INZONE
    SELECT ZH
    LOCKF('Zone History')
    REPLACE INZPCHECK WITH INZPCHECKED
    UNLOCK
  ENDIF
ENDIF
SET COLOR TO &BLUELIT
@ 13,7 SAY 'Updating Zone History.'
@ 13,49 SAY TRANSFORM(N,'9999')
@ 13,63 SAY 'Done.'
SET COLOR TO &HILIT
@ 14,7 SAY 'Updating Roam Tour History.'
@ 14,49 SAY TRANSFORM(N,'9999')
@ 14,63 SAY 'Working...'
XZ1DAT=BLANKDATE
STORE 0 TO N,INZPCHECKED
STORE '25:00' TO XZ1TIM,XZ2TIM
STORE SPACE(6) TO XZ1NUM,XGNUM
SELECT UBC
ZAP
SELECT 1
FUSE('ROAMREC/RR')
SET FILTER TO TYPE='G' .OR. TYPE='R'
GO TOP
DO WHILE !EOF()
  DISPNUM(14)
  DO CASE
  CASE TYPE='G'
    SELECT UBC
```

```
    SKIP
    SELECT RR
    XSNUM=LOGDATA
    XZ1DAT=DATE
  CASE TYPE='R'
    DO WHILE TYPE<>'G' .AND. !EOF()
      IF LEN(TRIM(LOGDATA))=2 .AND. TYPE='R'
        IF LOGDATA = 'ZZ'
          SKIP
        ENDIF
      ELSE
        SEARCH=LOGDATA
        SELECT BC
        SEEK SEARCH
        DO WHILE BARCODE=SEARCH .AND. !EOF()
          NEWSCAN(SEARCH,ZNUM,'RR')
          SELECT BC
          SKIP
        ENDDO
      ENDIF
      SELECT RR
      SKIP
    ENDDO
    SKIP -1
    SELECT UBC
    SET ORDER TO 2
    GO TOP
    DO WHILE !EOF()
      XZ1NUM=ZONE
      INZPCHECKED=0
      DO WHILE XZ1NUM=ZONE .AND. !EOF()
        INZPCHECKED=INZPCHECKED+1
        SKIP
      ENDDO
      DO ZNREC
      SELECT UBC
    ENDDO
    SET ORDER TO 1
  ENDCASE
  SELECT RR
  SKIP
ENDDO

GO TOP
SET COLOR TO &BLUELIT
IF EOF()
  @ 14,7 SAY 'There Were No Roam Tours.   '
  @ 14,63 SAY 'No Update.'
ELSE
  @ 14,7 SAY 'Updating Roam Tour History.'
  @ 14,49 SAY TRANSFORM(N,'9999')
  @ 14,63 SAY 'Done.      '
ENDIF
SET COLOR TO &HILIT
SET FILTER TO
CLOSE DATABASES
FUSE('CONFIG/CO')
LOCKF('Configuration')
SELECT 2
FUSE('ZHISTORY/ZH')
GO BOTT
XREC=RECNO()
SELECT CO
REPLACE ZHIST WITH XREC
SELECT 2
FUSE('CHISTORY/CH')
GO BOTT
XREC=RECNO()
SELECT CO
REPLACE CHIST WITH XREC
SELECT 2
FUSE('GHISTORY/GH')
GO BOTT
XREC=RECNO()
SELECT CO
```

```
REPLACE GHIST WITH XREC
UNLOCK
CLOSE DATABASES
FUSE('XRECORD/RC/RCNUMX')
ZAP
FUSE('XROAMREC/RR/ROAM1X')
ZAP
SET COLOR TO &HILIT
CLOSE DATABASES
IF FILE('USEDBC.DBF')
  DELETE FILE('USEDBC.DBF')
ENDIF
IF FILE('TEMPBC1X.NTX')
  DELETE FILE('TEMPBC1X.NTX')
ENDIF
IF FILE('TEMPBC2X.NTX')
  DELETE FILE('TEMPBC2X.NTX')
ENDIF
SET CURSOR ON
SET COLOR TO &BLUELIT
@ 7,49 SAY '# of Records'
@ 7,63 SAY '- CLOSED -'
SET COLOR TO &HILIT
MESG(22,'Updating of History Files is Complete')
KEYBOARD ''
XJUNK=INKEY(5)
RETURN
FUNCTION DISPNUM
PARAMETERS F0
N=N+1
IF (N % 10) = 0
  @ F0,49 SAY TRANSFORM(N,'9999')
ENDIF
RETURN .T.
PROCEDURE ZNREC
SELECT ZN
SEEK XZ1NUM
SELECT ZH
LOCKF('Zone History')
APPEND BLANK
REPLACE ZNUM WITH XZ1NUM, DATE WITH PKDATE(XZ1DAT), ENTER WITH PKTIME(XZ1TIM), LEAVE WITH PKTIME(XZ2TIM), GNUM WITH XGNUM, POINTS WITH ZN-
UNLOCK
RETURN
PROCEDURE GRDREC
PARAMETERS F0,F1
SELECT ZN
SEEK XZONE
SELECT GH
LOCKF('Guard History')
APPEND BLANK
REPLACE GNUM WITH XGNUM, DATE WITH PKDATE(XCHECKIND), RNUM WITH XRNUM, CHECKIN WITH PKTIME(XCHECKINT), CHECKOUT WITH PKTIME(XCHECKOUT)
REPLACE ZONES WITH F0, POINTS WITH F1, PCHECKED WITH CHPOINT, INZPCHECK WITH INZPCHECKED
UNLOCK
XCHECKIND=BLANKDATE
XCHECKINT=BLANKTIME
STORE '' TO XGNUM
STORE 0 TO ZONECNT,POINTCNT,CHPOINT,INZPCHECKED
SELECT VALIDI
RETURN
PROCEDURE GHISTTOTALS
POINTCNT =0
ZONECNT  =0
XXOLDZONE=SPACE(6)
SELECT UBC
SET ORDER TO 2
GO TOP
DO WHILE !EOF()
  IF XXOLDZONE<>ZONE
    XXOLDZONE= ZONE
    ZONECNT  = ZONECNT+1
    SELECT ZN
    SEEK XXOLDZONE
    IF ! EOF()
      POINTCNT=POINTCNT+POINTS
    ENDIF
```

```
  ENDIF
  SELECT UBC
  SKIP
ENDDO
SET ORDER TO 1
SELECT &ALIAS1
RETURN
PROCEDURE ROUTE_TOT
PARAMETERS F0
ROUTEZNS=0
ROUTEPTS=0
SELECT 2
FUSE('RDET/RDT/RNUM1X')
SELECT RDT
SEEK F0
DO WHILE RNUM=F0 .AND. !EOF()
  ROUTEZNS=ROUTEZNS+1
  SELECT ZN
  SEEK RDT->ZNUM
  IF !EOF()
    ROUTEPTS=ROUTEPTS+POINTS
  ENDIF
  SELECT RDT
  SKIP
ENDDO
SELECT 2
FUSE('XUSEDBC/UBC/TEMPBC1X,TEMPBC2X')

SELECT &ALIAS1
RETURN
FUNCTION NEWSCAN
PARAMETERS F0,F1,F2
SELECT UBC
SEEK F0
IF !EOF()
  IF F2='RC'
    RETURN .F.
  ENDIF
  DO WHILE LOGDATA=F0 .AND. !EOF()
    IF F1=ZONE
      RETURN .F.
    ENDIF
    SKIP
  ENDDO
ENDIF
APPEND BLANK
REPLACE LOGDATA WITH SUBSTR(F0,1,6)
REPLACE ZONE WITH F1
RETURN .T.
PROCEDURE CPOSTDATA
SELECT CH
LOCKF('Checkpoint History')
APPEND BLANK
REPLACE DATE WITH PKDATE(&ALIAS1->DATE)
REPLACE TIME WITH PKTIME(&ALIAS1->TIME)
REPLACE GNUM WITH XGNUM
REPLACE BARCODE WITH &ALIAS1->LOGDATA
UNLOCK
SELECT &ALIAS1
RETURN

* GHISTRPT.PRG
* COPYRIGHT 1989, 1988 COMPUTER SYSTEMS DESIGN, INC.

SET INTEN OFF
SET DELIMITERS ON
CLEAR
CLOSE DATABASES
HEADER('GUARD HISTORY REPORT',-1)
MESG(7,'This report displays summarized tour activity')
MESG(8,'information about a guard for a designated time period.')
MESG(12,'Please wait while setting up files...')
SELECT 1
FUSE('BARCODE/BC/BNUMX,ZNUM2X')
SELECT 2
```

```
FUSE('GHISTORY/GH/GHIST3X')
IF EOF()
  CLOSE DATABASES
  MESGWAIT(18,'There is no history for any guard.')
  RETURN
ENDIF
SELECT 3
FUSE('GUARD/GN/GRDX,GRDX1')
IF EOF()
  CLOSE DATABASES
  MESGWAIT(18,'There are no guards defined.')
  RETURN
ENDIF
EXCLAM = REPLICATE("X",24)
DO WHILE .T.
  XODATE = CTOD('  /  /  ')
  X1DATE = CTOD('  /  /  ')
  XGRDNUM  = SPACE(6)
  XGRDNAME = SPACE(24)
  DO WHILE .T.
    CLR(9)
    SELECT GN
    MESG(19,'F2 to display GUARDS.  ESC to exit.')
    @ 12,20 SAY 'Guard Name    ' GET XGRDNAME PICTURE '&EXCLAM' VALID OKGUARD(XGRDNAME,'2','GHISTRPT')
    @ 13,20 SAY 'Guard ID      ' GET XGRDNUM PICTURE '!!!!!!' VALID OKGUARD(XGRDNUM,'1','GHISTRPT')
    SET COLOR TO &LOLIT
    @ 14,18 SAY "Enter a Guard Name of '**' for all guards."
    SET COLOR TO &HILIT
    @ 16,20 SAY 'Starting Date ' GET XODATE VALID OKDATE(XODATE,19)
    @ 17,20 SAY 'Ending Date   ' GET X1DATE VALID OKDATE(X1DATE,19)
    SET KEY -1 TO GENWIND
    READ
    SET KEY -1
    SET ORDER TO 1
    CLR(20)
    IF LASTKEY() = 27
      EXIT
    ENDIF
    IF LEN(XGRDNUM)<6
      XGRDNUM=XGRDNUM+SPACE(6-LEN(XGRDNUM))
    ENDIF
    PODATE=PKDATE(XODATE)
    P1DATE=PKDATE(X1DATE)
  IF P1DATE < PODATE
    MESGWAIT(19,'Starting date is later than ending date.')
    LOOP
  ENDIF
  MESG(19,'Please wait while processing files...')
  DO CASE
  CASE XGRDNUM='**'
    SELECT GN
    SET ORDER TO 1
    GO TOP
    SET SOFTSEEK ON
    DO WHILE !EOF()
      SELECT GH
      SEEK GN->GNUM+PODATE
      IF GNUM=GN->GNUM.AND.DATE>=PODATE.AND.DATE<=P1DATE.AND.!EOF()
        EXIT
      ENDIF
      SELECT GN
      SKIP
    ENDDO
    SET SOFTSEEK OFF
    IF EOF()
      MESGWAIT(19,'No guards were active during this period.')
      LOOP
    ELSE
      EXIT
    ENDIF
  OTHERWISE
    SELECT GH
    SET SOFTSEEK ON
    SEEK XGRDNUM + PODATE
    SET SOFTSEEK OFF
```

```
    IF XGRDNUM=GNUM .AND. DATE>=PODATE .AND. DATE<=P1DATE .AND. !EOF()
      EXIT
    ENDIF
    MESGWAIT(19,'No history for guard '+TRIM(XGRDNUM)+' during this period.')
  ENDCASE
ENDDO
IF LASTKEY() = 27
  EXIT
ENDIF
XPG  = 0
LMAX = 0
YPRINTIT = ' '
IF ! SORP()
  LOOP
ENDIF
SET DELIMITERS ON
DO GHISTHEAD
SELECT GH
IF XGRDNUM='**'
  DO ALLGHIST
ELSE
  DO ONEGHIST
ENDIF
SET DEVICE TO SCREEN
IF YPRINTIT
  EJECT
ELSE
  IF LASTKEY() <> 27
    MESG(24,'End of report.  Press any key to continue...')
    DO WHILE INKEY() = 0
    ENDDO
  ENDIF
ENDIF
CLEAR
  HEADER('GUARD HISTORY REPORT',
  MESG(7,'This report displays summarized tour activity')
  MESG(8,'information about a guard for a designated time period.')
ENDDO
CLOSE DATABASES
RETURN
PROCEDURE ALLGHIST
SELECT GN
SET ORDER TO 1
DO WHILE !EOF()
  XGRDNUM=GNUM
  XGRDNAME=GNAME
  SELECT GH
  SET SOFTSEEK ON
  SEEK XGRDNUM+PODATE
  SET SOFTSEEK OFF
  IF XGRDNUM=GNUM.AND.DATE>=PODATE.AND.DATE<=P1DATE.AND.!EOF()
    DO ONEGHIST
  ENDIF
  IF LASTKEY()=27
    EXIT
  ENDIF
  SELECT GN
  SKIP
ENDDO
RETURN
PROCEDURE ONEGHIST
SELECT GH
TZ=0
TIZP=0
TIZPC=0
CHANGED_GUARD=.T.
DO WHILE XGRDNUM=GNUM .AND. DATE >=PODATE .AND. DATE<=P1DATE .AND. !EOF()
  IF (L > LMAX) .OR. (CHANGED_GUARD .AND. L>=LMAX-1)
    IF ! CHNGPAGE('GHISTHEAD')
      EXIT
    ENDIF
  ENDIF
  IF CHANGED_GUARD
    @ L,0 SAY 'Guard Name:  '+TRIM(XGRDNAME)
    L=L+1
```

```
ENDIF
XIN   = UPKTIME(CHECKIN)
XOUT  = UPKTIME(CHECKOUT)
XDATE = CTOD(UPKDATE(DATE))
@ L, 0 SAY XDATE
@ L,11 SAY RNUM
@ L,20 SAY XIN
@ L,28 SAY XOUT
IF !EMPTY(XOUT)
  IF VAL(SUBSTR(XOUT,1,2)) < VAL(SUBSTR(XIN,1,2))
    @ L,36 SAY CETIME(-1,1,XIN,XDATE,XOUT,XDATE+1)
  ELSE
    @ L,36 SAY CETIME(-1,1,XIN,XDATE,XOUT,XDATE)
  ENDIF
ENDIF
@ L,46 SAY ZONES PICTURE '999'
@ L,55 SAY POINTS PICTURE '9999'
@ L,66 SAY INZPCHECK PICTURE '9999'
TZ=TZ+ZONES
TIZP=TIZP+POINTS
TIZPC=TIZPC+INZPCHECK
IF POINTS = 0
  @ L,77 SAY '0'
ELSE
  @ L,75 SAY INT(100*INZPCHECK/POINTS) PICTURE '999'
  ENDIF
  @ L,79 SAY '%'
  L = L+1
  SKIP
  CHANGED_GUARD=.F.
ENDDO
IF LASTKEY()<>27
  IF L>=LMAX-1
    IF ! CHNGPAGE('GHISTHEAD')
      RETURN
    ENDIF
  ENDIF
  @ L,44 SAY '====    ======    =======' 
  L=L+1
  @ L,45 SAY TZ PICTURE '9999'
  @ L,54 SAY TIZP PICTURE '99999'
  @ L,65 SAY TIZPC PICTURE '99999'
  IF TIZP=0
    @ L,77 SAY '0'
  ELSE
    @ L,75 SAY INT(100*TIZPC/TIZP) PICTURE '999'
  ENDIF
  @ L,79 SAY '%'
ENDIF
L=L+2
RETURN
PROCEDURE GHISTHEAD
IF ! YPRINTIT
  CLEAR
ENDIF
XPG = XPG + 1
@ 1, 0 SAY DATE()
@ 1,40-INT(LEN(TRIM(LTRIM(HEAD)))/2) SAY HEAD
@ 1,71 SAY 'Page: '+STR(XPG,3)
@ 2, 0 SAY TIME()
@ 2,30 SAY 'GUARD HISTORY REPORT'
@ 3,25 SAY 'The TourWatch Manager (C) 1988'
IF ! YPRINTIT
  SET COLOR TO &BLUELIT
ENDIF
@ 5,0 SAY 'Begin Date : '+DTOC(X0DATE)
@ 6,0 SAY 'End Date   : '+DTOC(X1DATE)
@ 8,0 SAY 'Tour       Route    Check    Check    Total    Total    In-Zone    In-Zone    Percent'
@ 9,0 SAY 'Date       Number   In       Out      Time     Zones    Points     Pts Chkd   Checked'
IF ! YPRINTIT
  @ 10,0 SAY SLINE
  SET COLOR TO &HILIT
ELSE
  @ 10,0 SAY REPLICATE('-',80)
ENDIF
```

```
L = 11
RETURN

* ZHISTRPT.PRG
* COPYRIGHT 1989, 1988 COMPUTER SYSTEMS DESIGN, INC.

SET INTEN OFF
SET DELIMITERS ON
CLEAR
CLOSE DATABASES
HEADER('ZONE HISTORY REPORT',-1)
MESG(7,'This report displays summarized tour activity information')
MESG(8,'about a zone for a designated time period.')
MESG(12,'Please wait while setting up files...')
SELECT 1
FUSE('ZHISTORY/ZH/ZHISTIX')
IF EOF()
  CLOSE DATABASES
  MESGWAIT(18,'There is no history for any zone.')
  RETURN
ENDIF
SELECT 2
FUSE('GUARD/G/GRDX')
SELECT 3
FUSE('ZONE/ZN/ZNUMIX,ZNAMX')
IF EOF()
  CLOSE DATABASES
  MESGWAIT(18,'There are no zones defined.')
  RETURN
ENDIF
EXCLAM=REPLICATE("X",15)
DO WHILE .T.
  XODATE = CTOD('  /  /  ')
  X1DATE = CTOD('  /  /  ')
  XZNUM = SPACE(6)
  XZDESC=SPACE(15)
  DO WHILE .T.
    CLR(10)
    SELECT ZN
    MESG(19,'F2 to display ZONES.  ESC to exit.')
    @ 11,20 SAY 'Zone Name      ' GET XZDESC PICTURE '&EXCLAM' VALID OKZONE(XZDESC,'2')
    @ 12,20 SAY 'Zone Number    ' GET XZNUM PICTURE '!!!!!!' VALID OKZONE(XZNUM,'1')
    SET COLOR TO &LOLIT
    @ 13,19 SAY "Enter a Zone Name of '**' for all zones."
    SET COLOR TO &HILIT
    @ 15,20 SAY 'Starting Date ' GET XODATE VALID OKDATE(XODATE,19)
    @ 16,20 SAY 'Ending Date   ' GET X1DATE VALID OKDATE(X1DATE,19)
    SET KEY -1 TO GENWIND
    READ
    SET KEY -1
    CLR(19)
    IF LASTKEY() = 27
      EXIT
    ENDIF
    IF LEN(XZNUM)<6
      XZNUM=XZNUM+SPACE(6-LEN(XZNUM))
    ENDIF
    PODATE=PYDATE(XODATE)
    P1DATE=PYDATE(X1DATE)
    IF PODATE > P1DATE
      MESGWAIT(19,'Starting date is later than ending date.')
      LOOP
    ENDIF
    MESG(19,'Please wait while processing files...')
    SELECT ZH
    IF XZNUM='**'
      SELECT ZN
      SET ORDER TO 1
      GO TOP
      SET SOFTSEEK ON
      DO WHILE !EOF()
        SELECT ZH
        SEEK ZN->ZNUM+PODATE
        IF ZNUM=ZN->ZNUM.AND.DATE>=PODATE.AND.DATE<=P1DATE.AND.!EOF()
          EXIT
```

```
      ENDIF
      SELECT ZN
      SKIP
    ENDDO
    SET SOFTSEEK OFF
    IF ZNUM<>ZN->ZNUM.OR.DATE<PODATE.OR.DATE>P1DATE.OR.EOF()
      MESGWAIT(19,'No history for any zones for this time period.')
       LOOP
    ENDIF
  ELSE
    SELECT ZH
    SET SOFTSEEK ON
    SEEK XZNUM+PODATE
    SET SOFTSEEK OFF
    IF ZNUM<>XZNUM.OR.DATE<PODATE.OR.DATE>P1DATE.OR.EOF()
      MESGWAIT(19,'No history for this zone for this time period.')
      LOOP
    ENDIF
  ENDIF
  EXIT
ENDDO
IF LASTKEY() = 27
  EXIT
ENDIF
XPG  = 0
LMAX = 0
YPRINTIT = ' '
IF !SORP()
  LOOP
ENDIF
SET DELIMITERS ON
DO ZHISTHEAD
IF XZNUM='**'
  DO ALLZHIST
ELSE
  DO ONEZHIST
ENDIF
SET DEVICE TO SCREEN
IF YPRINTIT
  EJECT
ELSE
  IF LASTKEY()<>27
    MESG(24,'End of report.  Press any key to continue.')
    DO WHILE INKEY()=0
    ENDDO
  ENDIF
ENDIF
CLEAR
HEADER('ZONE HISTORY REPORT',-1)
MESG(7,'This report displays summarized tour activity information')
MESG(8,'about a zone for a designated time period.')
ENDDO
CLOSE DATABASES
RETURN
PROCEDURE ALLZHIST
SELECT ZN
SET ORDER TO 1
DO WHILE !EOF()
  XZDESC=SDESC
  XZNUM=ZNUM
  SELECT ZH
  SET SOFTSEEK ON
  SEEK XZNUM+PODATE
  IF ZNUM=XZNUM.AND.DATE>=PODATE.AND.DATE<=P1DATE.AND.!EOF()
    DO ONEZHIST
    L=L+3
  ENDIF
  SELECT ZN
  SKIP
  IF LASTKEY()=27
    EXIT
  ENDIF
ENDDO
```

```
RETURN
PROCEDURE ONEZHIST
SELECT ZH
IZP =0
IZPC=0
CHANGED_ZONE=.T.
DO WHILE ZNUM=XZNUM .AND. DATE>=PODATE .AND. DATE<=P1DATE .AND. !EOF()
  IF (L > LMAX) .OR. (CHANGED_ZONE .AND. L>=LMAX-1)
    IF ! CHNGPAGE('ZHISTHEAD')
      EXIT
    ENDIF
  ENDIF
  XDATE  = CTOD(UPKDATE(DATE))
  INTIME = UPKTIME(ENTER)
  IF EMPTY(INTIME)
    INTIME  = 'ROAM'
    ELAPSED = ''
    OUTTIME = ''
  ELSE
    OUTTIME=UPKTIME(LEAVE)
    IF EMPTY(OUTTIME)
      ELAPSED=''
    ELSE
      IF VAL(SUBSTR(OUTTIME,1,2)) < VAL(SUBSTR(INTIME,1,2))
        ELAPSED=CETIME(-1,1,INTIME,XDATE,OUTTIME,XDATE+1)
      ELSE
        ELAPSED=CETIME(-1,1,INTIME,XDATE,OUTTIME,XDATE)
      ENDIF
    ENDIF
  ENDIF
  IF CHANGED_ZONE
    @ L,0 SAY 'Zone Name:  '+TRIM(ZN->SDESC)
    L=L+1
  ENDIF
  @ L, 0 SAY XDATE
  @ L, 9 SAY INTIME
  @ L,16 SAY OUTTIME
  @ L,23 SAY ELAPSED
  SELECT 6
  SEEK ZH->GNUM
  IF FOUND()
    @ L,30 SAY SUBSTR(GNAME,1,24)
  ELSE
    @ L,30 SAY 'Undefined'
  ENDIF
  SELECT ZH
  @ L,57 SAY STR(POINTS,3)
  @ L,68 SAY STR(INZPCHECK,3)
  IF POINTS = 0
    @ L,77 SAY '0'
  ELSE
    @ L,75 SAY INT(100*INZPCHECK/POINTS) PICTURE '999'
  ENDIF
  @ L,79 SAY '%'
  IZP=IZP+POINTS
  IZPC=IZPC+INZPCHECK
  L = L+1
  SKIP
  CHANGED_ZONE=.F.
ENDDO
IF LASTKEY()<>27
  IF L>=LMAX-1
    IF ! CHNGPAGE('ZHISTHEAD')
      RETURN
    ENDIF
  ENDIF
  @ L  ,54 SAY '=====      ====='
  @ L+1,55 SAY IZP PICTURE '99999'
  @ L+1,66 SAY IZPC PICTURE '99999'
  IF IZP=0
    @ L,77 SAY '0'
  ELSE
    @ L+1,75 SAY INT(100*IZPC/IZP) PICTURE '999'
  ENDIF
  @ L+1,79 SAY '%'
```

```
ENDIF
RETURN
PROCEDURE ZHISTHEAD
IF ! YPRINTIT
  CLEAR
ENDIF
XPG = XPG + 1
@ 1, 0 SAY DATE()
@ 1,40-(INT(LEN(HEAD)/2)) SAY HEAD
@ 1,71 SAY 'Page: '+STR(XPG,3)
@ 2, 0 SAY TIME()
@ 2,31 SAY 'ZONE HISTORY REPORT'
@ 3,25 SAY 'The TourWatch Manager (C) 1988'
IF ! YPRINTIT
  SET COLOR TO &BLUELIT
ENDIF
@ 5,0 SAY 'Begin Date : '+DTOC(X0DATE)
@ 6,0 SAY 'End Date   : '+DTOC(X1DATE)
@ 8,0  SAY 'Tour     Enter  Leave  Total                            In-Zone   In-Zone   Percent'
@ 9,0  SAY 'Date     Zone   Zone   Time   Guard Name                Points    Pts Chkd  Checked'
IF ! YPRINTIT
  @ 10,0 SAY SLINE
  SET COLOR TO &HILIT
ELSE
  @ 10,0 SAY REPLICATE('-',80)
ENDIF
L = 11
RETURN

* CHISTRPT.PRG
* COPYRIGHT 1989, 1988 COMPUTER SYSTEMS DESIGN, INC.

SET INTEN OFF
SET DELIM ON
CLEAR
HEADER('CHECKPOINT HISTORY REPORT',-1)
MESG(7,'This report displays checkpoint activity.')
MESG(8,'for a designated time period.')
MESG(10,'Please wait while setting up files...')
CLOSE DATABASES
SELECT 1
FUSE('CHISTORY/CH/CHIST1X,CHIST2X,CHIST3X')
IF EOF()
  CLOSE DATABASES
  MESGWAIT(18,'There is no history for any checkpoint.')
  RETURN
ENDIF
SELECT 2
FUSE('BARCODE/BC/BNUMX,BC1X,BC2X')
IF EOF()
  CLOSE DATABASES
  MESGWAIT(18,'There are no checkpoints defined.')
  RETURN
ENDIF
SELECT 3
FUSE('EXCEPT/EX/EXCX')
SELECT 4
FUSE('GUARD/G/GRDX')
SELECT 5
FUSE('OHISTORY/OH/OHIST1X')
EXCLAM=REPLICATE("X",15)
DO WHILE .T.
  XBARCODE  = SPACE(6)
  XCHKDESC = SPACE(15)
  X0TIME='00:00'
  X1TIME='23:59'
  X0DATE = CTOD('  /  /  ')
  X1DATE = CTOD('  /  /  ')
  DO WHILE .T.
    CLR(9)
    XWINDREC=0
    INCID_ONLY = 'N'
    SELECT BC
    MESG(19,'F2 to display CHECKPOINTS.  ESC to exit.')
    @ 10,20 SAY 'Checkpoint    ' GET XCHKDESC PICTURE '&EXCLAM' VALID OKCPNTHIST(XCHKDESC,'2')
```

```
@ 11,20 SAY 'Bar Code      ' GET XBARCODE PICTURE '!!!!!!' VALID OKCPNTHIST(XBARCODE,'1')
SET COLOR TO &LOLIT
@ 12,17 SAY "Enter a Checkpoint of '**' for all checkpoints."
SET COLOR TO &HILIT
@ 14,20 SAY 'Starting Date ' GET XODATE VALID OKDATE(XODATE,19)
@ 14,48 SAY 'Time ' GET XOTIME PICTURE '99:99' VALID OKHISTTIME(XOTIME,1)
@ 15,20 SAY 'Ending Date   ' GET X1DATE VALID OKDATE(X1DATE,19)
@ 15,48 SAY 'Time ' GET X1TIME PICTURE '99:99' VALID OKHISTTIME(X1TIME,1)
@ 17,26 SAY 'Incidents only (Y/N) ? ' GET INCID_ONLY PICTURE 'Y'
SET KEY -1 TO GENWIND
READ
SET KEY -1
IF LASTKEY() = 27
  EXIT
ENDIF
IF LEN(XBARCODE)<6
  XBARCODE=XBARCODE+SPACE(6-LEN(XBARCODE))
ENDIF
PODATE=PKDATE(XODATE)
P1DATE=PKDATE(X1DATE)
POTIME=PKTIME(XOTIME)
P1TIME=PKTIME(X1TIME)
IF PODATE>P1DATE
  MESGWAIT(19,'Starting date is later than ending date.')
  LOOP
ENDIF
IF PODATE=P1DATE.AND.POTIME>P1TIME
  MESGWAIT(19,'Starting time is later than ending time.')
  LOOP
ENDIF
MESG(19,'Please wait while processing files...')
DO CASE
CASE XBARCODE='**'
  SELECT CH
  SET ORDER TO 3
  SET SOFTSEEK ON
  SEEK PODATE+POTIME
  SET SOFTSEEK OFF
  IF OKSEEKS().AND.!EOF()
    EXIT
  ENDIF
  MESGWAIT(19,'No checkpoint activity for this time period.')
OTHERWISE
  SELECT BC
  IF XWINDREC<>0
    GO XWINDREC
    XSERNUM=SERNUM
    XBARCODE=BARCODE
      XCHKDESC=DESC
    ELSE
      SET ORDER TO 1
      SEEK XBARCODE
      IF XBARCODE=BARCODE .AND. !EOF()
        XSERNUM=SERNUM
        XBARCODE=BARCODE
        XCHKDESC=DESC
      ELSE
        MESGWAIT(19,'Unable to find this checkpoint in the bar code file !')
        LOOP
      ENDIF
    ENDIF
    SELECT CH
    SET ORDER TO 1
    SET SOFTSEEK ON
    SEEK XSERNUM+PODATE+POTIME
    SET SOFTSEEK OFF
    IF XSERNUM=BARCODE.AND.OKSEEKS().AND.!EOF()
      EXIT
    ENDIF
    MESGWAIT(19,'No activity for bar code '+TRIM(XBARCODE)+' for this time period.')
  ENDCASE
ENDDO
IF LASTKEY() = 27
  EXIT
ENDIF
```

```
  STORE 0 TO XPS,LMAX,L
  YPRINTIT=' '
  SET DELIMITERS ON
  SELECT CH
  SET ORDER TO 1
  IF XBARCODE='**'
    DO ALLCHIST
  ELSE
    DO ONECHIST
  ENDIF
  SET DEVICE TO SCREEN
  IF (L = 0)
    CLR(19)
    MESGWAIT(23,'No incidents occurred at this checkpoint over this time period.')
  ELSE
    IF YPRINTIT
      EJECT
    ELSE
      IF LASTKEY()<>27
        MESG(24,'End of report.  Press any key to continue.')
        DO WHILE INKEY() = 0
        ENDDO
      ENDIF
    ENDIF
  ENDIF
  CLEAR
  HEADER('CHECKPOINT HISTORY REPORT',-1)
  MESG(7,'This report displays checkpoint activity.')
  MESG(8,'for a designated time period.')
ENDDO
CLOSE DATABASES
RETURN
PROCEDURE ALLCHIST
SELECT BC
SET ORDER TO 3
GO TOP
XSERNUM=SPACE(6)
DO WHILE !EOF()
  IF SERNUM<>XSERNUM
    XSERNUM=SERNUM
    SELECT CH
    SET SOFTSEEK ON
    SEEK BC->SERNUM+PODATE+POTIME
    SET SOFTSEEK OFF
    IF BC->SERNUM=BARCODE.AND.!EOF()
      IF OKSEEKS()
        XSERNUM=BC->SERNUM
        XBARCODE=BC->BARCODE
        XCHKDESC=BC->DESC
        DO ONECHIST
        L=L+1
      ENDIF
    ENDIF
  ENDIF
  IF LASTKEY()=27
    EXIT
  ENDIF
  SELECT BC
  SKIP
ENDDO
RETURN
PROCEDURE ONECHIST
SELECT CH
CHANGED_POINT=.T.
DO WHILE BARCODE=XSERNUM.AND.OKSEEKS().AND.!EOF()
  XXXDATE  = UPKDATE(DATE)
  XXXTIME  = UPKTIME(TIME)
  XXXGUARD = GNUM
  SELECT 6
  SEEK CH->GNUM
  IF .NOT. EOF()
    XXXGNAME=GNAME
  ELSE
    XXXGNAME='Undefined'
  ENDIF
```

```
SELECT CH
XREC = RECNO()
SET ORDER TO 2
SKIP
IF OKSEEKS().AND.!EOF()
  IF (INCID_ONLY='N') .OR. (XXXGUARD=GNUM.AND.LEN(TRIM(BARCODE))=2)
    IF (L = 0)
      YPRINTIT=' '
      IF !SORP()
        EXIT
      ENDIF
      DO CPNTHEAD
    ENDIF
    IF (L>LMAX) .OR. (CHANGED_POINT.AND.L>=LMAX-1.AND.L<>0)
      IF ! CHNGPAGE('CPNTHEAD')
        EXIT
      ENDIF
    ENDIF
    IF CHANGED_POINT
      @ L,0 SAY 'Checkpoint:  '+TRIM(XCHKDESC)
      L=L+1
      CHANGED_POINT=.F.
    ENDIF
  ENDIF
ENDIF
XICODEF  = .F.
DO WHILE XXXGUARD=GNUM.AND.LEN(TRIM(BARCODE))=2.AND.OKSEEKS().AND.!EOF()
  IF L>LMAX
    IF ! CHNGPAGE('CPNTHEAD')
      EXIT
    ENDIF
  ENDIF
  XICODEF=.T.
  IF BARCODE = 'ZZ'
    SKIP
    XXXDATE=UPKDATE(DATE)
    XXXTIME=UPKTIME(TIME)
    SELECT CH
    SEEK CH->BARCODE
  ELSE
    XXXDATE=UPKDATE(DATE)
    XXXTIME=UPKTIME(TIME)
    SELECT EX
    SEEK TRIM(CH->BARCODE)
  ENDIF
  @ L, 0 SAY XXXDATE
  @ L,13 SAY XXXTIME
  @ L,27 SAY XXXGNAME
  IF !EOF()
    IF ALIAS()='EX'
      @ L,59 SAY SUBSTR(EDESC,1,15)
    ELSE
      @ L,59 SAY SUBSTR(COMMENT,1,15)
    ENDIF
  ELSE
    @ L,59 SAY 'Undefined'
  ENDIF
  L=L+1
  SELECT CH
  SKIP
ENDDO
IF LASTKEY()=27
  EXIT
ENDIF
IF !XICODEF .AND. INCID_ONLY = 'N'
  @ L, 0 SAY XXXDATE
  @ L,13 SAY XXXTIME
  @ L,27 SAY XXXGNAME
  L=L+1
ENDIF
SET ORDER TO 1
GO XREC
SKIP
ENDDO
RETURN
```

```
PROCEDURE CPNTHEAD
IF ! YPRINTIT
  CLEAR
ENDIF
XPG = XPG + 1
@ 1, 0 SAY DATE()
@ 1,40-(INT(LEN(HEAD)/2)) SAY HEAD
@ 1,71 SAY 'Page: '+STR(XPG,3)
@ 2, 0 SAY TIME()
@ 2,28 SAY 'CHECKPOINT HISTORY REPORT'
@ 3,25 SAY 'The TourWatch Manager (C) 1990'
IF ! YPRINTIT
  SET COLOR TO &BLUELIT
ENDIF
@ 5,0 SAY 'Begin Date : '+DTOC(X0DATE)
@ 6,0 SAY 'End Date   : '+DTOC(X1DATE)
@ 8,0 SAY 'Check        Check'
@ 9,0 SAY 'Date         Time          Guard Name                        Incident'
IF ! YPRINTIT
  @ 10,0 SAY SLINE
  SET COLOR TO &HILIT
 ELSE
  @ 10,0 SAY REPLICATE('-',80)
 ENDIF
 L = 11
 RETURN
 FUNCTION OKCPNTHIST
 PARAMETER F0,F1
 IF INKEY()=255
   RETURN .T.
 ENDIF
 IF LASTKEY()= 5
   IF F1 = '1'
     XBARCODE=SPACE(6)
     @ 11,36 SAY XBARCODE
     RETURN .T.
   ELSE
     RETURN .F.
   ENDIF
 ENDIF
 IF F1='2'
   IF AT('**',XCHKDESC)<>0 .OR. (UPPER(XCHKDESC)='ALL CHECKPOINTS'.AND.AT('**',XBARCODE)<>0)
     XBARCODE='**    '
     XCHKDESC='ALL CHECKPOINTS'
     @ 10,36 SAY XCHKDESC
     KEYBOARD XBARCODE+CHR(13)+CHR(255)
     RETURN .T.
   ENDIF
 ENDIF
 IF F1='1'
   IF AT('**',XCHKDESC)<>0 .OR. (AT('ALL CHECKPOINTS',UPPER(XCHKDESC))<>0.AND.AT('**',XBARCODE)<>0)
     XBARCODE='**    '
     XCHKDESC='ALL CHECKPOINTS'
     @ 10,36 SAY XCHKDESC
     @ 11,36 SAY XBARCODE
     RETURN .T.
   ENDIF
 ENDIF
 IF EMPTY(F0)
   IF F1 ='2'
     XCHKDESC = SPACE(15)
     RETURN .T.
   ELSE
     IF EMPTY(XBARCODE)
       ERRMESG(19,'Missing bar code.')
       MESS(19,'F2 to display CHECKPOINTS.  ESC to exit.')
       RETURN .F.
     ELSE
       SELECT BC
       SET ORDER TO 1
       SEEK XBARCODE
       XCHKDESC = DESC
       @ 10,36 SAY DESC
       RETURN .T.
     ENDIF
```

```
  ENDIF
ENDIF
IF F1 = '1'
  F0 = SUBSTR(LTRIM(F0)+SPACE(6),1,6)
  XBARCODE = F0
  @ 11,36 SAY F0
ELSE
  F0 = SUBSTR(LTRIM(F0)+SPACE(15),1,15)
  XCHKDESC = F0
  @ 10,36 SAY F0
ENDIF
SELECT BC
SET ORDER TO &F1
IF XWINDREC = 0
  SEEK UPPER(F0)
  IF F1 = '2' .AND. ! EMPTY(XBARCODE) .AND. ! EOF()
    DO WHILE UPPER(F0) = UPPER(DESC) .AND. BARCODE <> XBARCODE .AND. !EOF()
      SKIP
    ENDDO
    IF UPPER(F0)<>UPPER(DESC) .OR. EOF()
      SEEK UPPER(F0)
    ENDIF
  ENDIF
ELSE
  GO XWINDREC
  XWINDREC = 0
ENDIF
IF EOF()
  IF F1='1'
    ERRMESG(19,'Invalid bar code.')
  ELSE
    ERRMESG(19,'Invalid checkpoint.')
  ENDIF
  MESG(19,'F2 to display CHECKPOINTS.  ESC to exit.')
  RETURN .F.
ENDIF
XBARCODE = BARCODE
XCHKDESC = DESC
@ 10,36 SAY XCHKDESC
@ 11,36 SAY BARCODE
IF F1='2'
  KEYBOARD XBARCODE+CHR(13)+CHR(255)
ENDIF
RETURN .T.

* IHISTRPT.PRG
* COPYRIGHT 1989, 1990 COMPUTER SYSTEMS DESIGN, INC.

SET INTEN OFF
SET DELIM ON
CLEAR
HEADER('INCIDENT HISTORY REPORT',-1)
MESG(7,'This report displays occurrences of')
MESG(8,'incidents for a designated time period.')
MESG(11,'Please wait while setting up files...')
CLOSE DATABASES
SELECT 1
FUSE('CHISTORY/CH/CHIST1X')
IF EOF()
  MESGWAIT(18,'There is no history of any incident.')
  CLOSE DATABASES
  RETURN
ENDIF
SELECT 2
FUSE('EXCEPT/EX/EXCX')
SELECT 3
FUSE('BARCODE/BC/BNUMX,BC2X')
IF EOF()
  MESGWAIT(18,'There are no checkpoints defined.')
  CLOSE DATABASES
  RETURN
ENDIF
SELECT 4
FUSE('GUARD/GRD/GRDX')
SELECT 5
```

```
FUSE('OHISTORY/OH/OHIST1X')
DO WHILE .T.
  XICODE=SPACE(2)
  XODATE = CTOD('  /  /  ')
  X1DATE = CTOD('  /  /  ')
  XOTIME = '00:00'
  X1TIME = '23:59'
  DO WHILE .T.
    CLR(10)
    SET COLOR TO &LOLIT
    @ 13,22 SAY "Enter '**' for all incident codes."
    SET COLOR TO &HILIT
    MESS(19,'F2 to display INCIDENT CODES.  ESC to exit.')
    @ 12,27 SAY 'Incident Code ' GET XICODE PICTURE '!!' VALID OKICODE(1)
    @ 15,20 SAY 'Starting Date ' GET XODATE VALID OKDATE(XODATE,19)
    @ 15,46 SAY 'Time ' GET XOTIME PICTURE '99:99' VALID OKHISTTIME(XOTIME,2)
    @ 16,20 SAY 'Ending Date   ' GET X1DATE VALID OKDATE(X1DATE,19)
    @ 16,46 SAY 'Time ' GET X1TIME PICTURE '99:99' VALID OKHISTTIME(X1TIME,2)
    SET KEY -1 TO GENWIND
    READ
    SET KEY -1
    CLR(19)
    IF LASTKEY() = 27
      EXIT
    ENDIF
    PODATE=PKDATE(XODATE)
    P1DATE=PKDATE(X1DATE)
    POTIME=PKTIME(XOTIME)
    P1TIME=PKTIME(X1TIME)
    IF PODATE>P1DATE
      MESGWAIT(19,'Starting date is later than ending date.')
      LOOP
    ENDIF
    IF PODATE=P1DATE.AND.POTIME>P1TIME
      MESGWAIT(19,'Starting time is later than ending time.')
      LOOP
    ENDIF
    MESS(19,'Please wait while processing files...')
    SELECT OH
    SET ORDER TO 1
    DO CASE
    CASE XICODE='**'
      SELECT EX
      GO TOP
      SET SOFTSEEK ON
      DO WHILE !EOF()
        SELECT OH
        SEEK EX->ECODE+SPACE(4)+PODATE+POTIME
        IF BARCODE=EX->ECODE.AND.!EOF()
          IF OKSEEKS()
            EXIT
          ENDIF
        ENDIF
        SELECT EX
        SKIP
      ENDDO
      SET SOFTSEEK OFF
      IF EOF()
        MESGWAIT(19,'No history of any incidents for this time period.')
        LOOP
      ELSE
        EXIT
      ENDIF
    OTHERWISE
      SET SOFTSEEK ON
      SEEK XICODE+SPACE(4)+PODATE+POTIME
      SET SOFTSEEK OFF
      IF BARCODE=XICODE.AND.OKSEEKS().AND.!EOF()
        EXIT
      ENDIF
      MESGWAIT(19,'No history for incident code '+XICODE+' during this time period.')
    ENDCASE
  ENDDO
  IF XICODE<>'ZZ'
```

```
  XEDESC=SUBSTR(EX->EDESC,1,15)
 ENDIF
 IF LASTKEY()=27
  EXIT
 ENDIF
 YPRINTIT = ' '
 STORE 0 TO XPG,LMAX,L
 IF !SORP()
  LOOP
 ENDIF
 SET DELIMITERS ON
 DO IHISTHEAD
 IF XICODE='**'
  DO ALLIHIST
 ELSE
  DO ONEIHIST
 ENDIF
 SET DEVICE TO SCREEN
 IF YPRINTIT
  EJECT
 ELSE
  IF LASTKEY() <> 27
   MESG(24,'End of report.  Press any key to continue...')
   DO WHILE INKEY() = 0
   ENDDO
  ENDIF
 ENDIF
 CLEAR
 HEADER('INCIDENT HISTORY REPORT',-1)
 MESG(7,'This report displays occurrences of')
 MESG(8,'incidents for a designated time period.')
ENDDO
CLOSE DATABASES
RETURN
PROCEDURE ALLIHIST
SELECT CH
SET ORDER TO 1
SELECT EX
GO TOP
DO WHILE !EOF()
 SELECT CH
 SET SOFTSEEK ON
 SEEK EX->ECODE+SPACE(4)+PODATE+POTIME
 SET SOFTSEEK OFF
 IF BARCODE=EX->ECODE.AND. OKSEEKS().AND.!EOF()
  IF EX->ECODE<>'ZZ'
   XEDESC=SUBSTR(EX->EDESC,1,15)
  ENDIF
  XICODE=EX->ECODE
  DO ONEIHIST
  L=L+1
 ENDIF
 IF LASTKEY()=27
  EXIT
 ENDIF
 SELECT EX
 SKIP
ENDDO
RETURN
PROCEDURE ONEIHIST
SELECT CH
SET ORDER TO 1                OKSEEKS().
DO WHILE BARCODE=XICODE.AND.OKSEE   AND.!EOF()
 XRECNO=RECNO()
 SET ORDER TO
 DO WHILE .T.
  IF LEN(TRIM(BARCODE))<>2
   SKIP -1
   IF BARCODE<>'ZZ'
    SKIP
    EXIT
   ENDIF
  ELSE
   SKIP -1
```

```
  ENDIF
ENDDO
SET ORDER TO 1
XBARCODE=SPACE(6)
XSERNUM=SPACE(6)
IF BOF()
  XCHKPOINT='No reference'
ELSE
  XSERNUM=CH->BARCODE
  SELECT BC
  SET ORDER TO 2
  SEEK XSERNUM
  IF !EOF()
    XBARCODE=BARCODE
    XCHKPOINT=SUBSTR(DESC,1,15)
  ELSE
    XBARCODE=CH->BARCODE
    XCHKPOINT='Undefined'
  ENDIF
ENDIF
SELECT CH
SET ORDER TO 1
GO XRECNO
XDATE=UPKDATE(DATE)
XTIME=UPKTIME(TIME)
SELECT GRD
SEEK CH->GNUM
IF EOF()
  XGNAME='Undefined'
ELSE
  XGNAME=GNAME
ENDIF
SELECT CH
IF BARCODE='ZZ'
  SET ORDER TO
  SKIP
  SELECT CH
  SEEK CH->BARCODE
  IF EOF()
    XEDESC='Undefined'
  ELSE
    XEDESC=SUBSTR(COMMENT,1,15)
  ENDIF
  SELECT CH
  SKIP -1
ENDIF
IF L > LMAX
  IF ! CHNGPAGE('IHISTHEAD')
    EXIT
  ENDIF
ENDIF
DO IHISTDATA
L=L+1
  SELECT CH
  SET ORDER TO 1
  SKIP
ENDDO
RETURN
PROCEDURE IHISTHEAD
IF ! YPRINTIT
  CLEAR
ENDIF
XPG = XPG + 1
@ 1, 0 SAY DATE()
@ 1,40-(INT(LEN(HEAD)/2)) SAY HEAD
@ 1,71 SAY 'Page: '+STR(XPG,3)
@ 2, 0 SAY TIME()
@ 2,29 SAY 'INCIDENT HISTORY REPORT'
@ 3,25 SAY 'The TourWatch Manager (C) 1988'
IF ! YPRINTIT
  SET COLOR TO &BLUELIT
ENDIF
@ 5, 0 SAY 'Begin Date : '+DTOC(X0DATE)
@ 6, 0 SAY 'End Date   : '+DTOC(X1DATE)
```

```
@ 8, 0 SAY 'Check    Check                                  Bar'
@ 9, 0 SAY 'Date     Time  Guard Name                       Code     Checkpoint       Incident'
IF ! YPRINTIT
  @ 10,0 SAY SLINE
  SET COLOR TO &HILIT
ELSE
  @ 10,0 SAY REPLICATE('-',80)
ENDIF
L = 11
RETURN
PROCEDURE IHISTDATA
@ L, 0 SAY XDATE
@ L, 9 SAY XTIME
@ L,15 SAY XGNAME
@ L,41 SAY XBARCODE
@ L,49 SAY XCHKPOINT
@ L,65 SAY XEDESC
RETURN
FUNCTION OKSEEKS
DO CASE
CASE P0DATE=P1DATE
  IF DATE=P0DATE.AND.TIME>=P0TIME.AND.TIME<=P1TIME
    RETURN .T.
  ENDIF
CASE DATE=P0DATE
  IF TIME>=P0TIME
    RETURN .T.
  ENDIF
CASE DATE=P1DATE
  IF TIME<=P1TIME
    RETURN .T.
  ENDIF
CASE DATE>P0DATE.AND.DATE<P1DATE
  RETURN .T.
ENDCASE
RETURN .F.

* DHISTRPT.PRG
* COPYRIGHT 1989, 1988 COMPUTER SYSTEMS DESIGN, INC.

SET INTEN OFF
SET DELIM ON
CLEAR
HEADER('DETAILED HISTORY REPORT',-1)
MESG(7,'This report provides a chronological listing')
MESG(8,'of activity by guard for a designated time period.')
MESG(10,'Please wait while setting up files...')
CLOSE DATABASES
SELECT 1
FUSE('CHISTORY/CH/CHIST1X,CHIST2X,CHIST3X')
IF EOF()
  CLOSE DATABASES
  MESGWAIT(18,'There is no history to print.')
  RETURN
ENDIF
SELECT 2
FUSE('BARCODE/BC/BNUMX,BC2X')
IF EOF()
  CLOSE DATABASES
  MESGWAIT(18,'There are no checkpoints defined.')
  RETURN
ENDIF
SELECT 3
FUSE('EXCEPT/EX/EXCX')
SELECT 4
FUSE('GUARD/GN/GRDX,GRDX1')
SELECT 5
FUSE('OHISTORY/OH/OHIST1X')
EXCLAM=REPLICATE('X',24)
DO WHILE .T.
  XGRDNUM=SPACE(6)
  XGRDNAME=SPACE(24)
```

```
XODATE = CTOD('  /  /  ')
X1DATE = CTOD('  /  /  ')
XOTIME = '00:00'
X1TIME = '23:59'
DO WHILE .T.
  CLR(9)
  XWINDREC=0
  @ 12,20 SAY 'Guard Name    ' GET XGRDNAME PICTURE '&EXCLAM' VALID OKGUARD(XGRDNAME,'2','DHISTRPT')
  @ 13,20 SAY 'Guard ID      ' GET XGRDNUM PICTURE '!!!!!!' VALID OKGUARD(XGRDNUM,'1','DHISTRPT')
  SET COLOR TO &LOLIT
  @ 14,20 SAY "Enter a Guard Name of '**' for all guards."
  SET COLOR TO &HILIT
  @ 16,20 SAY 'Starting Date ' GET XODATE VALID OKDATE(XODATE,19)
  @ 16,48 SAY 'Time ' GET XOTIME PICTURE '99:99' VALID OKHISTTIME(XOTIME,3)
  @ 17,20 SAY 'Ending Date   ' GET X1DATE VALID OKDATE(X1DATE,19)
  @ 17,48 SAY 'Time ' GET X1TIME PICTURE '99:99' VALID OKHISTTIME(X1TIME,3)
  MESG(19,'F2 to display GUARDS.  ESC to exit.')
  SET KEY -1 TO GENWIND
  READ
  SET KEY -1
  IF LASTKEY() = 27
    EXIT
  ENDIF
  IF XWINDREC<>0
    GO XWINDREC
    XGRDNAME=GN->GNAME
    XGRDNUM=GN->GNUM
  ENDIF
  IF LEN(XGRDNUM)<6
    XGRDNUM=XGRDNUM+SPACE(6-LEN(XGRDNUM))
  ENDIF
  PODATE=PKDATE(XODATE)
  P1DATE=PKDATE(X1DATE)
  POTIME=PKTIME(XOTIME)
  P1TIME=PKTIME(X1TIME)
  IF PODATE > P1DATE
    MESGWAIT(19,'Starting date is later than ending date.')
    LOOP
  ENDIF
                              POTIME > PITIME
  IF PODATE=P1DATE .AND. POTIME    ME
    MESGWAIT(19,'Starting time is later than ending time.')
    LOOP
  ENDIF
  MESG(19,'Please wait while processing files...')
  SELECT CH
  DO CASE
  CASE XGRDNUM='**'
    SET ORDER TO 3
    SET SOFTSEEK ON
    SEEK PODATE+POTIME
    SET SOFTSEEK OFF
    IF OKSEEKS() .AND. !EOF()
      EXIT
    ENDIF
    MESGWAIT(19,'No activity for this period.')
  OTHERWISE
    SET ORDER TO 2
    SET SOFTSEEK ON
    SEEK XGRDNUM+PODATE+POTIME
    SET SOFTSEEK OFF
    IF GNUM=XGRDNUM.AND.OKSEEKS().AND.!EOF()
      EXIT
    ENDIF
    MESGWAIT(19,'Guard '+TRIM(XGRDNUM)+' not active during this period.')
  ENDCASE
ENDDO
IF LASTKEY() = 27
  EXIT
ENDIF
STORE 0 TO XPG,L,LMAX
YPRINTIT = ' '
IF !SORP()
  LOOP
ENDIF
```

```
  IF YPRINTIT
    SET DEVICE TO PRINT
  ENDIF
  SET DELIMITERS ON
  SELECT CH
  DO DHISTHEAD
  IF XGRDNUM='**'
    DO ALLDHIST
  ELSE
    DO ONEDHIST
  ENDIF
  SET DEVICE TO SCREEN
  IF YPRINTIT
    EJECT
  ELSE
    IF LASTKEY()<>27
      MESG(24,'End of report.  Press any key to continue.')
      DO WHILE INKEY() = 0
  -   ENDDO
    ENDIF
  ENDIF
  CLEAR
  HEADER('DETAILED HISTORY REPORT',-1)
  MESG(7,'This report provides a chronological listing')
  MESG(8,'of activity by guard for a designated time period.')
ENDDO
CLOSE DATABASES
RETURN
PROCEDURE ALLDHIST
SELECT CH
SET ORDER TO 2
SELECT GN
GO TOP
DO WHILE !EOF()
  XGRDNUM=GNUM
  XGRDNAME=GNAME
  SELECT CH
  SET SOFTSEEK ON
  SEEK GN->GNUM+P0DATE+P0TIME
  SET SOFTSEEK OFF
  IF XGRDNUM=GNUM.AND.!EOF()
    IF OKSEEKS()
      DO ONEDHIST
      L=L+1
    ENDIF
  ENDIF
  SELECT GN
  SKIP
  IF LASTKEY()=27
    EXIT
  ENDIF
ENDDO
RETURN
PROCEDURE ONEDHIST
CHANGED_GUARD=.T.
DO WHILE GNUM=XGRDNUM.AND.OKSEEKS().AND.!EOF()
  DO WHILE GNUM=XGRDNUM.AND.DATE>=P0DATE.AND.DATE<=P1DATE.AND.LEN(TRIM(BARCODE))=2.AND.!EOF()
    SKIP
  ENDDO
  SELECT BC
  SET ORDER TO 2
  SEEK CH->BARCODE
  IF !EOF()
    XBARCODE=BARCODE
    XCHKPOINT=DESC
  ELSE
    XBARCODE=CH->BARCODE
    XCHKPOINT='Undefined'
  ENDIF
  SELECT CH
  SKIP
  DO CASE
  CASE LEN(TRIM(BARCODE))<.[illegible].EOF()
    XINCIDENT=SPACE(15)
```

```
SKIP -1
IF (L>LMAX) .OR. (CHANGED_GUARD .AND. L>=LMAX-2)
  IF !CHNGPAGE('DHISTHEAD')
    EXIT
  ENDIF
ENDIF
DO DHISTDATA
CHANGED_GUARD=.F.
SKIP
OTHERWISE
DO WHILE LEN(TRIM(BARCODE))=2.AND.OKSEEKS().AND.!EOF()
  IF BARCODE='ZZ'
    SKIP
    SELECT OH
  ELSE
    SELECT EX
  ENDIF
  SEEK TRIM(CH->BARCODE)
  IF !EOF() .AND. ALIAS()='OH'
    XINCIDENT=SUBSTR(COMMENT,1,15)
  ELSE
    IF !EOF() .AND. ALIAS()='EX'
      XINCIDENT=SUBSTR(EDESC,1,15)
    ELSE
      XINCIDENT='Undefined'
    ENDIF
  ENDIF
  SELECT CH
  IF (L>LMAX) .OR. (CHANGED_GUARD .AND. L>=LMAX-2)
    IF !CHNGPAGE('DHISTHEAD')
      EXIT
    ENDIF
  ENDIF
  DO DHISTDATA
  CHANGED_GUARD=.F.
  SKIP
ENDDO
IF LASTKEY()=27
  EXIT
ENDIF
ENDCASE
ENDDO
RETURN
PROCEDURE DHISTHEAD
IF ! YPRINTIT
  CLEAR
ENDIF
XPG = XPG + 1
@ 1, 0 SAY DATE()
@ 1,40-(INT(LEN(HEAD)/2)) SAY HEAD
@ 1,71 SAY 'Page: '+STR(XPG,3)
@ 2, 0 SAY TIME()
@ 2,29 SAY 'DETAILED HISTORY REPORT'
@ 3,25 SAY 'The Tourwatch Manager (C) 1988'
IF ! YPRINTIT
  SET COLOR TO &BLUELIT
ENDIF
@ 5, 0 SAY 'Begin Date : '+DTOC(X0DATE)
@ 6, 0 SAY 'End Date   : '+DTOC(X1DATE)
@ 8, 0 SAY '                          Bar'
@ 9, 0 SAY '          Date     Time   Code   Checkpoint          Incident'
IF ! YPRINTIT
  @ 10,0 SAY SLINE
  SET COLOR TO &HILIT
ELSE
  @ 10,0 SAY REPLICATE('-',80)
ENDIF
L = 11
RETURN
PROCEDURE DHISTDATA
IF CHANGED_GUARD
  @ L,0 SAY 'Guard Name:  '+TRIM(XGRDNAME)
  L=L+1
ENDIF
```

```
@ L,13 SAY CTOD(UPKDATE(DATE))
@ L,22 SAY UPKTIME(TIME)
@ L,30 SAY XBARCODE
@ L,38 SAY XCHKPOINT
@ L,59 SAY XINCIDENT
L=L+1
RETURN

* GUARD.PRG
* COPYRIGHT 1985, 1988 COMPUTER SYSTEMS DESIGN, INC.

DECLARE GRD[200],GRNAME[200],STAT[200]
MESG(0,LBLOCK+' GUARD MAINTENANCE '+RBLOCK)
CLR(5)
MESG(10,'The list of guards may be displayed in order of Guard Id #')
                                  Guard Name
MESG(11,'or alphabetically by Gua   me.')
MESG(24,'Use the '+CHR(27)+' or '+CHR(26)+' keys to position cursor. Press Enter '+CHR(17)+CHR(196)+CHR(217)+' to select')
XRES = 1
SET INTEN ON
SET DELIM ON
SET COLOR TO &HMENU
DO WHILE .T.
  SET MESSAGE TO
  @ 14,13 PROMPT 'Name Order'
  @ 14,35 PROMPT ' ID Order '
  @ 14,57 PROMPT '   Quit   '
  MENU TO XRES
  IF LASTKEY() <> 27
    EXIT
  ENDIF
ENDDO
SET INTEN OFF
SET COLOR TO &HILIT
IF (XRES = 3)
  CLEAR
  CLOSE DATABASES
  RETURN
ENDIF
SET DELIMITERS OFF
CLR(1)
MESG(10,'Please wait while setting up files...')
CLOSE DATABASES
FUSE('GUARD/GN/GRDX,GRDX1')
SELECT 2
FUSE('GHISTORY/GH/GHIST1X')
SELECT GN
IF XRES = 1
  SET ORDER TO 2
  GO TOP
ENDIF
XNB = 0
DO WHILE .NOT. EOF()
  XNB = XNB+1
  GRD[XNB] = GNUM
  GRNAME[XNB]=GNAME
  STAT[XNB]=.T.
  SKIP
ENDDO
@ 2,00 SAY 'Line  ID      Name'
@ 3,00 SAY LINE(38)
@ 2,40 SAY 'Line  ID      Name'
@ 3,40 SAY LINE(38)
XHASMODIFY = .F.
XPGTOP = 1
XPOLD = 1
DO DISPGUARD WITH 1
XADD = (XNB = 0)
IF XADD
  CLR(23)
  DO GETGRD WITH XNB + 1
ENDIF
SET MESSAGE TO
```

```
XRES = 1
DO WHILE .T.
  XADD = .F.
  CLR(23)
  @ 23,0 SAY LINE(80)
  SET KEY 3 TO
  SET KEY 18 TO
  SET INTENSITY ON
  @ 24,00 PROMPT '  Add '
  @ 24,14 PROMPT 'Change'
  @ 24,29 PROMPT 'Delete'
  @ 24,44 PROMPT 'NextPg'
  @ 24,60 PROMPT 'PrevPg'
  @ 24,74 PROMPT ' Quit '
  MENU TO XRES
  IF LASTKEY() = 3
    XRES = 4
  ENDIF
  IF LASTKEY() = 18
    XRES = 5
  ENDIF
  SET KEY 3 TO NULL_FUNC
  SET KEY 18 TO NULL_FUNC
  SET INTENSITY OFF
  DO CASE
  CASE XRES = 1
    IF XNB >= 200
      ERRMESG(24,'No more room for new guard definition.')
      LOOP
    ENDIF
    XADD = .T.
    XPOLD = XPGTOP
    DO WHILE (XPGTOP + 36) <= (XNB + 1)
      XPGTOP = XPGTOP + 36
    ENDDO
    IF XPOLD <> XPGTOP
      DO DISPGUARD WITH XPGTOP
    ENDIF
    DO GETGRD WITH XNB + 1
  CASE XRES = 2
    DO WHILE .T.
      @ 24,0
      XRES1 = 0
      SET DELIMITERS ON
      @ 24,20 SAY 'What LINE do you want to change?' GET XRES1 PICTURE '@Z 999'
      READ
      SET DELIMITERS OFF
      IF OK_NUM(XRES1,35)
        EXIT
      ENDIF
    ENDDO
    IF XRES1 = 0
      LOOP
    ENDIF
    IF !STAT[XRES1]
      LOOP
    ENDIF
    SELECT GN
    DO GETGRD WITH XRES1
  CASE XRES = 3
    DO WHILE .T.
      @ 24,0
      XRES1 = 0
      SET DELIMITERS ON
      @ 24,20 SAY 'What LINE do you want to delete?' GET XRES1 PICTURE '@Z 999'
      READ
      SET DELIMITERS OFF
      IF OK_NUM(XRES1,35)
        EXIT
      ENDIF
    ENDDO
    IF XRES1 = 0
      LOOP
    ENDIF
    IF ! STAT[XRES1]
```

```
    LOOP
  ENDIF
  SELECT GH
  SEEK GRD[XRES1]
  IF !EOF()
    ERRMESG(24,'Guard '+TRIM(GRD[XRES1])+' is in history and may not be deleted.')
    SELECT GN
    LOOP
  ENDIF
  SELECT GN
  XR = (XRES1-1) % 18 + 4
  XC = (INT((XRES1 - 1)/18)*40 % 80)
  SET COLOR TO &INVRS
  @ XR,XC SAY STR(XRES1,4)
  @ XR,XC+6 SAY GRD[XRES1]
  @ XR,XC+14 SAY GRNAME[XRES1]
  IF CONFDEL(24,'Delete this guard (Y/N)? ')
    SET COLOR TO &HILIT
    XHASMODIFY = .T.
    @ XR,XC SAY STR(XRES1,4)
    @ XR,XC+6 SAY SPACE(34)
    STAT[XRES1] = .F.
  ELSE
    SET COLOR TO &HILIT
    @ XR,XC SAY STR(XRES1,4)+'  '+GRD[XRES1]+'  '+GRNAME[XRES1]
  ENDIF
CASE XRES = 4
  IF XPGTOP + 36 <= XNE
    XPGTOP = XPGTOP + 36
    DO DISPGUARD WITH XPGTOP
  ENDIF
CASE XRES = 5
  IF XPGTOP - 36 > 0
    XPGTOP = XPGTOP - 36
    DO DISPGUARD WITH XPGTOP
  ENDIF
CASE XRES = 6
  IF XHASMODIFY
    @ 24,0
    XRES1 = 'YES'
    SET ESCAP OFF
    SET DELIM ON
    @ 24,12 SAY 'Do you wish to save the changes you have made? ' GET XRES1 PICTURE '@K !!!' VALID !EMPTY(XRES1)
    READ
    SET ESCAP ON
    SET DELIM OFF
    IF XRES1 = 'YES'
      CLR(1)
      MESG(10,'Please wait while updating...')
      SELECT GN
      LOCKF('GUARD')
      DELETE ALL
      FOR I=1 TO XNE
        IF STAT[I] .AND. !EMPTY(GRD[I])
          APPEND BLANK
          REPLACE GNUM WITH GRD[I]
          REPLACE GNAME WITH GRNAME[I]
        ENDIF
      NEXT
      UNLOCK
    ENDIF
  ENDIF
  EXIT
 ENDCASE
ENDDO
PROCEDURE GETGRD
PARAMETER F0
IF F0 = 0
  RETURN
ENDIF
IF (F0 < 0)
  ERRMESG(24,'Invalid line #.')
ENDIF
IF (F0 < XPGTOP)
```

```
  ERRMESG(24,'Line # not on this page.')
  RETURN
ENDIF
IF XADD
  XNB = XNB + 1
  GRD[XNB] = SPACE(6)
  GRNAME[XNB] = SPACE(24)
  STAT[XNB] = .T.
ENDIF
MESG(24,'ESC to cancel entry.')
XR = (F0 -1)%18+4
XC = (INT((F0 -1)/18)*40%80)
SET INTENSITY ON
@ XR,XC SAY STR(F0,4)
YGRD = GRD[F0]
YGRNAME = GRNAME[F0]
SELECT GN
IF XADD
  @ XR,XC+6 GET YGRD PICTURE '!!!!!!' VALID OKNEWGUARD()
ENDIF
@ XR,XC+14 GET YGRNAME VALID OKGNAME()
READ
SET INTENSITY OFF
LK = LASTKEY()
IF LK = 27 .AND. XADD
  XNB = XNB -1
  XPSTOP = XPOLD
ENDIF
IF LK <> 27
  IF (GRD[F0] <> YGRD) .OR. (GRNAME[F0] <> YGRNAME)
    XHASMODIFY = .T.
    GRD[F0] = YGRD
    GRNAME[F0] = YGRNAME
  ENDIF
ENDIF
DO DISPGUARD WITH XPSTOP
RETURN
PROCEDURE DISPGUARD
PARAMETER XPTOP
XPAGETOP = XPTOP
@ 4,0,22,79 BOX ""
SET DELIMITERS OFF
XR = 3
XC = 0
I = 1
DO WHILE (I < 37) .AND. (XPAGETOP <= XNB)
  XR = XR + 1
  IF XR > 21
    XR = 4
    XC = 40
  ENDIF
  IF ! STAT[XPAGETOP]
    @ XR,XC SAY STR(XPAGETOP,4)
  ELSE
    @ XR,XC SAY STR(XPAGETOP,4)+'  '+GRD[XPAGETOP]+'  '+GRNAME[XPAGETOP]
  ENDIF
  I = I+1
  XPAGETOP = XPAGETOP + 1
ENDDO
RETURN
FUNCTION CONFDEL
PARAMETER F0,F1
SET COLOR TO &INVRS
@ F0,0
MESG(F0,F1)
XKEY = 'N'
F2 = 40 + (LEN(F1)/2)
@ F0,F2 GET XKEY PICTURE 'Y'
READ
SET COLOR TO &HILIT
@ F0,0
IF UPPER(XKEY) = 'Y'
  RETURN .T.
ELSE
```

```
  RETURN .F.
ENDIF

* ZONE.PRG
* COPYRIGHT 1989, 1988 COMPUTER SYSTEMS DESIGN, INC.

DECLARE B1[200],STAT[200],MUST[200],DESCR[200],SERIAL[200]
MESG(0,LBLOCK+' ZONE MAINTENANCE '+RBLOCK)
CLR(5)
MESG(10,'A list of checkpoints may be displayed in bar code order or')
MESG(11,'alphabetically by their descriptions.')
MESG(24,'Use the '+CHR(27)+' or '+CHR(26)+' keys to position cursor. Press Enter '+CHR(17)+CHR(196)+CHR(217)+' to select')
SET COLOR TO &MENU
SET INTEN ON
SET DELIM ON
XRESO = 1
DO WHILE .T.
  SET MESSAGE TO
  @ 14, 8 PROMPT 'Checkpoint Order'
  @ 14,32 PROMPT ' Bar Code Order '
  @ 14,56 PROMPT '      Quit      '
  MENU TO XRESO
  IF LASTKEY() <> 27
    EXIT
  ENDIF
ENDDO
SET INTEN OFF
SET COLOR TO &HILIT
IF XRESO = 3
  CLEAR
  CLOSE DATABASES
  RETURN
ENDIF
SET DELIM OFF
CLR(1)
MESG(10,'Please wait while setting up files...')
CLOSE DATABASES
FUSE('BARCODE/BC/ZNUM2X,ZNUM3X,BNUMX,BC1X,BC2X')


SELECT 2
FUSE('ZONE/ZN/ZNUM1X,ZNAMX')
SELECT 3
FUSE('CHISTORY/CH/CHIST1X')
SELECT 4
FUSE('RDET/RD/RDETX')
IF XRESO = 2
  SELECT BC
  SET ORDER TO 2
  GO TOP
ENDIF
DO WHILE .T.
  SET INTEN OFF
  SET DELIM ON
  XZNUM = SPACE(6)
  XNEW = .T.
  CLR(1)
  @ 3,00 SAY '      Bar     Must'
  @ 3,40 SAY '      Bar     Must'
  @ 4,00 SAY 'Line  Code    Scan  Checkpoint '
  @ 4,40 SAY 'Line  Code    Scan  Checkpoint '
  @ 5,00 SAY LINE(38)
  @ 5,40 SAY LINE(38)
  @ 23,0 SAY LINE(80)
  DO WHILE .T.
    XZNUM = XZNUM+SPACE(6-LEN(XZNUM))
    @ 1,0
    @ 1,40 SAY 'Zone Name: '
    MESG(24,'F1 Help    F2 display ZONES    ESC exit')
    @ 1,2 SAY 'Zone Number: ' GET XZNUM PICTURE '!!!!!!' VALID OKZNUM()
    SET KEY -1 TO GENWIND
    READ
    SET KEY -1
    IF LASTKEY() = 27
      CLEAR
```

```
   CLOSE DATABASES
   RETURN
  ENDIF
  IF XNEW
   MESG(24,'Enter name for new zone.  ESC to cancel entry.')
   XSDESC = SPACE(15)
  ELSE
   MESG(24,'Change zone name or press ENTER to continue.  ESC to cancel entry.')
   XSDESC = SDESC
  ENDIF
  @ 1,52 GET XSDESC VALID OKSDESC()
  READ
  IF LASTKEY() <> 27
   EXIT
  ENDIF
ENDDO
MESG(10,'Setting up zone file...')
SELECT ZN
LOCKF('ZONE')
IF XNEW
 APPEND BLANK
 REPLACE ZNUM WITH XZNUM
ENDIF
IF (SDESC <> XSDESC)
 REPLACE SDESC WITH XSDESC
ENDIF
UNLOCK
SELECT BC
SEEK XZNUM
XNB=0
DO WHILE ZNUM==XZNUM .AND. !EOF()
 XNB=XNB+1
 BI[XNB]=BARCODE
 DESCR[XNB]=DESC
 MUST[XNB]=MUSTCHECK
 STAT[XNB]=.T.
 SERIAL[XNB]=VAL(SERNUM)
 SKIP
ENDDO
FOR FXX = XNB+1 TO 200
 SERIAL[FXX] = 0
NEXT
XHASMODIFY = .F.
XPGTOP = 1
XPOLD = 1
DO DISPBARC WITH 1
XADD = (XNB = 0)
IF XADD
 DO GETLN WITH XNB + 1
ENDIF
SET MESSAGE TO
XRES = 1
DO WHILE .T.
 XADD = .F.
 @ 24,0
 SET COLOR TO &HMENU
 SET KEY 3 TO
 SET KEY 18 TO
 SET INTEN ON
 @ 24,00 PROMPT '  Add  '
 @ 24,14 PROMPT 'Change'
 @ 24,29 PROMPT 'Delete'
 @ 24,44 PROMPT 'NextPg'
 @ 24,60 PROMPT 'PrevPg'
 @ 24,74 PROMPT ' Quit '
 MENU TO XRES
 IF LASTKEY() = 3
  XRES = 4
 ENDIF
 IF LASTKEY() = 18
  XRES = 5
 ENDIF
 SET KEY 3 TO NULL_FUNC
 SET KEY 18 TO NULL_FUNC
 SET INTEN OFF
```

```
SET COLOR TO &HILIT
DO CASE
CASE XRES = 1
  IF XNB >= 200
    ERRMESS(24,'No more room for additional bar codes.')
    LOOP
  ENDIF
  XADD = .T.
  XPOLD = XPGTOP
  DO WHILE (XPGTOP + 32) <= (XNB + 1)
    XPGTOP = XPGTOP + 32
  ENDDO
  IF XPOLD <> XPGTOP
    DO DISPBARC WITH XPGTOP
  ENDIF
  DO GETLN WITH XNB + 1
CASE XRES = 2
  DO WHILE .T.
    SET DELIM ON
    XRES1 = 0
    @ 24,0
    @ 24,20 SAY 'What LINE do you want to change? ' GET XRES1 PICTURE '@Z 999'
    READ
    SET DELIM OFF
    IF OKLNUM(XRES1,31)
      EXIT
    ENDIF
  ENDDO
  IF XRES1 = 0
    LOOP
  ENDIF
  IF !STAT[XRES1]
    LOOP
  ENDIF
  DO GETLN WITH XRES1
CASE XRES = 3
  XNONELFT = .T.
  XKEY = 'Y'
  I = 1
  DO WHILE (I <= XNB)
    IF STAT[I]
      XNONELFT = .F.
      IF NOKILL(I)
        XKEY = 'N'
        EXIT
      ENDIF
    ENDIF
    I = I + 1
  ENDDO
  SET DELIMITERS ON
  SELECT RD
  SEEK ZN->ZNUM
  DO WHILE .T.
    @ 24,0
    XRES1 = SPACE(3)
    IF EOF()
      IF XNONELFT
        @ 24,25 SAY 'Enter "**" to delete entire zone ' GET XRES1 PICTURE '!!!'
      ELSE
        IF XKEY = 'Y'
          @ 24,7 SAY 'What LINE to Delete (enter "**" to delete entire zone)? ' GET XRES1 PICTURE '!!!'
        ELSE
          @ 24,30 SAY 'What LINE to Delete? ' GET XRES1 PICTURE '!!!'
        ENDIF
      ENDIF
    ELSE
      IF XNONELFT
        ERRMESS(24,'This zone is in route '+TRIM(RNUM)+' and cannot be deleted.')
        EXIT
      ELSE
        @ 24,2 SAY 'What LINE to Delete (zone is in route '+TRIM(RNUM)+' and cannot be deleted)? ' GET XRES1 PICTURE '999'
      ENDIF
    ENDIF
    READ
    IF '**' $ XRES1
```

```
    EXIT
  ELSE
    IF OKLNUM(VAL(XRES1),31)
      EXIT
    ENDIF
  ENDIF
ENDDO
SET DELIM OFF
XKEY = 'Y'
IF '**' $ XRES1
  SELECT 4
  FUSE('ZHISTORY/ZH/ZHIST1X')
  SEEK XZNUM
  IF EOF()
    IF !CONFDEL(24,'Delete this zone (Y/N)? ')
      XKEY = 'N'
    ENDIF
  ELSE
    IF !CONFDEL(24,'Access to this zone in history will be lost.  Delete anyway (Y/N)? ')
      XKEY = 'N'
    ENDIF
    ENDIF
    SELECT 4
    FUSE('RDET/RD/RDET1X')
    IF XKEY = 'Y'
      SELECT ZN
      LOCKF('ZONE')
      DELETE
      UNLOCK
      SELECT BC
      SEEK XZNUM
      LOCKF('BARCODE')
      DELETE WHILE ZNUM==XZNUM
      UNLOCK
      EXIT
    ENDIF
    LOOP
  ENDIF
  XRES1 = VAL(XRES1)
  IF XRES1 = 0
    LOOP
  ENDIF
  IF ! STAT[XRES1]
    LOOP
  ENDIF
  IF NOKILL(XRES1)
    XKEY = 'N'
    ERRMESS(24,'Checkpoint '+TRIM(B1[XRES1])+' is in history and may not be deleted.')
  ENDIF
  IF XKEY = 'Y'
    XR = (XRES1 - 1) % 16 + 6
    XC = (INT((XRES1 - 1)/16)*40 % 80)
    SET COLOR TO &INVRS
    @ XR,XC SAY STR(XRES1,4)
    @ XR,XC+6 SAY B1[XRES1]
    @ XR,XC+16 SAY MUST[XRES1]
    @ XR,XC+20 SAY DESCR[XRES1]
    IF CONFDEL(24,'Delete this checkpoint (Y/N)? ')
      SET COLOR TO &HILIT
      XHASMODIFY = .T.
      @ XR,XC SAY STR(XRES1,4)
      @ XR,XC+6 SAY SPACE(34)
      STAT[XRES1] = .F.
    ELSE
      SET COLOR TO &HILIT
      @ XR,XC SAY STR(XRES1,4)+'  '+B1[XRES1]+'    '+MUST[XRES1]+'   '+DESCR[XRES1]
    ENDIF
  ENDIF
  SELECT BC
  SET ORDER TO XRES0
CASE XRES = 4
  IF XPGTOP + 32 <= XNB
    XPGTOP = XPGTOP + 32
    DO DISPBARC WITH XPGTOP
  ENDIF
```

```
CASE XRES = 5
  IF XPGTOP - 32 > 0
    XPGTOP = XPGTOP - 32
    DO DISPBARC WITH XPGTOP
  ENDIF
CASE XRES = 6
  IF XHASMODIFY
    @ 24,0
    XRES1 = 'YES'
    SET ESCAPE OFF
    SET DELIMITERS ON
    @ 24,14 SAY 'Do you wish to save changes you have made? ' GET XRES1 PICTURE '@M !!!'
    READ
    SET ESCAPE ON
    SET DELIMITERS OFF
    @ 24,0
    IF 'YES' $ XRES1
      CLR(1)
      MESS(10,'Please wait while updating... ')
      SELECT BC
      SET ORDER TO 5
      GO BOTTOM
      IF EOF()
        XSERNUM = 1
      ELSE
        XSERNUM = VAL(SERNUM) + 1
      ENDIF
      SET ORDER TO XRES0
      SEEK XZNUM
      LOCKF('BARCODE')
      DELETE WHILE ZNUM==XZNUM
      SET ORDER TO 3
      XPOINTS=0
      FOR I=1 TO XNB
        IF STAT[I] .AND. !EMPTY(B1[I])
          IF EMPTY(SERIAL[I])
            SERIAL[I] = XSERNUM
            XSERNUM = XSERNUM + 1
            YSERNUM = SUBSTR(STR(1000000+SERIAL[I],7),2)
          ELSE
            YSERNUM = SUBSTR(STR(1000000+SERIAL[I],7),2)
            SET ORDER TO 5
            SEEK YSERNUM
            DO WHILE (SERNUM == YSERNUM) .AND. ! EOF()
              IF BARCODE <> B1[I]
                REPLACE BARCODE WITH B1[I]
              ENDIF
              IF DESC <> DESCR[I]
                REPLACE DESC WITH DESCR[I]
              ENDIF
              SKIP
            ENDDO
            SET ORDER TO XRES0
          ENDIF
          APPEND BLANK
          REPLACE SERNUM WITH YSERNUM
          REPLACE BARCODE WITH B1[I]
          REPLACE ZNUM WITH XZNUM
          REPLACE DESC WITH DESCR[I]
          REPLACE MUSTCHECK WITH MUST[I]
          XPOINTS=XPOINTS+1
        ENDIF
      NEXT
```

```
        UNLOCK
        SELECT ZN
        SEEK XZNUM
        LOCKF('ZONE')
        REPLACE POINTS WITH XPOINTS
        UNLOCK
        SELECT BC
        SET ORDER TO XREBC
      ENDIF
    ENDIF
    EXIT
  ENDCASE
 ENDDO
 SET COLOR TO &HILIT
ENDDO
PROCEDURE SETLN
PARAMETER FO
@ 24,0
IF FO = 0
  RETURN
ENDIF
IF (FO < 0)
  ERRMESS(24,'Invalid line number.')
  RETURN
ENDIF
IF (FO < XPBTOP)
  ERRMESS(24,'Line number is not on this page.')
  RETURN
ENDIF
IF XADD
  XNB = XNB + 1
  B1[XNB] = SPACE(6)
  DESCR[XNB] = SPACE(15)
  MUST[XNB] = 'N'
  STAT[XNB] = .T.
  SERIAL[XNB] = 0
ENDIF
MESS(24,'F1 Help      F2 Display Bar Codes      ESC cancel entry')
XR = (FO - 1) % 16 + 6
XC = (INT((FO - 1)/16)*40 % 80)
SET INTENSITY ON
@ XR,XC SAY STR(FO,4)
YB1 = B1[FO]
YMUST = MUST[FO]
YDESCR = DESCR[FO]
YSERIAL = SERIAL[FO]
SET KEY -1 TO SENWIND
@ XR,XC+6 GET YB1 PICTURE '!!!!!!' VALID B1()
@ XR,XC+16 GET YMUST PICTURE '!' VALID MUST()
@ XR,XC+20 GET YDESCR VALID DESCR()
READ
SET KEY -1 TO
SET INTENSITY OFF
@ 24,0
LK = LASTKEY()
IF LK = 27 .AND. XADD
  XNB = XNB - 1
  XPBTOP = XPOLD
ENDIF
IF LK <> 27
  IF (B1[FO]<>YB1).OR.(MUST[FO]<>YMUST).OR.(DESCR[FO]<>YDESCR).OR.(SERIAL[FO]<>YSERIAL)
```

```
      XHASMODIFY = .T.
      B1[F0] = YB1
      MUST[F0] = YMUST
      DESCR[F0] = YDESCR
      SERIAL[F0]= YSERIAL
    ENDIF
  ENDIF
  DO DISPBARC WITH XPBTOP
  RETURN
  PROCEDURE DISPBARC
  PARAMETER XPTOP
  XPAGETOP = XPTOP
  @ 6,0,22,79 BOX ""
  SET DELIMITERS OFF
  XR = 5
  XC = 0
  I = 1
  DO WHILE (I < 33) .AND. (XPAGETOP <= XNB)
    XR = XR + 1
    IF XR > 21
    XR = 6
    XC = 40
   ENDIF
   IF ! STAT[XPAGETOP]
     @ XR,XC SAY STR(XPAGETOP,4)
   ELSE
     @ XR,XC SAY STR(XPAGETOP,4)+'  '+B1[XPAGETOP]+'    '+MUST[XPAGETOP]+'   '+DESCR[XPAGETOP]
   ENDIF .
   I = I + 1
   XPAGETOP = XPAGETOP + 1
 ENDDO
 RETURN
 FUNCTION OKSDESC
 IF LASTKEY() = 27
   RETURN .T.
 ENDIF
 IF EMPTY(XSDESC)
   ERRMESS(24,'Zone name cannot be empty.')
   IF XNEW
     MESS(24,'Enter name for new zone.  ESC to cancel entry.')
   ELSE
     MESS(24,'Change zone name or press ENTER to continue.  ESC to cancel entry.')
     XSDESC = SDESC
   ENDIF
   RETURN .F.
 ENDIF
 IF '**' $ XSDESC
   ERRMESS(24,'"**" is a reserved zone name and may not be used.')
   IF XNEW
     MESS(24,'Enter name for new zone.  ESC to cancel entry.')
   ELSE
     MESS(24,'Change zone name or press ENTER to continue.  ESC to cancel entry.')
     XSDESC = SDESC
   ENDIF
   RETURN .F.
 ENDIF
 RETURN .T.
 FUNCTION B1
 IF EMPTY(YB1)
   ERRMESS(24,'Invalid ba[illegible]de.')
   MESS(24,'F1 Help      F2 Display Bar Codes      ESC cancel entry')
```

```
  RETURN .F.
ENDIF
IF ( '**' $ YB1)
  ERRMESG(24,'"**' is a reserved bar code name and may not be used.')
  MESG(24,'F1 Help      F2 Display Bar Codes      ESC cancel entry')
  RETURN .F.
ENDIF
YB1=SUBSTR(LTRIM(YB1)+SPACE(6),1,6)
IF LEN(TRIM(YB1))=2
  ERRMESG(24,'Bar code cannot have a length of two characters.')
  MESG(24,'F1 Help      F2 Display Bar Codes      ESC cancel entry')
  RETURN .F.
ENDIF
XX1 = 1
DO WHILE (XX1 <= XNB)
  IF XX1 = F0
    XX1 = XX1 + 1
    LOOP
  ENDIF
  IF (B1[XX1] = YB1)
    IF STAT[XX1]
      ERRMESG(24,'Bar code '+TRIM(YB1)+' already exist in this zone.')
      MESG(24,'F1 Help      F2 Display Bar Codes      ESC cancel entry')
      YB1 = B1[F0]
      SET ORDER TO XRESO
      RETURN .F.
    ENDIF
  ENDIF
  XX1 = XX1 + 1
ENDDO
IF (B1[F0] <> YB1)
  SELECT BC
  SET ORDER TO 3
  SEEK YB1
  IF !EOF()
    DO WHILE (YB1 = BARCODE) .AND. (ZNUM = XZNUM) .AND. ! EOF()
      SKIP
    ENDDO
    IF (YB1 = BARCODE) .AND. (ZNUM <> XZNUM) .AND. ! EOF()
      IF !XADD
        MESG(24,'Bar code '+TRIM(YB1)+' is already used by another checkpoint.')
        ?? CHR(7)
        INKEY(3)
        YB1 = B1[F0]
        MESG(24,'F1 Help      F2 Display Bar Codes      ESC cancel entry')
        RETURN .F.
      ELSE
        SET COLOR TO &INVRS
        ?? CHR(7)
        @ 24,0
        @ XR,XC+16 SAY MUSTCHECK
        @ XR,XC+20 SAY DESC
        @ 24, 0 SAY 'Bar code is already in zone '+TRIM(LTRIM(ZNUM))+' !'
        @ 24,41 SAY 'Place it in this zone also (Y/N) ?  [ ]'
        @ 24,75 SAY ''
        DO WHILE .T.
          DO WHILE INKEY()=0
          ENDDO
          XCONFIRM=UPPER(CHR(LASTKEY()))
          IF XCONFIRM $ 'YN'
            EXIT
```

```
      ENDIF
     ENDDO
     SET COLOR TO &WHILIT
     IF XCONFIRM='Y'
       YMUST=MUSTCHECK
       YDESCR=DESC
       YSERIAL=VAL(SERNUM)
       MESG(24,'Enter "Y" to indicate Must-Scan.  ESC to cancel entry.')
     ELSE
       MESG(24,'F1 Help      F2 Display Bar Codes      ESC cancel entry')
       SET ORDER TO XRESO
       RETURN .F.
     ENDIF
    ENDIF
   ENDIF
  ENDIF
ENDIF
SET ORDER TO XRESO
IF BC_IF0 = YBC
  YMUST  = MUSTIF0
  YDESCR = DESCRIF0
  YSERIAL= SERIALIF0
ENDIF
MESG(24,'Enter "Y" to indicate Must-Scan.  ESC to cancel entry.')
RETURN .T.
FUNCTION MUST
IF LASTKEY() = 5
  MESG(24,'F1 Help      F2 Display Bar Codes      ESC cancel entry')
  RETURN .T.
ENDIF
IF !(YMUST $ 'YN')
  ERRMESG(24,'Enter "Y" for Must-Scan Bar Code.  Otherwise, enter "N".')
  MESG(24,'Enter "Y" to indicate Must-Scan.  ESC to cancel entry.')
  YMUST = 'N'
  RETURN .F.
ENDIF
MESG(24,'ESC to cancel entry.')
RETURN .T.
FUNCTION DESCR
IF LASTKEY() = 5
  MESG(24,'Enter "Y" to indicate Must-Scan.  ESC to cancel entry.')
  RETURN .T.
ENDIF
IF EMPTY(YDESCR)
  ERRMESG(24,'Invalid checkpoint.')
  MESG(24,'ESC to cancel entry')
  RETURN .F.
ENDIF
IF '**' $ YDESCR
  ERRMESG(24,'"**" is a reserved bar code name and may not be used.')
  MESG(24,'ESC to cancel entry')
  RETURN .F.
ENDIF
RETURN .T.
FUNCTION NOKILL
PARAMETER FF0
IF !EMPTY(SERIAL_IFF0)
  SELECT BC
  XBCREC = RECNO()
  SET ORDER TO 5
  YSERNUM = SUBSTR(STR(1000000+SERIAL_IFF0),7),2)
```

```
  SEEK YSERNUM
  SKIP
  IF (SERNUM <> YSERNUM) .OR. EOF()
    SELECT DH
    SEEK YSERNUM
    IF !EOF()
      SELECT BC
      SET ORDER TO XREBC
      GO XBCREC
      RETURN .T.
    ENDIF
  ENDIF
  SELECT BC
  SET ORDER TO XREBC
  GO XBCREC
ENDIF
RETURN .F.

* ROUTE.PRG
* COPYRIGHT 1989, 1988 COMPUTER SYSTEMS DESIGN, INC.

CLEAR
CLOSE DATABASES
MESG(0,LBLOCK+' ROUTE MAINTENANCE '+RBLOCK)
MESG(10,'Please wait while setting up files...')
DECLARE ZONE[200],STAT[200],DESCR[200]
FUSE('RSUM/RTS/RNUMIX,RNAMX')
SELECT 2
FUSE('RDET/RTD/RNUMIX,RDETX')
SELECT 3
FUSE('ZONE/ZN/ZNUMIX,ZNAMX')
SELECT RTD
SET RELATION TO ZNUM INTO ZN
GO TOP
SELECT RTS
DO WHILE .T.
  SET INTEN OFF
  SET DELIM ON
  XRNUM=SPACE(6)
  XNEW=.T.
  CLR(1)
  @ 3,00 SAY 'Line  Zone    Description'
  @ 3,40 SAY 'Line  Zone    Description'
  @ 4,00 SAY LINE(38)
  @ 4,40 SAY LINE(38)
  @ 23,0 SAY LINE(80)
  DO WHILE .T.
    XRNUM = XRNUM+SPACE(6-LEN(XRNUM))
    @ 1,0
    @ 1,40 SAY 'Description: '
    MESG(24,'F1 Help    F2 display ROUTES    ESC exit')
    SET KEY -1 TO GENWIND
    @ 1,2 SAY 'Route: ' GET XRNUM PICTURE '!!!!!!' VALID OKROUT(XRNUM)
    READ
    SET KEY -1
    IF LASTKEY() = 27
      CLOSE DATABASES
      RETURN
    ENDIF
    IF XNEW
      MESG(24,'Enter name for new route. ESC to cancel entry.')
      XDESC=SPACE(20)
```

```
  ELSE
    MESS(24,'Change route name or press ENTER to continue.  ESC to cancel change.')
    XDESC = DESC
  ENDIF
  @ 1,58 GET XDESC VALID ONDESC()
  READ
  IF LASTKEY() = 27
    LOOP
  ENDIF
  EXIT
ENDDO
MESS(10,'Setting up route file...')
SELECT RTS
LOCKF('RNUM')
IF XNEW
  APPEND BLANK
  REPLACE RNUM WITH XRNUM
ENDIF
IF (DESC<>XDESC)
  REPLACE DESC WITH XDESC
ENDIF
UNLOCK
SELECT RTD
SEEK XRNUM
XNB=0
DO WHILE RNUM==XRNUM .AND. !EOF()
  XNB=XNB+1
  ZONE[XNB]=ZNUM
  DESCR[XNB]=ZN->ZDESC
  STAT[XNB]=.T.
  SKIP
ENDDO
XHASMODIFY = .F.
XPSTOP = 1
XPOLD = 1
DO DISPARRAY WITH 1
XINSERT = .F.
XADD = (XNB = 0)
IF XADD
  DO GETLN2 WITH XNB + 1
ENDIF
SET MESSAGE TO
XRES = 1
DO WHILE .T.
  XADD = .F.
  XINSERT = .F.
  @ 24,0
  SET INTENSITY ON
  SET KEY 3 TO
  SET KEY 18 TO
  @ 24,00 PROMPT ' Add  '
  @ 24,12 PROMPT 'Change'
  @ 24,25 PROMPT 'Delete'
  @ 24,37 PROMPT 'Insert'
  @ 24,50 PROMPT 'NextPg'
  @ 24,62 PROMPT 'PrevPg'
  @ 24,74 PROMPT ' Quit '
  MENU TO XRES
  IF LASTKEY() = 3
    XRES = 5
  ENDIF
```

```
IF LASTKEY() = 18
  XRES = 6
ENDIF
SET KEY 3 TO NULL_FUNC
SET KEY 18 TO NULL_FUNC
SET INTENSITY OFF
DO CASE
CASE XRES = 1
  IF XNB >= 200
    ERRMESS(24,'No more room for additional zone. ')
    LOOP
  ENDIF
  XADD = .T.
  XPOLD = XPSTOP
  DO WHILE (XPSTOP + 34) <= (XNB + 1)
    XPSTOP = XPSTOP + 34
  ENDDO
  IF XPOLD <> XPSTOP
    DO DISPARRAY WITH XPSTOP
  ENDIF
  DO GETLN2 WITH XNB + 1
CASE XRES = 2
  DO WHILE .T.
    @ 24,0
    XRES1 = 0
    SET DELIMITERS ON
    @ 24,20 SAY 'What LINE do you want to change?' GET XRES1 PICTURE '@Z 999'
    READ
    SET DELIMITERS OFF
    IF OKLNUM(XRES1,33)
      EXIT
    ENDIF
  ENDDO
  IF XRES1 = 0
    LOOP
  ENDIF
  IF ! STAT(XRES1)
    LOOP
  ENDIF
  DO GETLN2 WITH XRES1
CASE XRES = 3
  SET DELIMITERS ON
  DO WHILE .T.
    @ 24,0
  XRES1 = SPACE(3)
  @ 24,7 SAY 'What LINE to Delete (enter "**" to delete entire route)? ' GET XRES1 PICTURE '!!!'
  READ
  IF '**' $ XRES1
    EXIT
  ELSE
    IF OKLNUM(VAL(XRES1),33)
      EXIT
    ENDIF
  ENDIF
ENDDO
SET DELIMITERS OFF
IF '**' $ XRES1
  IF CONFDEL(24,'Delete this route (Y/N)? ')
    SELECT RTS
    LOCKF('RSUM')
    DELETE
```

```
      UNLOCK
      SELECT RTD
      SEEK XRNUM
      LOCKF('RDET')
      DELETE WHILE RNUM==XRNUM
      UNLOCK
      EXIT
    ENDIF
    LOOP
  ENDIF
  XRES1 = VAL(XRES1)
  IF XRES1 = 0
    LOOP
  ENDIF
  IF !STAT[XRES1]
    LOOP
  ENDIF
  XHASMODIFY = .T.
  XR = (XRES1 - 1) % 17 + 5
  XC = (INT((XRES1 - 1)/17)*40 % 80)
  @ XR,XC+6 SAY SPACE(34)
  STAT[XRES1] = .F.
CASE XRES = 4
  IF XNE >= 200
    ERRMESS(24,'No more room for additional zone.')
    LOOP
  ENDIF
  XINSERT = .T.
  DO WHILE .T.
    @ 24,0
    XRES1 = 0
    SET DELIMITERS ON
    @ 24,17 SAY 'Insert new zone ABOVE which line? ' GET XRES1 PICTURE '@Z 999'
    READ
    SET DELIMITERS OFF
    IF OKLNUM(XRES1,33)
      EXIT
    ENDIF
  ENDDO
  DO GETLN2 WITH XRES1
CASE XRES = 5
  IF XPGTOP + 34 <= XNE
    XPGTOP = XPGTOP + 34
    DO DISPARRAY WITH XPGTOP
  ENDIF
CASE XRES = 6
  IF XPGTOP - 34 > 0
    XPGTOP = XPGTOP - 34
    DO DISPARRAY WITH XPGTOP
  ENDIF
CASE XRES = 7
  IF XHASMODIFY
    @ 24,0
    XRES1 = 'YES'
    SET ESCAPE OFF
    SET DELIMITERS ON
    @ 24,14 SAY 'Do you wish to save the changes you have made? ' GET XRES1 PICTURE '@K !!!'
    READ
    SET ESCAPE ON
    SET DELIMITERS OFF
```

```
        IF 'YES' $ UPPER(XRESP)
          CLR(1)
          MESG(10,'Please wait while updating...')
          SELECT RTD
          SEEK XRNUM
          LOCKF('RDET')
          DELETE WHILE RNUM==XRNUM
          FOR I=1 TO XNB
            IF STAT[I] .AND. !EMPTY(ZONE[I])
              APPEND BLANK
              REPLACE ZNUM WITH ZONE[I]
              REPLACE RNUM WITH XRNUM
            ENDIF
          NEXT
          UNLOCK
        ENDIF
      ENDIF
      EXIT
    ENDCASE
  ENDDO
ENDDO
PROCEDURE DISPARRAY
PARAMETER XPTOP
XPAGETOP = XPTOP
@ 5,0,22,79 BOX ""
SET DELIMITERS OFF
XR = 4
XC = 0
I = 1
DO WHILE (I < 35) .AND. (XPAGETOP <= XNB)
  XR = XR+1
  IF XR > 21
    XR = 5
    XC = 40
  ENDIF
  IF ! STAT[XPAGETOP]
    @ XR,XC SAY STR(XPAGETOP,4)
  ELSE
    @ XR,XC SAY STR(XPAGETOP,4)+'  '+ZONE[XPAGETOP]+'  '+DESCR[XPAGETOP]
  ENDIF
  I = I+1
  XPAGETOP = XPAGETOP + 1
ENDDO
RETURN
PROCEDURE GETLNO
PARAMETER FO
@ 24,0
IF FO = 0
  RETURN
ENDIF
IF (FO < 0)
  ERRMESG(24,'Invalid line #.')
  RETURN
ENDIF
IF (FO < XPGTOP)
  ERRMESS(24,'Line # not on this page.')
  RETURN
ENDIF
IF XADD
  XNB = XNB + 1
  ZONE[XNB] = SPACE(6)
```

```
  DESCR[XNB] = SPACE(15)
  STAT[XNB] = .T.
ENDIF
IF XINSERT
  FOR I = XNB TO FO STEP -1
    ZONE[I+1] = ZONE[I]
    DESCR[I+1] = DESCR[I]
    STAT[I+1] = STAT[I]
  NEXT
  ZONE[FO] = SPACE(6)
  DESCR[FO] = SPACE(15)
  STAT[FO] = .T.
  XNB = XNB + 1
  DO DISPARRAY WITH XPSTOP
ENDIF
MESS(24,'F1 Help    F2 display ZONES    ESC cancel entry')
XR = (FO - 1) % 17 + 5
XC = (INT((FO - 1)/17)*40 % 80)
SET INTENSITY ON
@ XR,XC SAY STR(FO,4)
XZNUM = ZONE[FO]
YDESCR = DESCR[FO]
COLF = 14
SET KEY -1 TO ZENWIND
@ XR,XC+6 GET XZNUM PICTURE '!!!!!!' VALID OKZNUM()
@ XR,XC+14 SAY YDESCR
READ
SET KEY -1
SET INTENSITY OFF
@ 24,0
LK = LASTKEY()
IF LK = 27
  IF XINSERT
    FOR I = FO TO XNB - 1
      ZONE[I] = ZONE[I+1]
      DESCR[I] = DESCR[I+1]
      STAT[I] = STAT[I+1]
    NEXT
  ENDIF
  IF XINSERT .OR. XADD
    XNB = XNB - 1
    XPSTOP = XPOLD
  ENDIF
ENDIF
IF LK <> 27
  IF (XZNUM <> ZONE[FO]) .OR. (YDESCR <> DESCR[FO])
    XHASMODIFY = .T.
    ZONE[FO] = XZNUM
    DESCR[FO] = YDESCR
  ENDIF
ENDIF
DO DISPARRAY WITH XPSTOP
RETURN
FUNCTION OKDESC
IF LASTKEY() = 27
  RETURN .T.
ENDIF
IF EMPTY(XDESC)
  ERRMESS(24,'House description cannot be empty.')
  IF XNEW
```

```
    MESG(24,'Enter name for new route. ESC to cancel entry.')
  ELSE
    MESG(24,'Change route name or press ENTER to continue.  ESC to cancel entry.')
    XDESC = DESC
  ENDIF
  RETURN .F.
ENDIF
IF '**' $ XDESC
  ERRMESG(24,'"**" is a reserved route name and may not be used.')
  IF XNEW
    MESG(24,'Enter name for new route.  ESC to cancel entry.')
  ELSE
    MESG(24,'Change route name or press ENTER to continue.  ESC to cancel entry.')
    XDESC = DESC
  ENDIF
  RETURN .F.
ENDIF
RETURN .T.

* PNTFILE.PRG
* COPYRIGHT 1989, 1988 COMPUTER SYSTEMS DESIGN, INC.

DO WHILE .T.
  CLOSE DATABASES
  MS1 = 'A  PRINT GUARD LIST          '
  MS2 = 'B  PRINT ROUTE LIST          '
  MS3 = 'C  PRINT ZONE LIST           '
  MS4 = 'X  RETURN TO MAINTENANCE MENU'
  MG1 = 'Print all Guards'
  MG2 = 'Print all Routes'
  MG3 = 'Print all Zones'
  MG4 = 'Return to Previous Menu'
  RESP = HEADER('PRINT LISTS',4)
  CLEAR
  SET DELETED ON
  DO CASE
  CASE RESP = 1
    HEADER('GUARD LIST',-1)
    MESG(7,'This report displays all the guards currently defined.')
    MESG(11,'Setting up guard files...')
    FUSE('GUARD/GN/GRDX')
    DO GUARDPRINT
  CASE RESP = 2
    HEADER('ROUTE LIST',-1)
    MESG(7,'This report displays all zones within a route.')
    MESG(11,'Setting up route files...')
    FUSE('RSUM/RTS/RNUM2X,RNAMX')
    SELECT 2
    FUSE('RDET/RTD/RNUM1X')
    SELECT 3
    FUSE('ZONE/ZN/ZNUM1X,ZNAMX')
    SELECT RTD
    SET RELATION TO ZNUM INTO ZN
    GO TOP
    SELECT RTS
    SET INTENSITY OFF
    SET DELIM ON
    DO WHILE .T.
      CLR(11)
      SET COLOR TO &LOLITE
      @ 13,16 SAY "Enter a Route Name or '**' to list every route."
```

```
SET COLOR TO &WHILIT
MESS(19,'F2 to display ROUTES.  ESC to exit.')
SET KEY -1 TO GENWIND
XRNUM = SPACE(6)
XRDESC= SPACE(20)

  @ 11,20 SAY 'Route Name    ' GET XRDESC PICTURE 'XXXXXXXXXXXXXXXXXXXX' VALID OKRDESC(XRDESC,'2')
  @ 12,20 SAY 'Route Number  ' GET XRNUM PICTURE '!!!!!!' VALID OKRDESC(XRNUM,'1')
  READ
  IF LASTKEY()=27
    EXIT
  ENDIF
  SET KEY -1
  CLR(13)
  DO ROUTEPRINT
 ENDDO
CASE RES3 = 3
 HEADER('ZONE LIST',-1)
 MESS(7,'This report displays all checkpoints within a zone.')
 MESS(11,'Setting up zone files...')
 FUSE('BARCODE/BC/ZNUM3X,ZNUM2X')
 SELECT 2
 FUSE('ZONE/ZN/ZNUM1X,ZNAMX')
 MESS(11,'The checkpoints may be printed in order by their ')
 MESS(12,'barcodes or alphabetically by their descriptions.')
 MESS(24,'Use the '+CHR(27)+' or '+CHR(26)+' keys to position cursor.
 Press Enter '+CHR(17)+CHR(196)+CHR(217)+' to select')
 XRES = 1
 SET INTENSITY ON
 SET DELIMITERS ON
 SET MESSAGE TO
 DO WHILE .T.
  @ 16, 8 PROMPT ' Bar Code Order '
  @ 16,32 PROMPT 'Checkpoint Order'
  @ 16,56 PROMPT '      Quit      '
  MENU TO XRES
  IF LASTKEY() <> 27
    EXIT
  ENDIF
 ENDDO
 SET INTENSITY OFF
 IF XRES = 3
   LOOP
 ENDIF
 IF XRES = 2
  SELECT BC
  SET ORDER TO 2
  GO TOP
  SELECT ZN
 ENDIF
 DO WHILE .T.
  CLR(13)
  SET COLOR TO &LOLIT
  @ 13,19 SAY "Enter a Zone Name or '**' for all zones."
  SET COLOR TO &WHILIT
  MESS(19,'F2 to display ZONES.  ESC to exit.')
  SET KEY -1 TO GENWIND
  XZNUM = SPACE(6)
  XZDESC= SPACE(15)
  @ 11,20 SAY 'Zone Name     ' GET XZDESC PICTURE 'XXXXXXXXXXXXXXX' VALID OKZONE(XZDESC,'2')
  @ 12,20 SAY 'Zone Number   ' GET XZNUM PICTURE '!!!!!!' VALID OKZONE(XZNUM,'1')
  READ
```

```
    SET KEY -1
    CLR(13)
    IF LASTKEY()=27
      EXIT
    ENDIF
    DO ZONEPRINT
  ENDDO
CASE RES3 = 4
  CLEAR
  CLOSE DATABASES
  RETURN
  ENDCASE
ENDDO
RETURN
FUNCTION RPHEAD
IF EOF()
  RETURN 0
ENDIF
XFIRST = RECNO()
ICOUNTER = 0
XSECOND = 0
DO WHILE RNUM = YRNUM .AND. ! EOF()
  ICOUNTER = ICOUNTER + 1
  IF ICOUNTER > 43
    EXIT
  ENDIF
  SKIP
ENDDO
IF (ICOUNTER > 43)
  XSECOND = RECNO()
  XTWOCOL = .T.
ENDIF
GO XFIRST
XPG = XPG + 1
SELECT RTS
SEEK YRNUM
@ 1,0 SAY DATE()
@ 1,40-INT(LEN(LTRIM(TRIM(HEAD)))/2) SAY HEAD
@ 1,71 SAY 'Page '
@ 1,76 SAY XPG PICTURE '999'
@ 2,0 SAY TIME()
@ 2,35 SAY 'ROUTE LIST'
@ 4,0 SAY 'Route Number: '+YRNUM
@ 5,0 SAY 'Route Name  : '+DESC
IF XTWOCOL
  @ 7,0 SAY '       Zone    Zone
  @ 7,40 SAY '       Zone    Zone'
  @ 8,0 SAY 'Order  Number  Name'
  @ 8,40 SAY 'Order  Number  Name'
  @ 9,0 SAY REPLICATE('-',38)
  @ 9,40 SAY REPLICATE('-',38)
ELSE
  @ 7,0 SAY '       Zone    Zone'
  @ 8,0 SAY 'Order  Number  Name'
  @ 9,0 SAY REPLICATE('-',38)
ENDIF
L = 10
SELECT STD
RETURN XSECOND
PROCEDURE ROUTEPRINT
CLR(15)
```

```
MESG(15,'Is the printer ready?')
IF ! CONFIRM(12)
  SET DELIMITERS ON
  RETURN
ENDIF
SET DELIMITERS ON
CLR(11)
MESG(11,'Please wait while printing ...')
STORE 0 TO XFIRST,XSECOND,XPG
SET DEVICE TO PRINT
SELECT RTD
IF '**' $ XRNUM
  GO TOP
ELSE
  YRNUM = XRNUM
  SEEK XRNUM
ENDIF
IF EOF()
  SET DEVICE TO SCREEN
  MESG(11,'No zone data for '+TRIM(LTRIM(XRNUM))+' route.')
  MESG(12,'Press any key to continue...')
  DO WHILE INKEY() = 0
  ENDDO
ENDIF
DO WHILE ! EOF()
  IF '**' $ XRNUM
    YRNUM = RNUM
  ENDIF
  XTWOCOL = .F.
  STORE 0 TO XZCOUNT,L,XFIRST
  SET DEVICE TO SCREEN
  MESG(13,'Route = '+YRNUM)
  SET DEVICE TO PRINT
  XSECOND = RPHEAD()
  DO WHILE (RNUM = YRNUM) .AND. .NOT.,EOF()
    XZCOUNT = XZCOUNT + 1
    IF XTWOCOL
      GO XFIRST
      @ L,0 SAY XZCOUNT PICTURE '99999'
      @ L,7 SAY ZNUM
      SELECT ZN
      @ L,15 SAY SDESC
      SELECT RTD
      SKIP
      XFIRST = RECNO()
      IF ! EMPTY(XSECOND)
        GO XSECOND
        @ L,40 SAY 43+XZCOUNT PICTURE '99999'
        @ L,47 SAY ZNUM
        SELECT ZN
        @ L,55 SAY SDESC
        SELECT RTD
        SKIP
        IF (RNUM <> YRNUM) .OR. EOF()
          XSECOND = 0
        ELSE
          XSECOND = RECNO()
        ENDIF
      ENDIF
      GO XFIRST
    ELSE
```

```
  @ L,0 SAY XZCOUNT PICTURE '99999'
  @ L,7 SAY ZNUM
  SELECT ZN
  @ L,15 SAY ZDESC
  SELECT RTD
  SKIP
ENDIF
L = L+1
IF L > 52
  IF ! EMPTY(XSECOND)
    GO XSECOND
    XZCOUNT = XZCOUNT + 43
    XTWOCOL = .F.
    EJECT
    XSECOND = ZPHEAD()
  ELSE
    DO WHILE (RNUM = YRNUM) .AND. .NOT. EOF()
      SKIP
    ENDDO
  ENDIF
ENDIF
 ENDDO
 IF .NOT. ('**' $ YRNUM)
   EJECT
   EXIT
 ELSE
   EJECT
 ENDIF
ENDDO
SET DEVICE TO SCREEN
RETURN
FUNCTION ZPHEAD
IF EOF()
  RETURN 0
ENDIF
XFIRST = RECNO()
ICOUNTER = 0
XSECOND = 0
DO WHILE ZNUM = YZNUM .AND. ! EOF()
  ICOUNTER = ICOUNTER + 1
  IF ICOUNTER > 43
    EXIT
  ENDIF
  SKIP
ENDDO
IF ICOUNTER > 43
  XSECOND = RECNO()
  XTWOCOL = .T.
ENDIF
GO XFIRST
XPG = XPG + 1
SELECT ZN
SEEK YZNUM
@ 1,0 SAY DATE()
@ 1,40-INT(LEN(LTRIM(TRIM(HEAD)))/2) SAY HEAD
@ 1,71 SAY 'Page '
@ 1,76 SAY XPG PICTURE '999'
@ 2,0 SAY TIME()
@ 2,35 SAY 'ZONE LIST'
IF XRES = 1
  @ 3,33 SAY 'BAR CODE ORDER'
```

```
ELSE
  @ 3,31 SAY 'CHECKPOINT ORDER'
ENDIF
@ 4,0 SAY 'Zone Number: '+YZNUM
@ 5,0 SAY 'Zone Name  : '+ZDESC
IF XTWOCOL
  @ 7,0 SAY '           Must'
  @ 7,40 SAY '          Must'
  @ 8,0 SAY 'Bar Code  Scan    Checkpoint'
  @ 8,40 SAY 'Bar Code  Scan    Checkpoint'
  @ 9,0 SAY REPLICATE('-',38)
  @ 9,40 SAY REPLICATE('-',38)
ELSE
  @ 7,0 SAY '           Must'
  @ 8,0 SAY 'Bar Code  Scan    Checkpoint'
  @ 9,0 SAY REPLICATE('-',38)
ENDIF
L = 10
SELECT BC
RETURN XSECOND
PROCEDURE ZONEPRINT
CLR(15)
MESG(15,'Is the printer ready?')
IF ! CONFIRM(15)
  SET DELIMITERS ON
  RETURN
ENDIF
SET DELIMITERS ON
CLR(11)
MESG(11,'Please wait while printing ...')
STORE 0 TO XFIRST,XSECOND,XPE
SET DEVICE TO PRINT
SELECT BC
IF '**' $ XZNUM
  GO TOP
ELSE
  YZNUM = XZNUM
  SEEK XZNUM
ENDIF
IF EOF()
  SET DEVICE TO SCREEN
  MESG(11,'No checkpoint for '+TRIM(LTRIM(XZNUM))+' zone.')
  MESG(12,'Press any key to continue...')
  DO WHILE INKEY() = 0
  ENDDO
ENDIF
DO WHILE ! EOF()
  IF '**' $ XZNUM
    YZNUM = ZNUM
  ENDIF
  XTWOCOL = .F.
  STORE 0 TO L,XFIRST
  SET DEVICE TO SCREEN
  MESG(15,'Zone = '+YZNUM)
  SET DEVICE TO PRINT
  XSECOND = ZPHEAD()
  DO WHILE (ZNUM = YZNUM) .AND. .NOT. EOF()
    IF XTWOCOL
      GO XFIRST
      @ L,0 SAY BARCODE
      @ L,12 SAY MUSTCHECK
```

```
 @ L,16 SAY DESC
 SKIP
 XFIRST = RECNO()
 IF ! EMPTY(XSECOND)
   GO XSECOND
   @ L,40 SAY BARCODE
   @ L,52 SAY MUSICHECK
   @ L,56 SAY DESC
   SKIP
   IF (ZNUM <> YZNUM) .OR. EOF()
     XSECOND = 0
   ELSE
     XSECOND = RECNO()
   ENDIF
 ENDIF
 GO XFIRST
ELSE
 @ L,0 SAY BARCODE
 @ L,12 SAY MUSICHECK
 @ L,16 SAY DESC
 SKIP
ENDIF
L = L+1
IF L > 52
 IF ! EMPTY(XSECOND)
   GO XSECOND
   XTWOCOL = .F.
   EJECT
   XSECOND = ZPHEAD()
 ELSE
   DO WHILE (ZNUM = YZNUM) .AND. .NOT. EOF()
         SKIP
       ENDDO
     ENDIF
   ENDIF
  ENDDO
  IF .NOT. ('**' $ XZNUM)
    EJECT
    EXIT
  ELSE
    EJECT
  ENDIF
ENDDO
SET DEVICE TO SCREEN
RETURN
PROCEDURE GPHEAD
XPG = XPG+1
@ 1,0 SAY DATE()
@ 1,40-INT(LEN(LTRIM(TRIM(HEAD)))/2) SAY HEAD
@ 1,71 SAY 'Page '
@ 1,76 SAY XPG PICTURE '999'
@ 2,0 SAY TIME()
@ 2,35 SAY 'GUARD LIST'
@ 4,10 SAY 'Guard ID     Guard Name'
@ 5,10 SAY REPLICATE('-',40)
L = 6
RETURN
PROCEDURE GUARDPRINT
CLR(11)
MESG(11,'Is the printer ready?')
IF ! CONFIRM(15)
```

```
  SET DELIMITERS ON
  RETURN
ENDIF
SET DELIMITERS ON
CLR(11)
MESS(11,'Please wait while printing guards...')
SET DEVICE TO PRINT
L = 0
XPG = 0
DO GPHEAD
SELECT GN
GO TOP
IF EOF()
  SET DEVICE TO SCREEN
  MESS(11,'No guard found.')
  MESS(12,'Press any key to continue...')
ENDIF
DO WHILE .NOT. EOF()
  @ L,10 SAY GNUM
  @ L,20 SAY GNAME
  SKIP
  L = L+1
  IF L > 52
   EJECT
    DO GPHEAD
  ENDIF
ENDDO
SET DEVICE TO SCREEN
RETURN
* HELP.PRG
* COPYRIGHT 1989, 1988 COMPUTER SYSTEMS DESIGN, INC.

PARAMETER CALL_PRG, LINE_NUM, INPUT_VAR
IF CALL_PRG = 'HELP'
  RETURN
ENDIF
IF TYPE('HLPVAR') = 'U'
  RETURN
ENDIF
IF (HLPVAR = 0)
  RETURN
ENDIF
SAVE SCREEN
@ 0,0 CLEAR
DO CASE
CASE HLPVAR = 1
  @ 1,0
  TEXT
  The menu displayed at the bottom of the Guard Maintenance screen
  lets you add, change, delete, or view guard information.

  To select an option from the menu, you may either:
    Use the LEFT and RIGHT arrow keys to move from one selection
    to another. Press ENTER at the desired selection.
                         -- OR --
    Press the first letter of the desired selection.

  Menu options and their respective functions:

    Add    :  To enter a new guard.
              Enter a UNIQUE guard ID and corresponding guard name.
```

```
    Change :  To change a specific guard's name.
              Enter the LINE number of the guard to be changed.
    Delete :  To delete a guard.
              Enter the LINE number of a guard to delete.
    NextPg :  To display the next screen, if more information exists.
    PrevPg :  To display the previous screen.
    Quit   :  To exit the guard maintenance program.
  ENDTEXT
  SET COLOR TO &BLUELIT
  @ 0,0 TO 24,79
  SET COLOR TO &HILIT
  @ 0,24 SAY ' GUARD MAINTENANCE HELP WINDOW '
CASE HLPVAR = 2
  @ 1,0
  TEXT
  The menu displayed at the bottom of the Route Maintenance screen
  lets you add, change, delete, insert, or view zones within a route.

  To select an option from the menu, you may either:
    Use the LEFT and RIGHT arrow keys to move from one selection
    to another. Press ENTER at the desired selection.
                        -- OR --
    Press the first letter of the desired selection.

  Menu options and their respective functions:
    Add    :  To add a zone to the end of the route.
              Enter a valid zone number. The zone name will be displayed.
    Change :  To replace a zone in the route.
              Enter the LINE number of the zone to be replaced.
    Delete :  To delete a zone in the route.
              Enter the LINE number of the zone to delete.
    Insert :  To insert a zone at a specific position in the route.
              Enter a valid zone number. The zone name will be displayed.
    NextPg :  To display the next screen, if more information exists.
    PrevPg :  To display the previous screen.
    Quit   :  To exit the route maintenance program.
  ENDTEXT
  SET COLOR TO &BLUELIT
  @ 0,0 TO 24,79
  SET COLOR TO &HILIT
  @ 0,24 SAY ' ROUTE MAINTENANCE HELP WINDOW '
CASE HLPVAR = 3
  @ 1,0
  TEXT
  The menu displayed at the bottom of the Zone Maintenance screen
  lets you add, change, delete, or view checkpoints within a zone.

  To select an option from the menu, you may either:
    Use the LEFT and RIGHT arrow keys to move from one selection
    to another. Press ENTER at the desired selection.
                        -- OR --
    Press the first letter of the desired selection.

  Menu options and their respective functions:
    Add    :  To add a checkpoint to the zone.
              Enter a bar code, a must-scan indicator
              ('Y' for YES, 'N' for NO), and the checkpoint's description.
    Change :  To change checkpoint information in the zone.
              Enter the LINE number of the checkpoint to be changed.
    Delete :  To delete a checkpoint.
              Enter the LINE number of a checkpoint to delete.
    NextPg :  To display the next screen, if more information exists.
    PrevPg :  To display the previous screen.
    Quit   :  To exit the zone maintenance program.
  ENDTEXT
  SET COLOR TO &BLUELIT
```

```
  @ 0,0 TO 24,79
  SET COLOR TO &HILIT
  @ 0,25 SAY ' ZONE MAINTENANCE HELP WINDOW '
ENDCASE
@ 24,30 SAY ' ESC to exit '
DO WHILE INKEY() <> 27
ENDDO
RESTORE SCREEN
RETURN
* DETREP2.PRG
* COPYRIGHT 1989, 1990 COMPUTER SYSTEMS DESIGN, INC.

PROCEDURE ROAMHEAD
@ 1, 0 SAY DATE()
@ 1,40-INT(LEN(LTRIM(TRIM(HEAD)))/2) SAY HEAD
@ 1,71 SAY 'Page: '+STR(XPG,3)
@ 2, 0 SAY TIME()
IF ISFORDET
  @ 2,31 SAY 'DETAIL ROAM REPORT'
ELSE
  @ 2,31 SAY 'SUMMARY ROAM REPORT'
ENDIF
@ 2,69 SAY 'Report: '+STR(XPNTPG,3)
@ 3,25 SAY 'The TourWatch Manager (C) 1989'
@ 5, 0 SAY 'Guard Name : '+SUBSTR(XGNAME,1,24)
@ 5,38 SAY 'Check In    : '+DTOC(XDCHKIN)+'  '+XTCHKIN
@ 6, 0 SAY 'Route Name : '+XROUTE
@ 6,38 SAY 'Check Out  : '
IF ! EMPTY(XDCHKOUT)
  @ 6,51 SAY DTOC(XDCHKOUT)+'  '+XTCHKOUT
ENDIF
@ 7,38 SAY 'Total Time : '+XTDIFF
IF ISFORDET
  @  9,0 SAY 'Zone                              Bar         Check       Between'
  @ 10,0 SAY 'Number  Checkpoint                Code         Time         Time      Incident'
ELSE
  @  9,0 SAY 'Zone                        'Enter  Leave  Total In-Zone In-Zone  Percent  Must-scans'
  @ 10,0 SAY 'Number  Zone Name             Time   Time   Time  Points Pts Chkd Checked      Missed'
ENDIF
@ 11,0 SAY REPLICATE('-',80)
L = 11
RETURN
PROCEDURE ROAMLOOP
PARAMETER RPTNAME
XROUTE = 'ROAM'
DO WHILE ! EOF()
  XPG   = XPG + 1
  XPNTPG= XPNTPG+1
  XTOUR = RDNUM
  SEEK XTOUR+'S'
  XDCHKIN = DATE
  XTCHKIN = TIME
  SELECT GN
  SEEK RR->LOGDATA
  IF EOF()
    XGNAME = 'Undefined guard'
  ELSE
    XGNAME = GNAME
  ENDIF
  SELECT RR
  SEEK XTOUR+'F'
  IF ! EOF()
    XDCHKOUT = DATE
```

```
  XTCHKOUT = TIME
  XTDIFF   = DETIME(-1.2,XTCHKIN,XDCHKIN,XTCHKOUT,XDCHKOUT)
ELSE
  XDCHKOUT = SPACE(8)
  XTCHKOUT = SPACE(5)
  XTDIFF   = SPACE(11)
ENDIF
DO RDAMHEAD
L = L + 1
IF ISFORDET
  @ L,5 SAY 'Check In'
  @ L,41 SAY XTCHKIN
  L = L + 2
ELSE
  @ L,9 SAY 'Check In'
  @ L,24 SAY XTCHKIN
  L = L + 1
ENDIF
SELECT RR
SEEK XTOUR+'R'
IF (RCNUM = XTOUR) .AND. (TYPE = 'R') .AND. ! EOF()
  DO &RPTNAME
  DO &RPTNAME
ENDIF
SELECT RR
SEEK XTOUR+'B'
SET ORDER TO
DO WHILE (RCNUM = XTOUR) .AND. ! EOF()
  SKIP
ENDDO
SKIP -1
IF ISFORDET
  IF ! EMPTY(XTCHKOUT)
    @ L,5 SAY 'Check Out'
    @ L,41 SAY XTCHKOUT
  ELSE
    @ L,5 SAY 'Last recorded time is '+TIME
  ENDIF
ELSE
  IF ! EMPTY(XTCHKOUT)
    @ L,8 SAY 'Check Out'
    @ L,31 SAY XTCHKOUT
  ELSE
    @ L,8 SAY 'Last recorded time is '+TIME
  ENDIF
ENDIF
SKIP
SET ORDER TO 1
ENDDO
RETURN
PROCEDURE DETRDAM
DO WHILE (RCNUM = XTOUR) .AND. (TYPE = 'R') .AND. ! EOF()
  XCHKPNT = LOGDATA
  IF LEN(TRIM(XCHKPNT)) = 2
    IF TRIM(XCHKPNT) = 'ZZ'
      SKIP
    ENDIF
    SKIP
    LOOP
  ENDIF
  XZUR1 = ZONE
```

```
    SELECT ZN
    SEEK XCURZ
    IF EOF()
      XZDESC = 'Undefined zone'
    ELSE
      XZDESC = ZDESC
    ENDIF
    @ L,5 SAY 'Zone '+XCURZ+' - '+XZDESC
    SELECT RR
    XCHKPNT = LOGDATA
    DO WHILE (LEN(TRIM(XCHKPNT))=2).AND.(RCNUM=XTOUR).AND.(TYPE='R').AND.(ZONE=XCURZ).AND.!EOF()
      IF TRIM(LTRIM(XCHKPNT)) = 'ZZ'
        SKIP
      ENDIF
   SKIP
   XCHKPNT = LOGDATA
ENDDO
DO WHILE (RCNUM = XTOUR) .AND. (TYPE = 'R') .AND. (ZONE = XCURZ) .AND. ! EOF()
   SELECT BC
   SEEK XCHKPNT
   IF EOF()
     XDESC = 'Undefined bar code'
   ELSE
     XDESC = DESC
   ENDIF
   L = L + 1
   IF L > LMAX
     XPG    = XPG + 1
     CHNGPAGE('NORMHEAD')
   ENDIF
   SELECT RR
   @ L,8 SAY XDESC
   @ L,28 SAY XCHKPNT
   @ L,41 SAY TIME
   SKIP
   XCHKPNT  = LOGDATA
   ISEXCEPT = .F.
   DO WHILE (LEN(TRIM(XCHKPNT)) = 2) .AND. (RCNUM = XTOUR) .AND. (TYPE = 'R') .AND. (ZONE = XCURZ) .AND. ! EOF()
     ISEXCEPT = .T.
     IF TRIM(LTRIM(XCHKPNT)) = 'ZZ'
       SKIP
       XCHKPNT  = LOGDATA
       SELECT OP
       SEEK XCHKPNT
       IF EOF()
         @ L,65 SAY 'Undefined'
       ELSE
         @ L,65 SAY SUBSTR(COMMENT,1,15)
       ENDIF
     ELSE
       SELECT EC
       SEEK TRIM(XCHKPNT)
       IF EOF()
         @ L,65 SAY 'Undefined'
       ELSE
         @ L,65 SAY SUBSTR(EDESC,1,15)
       ENDIF
     ENDIF
     L = L + 1
     SELECT RR
     SKIP
```

```
     XCHKPNT = LOGDATA
    ENDDO
    IF IBEXCEPT
      L = L - 1
    ENDIF
  ENDDO
  L = L + 2
ENDDO
RETURN
PROCEDURE SUMRDAY
DO WHILE (RDNUM = XTOUR) .AND. (TYPE = 'R') .AND. ! EOF()
  XCHKPNT = LOGDATA
  IF LEN(TRIM(XCHKPNT)) = 2
    IF TRIM(XCHKPNT) = 'ZZ'
      SKIP
    ENDIF
    SKIP
    LOOP
  ENDIF
  XCURZ    = ZONE
  PNTIZONE = 0
  PNTCHK   = 0
  XPER     = 0
  MISSCHK  = 0
  SELECT ZN
  SEEK XCURZ
  IF EOF()
    XZDESC = 'Undefined zone'
  ELSE
    XZDESC   = ZDESC
    PNTIZONE = POINTS
  ENDIF
  IF ! EMPTY(PNTIZONE)
    SELECT RR
    ZNREC = RECNO()
    DO WHILE (RDNUM = XTOUR) .AND. (TYPE = 'R') .AND. (ZONE = XCURZ) .AND. ! EOF()
      XCHKPNT = LOGDATA
      IF LEN(TRIM(XCHKPNT)) = 2
        IF TRIM(XCHKPNT) = 'ZZ'
          SKIP
        ENDIF
        SKIP
        LOOP
      ENDIF
      LZNREC = RECNO()
      GO ZNREC
      DO WHILE (LOGDATA <> XCHKPNT) .AND. (RECNO() <> LZNREC) .AND. ! EOF()
        SKIP
      ENDDO
      IF (RECNO() = LZNREC)
        PNTCHK = PNTCHK + 1
      ELSE
      ENDIF
      GO LZNREC
      SKIP
    ENDDO
    XPER = INT(PNTCHK/PNTIZONE*100)
    GO ZNREC
    DO WHILE (RDNUM = XTOUR) .AND. (TYPE = 'R') .AND. (ZONE = XCURZ) .AND. ! EOF()
      SKIP
    ENDDO
    LZNREC = RECNO()
```

```
    SCRNMISS(0,'RR')
  ENDIF
  SELECT RR
  DO WHILE (RONUM = XTOUR) .AND. (TYPE = 'R') .AND. (ZONE = XCURZ) .AND. ! EOF()
    SKIP
  ENDDO
  @ L,0 SAY XCURZ
  @ L,8 SAY XZDESC
  @ L,47 SAY PNTIZONE PICTURE '9999'
  @ L,56 SAY PNTCHK PICTURE '9999'
  @ L,63 SAY XPER PICTURE '9999'
  @ L,67 SAY '%'
  @ L,76 SAY MISSCHK PICTURE '9999'
  L = L + 1
  IF L > LMAX
    XPG    = XPG + 1
    CHNGPAGE('NORMHEAD')
  ENDIF
ENDDO
SELECT BC
SET ORDER TO 2
GO TOP
PNTCHK    = 0
XPER      = 0
DO WHILE ! EOF()
  XCURZ     = ZNUM
  PNTIZONE = 0
  MISSCHK  = 0
  SELECT RR
  SEEK XTOUR+'R'+XCURZ
  IF EOF()
    SELECT ZN
    SEEK XCURZ
    IF EOF()
      XZDESC = 'Undefined zone'
    ELSE
      XZDESC   = SDESC
      PNTIZONE = POINTS
    ENDIF
    SELECT BC
    DO WHILE (ZNUM = XCURZ) .AND. ! EOF()
      IF MUSTCHECK = 'Y'
        MISSCHK = MISSCHK + 1
      ENDIF
      SKIP
    ENDDO
    @ L,0 SAY XCURZ
    @ L,8 SAY XZDESC
    @ L,47 SAY PNTIZONE PICTURE '9999'
    @ L,56 SAY PNTCHK PICTURE '9999'
    @ L,63 SAY XPER PICTURE '9999'
    @ L,67 SAY '%'
    @ L,76 SAY MISSCHK PICTURE '9999'
    L = L + 1
    IF L > LMAX
      XPG    = XPG + 1
      CHNGPAGE('NORMHEAD')
    ENDIF
  ELSE
    SELECT BC
    DO WHILE (ZNUM = XCURZ) .AND. ! EOF()
```

```
    ENDIF
   ENDDO
  ENDIF
ENDDO
SELECT B2
SET ORDER TO 1
SELECT R4
RETURN
* PNTERR.PRE
* COPYRIGHT 1989, 1988 COMPUTER SYSTEMS DESIGN, INC.

FUNCTION print_error
PARAM name, line
SET DEVICE TO SCREEN
SAVE SCREEN TO _SCR1
SET MESSAGE TO 15 CENTER
_SPNT_CHOICE = 1
SET COLOR TO &HILIT
@ 7,28 CLEAR TO 16,49
SET COLOR TO &BLUELIT
@ 7,28 TO 12,49 DOUBLE
SET COLOR TO &HILIT
@ 7,34 SAY 'PARALLEL'
@ 8,33 SAY 'Printer Error'
@ 9,28 SAY CHR(199)+REPLICATE(CHR(196),20)+CHR(182)
@ 10,30 PROMPT 'A  Retry Printing ' MESSAGE 'Set printer correctly and try again.'
@ 11,30 PROMPT 'B  Cancel Printing' MESSAGE 'Cancel printing and return to program.'
SET INTENSITY ON
MENU TO _SPNT_CHOICE
SET INTENSITY OFF
IF _SPNT_CHOICE = 2
  RESTORE SCREEN FROM _SCR1
  SET COLOR TO &HILIT
  BREAK
ENDIF
SET DEVICE TO PRINT
RESTORE SCREEN FROM _SCR1
SET COLOR TO &HILIT
RETURN .T.
* FUNCLIB.PRE
* COPYRIGHT 1989, 1988 COMPUTER SYSTEMS DESIGN, INC.

FUNCTION CETIME
PARAMETER FTNT,FMAT,FT1,FD1,FT2,FD2
IF FTNT < 0
  FTNT = 60*(VAL(FT2)-VAL(FT1))+VAL(SUBSTR(FT2,4))-VAL(SUBSTR(FT1,4))
  FTNT = 1440*(FD2-FD1)+FTNT
ENDIF
IF FMAT = 0
  RETURN FTNT
ENDIF
GHH = INT(FTNT/60)
IF GHH > 99
  STORE '99' TO GHH,GMM
ELSE
  GHH = SUBSTR(STR(GHH+100,3),2)
  GMM = INT(FTNT%60)
  GMM = SUBSTR(STR(GMM+100,3),2)
ENDIF
IF FMAT = 1
  RETURN GHH+':'+GMM
```

```
ENDIF
RETURN [illegible]
FUNCTION OKZONE
PARAMETERS F0,F1
IF INKEY()=255
  RETURN .T.
ENDIF
IF LASTKEY() = 5
  IF F1 = '1'
    XZNUM = SPACE(6)
    @ 12,36 SAY XZNUM
    RETURN .T.
  ELSE
    RETURN .F.
  ENDIF
ENDIF
IF F1='2'
  IF AT('**',XZDESC)<>0 .OR. (AT('ALL ZONES',UPPER(XZDESC))<>0.AND.AT('**',XZNUM)<>0)
    XZDESC='ALL ZONES'+SPACE(6)
    XZNUM='**
    @ 11,36 SAY XZDESC
    KEYBOARD XZNUM+CHR(13)+CHR(255)
    RETURN .T.
  ENDIF
ENDIF
IF F1='1'
  IF AT('**',XZDESC)<>0 .OR. (AT('ALL ZONES',UPPER(XZDESC))<>0.AND.AT('**',XZNUM)<>0)
    XZDESC='ALL ZONES'+SPACE(6)
  - XZNUM='**
    @ 11,36 SAY XZDESC
    @ 12,36 SAY XZNUM
    RETURN .T.
  ENDIF
ENDIF
IF EMPTY(F0)
  IF F1='2'
    XZDESC = SPACE(15)
    @ 11,36 SAY SPACE(15)
    RETURN .T.
  ELSE
    IF EMPTY(XZDESC)
      ERRMESS(19,'Missing zone number.')
      MESS(19,'F2 to display zones. ESC to exit.')
      RETURN .F.
    ELSE
      SELECT ZN
      SET ORDER TO 1
      SEEK XZNUM
      XZDESC = SDESC
      @ 11,36 SAY SDESC
      RETURN .T.
    ENDIF
  ENDIF
ENDIF
IF F1 = '1'
  F0 = SUBSTR(LTRIM(F0)+SPACE(6),1,6)
  XZNUM = F0
  @ 12,36 SAY F0
ELSE
  F0 = SUBSTR(LTRIM(F0)+SPACE(15),1,15)
  XZDESC = F0
```

```
  @ 11,36 SAY F0
ENDIF
SELECT ZN
SET ORDER TO &F1
IF XWINDREC = 0
  SEEK UPPER(F0)
  IF F1 = '2' .AND. ! EMPTY(XZNUM) .AND. ! EOF()
    DO WHILE UPPER(F0) = UPPER(SDESC) .AND. ZNUM <> XZNUM .AND. !EOF()
      SKIP
    ENDDO
    IF UPPER(F0)<>UPPER(SDESC) .OR. EOF()
      SEEK UPPER(F0)
    ENDIF
  ENDIF
ELSE
  GO XWINDREC
  XWINDREC = 0
ENDIF
IF EOF()
  IF F1='1'
    ERRMESS(19,'Invalid zone number.')
  ELSE
    ERRMESS(19,'Invalid zone name.')
  ENDIF
  MESS(19,'F2 to display ZONES.  ESC to exit.')
  RETURN .F.
ENDIF
XZNUM =ZNUM
XZDESC=SDESC
@ 11,36 SAY SDESC
@ 12,36 SAY ZNUM
IF F1='2'
  KEYBOARD ZNUM+CHR(13)+CHR(255)
ENDIF
RETURN .T.
FUNCTION OKGUARD
PARAMETERS F0,F1
IF INKEY() = 255
  RETURN .T.
ENDIF
IF LASTKEY() = 5
  IF F1 = '1'
    XGRDNUM = SPACE(6)
    @ 13,36 SAY XGRDNUM
    RETURN .T.
  ELSE
    RETURN .F.
  ENDIF
ENDIF
IF F1='2'
  IF AT('**',XGRDNAME)<>0 .OR. (AT('ALL GUARDS',UPPER(XGRDNAME))<>0.AND.AT('**',XGRDNUM)<>0)
    XGRDNUM='**
    XGRDNAME='ALL GUARDS'+SPACE(14)
    @ 13,36 SAY '**
    @ 12,36 SAY XGRDNAME
    KEYBOARD XGRDNUM+CHR(13)+CHR(255)
    RETURN .T.
  ENDIF
ENDIF
IF F1='1'
  IF AT('**',XGRDNAME)<>0.OR.(AT('ALL GUARDS',UPPER(XGRDNAME))<>0.AND.AT('**',XGRDNUM)<>0)
```

```
    XGRDNUM='**     '
    XGRDNAME='ALL GUARDS'+SPACE(14)
    @ 13,36 SAY '**     '
    @ 12,36 SAY XGRDNAME
    RETURN .T.
  ENDIF
ENDIF
IF EMPTY(F0)
  IF F1='2'
    XGRDNAME = SPACE(24)
    @ 12,36 SAY SPACE(24)
    RETURN .T.
  ELSE
    IF EMPTY(XGRDNAME)
      ERRMESS(19,'Missing Guard ID.  ESC to exit.')
      MESS(19,'F2 to display GUARDS.  ESC to exit.')
      RETURN .F.
    ELSE
      SELECT GN
      SET ORDER TO 2
      SEEK UPPER(XGRDNAME)
      XGRDNUM = GNUM
      RETURN .T.
    ENDIF
  ENDIF
ENDIF
IF F1 = '1'
  F0 = SUBSTR(LTRIM(F0)+SPACE(6),1,6)
  XGRDNUM = F0
  @ 13,36 SAY F0
ELSE
  F0 = SUBSTR(LTRIM(F0)+SPACE(24),1,24)
  XGRDNAME = F0
  @ 12,36 SAY F0
ENDIF
SELECT GN
SET ORDER TO &F1
IF XWINDREC = 0
  SEEK UPPER(F0)
  IF F1 = '2' .AND. ! EMPTY(XGRDNUM) .AND. ! EOF()
    DO WHILE UPPER(F0) = UPPER(GNAME) .AND. GNUM <> XGRDNUM .AND. !EOF()
      SKIP
    ENDDO
    IF UPPER(F0)<>UPPER(GNAME) .OR. EOF()
      SEEK UPPER(F0)
    ENDIF
  ENDIF
ELSE
  GO XWINDREC
  XWINDREC = 0
ENDIF
IF EOF()
  IF F1='1'
    ERRMESS(19,'Invalid guard number.')
  ELSE
    ERRMESS(19,'Invalid guard name.')
  ENDIF
  MESS(19,'F2 to display GUARDS.  ESC to exit.')
  RETURN .F.
ENDIF
XGRDNUM = GNUM
```

```
XBRDNAME = BNAME
@ 12,36 SAY BNAME
@ 13,36 SAY BNUM
IF F1='2'
  KEYBOARD XBRDNUM+CHR(13)+CHR(255)
ENDIF
RETURN .T.
FUNCTION OKRDESC
PARAMETERS F0,F1
IF F1 = '1' .AND. INKEY() = 255
  RETURN .T.
ENDIF
IF LASTKEY() = 5
  IF F1 = '1'
    XRNUM=SPACE(6)
    @ 12,36 SAY XRNUM
    RETURN .T.
  ELSE
    RETURN .F.
  ENDIF
ENDIF
IF EMPTY(F0)
  IF F1='2'
    XRDESC = SPACE(20)
    @ 11,36 SAY XRDESC
    RETURN .T.
  ELSE
    IF EMPTY(XRNUM)
      ERRMESS(14,'Missing route number.')
      MESS(19,'F2 to display ROUTES.  ESC to exit.')
      RETURN .F.
    ELSE
      SELECT RTS
      SET ORDER TO 1
      SEEK XRNUM
      XRDESC = DESC
      @ 11,36 SAY XRDESC
      RETURN .T.
    ENDIF
  ENDIF
ENDIF
IF (F1='2') .AND. ('**  $ F0)
  XRDESC='ALL ROUTES'+SPACE(10)
  XRNUM='**    '
  @ 11,36 SAY XRDESC
  KEYBOARD XRNUM+CHR(13)+CHR(255)
  RETURN .T.
ENDIF
IF F1 = '1'
  F0 = SUBSTR(LTRIM(F0)+SPACE(6),1,6)
  XRNUM = F0
  @ 12,36 SAY F0
ELSE
  F0 = SUBSTR(LTRIM(F0)+SPACE(20),1,20)
  XRDESC = F0
  @ 11,36 SAY F0
ENDIF
SELECT RTS
SET ORDER TO &F1
IF X*INDREC = 0
  SEEK UPPER(F0)
  IF F1 = '2' .AND. ! EMPTY(XRNUM) .AND. ! EOF()
```

```
    DO WHILE UPPER(F0) = UPPER(DESC) .AND. RNUM <> XRNUM .AND. !EOF()
      SKIP
    ENDDO
    IF UPPER(F0)<>UPPER(DESC) .OR. EOF()
      SEEK UPPER(F0)
    ENDIF
  ENDIF
ELSE
  GO XWINDREC
  XWINDREC = 0
ENDIF
IF EOF()
  IF F1='1'
    ERRMESS(19,'Invalid route number.')
  ELSE
    ERRMESS(19,'Invalid route name.')
  ENDIF
  MESS(19,'F2 to display ROUTES.  ESC to exit.')
  RETURN .F.
ENDIF
XRNUM = RNUM
XRDESC=DESC
IF F1='1'
  @ 11,36 SAY XRDESC
ELSE
  @ 11,36 SAY XRDESC
  KEYBOARD XRNUM+CHR(13)+CHR(255)
ENDIF
RETURN .T.
FUNCTION OKICODE
PARAMETER F0
IF EMPTY(XICODE)
  @ 12,55 SAY SPACE(25)
  MESS(19,'F2 to display INCIDENT CODES.  ESC to exit.')
  RETURN .F.
ENDIF
IF '**' $ XICODE
  @ 12,55 SAY SPACE(25)
  SET COLOR TO &LOLIT
  @ 12,55 SAY 'ALL INCIDENT CODES'
  SET COLOR TO &HILIT
  RETURN .T.
ENDIF
IF LEN(LTRIM(TRIM(XICODE)))=1
  XICODE='0'+LTRIM(TRIM(UPPER(XICODE)))
  @ 12,43 SAY XICODE
ENDIF
SELECT EX
SEEK XICODE
IF EOF()
  CLR(19)
  ERRMESS(19,'Incident code not found.')
  @ 12,55 SAY SPACE(25)
  MESS(19,'F2 to display INCIDENT CODES.  ESC to exit.')
  RETURN .F.
ENDIF
SET COLOR TO &LOLIT
IF LEN(TRIM(EDESC))>=26
  @ 12,55 SAY SUBSTR(EDESC,1,25)
ELSE
```

```
  @ 12.55 SAY SPACE(25)
  @ 12,55 SAY EDESC
ENDIF
SET COLOR TO &HILIT
RETURN .T.
FUNCTION OKROUT
PARAMETER RO
IF EMPTY(RO)
  RETURN .F.
ENDIF
IF LASTKEY() = 27
  RETURN .F.
ENDIF
IF ('ROAM' $ RO) .OR. ('**' $ RO)
  ?? CHR(7)
  MESG(24,'"ROAM" and "**" are reserved route names and may not be used.')
  INKEY(2)
  MESG(24,'F1 Help    F2 display ROUTES    ESC exit')
  RETURN .F.
ENDIF
RO = SUBSTR(LTRIM(RO)+SPACE(6),1,6)
@ 1.11 SAY RO
SELECT RTS
SEEK RO
IF EOF()
  RETURN .T.
ENDIF
XNEW=.F.
RETURN .T.
FUNCTION OKZNUM
PARAMETER RPTBOOL
IF TYPE('RPTBOOL') = 'U'
  RPTBOOL = 0
ENDIF
IF LASTKEY() = 27
  RETURN .T.
ENDIF
IF EMPTY(XZNUM)
  IF RPTBOOL=1
    ERRMESG(24,'Invalid zone number.')
    XZNUM = ZONEIFO1
    YDESCR = DESCRIFO1
    MESG(24,'F1 Help    F2 display ZONES    ESC exit')
  ENDIF
  RETURN .F.
ENDIF
IF '**' $ XZNUM
  ERRMESG(24,'"**" is a reserved zone name and may not be used.')
  MESG(24,'F1 Help    F2 display ZONES    ESC exit')
  IF RPTBOOL=1
    XZNUM = ZONEIFO1
    YDESCR = DESCRIFO1
  ENDIF
  RETURN .F.
ENDIF
XZNUM=SUBSTR(LTRIM(XZNUM)+SPACE(6),1,6)
IF RPTBOOL = 0
  @ 1,17 SAY XZNUM
ENDIF
SELECT ZN
SEEK XZNUM
```

```
IF EOF()
  DO CASE
  CASE RPTBOOL = 0
    RETURN .T.
  CASE RPTBOOL = 1
    ERRMESG(24,TRIM(XZNUM)+' is an invalid zone.')
    XZNUM = ZONE[F0]
    YDESCR = DESCR[F0]
    MESG(24,'F1 Help    F2 display ZONES    ESC cancel entry')
    RETURN .F.
  ENDCASE
ENDIF
XNEW=.F.
IF RPTBOOL = 1
  YDESCR = SDESC
ENDIF
RETURN .T.
FUNCTION OKLNUM
PARAMETER ALNUM,PSLEN
IF ALNUM = 0
  RETURN .T.
ENDIF
IF (ALNUM < 0) .OR. (ALNUM > XNE)
  ERRMESG(24,'Invalid line number.')
  RETURN .F.
ENDIF
IF (ALNUM < XPSTOP) .OR. (ALNUM > (XPSTOP+PSLEN))
  ERRMESG(24,'Line number is not on this page.')
  RETURN .F.
ENDIF
RETURN .T.
FUNCTION OKTIME
PARAMETER NTIME
IF LASTKEY()=27
  RETURN .T.
ENDIF
IF AT(' ',NTIME) <> 0
  ERRMESG(19,'Invalid time.')
  MESG(19,'ESC to exit.')
  RETURN .F.
ENDIF
RETURN .T.
FUNCTION OKHISTTIME
PARAMETER F0,F1,F2
IF LASTKEY()=27
  RETURN .T.
ENDIF
IF LASTKEY()=5
  RETURN .T.
ENDIF
IF AT(' ',F0)<>0 .OR. VAL(SUBSTR(F0,1,2))>=24 .OR. VAL(SUBSTR(F0,4,2))>=60
  ERRMESG(19,'Invalid time.')
  DO CASE
  CASE F1=1
    MESG(19,'F2 to display CHECKPOINTS.  ESC to exit.')
  CASE F1=2
    MESG(19,'F2 to display INCIDENT CODES.  ESC to exit.')
  CASE F1=3
    MESG(19,'F2 to d...y GUARDS.  ESC to exit.')
  ENDCASE
  RETURN .F.
```

```
ENDIF
RETURN .T.
FUNCTION OKDATE
PARAMETER ADATE,P2ARM
IF LASTKEY()=27 .OR. LASTKEY()=5
  RETURN .T.
ENDIF
IF EMPTY(ADATE)
  ERRMESS(P2ARM,'Date must not be empty.')
  MESS(P2ARM,'ESC to exit.')

    ERRMESS(24,TRIM(XZNUM)+' is a not a valid zone.')
    XZNUM = ZONE[F0]
    YDESCR = DESCR[F0]
    MESS(24,'F1 Help    F2 display ZONES    ESC cancel entry')
    RETURN .F.
  ENDCASE
ENDIF
XNEW=.F.
IF RPTBOOL = 1
  YDESCR = SDESC
ENDIF
RETURN .T.
FUNCTION OKLNUM
PARAMETER ALNUM,PSLEN
IF ALNUM = 0
  RETURN .T.
ENDIF
IF (ALNUM < 0) .OR. (ALNUM > XNS)
  ERRMESS(24,'Invalid line number.')
  RETURN .F.
ENDIF
IF (ALNUM < XPSTOP) .OR. (ALNUM > (XPSTOP+PSLEN))
  ERRMESS(24,'Line number is not on this page.')
  RETURN .F.
ENDIF
RETURN .T.
FUNCTION OKTIME
PARAMETER NTIME
IF LASTKEY()=27
  RETURN .T.
ENDIF
IF AT(' ',NTIME) <> 0
  ERRMESS(19,'Invalid time.')
  MESS(19,'ESC to exit.')
  RETURN .F.
ENDIF
RETURN .T.
FUNCTION OKHISTTIME
PARAMETER F0,F1,F2
IF LASTKEY()=27
  RETURN .T.
ENDIF
IF LASTKEY()=5
  RETURN .T.
ENDIF
IF AT(' ',F0)<>0 .OR. VAL(SUBSTR(F0,1,2))>=24 .OR. VAL(SUBSTR(F0,4,2))>=60
  ERRMESS(19,'Invalid time.')
  DO CASE
  CASE F1=1
    MESS(19,'F2 to display CHECKPOINTS.  ESC to exit.')
  CASE F1=2
```

```
    MESS(19,'F2 to display INCIDENT CODES.  ESC to exit.')
  CASE F1=3
    MESS(19,'F2 to display GUARDS.  ESC to exit.')
  ENDCASE
  RETURN .F.
ENDIF
RETURN .T.
FUNCTION OKDATE
PARAMETER ADATE,P2ARM
IF LASTKEY()=27 .OR. LASTKEY()=5
  RETURN .T.
ENDIF
IF EMPTY(ADATE)
  ERRMESS(P2ARM,'Date must not be empty.')
  MESS(P2ARM,'ESC to exit.')
  RETURN .F.
ENDIF
RETURN .T.
FUNCTION OKGNAME
IF EMPTY(YGRNAME)
  ERRMESS(24,'Invalid guard name.')
  YGRNAME = GRNAME[F0]
  MESS(24,'ESC to cancel entry.')
  RETURN .F.
ENDIF
IF '**' $ YGRNAME
  ERRMESS(24,'"**" is a reserved guard name and may not be used.')
  YGRNAME = GRNAME[F0]
  MESS(24,'ESC to cancel entry.')
  RETURN .F.
ENDIF
RETURN .T.
FUNCTION OKNEWGUARD
IF EMPTY(YGRD)
  CLR(24)
  ERRMESS(24,'Invalid guard number.')
  MESS(24,'ESC to cancel entry.')
  RETURN .F.
ENDIF
IF '**' $ YGRD
  ERRMESS(24,'"**" is a reserved guard name and may not be used.')
  YGRD = GRD[F0]
  YGRNAME = GRNAME[F0]
  MESS(24,'ESC to cancel entry.')
  RETURN .F.
ENDIF
XXI = 1
YGRD = SUBSTR(LTRIM(YGRD)+SPACE(6),1,6)
DO WHILE (XXI <= XNG)
  IF XXI = F0
    XXI = XXI + 1
    LOOP
  ENDIF
  IF YGRD = GRD[XXI] .AND. STAT[XXI]
    ERRMESS(24,'Duplicate guard number.')
    YGRD = GRD[F0]
    YGRNAME = GRNAME[F0]
    MESS(24,'ESC to cancel entry.')
    RETURN .F.
  ENDIF
  XXI = XXI + 1
```

```
ENDDO
RETURN .T.
FUNCTION PKDATE
PARAMETERS F0
XDD=CHR(DAY(F0)+32)
XMM=CHR(MONTH(F0)+32)
XYY=YEAR(F0)%100
XYY=CHR(XYY+IIF(XYY>=82,-50,50))
RETURN XYY+XMM+XDD
FUNCTION UPKDATE
PARAMETERS F0
XYY=SUBSTR(STR(ASC(F0)-150,3),2)
XMM=SUBSTR(STR(ASC(SUBSTR(F0,2))-66,3),2)
XDD=SUBSTR(STR(ASC(SUBSTR(F0,3))+68,3),2)
RETURN XMM+'/'+XDD+'/'+XYY
FUNCTION PKTIME
PARAMETERS F0
XHH=CHR(VAL(F0)+32)
XMM=CHR(VAL(SUBSTR(F0,4))+32)
RETURN XHH+XMM
FUNCTION UPKTIME
PARAMETERS F0
XHH=SUBSTR(STR(ASC(F0)-66,3),2)
XMM=SUBSTR(STR(ASC(SUBSTR(F0,2))+68,3),2)
IF XHH='25'
  RETURN ''
ENDIF
RETURN XHH+':'+XMM
FUNCTION UPKTITLE
PARAMETERS F0
XT=''
FOR N=35 TO 1 STEP -1
  XT=XT+CHR(122-ASC(SUBSTR(F0,N)))
NEXT
RETURN XT
FUNCTION MESSWAIT
PARAMETERS F0,F1
MESS(F0,F1)
MESS(F0+1,'Press any key to continue...')
DO WHILE INKEY() = 0
ENDDO
RETURN .T.
FUNCTION SORP
CLR(10)
@ 12,23 SAY 'Report to (S)creen or (P)rinter' GET YPRINTIT PICTURE '!' VALID YPRINTIT $ 'SP'
MESS(16,'ESC to exit.')
READ
IF LASTKEY() = 27
  RETURN .F.
ENDIF
IF YPRINTIT = 'S'
  YPRINTIT = .F.
  LMAX = 22
  CLEAR
ELSE
  YPRINTIT = .T.
  LMAX =58
  CLR(12)
  MESS(12,'Please pre[illegible] printer for printing.')
  MESS(14,'ESC to exit. Press any other key to begin printing.')
  DO WHILE INKEY()=0
```

```
  ENDDO
  IF LASTKEY()=27
    RETURN .F.
  ENDIF
  CLR(12)
  MESG(12,'Sending output to printer..')
  SET DEVICE TO PRINT
ENDIF
RETURN.T.
FUNCTION CHNGPAGE
PARAMETER HEADPROG
IF YPRINTIT
  EJECT
ELSE
  @ 24, 0
  @ 24,15 SAY 'ESC to exit.  Press any other key to continue...'
  DO WHILE INKEY() = 0
  ENDDO
  IF LASTKEY() = 27
    RETURN .F.
  ENDIF
  MESG(24,'Please wait while processing files...')
ENDIF
IF !EMPTY(HEADPROG)
  DO &HEADPROG
  DO &HEADPROG
ENDIF
RETURN .T.
PROCEDURE GENWIND
PARAMETER DUM1,DUM2,I_VAR
IF TYPE(I_VAR) = 'C'
  INPVAR = UPPER(TRIM(LTRIM(&I_VAR)))
ELSE
  RETURN
ENDIF
SET KEY -1
SET CURSOR OFF
SAVE SCREEN TO SCR1
@ 24,0
YREADVAR = READVAR()
XWINDREC = 0
XREC = 0

DO CASE
CASE YREADVAR = 'XZNUM'
  IF TYPE('COLF') = 'U'
    COLF = 0
  ENDIF
  SELECT ZN
  SET ORDER TO 1
  DO DRAWINDOW WITH 6,2+COLF,14,'Zone window','ZNUM','Number','SDESC','Name'
CASE YREADVAR = 'XZDESC'
  SELECT ZN
  SET ORDER TO 2
  DO DRAWINDOW WITH 5,2,14,'Zone Window','SDESC','Name','ZNUM','Number'
CASE YREADVAR = 'XRNUM'
  SELECT RTE
  DO DRAWINDOW WITH 5,2,14,'Route window','RNUM','Number','DESC','Name'
CASE YREADVAR = 'XRDESC'
  SELECT RTE
  SET ORDER TO 2
  DO DRAWINDOW WITH 5,2,14,'Route Window','DESC','Name','RNUM','Number'
```

```
CASE YREADVAR = 'XGRDNUM'
  SELECT GN
  SET ORDER TO 1
  DO DRAWINDOW WITH 5,2,14,'Guard Window','GNUM','ID','GNAME','Name'
CASE YREADVAR = 'XGRDNAME'
  SELECT GN
  SET ORDER TO 2
  DO DRAWINDOW WITH 5,2,14,'Guard Window','GNAME','Name','GNUM','ID'
CASE YREADVAR = 'XBARCODE'
  SELECT BC
  SET ORDER TO 1
  DO DRAWINDOW WITH 5,2,14,'Checkpoint Window','BARCODE','Bar Code','DESC','Checkpoint','ZNUM','Zone'
CASE YREADVAR = 'YB1'
  SELECT BC
  XBCORD=INDEXORD()
  SET ORDER TO 3
  DO DRAWINDOW WITH 5,2,14,'Checkpoint Window','BARCODE','Bar Code','DESC','Checkpoint','ZNUM','Zone'
  SET ORDER TO XBCORD
CASE YREADVAR = 'XCHKDESC'
  SELECT BC
  SET ORDER TO 2
  DO DRAWINDOW WITH 5,2,14,'Checkpoint Window','DESC','Checkpoint','ZNUM','Zone','BARCODE','Bar Code'
CASE YREADVAR = 'XICODE'
  SELECT EX
  DO DRAWINDOW WITH 5,2,14,'Incident Window','ECODE','Code','EDESC','Incident'
ENDCASE
IF LASTKEY() <> 27
  XWINDREC = RECNO()
ENDIF
GO XREC
RESTORE SCREEN FROM SCR1
SET CURSOR ON
SET KEY -1 TO GENWIND
RETURN
PROCEDURE DRAWINDOW
PARAMETER LTR,LTC,RWTOT,HEDR0,FLD1,HEDR1,FLD2,HEDR2,FLD3,HEDR3
XREC = RECNO()
GO TOP
IF EOF()
  RETURN
ENDIF
XTOPREC = RECNO()
LTC = LTC + 2
RWTOT = RWTOT - 1
DUM_COUNT = LFT_SP(HEDR1,FLD1)
IF LEN(HEDR1) > LEN(&FLD1)
  CL_FLD1 = LTC+DUM_COUNT
ELSE
  CL_FLD1 = LTC
  IF INT(DUM_COUNT) <> DUM_COUNT
    DUM_COUNT = DUM_COUNT+1
  ENDIF
  HEDR1 = SPACE(DUM_COUNT)+HEDR1+SPACE(DUM_COUNT)
ENDIF
CLTOT = LEN(HEDR1)+2
IF TYPE('FLD2') <> 'U'
  DUM_COUNT = LFT_SP(HEDR2,FLD2)
  IF LEN(HEDR2) > LEN(&FLD2)
    CL_FLD2 = LTC+CLTOT+DUM_COUNT
  ELSE
    CL_FLD2 = LTC+CLTOT
    IF INT(DUM_COUNT) <> DUM_COUNT
```

```
      DUM_COUNT = DUM_COUNT+1
    ENDIF
    HEDR2 = SPACE(DUM_COUNT)+HEDR2+SPACE(DUM_COUNT)
  ENDIF
  CLTOT = CLTOT + LEN(HEDR2) + 2
ENDIF
IF TYPE('FLD3') <> 'U'
  DUM_COUNT = LFT_SP(HEDR3,FLD3)
  IF LEN(HEDR3) > LEN(&FLD3)
    CL_FLD3 = LTC+CLTOT+DUM_COUNT
  ELSE
    CL_FLD3 = LTC+CLTOT
    IF INT(DUM_COUNT) <> DUM_COUNT
      DUM_COUNT = DUM_COUNT+1
    ENDIF
    HEDR3 = SPACE(DUM_COUNT)+HEDR3+SPACE(DUM_COUNT)
  ENDIF
  CLTOT = CLTOT + LEN(HEDR3) + 2
ENDIF
RBR = LTR+RWTOT+1
RBC = CLTOT+LTC-1
LTR = LTR - 2
LTC = LTC - 2
SET COLOR TO &F2WIND
@ LTR,LTC CLEAR TO RBR,RBC
SET COLOR TO &BLNKWIND
@ LTR,LTC TO RBR,RBC DOUBLE
LTC = LTC + 2
IF ISCOLOR()
  SET COLOR TO &BLNKWIND
ELSE
  SET COLOR TO &F2INVRS
ENDIF
@ LTR,LTC+(CLTOT-LEN(HEDR0))/2-1 SAY ' '+HEDR0+' '
LTR = LTR + 1
SET COLOR TO &SCORELIT
@ LTR,LTC SAY HEDR1
IF TYPE('HEDR2') <> 'U'
  @ LTR,COL()+2 SAY HEDR2
ENDIF
IF TYPE('HEDR3') <> 'U'
  @ LTR,COL()+2 SAY HEDR3
ENDIF
@ 23,0
SET COLOR TO &INVRS
MESG(23,'PgUp, PgDn, '+CHR(24)+' and '+CHR(25)+' to move cursor. ENTER to select. ESC to cancel.')
SET COLOR TO &F2WIND
LTR = LTR + 1
RBR = RBR - 1
RBC = RBC - 1
SET SOFTSEEK ON
SEEK INPVAR
SET SOFTSEEK OFF
IF EOF()
  SKIP -1
ENDIF
XREC1 = RECNO()
XCURTOPREC = RECNO()
FILLWIND()
XREC1 = XTOPREC
IF ! EOF()
```

```
XPL = LTR
SET COLOR TO &F2INVRS
DRWLINE()
SET COLOR TO &F2WIND
XLST = 0
DO WHILE XLST <> 27
  XLST = INKEY(0)
  DO CASE
  CASE XLST = 27
    EXIT
  CASE XLST = 13

    KEYBOARD &FLD1+CHR(13)
    EXIT
  CASE XLST = 18

    IF RECNO() = XREC1
      LOOP
    ENDIF
    GO XCURTOPREC
    I = 1
    DO WHILE (I <= RWTOT) .AND. (RECNO() <> XREC1)
      SKIP -1
      I = I + 1
    ENDDO
    FILLWIND()
    SET COLOR TO &F2INVRS
    DRWLINE()
    SET COLOR TO &F2WIND
  CASE XLST = 3

    XCURREC = RECNO()
    GO XCURTOPREC
    I = 1
    DO WHILE (I <= RWTOT) .AND. ! EOF()
      SKIP
      I = I + 1
    ENDDO
    IF EOF()
      SKIP -1
    ENDIF
    FILLWIND()
    SET COLOR TO &F2INVRS
    DRWLINE()
    SET COLOR TO &F2WIND
  CASE XLST = 5

    IF EOF()
      SKIP -1
    ENDIF
    IF RECNO() = XREC1
      LOOP
    ENDIF
    SET COLOR TO &F2WIND
    DRWLINE()
    SKIP -1
    XPL = XPL - 1
    IF XPL < LTR
      FILLWIND()
    ENDIF
    SET COLOR TO &F2INVRS
```

```
    DRWLINE()
    SET COLOR TO &F2WIND
   CASE XLST = 24

    SKIP
    IF EOF()
      SKIP -1
      LOOP
    ENDIF
    SKIP -1
    SET COLOR TO &F2WIND
    DRWLINE()
    SKIP
    XPL = XPL + 1
    IF XPL > RBR
      FILLWIND()
    ENDIF
    SET COLOR TO &F2INVRS
    DRWLINE()
    SET COLOR TO &F2WIND
   ENDCASE
  ENDDO
ENDIF
SET COLOR TO &HILIT
RETURN
FUNCTION DRWLINE
IF TYPE('FLD2') <> 'U'
  @ XPL,CL_FLD2 SAY &FLD2
ENDIF
IF TYPE('FLD3') <> 'U'
  @ XPL,CL_FLD3 SAY &FLD3
ENDIF
@ XPL,CL_FLD1 SAY &FLD1
RETURN .T.
FUNCTION FILLWIND
XCURTOPREC = RECNO()
SET COLOR TO &F2WIND
@ LTR,LTC CLEAR TO RBR,RBC
XPL = LTR
DO WHILE (XPL <= RBR) .AND. ! EOF()


  IF TYPE('FLD2') <> 'U'
   @ XPL,CL_FLD2 SAY &FLD2
  ENDIF
  IF TYPE('FLD3') <> 'U'
   @ XPL,CL_FLD3 SAY &FLD3
  ENDIF
  @ XPL,CL_FLD1 SAY &FLD1
  XPL = XPL + 1
  SKIP
ENDDO
GO XCURTOPREC
XPL = LTR
RETURN .T.
FUNCTION LFT_SP
PARAMETER HEDR_STR,FLD_STR
RETURN(ABS(LEN(HEDR_STR)-LEN(&FLD_STR))/2)
* CSDCOMM.PRG
* COPYRIGHT 1989, 1988 COMPUTER SYSTEMS DESIGN, INC.

FUNCTION SENDSTR
PARAMETERS PT,STRING
PRIVATE P,PORT,TXERR
P=PCOUNT()
```

```
DO CASE
CASE P>=2
  PORT=PT
CASE P=1
  PORT=1
  STRING=PT
ENDCASE
STRING=STRING+CHR(13)
TXERR=TXSTRING(PORT,STRING)
RETURN TXERR
FUNCTION SENDCHR
PARAMETERS PORT,N
PRIVATE TXERR
IF PCOUNT()=1
  N=PORT
  PORT=1
ENDIF
IF (N>=0) .AND. (N<=255)
  TXERR=TXCHAR(PORT,CHR(N))
  RETURN TXERR
ELSE
  RETURN -93
ENDIF
FUNCTION GETSTR
PARAMETERS PORT,T
PRIVATE P,GSTR
P=PCOUNT()
DO CASE
CASE P=1
  T=PORT
  PORT=1
CASE P=0
  PORT=1
  T=1
ENDCASE
GSTR=RXSTRING(PORT,150,13,T,0,0,0)
IF RXSTRINGER()=-95
  GSTR='TIMEOUT'
ENDIF
RETURN GSTR
FUNCTION GETCHR
PARAMETERS PORT,T
PRIVATE P,ST,MT,G
P=PCOUNT()
DO CASE
CASE P=1
  T=PORT
  PORT=1
CASE P=0
  PORT=1
  T=1
ENDCASE
ST=SECONDS()
MT=ST
G=0
DO WHILE (G<=0) .AND. ((MT-ST)<=T)
  G=RXCHAR(PORT)
  MT=SECONDS()
ENDDO
IF G=-91
  G=0
ENDIF
RETURN G
FUNCTION CONNECT
PARAMETERS PORT,T
PRIVATE P,ST,MT,N
P=PCOUNT()
DO CASE
CASE P=1
  T=90000
CASE P=0
  PORT=1
  T=90000
ENDCASE
MESS(22,'ESC to exit')
```

```
RXFLUSH(PORT)
ST=SECONDS()
MT=ST
DO WHILE (SENDCHR(PORT,01)>=0) .AND. (INKEY()<>27) .AND. ((MT-ST)<=7)
  N=GETCHR(PORT,1)
  IF N=12
    RETURN .T.
  ENDIF
  RXFLUSH(PORT)
  MT=SECONDS()
ENDDO
RETURN .F.
FUNCTION CALCHECK
PARAMETERS PACKET
CHECKSUM=0
PL=ASC(SUBSTR(PACKET,3,1))-32
FOR I=1 TO PL
  CHECKSUM=CHECKSUM+ASC(SUBSTR(PACKET,3+I,1))
NEXT
CHECKSUM=CHECKSUM % 96
CHECKSUM=CHECKSUM+32
RETURN CHECKSUM
FUNCTION BUILD_PACKET
PARAMETERS PACKET,PN,PT
PL=LEN(PACKET)+32
PACKET=CHR(PN)+PT+CHR(PL)+PACKET
PACKET=PACKET+CHR(CALCHECK(PACKET))
RETURN PACKET
FUNCTION ACK
PARAMETER PORT,PACKNUM
PRIVATE PT,XPNUM
P=PCOUNT()
DO CASE
CASE P>=2
  PT=PORT
  XPNUM=PACKNUM
CASE P=1
  XPNUM=PORT
  PT=1
ENDCASE
OUTSTR=CHR(XPNUM)+'A'
SENDSTR(PT,OUTSTR)
RETRY=0
RETURN .T.
FUNCTION NAK
PARAMETER PORT,PACKNUM
PRIVATE PT,XPNUM
P=PCOUNT()
DO CASE
CASE P>=2
  PT=PORT
  XPNUM=PACKNUM
CASE P=1
  XPNUM=PORT
  PT=1
ENDCASE
OUTSTR=CHR(XPNUM)+'N'
SENDSTR(PT,OUTSTR)
RETRY=RETRY+1
RETURN .T.
FUNCTION INCPNUM
PARAMETER XPNUM
XPNUM=XPNUM+1
IF XPNUM=128
  XPNUM=32
ENDIF
RETURN XPNUM
FUNCTION SEND_PACKET
PARAMETERS PORT,XPACKET
PRIVATE PT,PACKET
P=PCOUNT()
DO CASE
CASE P>=2
  PT=PORT
  PACKET=XPACKET
```

```
CASE P=1
  PACKET=PORT
  PT=1
ENDCASE
MESS(12,'PACKET '+STR(ASC(SUBSTR(PACKET,1,1))-32,3))
ACKSTR=SUBSTR(PACKET,1,1)+'A'
INSTR='XX'
RETRY=0
DO WHILE (INSTR<>ACKSTR) .AND. (RETRY<=5)
  SENDSTR(PT,PACKET)
  INSTR=GETSTR(PT,2)
  RETRY=RETRY+1
ENDDO
IF INSTR=ACKSTR
  RETURN .T.
ELSE
  RETURN .F.
ENDIF
* CSD.PRG
* COPYRIGHT 1989, 1988 COMPUTER SYSTEMS DESIGN, INC.

FUNCTION HEADER
PARAMETERS MESG,SELECTION
XYDATE=CMONTH(DATE())+' '+STR(DAY(DATE()),2)+', '+STR(YEAR(DATE()),4)
SET COLOR TO &WHILIT
CLR(0)
RES=' '
RPOS=80-LEN(XYDATE)
@ 1,1 SAY UPLEFT
@ 1,HEADPOS SAY HEAD
@ 1,RPOS-1 SAY XYDATE
SET COLOR TO &REDLIT
@ 2,0 SAY SLINE
SET COLOR TO &WHILIT
DO CASE
CASE SELECTION>0
  XBOX=LEN(MS1)
  IF LEN(MS1)>50
    XBOX=LEN(MS1)+8
  ELSE
    XBOX=50
  ENDIF
  SET COLOR TO &HEADLIT
  @ 4,40-.5*XBOX,09+SELECTION,40+.5*XBOX BOX FRAME
  XBAR=CHR(198)+REPLICATE(CHR(205),XBOX-1)+CHR(181)
  @ 6,40-.5*XBOX SAY XBAR
  SET COLOR TO &WHILIT
  @ 5,CENTERP(MESG) SAY MESG
  SET INTEN ON
  SET MESSAGE TO SELECTION+11
  JJ=SELECTION+12
  LPOS=CENTERP(MS1)
  J=0
  DO WHILE J<SELECTION
    J=J+1
    Q=LTRIM(STR(J,2))
    @ J+7,LPOS PROMPT MS&Q MESSAGE CENTERB(MG&Q)
  ENDDO
  MENU TO RES
  SET INTEN OFF
CASE SELECTION=0
  @ 10,CENTERP(MESG) SAY MESG
CASE SELECTION<0 .AND. !EMPTY(MESG)
  XHEAD=LBLOCK+MESG+RBLOCK
  @ 4,CENTERP(XHEAD) SAY XHEAD
ENDCASE
RETURN RES
FUNCTION CENTERB
PARAMETERS STRING
BACK=SPACE(40-.5*LEN(STRING))+STRING
RETURN BACK
FUNCTION CENTERP
PARAMETERS STRING
LPOS = 40 - .5*LEN(STRING)
RETURN LPOS
```

```
FUNCTION ZDIV
PARAMETERS F0,F1
IF F1=0
  F2=0
ELSE
  F2=F0/F1
ENDIF
RETURN F2
FUNCTION TIMER
PARAMETERS XT
XTR=TIME()
XV1=TIME()
XV1=VAL2(SUBSTR(XV1,1,2))*3600+VAL2(SUBSTR(XV1,4,2))*60+VAL2(SUBSTR(XV1,7,2))+XT
DO WHILE .T.
  XV2=TIME()
  XV2=VAL2(SUBSTR(XV2,1,2))*3600+VAL2(SUBSTR(XV2,4,2))*60+VAL2(SUBSTR(XV2,7,2))
  IF XV2>XV1
    EXIT
  ENDIF
ENDDO
RETURN XT
FUNCTION CONFIRM
PARAMETERS F0,F1
P=PCOUNT()
DO CASE
CASE P=1
  F1='Y'
ENDCASE
SET DELIM OFF
XCON=F1
@ F0,0
@ F0,30 SAY 'IF OK, ENTER  Y > ' GET XCON PICTURE 'Y'
READ
IF LASTKEY()=27
  RETURN .F.
ENDIF
@ F0,0
IF XCON='Y'
  RETURN .T.
ENDIF
@ F0,0
RETURN .F.
FUNCTION PRINTCHECK
PARAMETERS F0
SET DELIM OFF
XCON='Y'
@ F0,0
@ F0,25 SAY 'Printer On-Line, ENTER Y > ' GET XCON PICTURE '!'
READ
@ F0,0
IF XCON='Y'
  RETURN .T.
ENDIF
@ F0,0
RETURN .F.
FUNCTION MESS
PARAMETERS F0,F1
SET COLOR TO &HILIT
DO CASE
CASE F0<30
  @ F0,0
  @ F0,40-.5*LEN(F1) SAY F1
CASE F0<300
  SET COLOR TO &LOLIT
  F0=F0/10
  @ F0,0
  @ F0,40-.5*LEN(F1) SAY F1
CASE F0<3000
  SET COLOR TO *.&HILIT
  F0=F0/100
  @ F0,0
  @ F0,40-.5*LEN(F1) SAY F1
ENDCASE
SET COLOR TO &HILIT
RETURN .T.
```

```
FUNCTION ERRMES
PARAMETERS F0,F1
@ F0,0
@ F0,40-.5*LEN(F1) SAY F1
WAIT
@ F0,0
@ F0+1,0
RETURN .T.
FUNCTION CONFCONT
PARAMETERS LINE,MES2
ANS='Y'
X=HEADER(' ',0)
X=MESG(LINE,MES2)
@ LINE+2,21 SAY 'Do you want to continue (Y/N)? ' GET ANS PICTURE '!'
READ
IF ANS='N'
  RETURN (.F.)
ENDIF
RETURN (.T.)
FUNCTION LINE
PARAMETERS F0
F1=REPLICATE(CHR(196),F0)
RETURN F1
FUNCTION LOCKF
PARAMETERS F0
XFIRST=.T.
DO WHILE .NOT. FLOCK()
  IF XFIRST
    X=MESG(24,'PLEASE WAIT. FILE '+F0+' IS IN USE....')
    XFIRST=.F.
  ENDIF
ENDDO
RETURN .T.
FUNCTION VAL2
PARAMETERS F0
PRIVATE LSNUM,POINT,TENS,FLAGP,N,NUM,J
F0=LTRIM(TRIM(F0))
LSNUM=LEN(F0)
POINT=AT('.',F0)
IF POINT=0
  SET DECIMAL TO 0
  TENS=10^(LSNUM-1)
  FLAGP=.F.
ELSE
  SET DECIMAL TO LSNUM-POINT
  TENS=10^(POINT-2)
  FLAGP=.T.
ENDIF
N=0
NUM=0
DO WHILE N<LSNUM
  IF FLAGP
    IF N<>POINT-1
      N=N+1
    ELSE
      N=N+2
    ENDIF
  ELSE
    N=N+1
  ENDIF
  J=ASC(SUBSTR(F0,N,1))-48
  IF J>=0 .AND. J<=9
    NUM=NUM+(ASC(SUBSTR(F0,N,1))-48)*TENS
  ELSE
    NUM=0
    EXIT
  ENDIF
  TENS=TENS/10
ENDDO
RETURN NUM
FUNCTION GETIT
PARAMETERS F0,F1,F2
SET DELIM ON
F2=F2+' '
F3=SPACE(F1)
```

```
@ F0,40-.5*(LEN(F2)+2+F1) SAY F2 GET F3
READ
RETURN F3
FUNCTION CLR
PARAMETERS F0
@ F0,0 CLEAR
RETURN .T.
FUNCTION ERRMESS
PARAMETERS F0,F1
??CHR(7)
@ F0,0
@ F0,40-.5*LEN(F1) SAY F1
INKEY(2.5)
@ F0,0
RETURN .T.
PROCEDURE VBAR
PARAMETER FX,FY,FL
IF FL>0
  XBOT=FX+FL-1
  IF XBOT>22
    XBOT=22
  ENDIF
  FOR FI=FX TO XBOT
    @ FI,FY SAY CHR(179)
  NEXT
ENDIF
RETURN
FUNCTION FUSE
PARAMETERS F0
NETMES=.F.
F4=AT('/',F0)
F1=SUBSTR(F0,1,F4-1)
F0=SUBSTR(F0,F4+1)
F4=AT('/',F0)
IF F4<>0
  F2=SUBSTR(F0,1,F4-1)
  F3=SUBSTR(F0,F4+1)
  F4=AT(',',F3)
  IF F4<>0
    N=10
    DO WHILE .T.
      N=N+1
      F='F'+STR(N,2)
      XF='F'+STR(N+10,2)
      &XF=AT(',',F3)
      &XF=AT(',',F3)
      IF &XF=0
        &F=F3
        &F=F3
        NI=N-10
        EXIT
      ELSE
        &F=SUBSTR(F3,1,&XF-1)
      ENDIF
      F3=SUBSTR(F3,&XF+1)
    ENDDO
  ELSE
    NI=1
  ENDIF
ELSE
  F2=SUBSTR(F0,1)
  F3='0'
  NI=0
ENDIF
DO WHILE .T.
  IF SUBSTR(F1,1,1)<>'X'
    USE &F1 ALIAS &F2
  ELSE
    F7=SUBSTR(F1,2)
    USE &F7 EXCLUSIVE ALIAS &F2
  ENDIF
  IF NETERR()
    IF .NOT. NETMES
      MESS(24,'FILE '+F0+' IS IN USE')
      NETMES=.T.
```

```
    ENDIF
    DUMMY1 = SECONDS()
    DO WHILE DUMMY1 + 5 > SECONDS()
      DUMMY2 = INKEY()
    ENDDO
  ELSE
    EXIT
  ENDIF
ENDDO
DO CASE
CASE NI=1
  SET INDEX TO &F1
CASE NI=2
  SET INDEX TO &F11,&F12
CASE NI=3
  SET INDEX TO &F11.&F12.&F13
CASE NI=4
  SET INDEX TO &F11,&F12,&F13,&F14
CASE NI=5
  SET INDEX TO &F11,&F12,&F13,&F14,&F15
CASE NI=6
  SET INDEX TO &F11,&F12,&F13,&F14,&F15,&F16
CASE NI=7
  SET INDEX TO &F11,&F12,&F13,&F14,&F15,&F16,&F17
CASE NI=8
  SET INDEX TO &F11,&F12,&F13,&F14,&F15,&F16,&F17,&F18
ENDCASE
@ 24,0
RETURN .T.
FUNCTION NULL_FUNC
RETURN .T.
* TWMAINT.PRG
* COPYRIGHT 1989, 1998 COMPUTER SYSTEMS DESIGN, INC.


SET SOFTSEEK OFF
SET CONFIRM ON
SET EXCLU OFF
SET BELL OFF
SET INTEN OFF
SET TALK OFF
SET DELET ON
SET SAFET OFF
SET DELIM TO '[]'
SET WRAP ON
SET EXACT ON
CLOSE DATABASES
SLINE=REPLICATE(CHR(196),80)
DLINE=REPLICATE(CHR(205),80)
LINE=SUBSTR(SLINE,1,60)
FRAME=CHR(213)+CHR(205)+CHR(184)+CHR(179)+CHR(217)+CHR(196)+CHR(192)+CHR(179)
LBLOCK=REPLICATE(CHR(205),5)+' '
RBLOCK=' '+REPLICATE(CHR(205),5)
XLEFT=CDOW(DATE())
UPLEFT='TourWatch Manager'
SETCANCEL(.F.)
SET KEY 3
SET KEY 18 TO NULL_FUNC
L=0
DATE=CMONTH(DATE())+' '+STR(DAY(DATE()),2)+', '+STR(YEAR(DATE()),4)
XPIC='99,999,999.99'
HLPVAR = 0
IF ISCOLOR()
  INVRS    = '+GR+/B'
  LOLIT    = '+BG/B,+W/BG,,,+GR+/B'
  HILIT    = '+GR+/B,+W/BG,,,+GR+/B'
  SCORELIT = '+BG/N,+W/BG,,,+GR+/B'
  PASSWD   = '+GR+/B,B/B,,,B/B'
  PASSWND  = '+BG/B'
  REDLIT   = '+R/B'
  BLUELIT  = '+BG/B'
  HMENU    = '+GR+/B,+W/BG,,,GR+/B'
  BLNKWIND = '+W/N'
  F2WIND   = 'W/N,'
  F2INVRS  = '+GR+/N'
```

```
  HEADLIT  = 'BG/B,+W/BG,,,+BG/B'
ELSE
  INVRS    = 'N/W'
  HILIT    = '+W/N'
  LOLIT    = 'W/N'
  SCORELIT = 'U'
  PASSWND  = '+W/N'
  PASSWD   = '+W/N,X,,,X'
  HMENU    = '+W/N'
  F2WIND   = '+W/N'
  F2INVRS  = 'N/W'
  REDLIT   = '+W/N'
  BLUELIT  = 'W/N'
  BLNKWIND = '+W/N'
  HEADLIT  = 'W/N'
ENDIF
SET COLOR TO &HILIT
SET CURSOR ON
STA='1'
SET MESSAGE TO 14
FUSE('CONFIG/CO')
HEAD=TRIM(UPKTITLE(CBUFFER))
KEYBOARD ""
XTMCHK1=SPACE(6)
IF TMCHK1<>SPACE(6)
  SET EXACT ON
  CLR(0)
  SET COLOR TO &PASSWND
  @ 9,21 TO 11,59
  SET COLOR TO &PASSWD
  SET DELIM ON
  SET INTEN ON
  @ 10,23 SAY 'TourWatch Manager Password' GET XTMCHK1 PICTURE '@!'
  READ
  SET COLOR TO
  SET COLOR TO &HILIT
  IF LASTKEY()=27
    CLOSE DATABASES
    SET COLOR TO +W/N
    CLEAR
    QUIT
  ELSE
    IF RTRIM(XTMCHK1)=='1409' .AND. LASTKEY()=3
      ERRMESG(20,'*** Do You Want To Play A Game ? ***')
    ELSE
      IF (XTMCHK1<>TMCHK1)
        MESG(12,'Access to the TourWatch Manager is denied.')
        INKEY(5)
        CLOSE DATABASES
        SET COLOR TO +W/N
        CLEAR
        QUIT
      ENDIF
    ENDIF
  ENDIF
ENDIF
SET KEY 3 TO NULL_FUNC
CLEAR
SHEAD=HEAD
HEADPOS=CENTERP(TRIM(UPKTITLE(CBUFFER)))
CLEAR
USE
DO WHILE .T.
  SET DELIM ON
  CLOSE DATABASES
  MS1='A  SYSTEM CONFIGURATION                  '
  MS2='B  TourWatch Manager PASSWORD MAINTENANCE'
  MS3='C  Micro-Wand PASSWORD MAINTENANCE       '
  MS4='D  PACK AND REINDEX FILES                '
  MS5='E  RECOVER FROM PROCESSING ERROR         '
  MS6='F  DELETE HISTORY                        '
  MS7='X  EXIT System Maintenance               '
  MG1='Change Communication Port, Detail Report Printing switch'
  MG2='Change TourWatch Manager Password'
  MG3='Change Micro-Wand Password'
```

```
 M64='Internal System File Maintenance'
 M65='Re-build data files if there were errors in PROCESS COMPLETED TOURS'
 M66='Delete History Records Prior to User Defined Date'
 M67='Exit Tourwatch Manager System Maintenance Program and return to DOS'
 SET COLOR TO &HILIT
 RES1=HEADER('SYSTEM MAINTENANCE MENU',7)
 SET COLOR TO &HILIT
 CLEAR
 DO CASE
 CASE RES1=1
   DO SYSCON
 CASE RES1=2 .OR. RES1=3
   DO PASSWORD
 CASE RES1=4
   DO RNDXPROG
 CASE RES1=5
   DO DISASTER
 CASE RES1=6
   DO HISTDEL
 CASE RES1=7
   SET CURSOR ON
   CLOSE DATABASES
   SET COLOR TO +W/N
   XX=0
   FOR YY=12 TO 0 STEP -1
     @ YY,0 CLEAR TO YY+XX,80
     FOR LITTLEWT=1 TO 17
     NEXT LITTLEWT
     XX=XX+2
   NEXT YY
   QUIT
 ENDCASE
 CLEAR
 CLOSE DATABASES
ENDDO
RETURN

* SYSCON.PRG
* COPYRIGHT 1989, 1988 COMPUTER SYSTEMS DESIGN, INC.

SET COLOR TO &HILIT
CLOSE DATABASES
HEADER('SYSTEM CONFIGURATION',-1)
FUSE('CONFIG/CO')
XCOMPORT=COMPORT
XPDETAIL=PDETAIL
DO WHILE .T.
  CLR(10)
  MESS(15,'ESC to exit.')
  SET DELIM ON
  @ 10,14 SAY '              COMMUNICATIONS PORT (1/2)' GET XCOMPORT PICTURE '9' VALID XCOMPORT$'12'
  @ 11,14 SAY 'PRINT DETAIL/SUMMARY ROUTE REPORTS? (Y/N)' GET XPDETAIL PICTURE 'Y'
  READ
  IF LASTKEY()=27
    EXIT
  ENDIF
  IF CONFIRM(15)
    LOCKF('Configuration')
    REPLACE COMPORT WITH XCOMPORT
    REPLACE PDETAIL WITH XPDETAIL
    UNLOCK
    EXIT
  ENDIF
ENDDO
CLOSE DATABASES
RETURN

* PASSWORD.PRG
* COPYRIGHT 1989, 1988 COMPUTER SYSTEMS DESIGN, INC.

HEADER('PASSWORD MAINTENANCE',-1)
FUSE('CONFIG/CO')
DO CASE
CASE RES1=2
  XCHK=TMCHK1
  XREF='TMCHK1'
```

```
  XPASSTYP='TourWatch Manager '
CASE RES1=3
  XCHK=MWCHK1
  XREP='MWCHK1'
  XPASSTYP='        Micro-Wand '
ENDCASE
DO WHILE .T.
  SET DELIM ON
  CLR(8)
  MESG(13,'Enter New Password.  ESC to exit.')
  @ 10,19 SAY XPASSTYP+'Password' GET XCHK PICTURE '@K!'
  READ
  IF LASTKEY()=27
    EXIT
  ENDIF
  IF CONFIRM(13)
    LOCKF('Configuration')
    REPLACE &XREP WITH LTRIM(XCHK)
    UNLOCK
    ERRMESG(13,'Password Has Been Updated.')
    EXIT
  ENDIF
ENDDO
CLOSE DATABASES
RETURN

* HISTDEL.PRG
* COPYRIGHT 1989, 1990 COMPUTER SYSTEMS DESIGN, INC.

HEADER('DELETE HISTORY DATA',-1)
MESG(10,'This selection allows you to delete information from the history')
MESG(11,'file based on a cut-off date')
IF ! CONFIRM(14,'N')
  RETURN
ENDIF
CLR(5)
XDATE=CTOD('  /  /  ')
SET DELIM ON
SET SCORE OFF
MESG(10,'Information prior to but not including')
MESG(11,'this date will be deleted.')
@ 13,28 SAY 'CUT-OFF DATE ' GET XDATE VALID OKDATE(XDATE,16)
MESG(16,'ESC to exit.')
READ
SET SCORE ON
IF EMPTY(DTOS(XDATE))
  RETURN
ENDIF
CLR(10)
MESG(10,'Delete information up to but not including '+DTOC(XDATE)+'.')
MESG(13,'ESC to exit. Press any other key to continue.')
DO WHILE INKEY()=0
ENDDO
IF LASTKEY()=27
  RETURN
ENDIF
CLR(10)
MESG(5,'DELETING HISTORY RECORDS PRIOR TO '+DTOC(XDATE)+'....')
SET COLOR TO &HILIT
@ 7,10 CLEAR TO 21,70
SET COLOR TO &BLUELIT
@ 7,10 TO 21,70 DOUBLE
SET COLOR TO &HILIT
XXDATE=DTOS(XDATE)
CLOSE DATABASES
SET COLOR TO &HILIT
@ 8, 12 SAY 'Deleting Zone History prior to '+DTOC(XDATE)+'        Working...'
FUSE('X2HISTORY/ZH')
PDATE=PKDATE(XDATE)
DELETE FOR DATE<PDATE
USE
SET COLOR TO &BLUELIT
@ 8, 12 SAY 'Deleting Zone History prior to '+DTOC(XDATE)+'        Done.      '
SET COLOR TO &HILIT
@ 10,12 SAY 'Deleting Guard History prior to '+DTOC(XDATE)+'       Working...'
```

```
FUSE('XGHISTORY/ZH')
DELETE FOR DATE<PDATE
USE
SET COLOR TO &BLUELIT
@ 10,12 SAY 'Deleting Guard History prior to '+DTOC(XDATE)+'      Done.      '
SET COLOR TO &HILIT
@ 12,12 SAY 'Deleting Checkpoint History prior to '+DTOC(XDATE)+' Working...'
SELECT 2
FUSE('XOHISTORY/OH/OHIST1X')
SELECT 1
FUSE('XCHISTORY/ZH')
GO TOP
DO WHILE ! EOF()
  IF DATE<PDATE
    IF TRIM(BARCODE) <> 'ZZ'
      DELETE
    ELSE
      DELETE
      SKIP
      SELECT OH
      SEEK ZH->BARCODE
      IF ! EOF()
        DELETE
      ENDIF
      SELECT ZH
      DELETE
    ENDIF
  ENDIF
  SELECT ZH
  SKIP
ENDDO
USE
SET COLOR TO &BLUELIT
@ 12,12 SAY 'Deleting Checkpoint History prior to '+DTOC(XDATE)+' Done.      '
FUSE('DATAFILE/DA')
SET FILTER TO DRECOVER
GO TOP
XLINE=14
XOLD=''
XCURFILE=NFILE
DO WHILE !EOF()
  IF XCURFILE<>NFILE
    SET COLOR TO &BLUELIT
    @ XLINE,12 SAY 'Reindexing '+XCURFILE+' Done.'
    SET COLOR TO &HILIT
    XLINE=XLINE+1
    XCURFILE=NFILE
    IF XLINE>20
      SET COLOR TO &HILIT
      @ 8,11 CLEAR TO 20,69
      XLINE=9
    ENDIF
  ENDIF
  NNFILE='X'+TRIM(NFILE)
  IIFILE=TRIM(IFILE)
  SELECT 2
  FUSE('&NNFILE/AA/&IIFILE')
  IF XOLD<>NNFILE
    PACK
    @ XLINE,12 SAY 'Reindexing '+XCURFILE+'       '
    XOLD=NNFILE
  ELSE
    @ XLINE,12 SAY 'Reindexing '+XCURFILE+'       '
    REINDEX
  ENDIF
  USE
  SELECT DA
  SKIP
ENDDO
SET COLOR TO &BLUELIT
@ XLINE,12 SAY 'Reindexing '+XCURFILE+' Done.'
SET COLOR TO &HILIT
CLOSE DATABASES
@ 20,12 SAY 'Updating the CONFIG file.      '
FUSE('CONFIG/CO')
```

```
LOCKF('Configuration')
SELECT 2
FUSE('ZHISTORY/ZH')
GO BOTT
XREC=RECNO()
SELECT CO
REPLACE ZHIST WITH XREC
SELECT 2
FUSE('GHISTORY/ZH')
GO BOTT
XREC=RECNO()
SELECT CO
REPLACE GHIST WITH XREC
SELECT 2
FUSE('CHISTORY/ZH')
GO BOTT
XREC=RECNO()
SELECT CO
REPLACE CHIST WITH XREC
UNLOCK
SET COLOR TO &BLUELIT
@ 20,12 SAY 'Updating the CONFIG file.  Done.'
SET COLOR TO &HILIT
MESG(23,'Delete history is Complete.')
XJUNK = INKEY(5)
CLOSE DATABASES
RETURN
```

```
^~~~~~~~~~~~~~~~~~~~~~~~~~~~~~~~~~~~~~~~~~~~~~~~~~~~~~~~~~~~~~~~~~~
^ Copyright 1989, 1988  Computer Systems Design, Inc.
^
^   FILE NAME : SMS2000.UDL
^ PROGRAM NAME : The TourWatch Manager, Version 3.1, Release 1
^
^~~~~~~~~~~~~~~~~~~~~~~~~~~~~~~~~~~~~~~~~~~~~~~~~~~~~~~~~~~~~~~~~~~

PROGRAM AUTOEXEC

USE(CODE39,USERBAR)
! external code39

:CONTROL_REC RECORD
  #ROUTE_NUMBER #6
  #GUARD_NUMBER #6
  #PASSWORD #6
  #ROUTE_POINTER INTEGER
  #LOG_POINTER INTEGER

:ROUTE_REC RECORD
  #ZNUM #6
  #ZDESC #15

:LOG_REC RECORD
  #TYPE #1
  #LOG_DATA #6
  #STAMP #12

:MUST_REC RECORD
  #MUST_ZONE #6
  #MUST_CODE #6
  #MUST_DESC #15
  #CHECKED INTEGER

:FILER FILE
:FILEL FILE
:FILEM FILE
:FILEG FILE
:FILEC FILE
:FILEO FILE
:FILER FILE

:RCODE INTEGER
:INSTR #128
:OUTSTR #128
:RETRY INTEGER
:PNUM INTEGER
:XPNUM INTEGER
:LPNUM INTEGER
:PCHR #1
:PTYPE #1
```

```
:PLEN INTEGER
:FPACK #40
:CHECKSUM INTEGER
:PHEAD #3
:C INTEGER
:J INTEGER
:L INTEGER
:RETRY_COUNT INTEGER

:TEMP_LOG_DATA #6
:TEMP_PASSWORD #6
:ZONE_NUMBER #6
:NEXT_ZNUM #6
:OTHER_STR #16
:BARC_STR #12
:SEARCH_STR #40
:COMFUNC #2
:A INTEGER
:B BYTE
:X #1
:Y #1
:Z INTEGER
:I INTEGER
:LEN INTEGER
:BCODE INTEGER
:DUMMY #40
:DUMMY1 #16
:DUMMY2 #16
:VOLTAGE REAL
:DUM_NUM INTEGER
:INFO #40
:NEW_GUARD #6
:TEMP_PTR INTEGER
:T #8
:D #8
:HAND_OFF_FLAG INTEGER
CONST SPACES = '


DEFWIN(2,'!YYYYYYYYYYYYYYN')
CLEARSCREEN
I = PEEK($FFAC)
IF I = 50 THEN
  CALL CODE39ON
  WIN(1)  PUT(DISPLAY,'OS VERSION')
  WIN(2)  PUT(DISPLAY,'2.X')
  PAUSE 20
ELSE
  IF I = 49 THEN
    ! LDX   #code39
    ! STX   $B4
    ! LDAB  #$$
    ! STAB  $B6
    ! BCLR  @BARFLAG1,64
    WIN(1)  PUT(DISPLAY,'OS VERSION')
    WIN(2)  PUT(DISPLAY,'1.X')
    PAUSE 20
  ELSE
    WIN(1)  PUT(DISPLAY,'OS ERROR')
    WIN(2)  PUT(DISPLAY,I)
    WARNING
    REPEAT
    UNTIL KEY(MODE)
    END
    CLICK
  END
END


 CALL FST
 CALL AOFF
 CALL HORNNP
 CALL MARKOFF
 CALL PROMPTOFF
 TIME FORMAT OFF
 FIXPOINT 2
 .INITIALIZE_STUFF
   DEFWIN(2,'!YYYYYYYYYYYYY...
   DEFWIN(4,'!NNNNNNNNNYYYYYYN')
   FIVE_ON
   DEFWIN(6, 'NNNNNNNNNYNNNYNN')
   DEFWIN(7,'!NNNNNNNNNNNNNNNN')
```

```
 DEFWIN(8, 'NNNNNYYYYYYYYYYYN')
 SETINFO INFO


.OPEN_CONTROL_FILE
CLOSE(FILEC)
OPEN(RANDOM,FILEC,'CONTROL',50)
READLN(REC=1,FILEC,CONTROL_REC)
ROUTE_NUMBER = ROUTE_NUMBER + SPACES
GUARD_NUMBER = GUARD_NUMBER + SPACES
PASSWORD = PASSWORD + SPACES
WRITELN(REC=1,FILEC,CONTROL_REC)


.OPEN_ROUTE_FILE
 CLOSE(FILER)
 OPEN(RANDOM,FILER,'ROUTE',26)
 IF ROUTE_NUMBER = '        ' THEN
   ROUTE_POINTER = -1
   WRITELN(REC=1,FILEC,CONTROL_REC)
 END


.OPEN_MUST_SCAN_FILE
 CLOSE(FILEM)
 OPEN(RANDOM,FILEM,'MUSTSCAN',33)


.OPEN_BARC_FILE
 CLOSE(FILEB)
 OPEN(SEQUENTIAL,FILEB,'BARC')
 CLOSE(FILEB)


.OPEN_LOG_FILE
 CLOSE(FILEL)
 OPEN(RANDOM,FILEL,'LOG',23)
 IF LOG_POINTER = 0 THEN
   LOG_POINTER = 1
   WRITELN(REC=1,FILEC,CONTROL_REC)
 END


.OPEN_OTHER_FILE
 CLOSE(FILEO)
 OPEN(SEQUENTIAL,FILEO,'OTHER')
 CLOSE(FILEO)


.RESUME_ROUTE
 IF ROUTE_POINTER >= 1 THEN
   GOTO DISPLAY_ZONES
 ELSE
   IF ROUTE_POINTER = 0 THEN
     GOTO BEGIN_ROUTE
   END
 END
.TITLE
 CLEARSCREEN
 CLEARKEYS
 FIVE_ON
 WIN(1)  PUT(DISPLAY,' The TourWatch  ')
 WIN(5)  PUT(DISPLAY,'Manager (c)1988 ')
 PAUSE 30
 CLEARSCREEN
 WIN(1)  PUT(DISPLAY,' Ver 3.1, R 3   ')
 WIN(5)  PUT(DISPLAY,'   SMS, Inc.    ')
 PAUSE 30


.MAINMENU
 CLEARSCREEN
 CLEARKEYS
 FIVE_ON
 WIN(1)  PUT(DISPLAY,'BEGIN  DATA MISC')
 WIN(5)  PUT(DISPLAY,'ROUTE  MENU MENU')
```

```
  TYPE = ''
  DEFKEY(1,F1,GOTO BEGIN_ROUTE)
  DEFKEY(3,F3,GOTO DATA_MENU)
  DEFKEY(4,F4,GOTO MISCELLANEOUS_MENU)
  DEFKEY(5,MODE,GOTO SLP)
  WAIT

.DATA_MENU
  CLEARSCREEN
  CLEARKEYS
  FIVE_ON
  COMFUNC = ''
  WIN(1)  PUT(DISPLAY,'LOAD        SEND')
  WIN(5)  PUT(DISPLAY,'ROUTE        LOG')
  DEFKEY(1,F1,GOTO LOAD_ROUTE)
  DEFKEY(2,F2,GOTO DUMP_SHIT)
  DEFKEY(4,F4,GOTO SEND_LOG)
  DEFKEY(5,MODE,GOTO MAINMENU)
  WAIT

.MISCELLANEOUS_MENU
  CLEARSCREEN
  CLEARKEYS
  FIVE_ON
  RCODE = 0
  WIN(1)  PUT(DISPLAY,'BAT         SCAN')
  WIN(5)  PUT(DISPLAY,'CHECK      CODES')
  DEFKEY(1,F1,GOTO BATCHECK)
  DEFKEY(4,F4,GOTO SCAN_CODES)
  DEFKEY(5,MODE,GOTO MAINMENU)
  WAIT

.SLP
  CLEARSCREEN
  CLEARKEYS
  BCODE = 0
  SLEEP
  IF KEY(ENT) THEN
    IF PASSWORD <> '        ' THEN
      CLEARSCREEN
      CLEARKEYS
      FIVE_OFF
      DEFKEY(5,MODE,GOTO SLP)
      TEMP_PASSWORD = ''
    WIN(1)  PUT(DISPLAY,'Enter Password
    WIN(2)  GET(KEYBOARD,2,TEMP_PASSWORD)
    TEMP_PASSWORD = TEMP_PASSWORD + SPACES
    CLEARSCREEN
    CLEARKEYS
    IF TEMP_PASSWORD = '        ' THEN
      GOTO SLP
    END
    IF TEMP_PASSWORD <> PASSWORD THEN
      WIN(1)  PUT(DISPLAY,'Invalid Password')
      WIN(2)  PUT(DISPLAY,TEMP_PASSWORD)
      WARNING
      GOTO SLP
    END
  END
  GOTO MAINMENU
 END
 IF TYPE = 'G' THEN
   GOTO GET_GUARD_ID
 ELSE
   IF TYPE = 'F' THEN
     GOTO BEGIN_ROUTE
   ELSE
     IF TYPE = 'R' THEN
       GOTO DISPLAY_ZONES
     ELSE
       IF TYPE = 'O' THEN
         GOTO GET_OTHER
```

```
      ELSE
        IF TYPE = 'M' THEN
          GOTO OUT_OF_RAM
        ELSE
          GOTO TITLE
        END
      END
    END
  END
END


.BEGIN_ROUTE
  CLEARSCREEN
  CLEARKEYS
  IF ROUTE_POINTER < 0 THEN
    WIN(1)  PUT(DISPLAY,'NO ROUTE LOADED ')
    WIN(2)  PUT(DISPLAY,' CANNOT BEGIN')
    WARNING
    GOTO MAINMENU
  END
  TEMP_LOG_DATA = ''
  HAND_OFF_FLAG = 0
  GOTO GET_GUARD_ID


.GET_GUARD_ID
  CLEARSCREEN
  CLEARKEYS
  FIVE_OFF
  TYPE = 'G'
  DEFKEY(4,F4.GOTO SHOW_ROUTE)
  DEFKEY(5,MODE.GOTO SLP)
  INFO = ''
  NEW_GUARD = ''
  BARCODEON
  IF HAND_OFF_FLAG = 1 THEN
    WIN(1)  PUT(DISPLAY.'Enter Hand-off')
  WIN(2)  PUT(DISPLAY,'Guard ID>')
ELSE
  WIN(1)  PUT(DISPLAY,'Enter Guard ID  ')
  WIN(2)  PUT(DISPLAY,'to begin>')
END
WIN(4)  GET(2,DUMMY)
BARCODEOFF
IF INFO <> '' THEN
  BEEPER
END
NEW_GUARD = DUMMY + SPACES
DUMMY = ''
CLOSE(FILEG)
OPEN(FILEG,'GUARDS')
FIND(FILEG,DUMMY,NEW_GUARD)
CLOSE(FILEG)
IF DUMMY <> NEW_GUARD THEN
  CLEARSCREEN
  WIN(1)  PUT(DISPLAY,'INVALID GUARD ID')
  WARNING
  GOTO GET_GUARD_ID
END
GUARD_NUMBER = NEW_GUARD
WRITELN(REC=1,FILEC,CONTROL_REC)
IF HAND_OFF_FLAG = 1 THEN
  GOTO ADVANCE
ELSE
  GOTO RESET_ROUTE_FILE
END


.SHOW_ROUTE
  CLEARSCREEN
  CLEARKEYS
  WIN(1)  PUT(DISPLAY,'ROUTE NUMBER: ')
  WIN(2)  PUT(DISPLAY.ROUTE_NUMBER)
```

```
 DEBOUNCE
 GOTO GET_GUARD_ID


.RESET_ROUTE_FILE
 CLEARSCREEN
 CLEARKEYS
 ROUTE_POINTER = 0
 WRITELN(REC=1,FILEC,CONTROL_REC)
 HAND_OFF_FLAG = 0
 TEMP_LOG_DATA = ''
 MUST_ZONE = 'X'
 TEMP_PTR = 1
 REPEAT
 UNTIL MUST_ZONE = ''
   READLN(REC=TEMP_PTR,FILEM,MUST_REC)
  -CHECKED = 0
   WRITELN(REC=TEMP_PTR,FILEM,MUST_REC)
   TEMP_PTR = TEMP_PTR + 1
 END
 TYPE = 'S'
 LOG_DATA = ROUTE_NUMBER
 WRITE_LOG
 IF FILEL <> 0 THEN
   GOTO OUT_OF_RAM
 END
 TYPE = 'G'
 LOG_DATA = GUARD_NUMBER
 WRITE_LOG
 IF FILEL <> 0 THEN
   GOTO OUT_OF_RAM
 END
 GOTO ADVANCE


.ADVANCE
 CLEARSCREEN
 CLEARKEYS

 IF ROUTE_POINTER > 0 THEN
   TYPE = 'L'
   LOG_DATA = ZNUM
   WRITE_LOG
   IF FILEL <> 0 THEN
     GOTO OUT_OF_RAM
   END
 END

 ROUTE_POINTER = ROUTE_POINTER + 1
 WRITELN(REC=1,FILEC,CONTROL_REC)
 READLN(REC=ROUTE_POINTER,FILER,ROUTE_REC)

 IF (ZNUM = '*EOF* ') OR (ZNUM = '') THEN
   IF ROUTE_NUMBER <> 'ROAM  ' THEN
     WIN(1)  PUT(DISPLAY,' YOU HAVE LEFT')
     WIN(2)  PUT(DISPLAY,' THE LAST ZONE')
     BEEPER
     PAUSE 10
   END
   CLEARSCREEN
   WIN(1)  PUT(DISPLAY,' TOUR COMPLETE')
   BEEPER
   PAUSE 5
   BEEPER
   PAUSE 10
   TYPE = 'F'
   LOG_DATA = ROUTE_NUMBER
   WRITE_LOG
   IF FILEL <> 0 THEN
     GOTO OUT_OF_RAM
   END
   ROUTE_POINTER = 0
   WRITELN(REC=1,FILEC,CONTROL_REC)
   GOTO SLP
 END
```

```
IF HAND_OFF_FLAG = 1 THEN
  TYPE = 'G'
  LOG_DATA = GUARD_NUMBER
  WRITE_LOG
  IF FILEL <> 0 THEN
    GOTO OUT_OF_RAM
  END
END


TYPE = 'E'
LOG_DATA = ZNUM
WRITE_LOG
IF FILEL <> 0 THEN
  GOTO OUT_OF_RAM
END

MUST_ZONE = 'X'
TEMP_PTR = 1
REPEAT
UNTIL MUST_ZONE = ''
  READLN(REC=TEMP_PTR,FILEM,MUST_REC)
  IF MUST_ZONE = ZNUM THEN
    CHECKED = 0
    WRITELN(REC=TEMP_PTR,FILEM,MUST_REC)
  END
  TEMP_PTR = TEMP_PTR + 1
END
GOTO DISPLAY_ZONES


.DISPLAY_ZONES
  IF TEMP_LOG_DATA <> '' THEN
    LOG_DATA = TEMP_LOG_DATA
    GOTO PROCESS_MUST_CHECK
  END
  CLEARSCREEN
  CLEARKEYS

  HAND_OFF_FLAG = 0
  TEMP_LOG_DATA = ''

  IF ROUTE_NUMBER = 'ROAM  ' THEN
    WIN(1)  PUT(DISPLAY,'   Roam Mode    ')
  ELSE
    WIN(1)  PUT(DISPLAY,ZDESC)
  END
  TEMP_PTR = ROUTE_POINTER + 1
  READLN(REC=TEMP_PTR,FILER,ROUTE_REC)
  NEXT_ZNUM = ZNUM + SPACES
  IF ROUTE_NUMBER = 'ROAM  ' THEN
  ELSE
    IF (NEXT_ZNUM = '*EOF* ') OR (NEXT_ZNUM = '      ') THEN
      WIN(2)  PUT(DISPLAY,' * Last Zone *')
    ELSE
      WIN(2)  PUT(DISPLAY,ZDESC)
    END
  END
  READLN(REC=ROUTE_POINTER,FILER,ROUTE_REC)
  GOTO GET_BAR_CODES


.GET_BAR_CODES
  TYPE = 'R'
  CLEARKEYS
  DEFKEY(1,F1,GOTO REQUEST_ADVANCE)
  DEFKEY(4,F4,GOTO REVIEW_MUST_SCANS)
  DEFKEY(5,MODE,GOTO SLP)
  INFO = ''
  BARCODEON
  WIN(7)  GET(0,DUMMY)
  BARCODEOFF
  BEEPER
  PAUSE 5
  GOTO ANALYZE_BAR_CODE
```

```
.ANALYZE_BAR_CODE
  IF DUMMY = 'ZZ' THEN
    GOTO GET_OTHER
  END
  IF DUMMY = 'YY' THEN
    IF ROUTE_NUMBER = 'ROAM  ' THEN
      CLEARSCREEN
      CLEARKEYS
      WIN(1)  PUT(DISPLAY,'CANNOT HAND OFF')
      WIN(2)  PUT(DISPLAY,' IN ROAM MODE')
      WARNING
      GOTO DISPLAY_ZONES
    ELSE
      GOTO REQUEST_HAND_OFF
    END
  END
  IF DUMMY = 'XX' THEN
    IF (NEXT_ZNUM = '*EOF* ') OR
       (NEXT_ZNUM = '      ') OR
       (ROUTE_NUMBER = 'ROAM  ') THEN
      GOTO REQUEST_ADVANCE
    ELSE
      CLEARSCREEN
      CLEARKEYS
      WIN(1)  PUT(DISPLAY,'  END TOUR IN   ')
      WIN(2)  PUT(DISPLAY,' LAST ZONE ONLY')
      WARNING
      GOTO DISPLAY_ZONES
    END
  END
  LEN = LENGTH(DUMMY)
  IF LEN = 2 THEN
    LOG_DATA = DUMMY + SPACES
    WRITE_LOG
    IF FILEL <> 0 THEN
      GOTO OUT_OF_RAM
    END
    GOTO DISPLAY_ZONES
  END
  LOG_DATA = DUMMY + SPACES
  IF ROUTE_NUMBER = 'ROAM  ' THEN
    GOTO WRITE_CHECKPOINT
  END
  GOTO PROCESS_MUST_CHECK


.PROCESS_MUST_CHECK
  TEMP_PTR = 1
  MUST_ZONE = 'X'
  REPEAT
  UNTIL ((MUST_ZONE = ZNUM) AND (MUST_CODE = LOG_DATA)) OR (MUST_ZONE = '')
    READLN(REC=TEMP_PTR,FILEM,MUST_REC)
    TEMP_PTR = TEMP_PTR + 1
  END
  IF MUST_ZONE = ZNUM THEN
    TEMP_PTR = TEMP_PTR - 1
    CHECKED = 1
    WRITELN(REC=TEMP_PTR,FILEM,MUST_REC)
  END
  IF TEMP_LOG_DATA <> '' THEN
    TEMP_LOG_DATA = ''
    WRITE_CHECKPOINT
  END
  GOTO PROCESS_CHECKPOINT


.PROCESS_CHECKPOINT
  CLOSE(FILEB)
  OPEN(FILEB,'BARC')
  DUMMY = ''
  SEARCH_STR = ZNUM + LOG_DATA
  FIND(FILEB,DUMMY,SEARCH_STR)
  CLOSE(FILEB)
```

```
  IF DUMMY <> SEARCH_STR THEN
    OPEN(FILEB,'BARC')
    SEARCH_STR = NEXT_ZNUM + LOG_DATA
    FIND(FILEB,DUMMY,SEARCH_STR)
    CLOSE(FILEB)
    IF DUMMY <> SEARCH_STR THEN
      CLEARSCREEN
      CLEARKEYS
      WIN(1)  PUT(DISPLAY,'CHECKPOINT OUT  ')
      WIN(2)  PUT(DISPLAY,'    OF ZONE')
      WARNING
      GOTO WRITE_CHECKPOINT
    ELSE
      TEMP_LOG_DATA = LOG_DATA
      GOTO REQUEST_ADVANCE
    END
  ELSE
    GOTO WRITE_CHECKPOINT
  END


.WRITE_CHECKPOINT
  TYPE = 'R'
  WRITE_LOG
  IF FILEL <> 0 THEN
    GOTO OUT_OF_RAM
  END
  GOTO DISPLAY_ZONES


.REQUEST_HAND_OFF
  CLEARSCREEN
  CLEARKEYS
  WIN(1)  PUT(DISPLAY,'OK')
  WIN(2)  PUT(DISPLAY,'TO HAND OFF?')
  WIN(6)  PUT(DISPLAY,'YN')
  DEFKEY(3,F3,GOTO HAND_OFF_OK)
  DEFKEY(4,F4,GOTO DISPLAY_ZONES)
  WAIT
  .HAND_OFF_OK
  HAND_OFF_FLAG = 1
  GOTO REQUEST_ADVANCE


.REQUEST_ADVANCE
  CLEARSCREEN
  CLEARKEYS
  TEMP_PTR = 1
  MUST_ZONE = 'X'
  REPEAT
    READLN(REC=TEMP_PTR,FILEM,MUST_REC)
  UNTIL MUST_ZONE = ''
    IF (MUST_ZONE = ZNUM) AND (CHECKED = 0) THEN
      CLEARSCREEN
      WIN(1)  PUT(DISPLAY,'MISSED MUST-SCAN')
      IF HAND_OFF_FLAG = 1 THEN
        WIN(2)  PUT(DISPLAY,'CANNOT HAND OFF')
      ELSE
        IF DUMMY = 'XX' THEN
          WIN(2)  PUT(DISPLAY,'CANNOT END TOUR')
        ELSE
          WIN(2)  PUT(DISPLAY,'CANNOT ADVANCE ')
        END
      END
      WARNING
      FIVE_ON
                          F4 TO REVIEW
    WIN(1)  PUT(DISPLAY,'HIT F4 -- REVIEW')
    WIN(5)  PUT(DISPLAY,'MISSED MUST-SCAN')
    WARNING                 MUST
    GOTO DISPLAY_ZONES
  END
  TEMP_PTR = TEMP_PTR + 1
END
```

```
IF HAND_OFF_FLAG = 1 THEN
  GOTO GET_GUARD_ID
ELSE
  IF TEMP_LOG_DATA = '' THEN
    CLEARSCREEN
    CLEARKEYS
    IF (ROUTE_NUMBER = 'ROAM  ') OR (DUMMY = 'XX') THEN
      WIN(2)  PUT(DISPLAY,'DONE WITH TOUR?')
    ELSE
      WIN(2)  PUT(DISPLAY,'OK TO ADVANCE?')
    END
    WIN(6)  PUT(DISPLAY,'YN')
    DEFKEY(3,F3,GOTO ADVANCE)
    DEFKEY(4,F4,GOTO DISPLAY_ZONES)
    WAIT
  ELSE
    GOTO ADVANCE
  END
END


.GET_OTHER
  CLEARSCREEN
  CLEARKEYS
  FIVE_OFF
  TYPE = 'O'
  OTHER_STR = ''
  DEFKEY(5,MODE,GOTO SLP)
  WIN(1)  PUT(DISPLAY,'Enter Incident:')
  WIN(2)  GET(2,OTHER_STR)
  L = LENGTH(OTHER_STR)
  OTHER_STR = OTHER_STR + SPACES
  OTHER_STR = COPY(OTHER_STR,1,15)
  IF (L = 0) OR (OTHER_STR = '               ') THEN
    CLEARSCREEN
    CLEARKEYS
    WIN(1)  PUT(DISPLAY,'NO INCIDENT WAS')
    WIN(2)  PUT(DISPLAY,'   RECORDED')
    WARNING
  ELSE
    IF L > 15 THEN
      CLEARSCREEN
      CLEARKEYS
      FIVE_ON
      WIN(1)  PUT(DISPLAY,'INCIDENT LIMITED')
      WIN(5)  PUT(DISPLAY,'TO 15 CHARACTERS')
      WARNING
      GOTO GET_OTHER
    ELSE
      TYPE = 'R'
      LOG_DATA = DUMMY + SPACES
      WRITE_LOG
      IF FILEL <> 0 THEN
        GOTO OUT_OF_RAM
      END
      CLOSE(FILEO)
      OPEN(APPEND,FILEO,'OTHER')
      WRITELN(FILEO,OTHER_STR)
      IF FILEO <> 0 THEN
        CLOSE(FILEO)
        GOTO OUT_OF_RAM
      END
      CLOSE(FILEO)
    END
  END
  GOTO DISPLAY_ZONES


.REVIEW_MUST_SCANS
  CLEARSCREEN
  CLEARKEYS

  MUST_ZONE = 'X'
  TEMP_PTR = 1
  REPEAT
```

```
  READLN(REC=TEMP_PTR,FILEM,MUST_REC)
UNTIL (MUST_ZONE = ZNUM) OR (MUST_ZONE = '')
  TEMP_PTR = TEMP_PTR + 1
END

IF MUST_ZONE = ZNUM THEN
  REPEAT
  UNTIL MUST_ZONE <> ZNUM
    IF CHECKED = 0 THEN
      CLEARSCREEN
      CLEARKEYS
      WIN(1)  PUT(DISPLAY,'SKIP?')
      WIN(2)  PUT(DISPLAY,MUST_DESC)
      WIN(6)  PUT(DISPLAY,'YN')
      DEFKEY(3,F3,GOTO SKIP_MUST_SCAN)
      DEFKEY(4,F4,GOTO NO_SKIP)
      DEFKEY(5,MODE,GOTO DISPLAY_ZONES)
      WAIT
    .SKIP_MUST_SCAN
      CLEARSCREEN
      CLEARKEYS
      WIN(1)  PUT(DISPLAY,'Skipping...')
      WIN(2)  PUT(DISPLAY,MUST_DESC)
      CHECKED = 1
      WRITELN(REC=TEMP_PTR,FILEM,MUST_REC)
      PAUSE 20
    .NO_SKIP
    END
    .MUST_CONTINUE
    TEMP_PTR = TEMP_PTR + 1
    READLN(REC=TEMP_PTR,FILEM,MUST_REC)
  END
 END
 CLEARSCREEN
 CLEARKEYS
 FIVE_ON
 WIN(1)  PUT(DISPLAY,'End of must-scan')
 WIN(5)  PUT(DISPLAY,'points this zone')
 BEEPER
 PAUSE 10
 GOTO DISPLAY_ZONES


.WRITE_LOG
 TIME FORMAT OFF
 T = TIME
 DATE FORMAT OFF
 D = DATE
 STAMP = D + T + SPACES
 WRITELN(REC=LOG_POINTER,FILEL,L [illegible] G)   LOG_REC ^
 LOG_POINTER = LOG_POINTER + 1
 WRITELN(REC=1,FILEC,CONTROL_REC)
 RETURN


.OUT_OF_RAM
 CLEARSCREEN
 CLEARKEYS
 WIN(1)  PUT(DISPLAY,'  THE WAND IS   ')
 WIN(2)  PUT(DISPLAY,' OUT OF MEMORY')
 WARNING
 CLEARSCREEN
 WIN(1)  PUT(DISPLAY,'SUPERVISOR MUST ')
 WIN(2)  PUT(DISPLAY,' UPLOAD TO PC ')
 WARNING
 TYPE = 'M'
 GOTO SLP


.LOAD_ROUTE
  J = 10
  COMFUNC = 'DOWNLOAD'
  CLEARSCREEN
  CLEARKEYS
```

```
WIN(1)  PUT(DISPLAY,' <ENT>=RECEIVE  ')
WIN(2)  PUT(DISPLAY,'  <MODE>=QUIT')
DEFKEY(5,MODE,GOTO DATA_MENU)
DEFKEY(6,ENT,GOTO GET_PACKET)
WAIT


.GET_PACKET
 CLEARSCREEN
 CLEARKEYS
 CONNECT
 IF PNUM = 0 THEN
   GOTO DATA_MENU
 END
 LPNUM = PNUM
 ZONE_NUMBER = SPACES
 CLEARSCREEN
 CLEARKEYS
 WIN(1)  PUT(DISPLAY,'LOADING...')
 INSTR = ''
 FPACK = ''
 RETRY = 0
 REPEAT
   GETSTRING
 UNTIL (INSTR = '') OR (RETRY >= 5)
   XPNUM = ORD(INSTR,1)
   PTYPE = COPY(INSTR,2,1)
   IF PTYPE = 'F' THEN
     PLEN = ORD(INSTR,3)
     PLEN = PLEN - 32
     CALCHECK
     IF CHECKSUM = C THEN
       IF LPNUM = XPNUM THEN
         ACK
       ELSE
         PNUM = LPNUM
         INCPNUM
         IF PNUM = XPNUM THEN
           ACK
           LPNUM = XPNUM
           FPACK = COPY(INSTR,4,PLEN)

           IF FPACK = 'GUARD' THEN
             CLOSE(FILEG)
             PURGE('GUARDS')
             OPEN(SEQUENTIAL,FILEG,'GUARDS')
             GUARD_NUMBER = '
             WRITELN(REC=1,FILEC,CONTROL_REC)
           ELSE
             IF FPACK = 'MUSTSCAN' THEN
               CLOSE(FILEM)
               PURGE('MUSTSCAN')
               OPEN(RANDOM,FILEM,'MUSTSCAN',33)
               TEMP_PTR = 1
             ELSE
               IF FPACK = 'DATE' THEN
               ELSE
                 IF FPACK = 'PASSWORD' THEN
                 ELSE
                   IF FPACK = 'BARC' THEN
                     CLOSE(FILEB)
                     PURGE('BARC')
                     OPEN(SEQUENTIAL,FILEB,'BARC')
                     CLOSE(FILEB)
                     OPEN(APPEND,FILEB,'BARC')
                   ELSE
                     CLOSE(FILER)
                     PURGE('ROUTE')
                     OPEN(RANDOM,FILER,'ROUTE',26)
                     ROUTE_NUMBER = COPY(FPACK,1,6)
                     ROUTE_POINTER = 0
                     WRIT[illegible]C=1,FILEC,CONTROL_REC)
                     FPACK = 'ROUTE'
                     TEMP_PTR = 1
```

```
            END
           END
          END
         END
        END
       ELSE
        NAK
       END
      END
     ELSE
      NAK
     END
    ELSE
     IF PTYPE = 'D' THEN
     PLEN = ORD(INSTR,3)
     PLEN = PLEN - 32
      CALCHECK
      IF CHECKSUM = C THEN
       IF LPNUM = XPNUM THEN
        ACK
       ELSE
        PNUM = LPNUM
        INCPNUM
        IF PNUM = XPNUM THEN
         ACK
         LPNUM = XPNUM
         IF FPACK = 'ROUTE' THEN
          ZNUM = COPY(INSTR,4,6)
          ZDESC = COPY(INSTR,10,15)
          WRITELN(REC=TEMP_PTR,FILER,ROUTE_REC)
          TEMP_PTR = TEMP_PTR + 1
         ELSE
          IF FPACK = 'GUARD' THEN
           DUMMY = COPY(INSTR,4,6)
          WRITELN(FILEG,DUMMY).
         ELSE
          IF FPACK = 'MUSTSCAN' THEN
           MUST_ZONE = COPY(INSTR,4,6)
           MUST_CODE = COPY(INSTR,10,6)
           MUST_DESC = COPY(INSTR,16,15)
           CHECKED = 0
           WRITELN(REC=TEMP_PTR,FILEM,MUST_REC)
           TEMP_PTR = TEMP_PTR + 1
          ELSE
           IF FPACK = 'DATE' THEN
            DUMMY1 = COPY(INSTR,4,6)
            DATE SET DUMMY1
            DUMMY2 = COPY(INSTR,10,6)
            TIME SET DUMMY2
            TIME FORMAT OFF
            DATE FORMAT OFF
           ELSE
            IF FPACK = 'PASSWORD' THEN
             PASSWORD = COPY(INSTR,4,6)
             WRITELN(REC=1,FILEC,CONTROL_REC)
            ELSE
             IF FPACK = 'BARC' THEN
              DUMMY1 = COPY(INSTR,4,1)
              DUMMY2 = COPY(INSTR,11,1)
              IF (DUMMY1 = '*') AND (DUMMY2 = '*') THEN
               ZONE_NUMBER = COPY(INSTR,5,6)
              ELSE
               DUMMY1 = COPY(INSTR,4,6)
               DUMMY = ZONE_NUMBER + DUMMY1
               WRITELN(FILEB,DUMMY)
              END
             END
            END
           END
          END
         END
        END
       ELSE
        NAK
       END
```

```
    END
  ELSE
    NAK
  END
ELSE
  IF PTYPE = 'E' THEN
    IF LPNUM = XPNUM THEN
      ACK
    ELSE
      PNUM = LPNUM
      INCPNUM
      IF PNUM = XPNUM THEN
        ACK
        LPNUM = XPNUM
        IF FPACK = 'ROUTE' THEN
          ZNUM = '*EOF*  '
          ZDESC = SPACES
          WRITELN(REC=TEMP_PTR,FILER.ROUTE_REC)
          TEMP_PTR = TEMP_PTR + 1
          CLOSE(FILER)
        ELSE
          IF FPACK = 'GUARD' THEN
            CLOSE(FILEG)
          ELSE
            IF FPACK = 'MUSTSCAN' THEN
                CLOSE(FILEM)
              ELSE
                IF FPACK = 'BARC' THEN
                  CLOSE(FILEB)
                END
              END
            END
          END
          FPACK = ''
        ELSE
          NAK
        END
      END
    ELSE
      IF PTYPE = 'X' THEN
        IF LPNUM = XPNUM THEN
          ACK
        ELSE
          PNUM = LPNUM
          INCPNUM
          IF PNUM = XPNUM THEN
            ACK
            LPNUM = XPNUM
          ELSE
            NAK
          END
        END
      ELSE
        NAK
      END
    END
  END
END
END
IF PTYPE <> 'X' THEN
  CLOSE(FILER)    PURGE('ROUTE')
  CLOSE(FILEG)    PURGE('GUARDS')
  CLOSE(FILEM)    PURGE('MUSTSCAN')
  CLOSE(FILEB)    PURGE('BARC')
  ROUTE_NUMBER = '      '  ROUTE_POINTER = -1
  GUARD_NUMBER = '      '  PASSWORD = SPACES
  WRITELN(REC=1,FILEC,CONTROL_REC)
  GOTO COM_FAILURE
END
WIN(2)  PUT(DISPLAY,'  ...COMPLETE')
BEEPER
PAUSE 20
BEEPER
CLEARSCREEN
CLEARKEYS
```

```
DATE FORMAT ON
DUMMY1 = DATE
DUMMY1 = 'Date:' + DUMMY1
DATE FORMAT OFF

TIME FORMAT ON
DUMMY2 = TIME
DUMMY2 = 'Time:' + DUMMY2
TIME FORMAT OFF

WIN(1)   PUT(DISPLAY,DUMMY1)
WIN(2)   PUT(DISPLAY,DUMMY2)
PAUSE 30

RCODE = 1
 GOTO BATCHECK


.CALCHECK
    CHECKSUM = 0
    LEN = PLEN + 3
    FOR I = 4 TO LEN
      Z = ORD(INSTR,I)
      CHECKSUM = CHECKSUM + Z
    END
    CHECKSUM = CHECKSUM MOD 96
    CHECKSUM = CHECKSUM + 32
    I = 4 + PLEN
    C = ORD(INSTR,I)
    RETURN


.SEND_LOG
  J = 6
  CLEARSCREEN
  CLEARKEYS
  WIN(1)  PUT(DISPLAY,' <ENT>=TRANSMIT ')
  WIN(2)  PUT(DISPLAY,'  <MODE>=QUIT')
  DEFKEY(5,MODE,GOTO DATA_MENU)
  DEFKEY(6,ENT,GOTO XMIT_HEADER)
  WAIT


.XMIT_HEADER
  CLEARSCREEN
  CLEARKEYS
  CONNECT
  IF PNUM = 0 THEN
    GOTO DATA_MENU
  END
  CLOSE(FILE0)
  OPEN(FILE0,'OTHER')
  CLEARSCREEN
  CLEARKEYS
  WIN(1)  PUT(DISPLAY,'SEND HEADER...')
  PTYPE = 'F'
  OUTSTR = 'LOGDATA '
  BUILD_PACKET
  RETRY = 0
  REPEAT
    PUTL(COM,OUTSTR)
    GETSTRING
  UNTIL (INSTR = DUMMY) OR (RETRY >= 5)
    RETRY = RETRY + 1
  END
  IF INSTR <> DUMMY THEN
    GOTO COM_FAILURE
  END


.XMIT_DATA
  CLEARSCREEN
  WIN(1)  PUT(DISPLAY,'SEND DATA')
  PTYPE = 'D'
  TEMP_PTR = 1
```

```
 REPEAT
 UNTIL (TEMP_PTR >= LOG_POINTER)
   READLN(REC=TEMP_PTR,FILEL,LOG_REC)
   OUTSTR = TYPE + LOG_DATA + STAMP

   IF LOG_DATA = 'ZZ     ' THEN
     READLN(FILED,OTHER_STR)
     OUTSTR = OUTSTR + OTHER_STR
   END

   BUILD_PACKET
   RETRY = 0
   REPEAT
     PUTL(COM,OUTSTR)
     GETSTRING
   UNTIL (INSTR = DUMMY) OR (RETRY >= 5)
     RETRY = RETRY + 1
   END
   IF INSTR <> DUMMY THEN
     GOTO COM_FAILURE
   END
   TEMP_PTR = TEMP_PTR + 1
 END


.END_OF_DATA
  INCPNUM
  PTYPE = 'E'
  OUTSTR = PCHR + PTYPE
  DUMMY = PCHR + 'A'
  RETRY = 0
  CLEARSCREEN
  WIN(1)  PUT(DISPLAY,'END OF DATA')
  CLICK
  REPEAT
  UNTIL (INSTR = DUMMY) OR (RETRY = 5)
    PUTL(COM,OUTSTR)
    GETSTRING
    RETRY = RETRY + 1
  END
  IF INSTR <> DUMMY THEN
    GOTO COM_FAILURE
  END


.END_OF_TRANSMISSION
  CLEARSCREEN
  WIN(1)  PUT(DISPLAY,'END OF XMIT')
  CLICK
  INCPNUM
  PTYPE = 'X'
  OUTSTR = PCHR + PTYPE
  DUMMY = PCHR + 'A'
  RETRY = 0
  REPEAT
  UNTIL (INSTR = DUMMY) OR (RETRY = 5)
    PUTL(COM,OUTSTR)
    GETSTRING
    RETRY = RETRY + 1
  END
  IF INSTR = DUMMY THEN
    GOTO XMIT_DONE
  END


.COM_FAILURE
  CLEARSCREEN
  CLEARKEYS
  DISCONNECT
  IF COMFUNC = 'DOWNLOAD' THEN
    DEFKEY(5,MODE,GOTO INITIALIZE_STUFF)
  ELSE
  DEFKEY(5,MODE,GOTO DATA_...
  CLOSE(FILED)
 END
 WIN(1)  PUT(DISPLAY,' COM Error!      ')
```

```
WARNING
CLEARSCREEN
WIN(1)  PUT(DISPLAY,' COM Error! Hit ')
WIN(2)  PUT(DISPLAY,' MODE to reset.')
WAIT


.XMIT_DONE
CLEARSCREEN
CLEARKEYS
WIN(1)  PUT(DISPLAY,'TRANSMISSION')
WIN(2)  PUT(DISPLAY,'  COMPLETE')
BEEPER
PAUSE 20
DISCONNECT
GOTO PURGE_DATA


.PURGE_DATA
CLEARSCREEN
CLEARKEYS
WIN(1)  PUT(DISPLAY,'PURGING DATA...')
PAUSE 15
CLOSE(FILEL)
PURGE('LOG')
CLOSE(FILEO)
PURGE('OTHER')
LOG_POINTER = 1
ROUTE_POINTER = 0
WRITELN(REC=1,FILEC,CONTROL_REC)
WIN(2)  PUT(DISPLAY,'    ...COMPLETE')
BEEPER
PAUSE 15
GOTO OPEN_LOG_FILE


.CONNECT
PNUM = 0
CALL NOECHO
CLEARSCREEN
FIVE_ON
WIN(1)  PUT(DISPLAY,'Waiting...')
WIN(5)  PUT(DISPLAY,'Hit MODE to quit')
COM(BAUD=1200,PARITY=NONE,BITS=8,XON=OFF) ON
PAUSE 10
REPEAT
  GETCHAR(COM,Z)
UNTIL (Z = 1) OR (KEY(MODE) = 255)
END
IF Z <> 1 THEN
  CLICK
  GOTO ABORT_CONNECT
END
WIN(2)  PUT(DISPLAY,'  ...CONNECTED')
CLICK
PUT(COM,#02)
PNUM = 31
RETURN


.ABORT_CONNECT
COM(CLEAR) OFF
RETURN


.INCPNUM
  PNUM = PNUM + 1
  IF PNUM = 128 THEN
    PNUM = 32
  END
  ! LDAA PNUM + 1
  ! STAA PCHR
  RETURN
```

```
.GETSTRING
  RETRY_COUNT = 0
  INSTR = ''
  REPEAT
    Z = 0
    GETCHAR(COM,Z,A)
    ! LDAA Z+1
    ! STAA Y
  UNTIL ((A = 0) AND (RETRY_COUNT >= 3)) OR (Z = 13)
    IF A = 0 THEN
      RETRY_COUNT = RETRY_COUNT + 1
      PAUSE 5
    ELSE
      RETRY_COUNT = 0
      IF Z >= 32 THEN
        INSTR = INSTR + Y
      END
    END
  END
  RETURN


.BUILD_PACKET
  INCPNUM
  LEN = LENGTH(OUTSTR)
  PLEN = LEN + 32
  ! LDAA PLEN + 1
  ! STAA Y
  PHEAD = PCHR + PTYPE + Y

  CHECKSUM = 0
  FOR I = 1 TO LEN
    Z = ORD(OUTSTR,I)
    CHECKSUM = CHECKSUM + Z
  END
  CHECKSUM = CHECKSUM MOD 96
  CHECKSUM = CHECKSUM + 32

  ! LDAA CHECKSUM + 1
  ! STAA Y

  OUTSTR = PHEAD + OUTSTR + Y
  INSTR = ''
  DUMMY = PCHR + 'A'
  RETURN


.ACK
  ! LDAA XPNUM + 1
  ! STAA PCHR
  OUTSTR = PCHR + 'A'
  PUTL(COM,OUTSTR)
  RETRY = 0
  RETURN


.NAK
  ! LDAA XPNUM + 1
  ! STAA PCHR
  OUTSTR = PCHR + 'N'
  PUTL(COM,OUTSTR)
  RETRY = RETRY + 1
  BUZZER
  RETURN


.BARCODEON
  BCODE = 1
  BARCODE ON
  RETURN


.BARCODEOFF
  BCODE = 0
  BARCODE OFF
  RETURN
```

```
.CLICK
 SIGNAL(600,2,B)
 RETURN


.BEEPER
 SIGNAL(800,15,B)
 RETURN


.BUZZER
 SIGNAL(200,15,B)
 RETURN


.WARNING
 BUZZER  PAUSE 5
 BUZZER  PAUSE 10
 RETURN


.DEBOUNCE
 REPEAT
 UNTIL SCANCODE(0) = 255
 END
 RETURN


.FIVE_ON
 DEFWIN(5,':YYYYYYYYYYYYYYYY')
 RETURN


.FIVE_OFF
 DEFWIN(5,':YYYYYYYYYYYYYYYN')
 RETURN


.DISCONNECT
 A = 0
 REPEAT
 UNTIL A >= 10
   IF NOT KEY(CTS) THEN
     A = 10
   END
   PAUSE 10
   A = A + 1
 END
 COM(CLEAR) OFF
 RETURN


.DUMP_SHIT

 COM(BAUD=2400,PARITY=NONE,XON=OFF) ON
 PAUSE 10
 IF KEY(F3) <> 255 THEN
   GOTO DUMP_DONE
 END
 CLEARSCREEN
 WIN(1)  PUT(DISPLAY,'DUMPING...')
 BEEPER

 PUTL(COM,'ROUTE FILE:')
 TEMP_PTR = 1
 REPEAT
   READLN(REC=TEMP_PTR,FILER,ROUTE_REC)
   PUTL(COM,ZNUM,ZDESC)
 UNTIL (FILER <> 0) OR (ZNUM = '')
   TEMP_PTR = TEMP_PTR + 1
 END
 TEMP_PTR = TEMP_PTR - 1
 DUMMY = STRING(TEMP_PTR) <.3
 PUTL(COM,'ROUTE FILE TOTAL:  ',DUMMY,' RECORDS')
 PUTL(COM,'')
```

```
PUTL(COM,'MUST-SCAN FILE:')
TEMP_PTR = 1
REPEAT
  READLN(REC=TEMP_PTR,FILEM,MUST_REC)
  DUMMY = STRING(CHECKED)
  PUTL(COM,MUST_ZONE,MUST_CODE,MUST_DESC,DUMMY)
UNTIL (FILEM <> 0) OR (MUST_ZONE = '')
  TEMP_PTR = TEMP_PTR + 1
END
TEMP_PTR = TEMP_PTR - 1
DUMMY = STRING(TEMP_PTR)
PUTL(COM,'MUST-SCAN FILE TOTAL:  ',DUMMY,' RECORDS')
PUTL(COM,'')

PUTL(COM,'GUARD FILE: ')
CLOSE(FILEG)
OPEN(SEQUENTIAL,FILEG,'GUARDS')
TEMP_PTR = 0
REPEAT
  READLN(FILEG,DUMMY)
UNTIL DUMMY = ''
  PUTL(COM,DUMMY)
  TEMP_PTR = TEMP_PTR + 1
END
CLOSE(FILEG)
DUMMY = STRING(TEMP_PTR)
PUTL(COM,'GUARD FILE TOTAL: ',DUMMY,' RECORDS')
PUTL(COM,'')

CLOSE(FILEB)
OPEN(FILEB,'BARC')
PUTL(COM,'CHECKPOINT FILE:')
TEMP_PTR = 0
REPEAT
  READLN(FILEB,BARC_STR)
UNTIL BARC_STR = ''
  PUTL(COM,BARC_STR)
  TEMP_PTR = TEMP_PTR + 1
END
CLOSE(FILEB)
DUMMY = STRING(TEMP_PTR)
PUTL(COM,'CHECKPOINT FILE TOTAL:  ',DUMMY,' RECORDS')
PUTL(COM,'')

PUTL(COM,'LOG FILE:')
TEMP_PTR = 1
REPEAT
  READLN(REC=TEMP_PTR,FILEL,LOG_REC)
  PUTL(COM,TYPE,LOG_DATA.STAMP)
UNTIL (FILEL <> 0) OR (TYPE = '')
  TEMP_PTR = TEMP_PTR + 1
END
TEMP_PTR = TEMP_PTR - 1
DUMMY = STRING(TEMP_PTR)
PUTL(COM,'LOG FILE TOTAL:  ',DUMMY,' RECORDS')
PUTL(COM,'')

CLOSE(FILEO)
OPEN(FILEO,'OTHER')
PUTL(COM,'OTHER FILE:')
TEMP_PTR = 0
REPEAT
  READLN(FILEO,OTHER_STR)
UNTIL OTHER_STR = ''
  PUTL(COM,OTHER_STR)
  TEMP_PTR = TEMP_PTR + 1
END
CLOSE(FILEO)
DUMMY = STRING(TEMP_PTR)
PUTL(COM,'OTHER FILE TOTAL:  ',DUMMY,' RECORDS')
PUTL(COM,'')

PUTL(COM,'CONTROL FILE:')
READLN(REC=1,FILEC,CONTROL_REC)
PUTL(COM,'ROUTE_NUMBER:',ROUTE_NUMBER)
```

```
PUTL(COM,'GUARD_NUMBER:',GUARD_NUMBER)
PUTL(COM,'PASSWORD:',PASSWORD)
PUTL(COM,'ROUTE_POINTER:',ROUTE_POINTER)
PUTL(COM,'LOG_POINTER:',LOG_POINTER)
PUTL(COM,'')
CLEARSCREEN

.DUMP_DONE
 COM(CLEAR) OFF
 BEEPER
 GOTO DATA_MENU

.BATCHECK
 CLEARSCREEN
 CLEARKEYS

 ! BCLR @PORTA,$18
 PAUSE 1
 VOLTAGE = BATTERY(0)
 ! BSET @PORTA,$18
 VOLTAGE = VOLTAGE/100
 DUMMY1 = STRING(VOLTAGE)
 DUMMY1 = 'Voltage = ' + DUMMY1
 WIN(1)  PUT(DISPLAY,DUMMY1)
 IF VOLTAGE < 7.8 THEN
   WIN(2)  PUT(DISPLAY,'Battery is low.')
 ELSE
   WIN(2)  PUT(DISPLAY,'Battery is ok.')
 END
 PAUSE 30
 IF RCODE = 1 THEN
   GOTO OPEN_ROUTE_FILE
 ELSE
   GOTO MISCELLANEOUS_MENU
 END

.DATE_TIME

.SCAN_CODES
 CLEARSCREEN
 CLEARKEYS
 DEFKEY(5,MODE,GOTO MISCELLANEOUS_MENU)
 DUMMY1 = ''
 .SCAN_CODES_LOOP
   WIN(1)  PUT(DISPLAY,'Scan Checkpoint>')
   DUMMY1 = DUMMY1 + SPACES
   DUMMY1 = COPY(DUMMY1,1,16)
   WIN(2)  PUT(DISPLAY,DUMMY1)
   BARCODEON
   INFO=''
   DUMMY2=''
   WIN(7)  GET(0,DUMMY2)
   BARCODEOFF
   IF INFO='' THEN
     GOTO SCAN_CODES_LOOP
   END
   BEEPER
   DUMMY1 = DUMMY2
   GOTO SCAN_CODES_LOOP

END.

PROGRAM WARMEXEC

repeat
until not key(on)
end
```

```
! LDAA $B7
! ANDA #3
! STAA @INPUT_DEV
! LDX #$DD00
!FIND_LOOP:
! INX
! LDD 0,X
! SUBD #$B60E
! BNE FIND_LOOP
! LDY 3,X
! LDAA 0,Y
! CMPA #$0E
! BNE NOT_CURSOR
! JSR 0,X
! LDX @TIME_OUT_INTERVAL
! STX @TIME_OUT_VAL
!NOT_CURSOR:

IF BCODE = 1 THEN
  BARCODE ON
END
RETURN

END.
```

Appendix 1-2

Creating TMMENU.EXE

A. To Create TMMENU.EXE, type OVLCOMP and press <enter>.

B. Listing of all files involved in creating TMMENU.EXE.

Listing of OVLCOMP.BAT:

```
ECHO OFF
CLIPPER @MAIN
CLIPPER @UTILITY
CLIPPER DOWNLOAD
CLIPPER UPLOAD
CLIPPER @DETREP
CLIPPER REPORTS
CLIPPER MAINT
ECHO Linking is Beginning
PLINK86 @OVLLINK
ECHO Linking and Compiling are now complete.
```

Listing of MAIN.CLP:

```
TMMENU
```

Listing of UTILITY.CLP:

```
CSD
FUNCLIB
PNTERR
CSDCOMM
HELP
```

Listing of DETREP.CLP:

```
DETREP
DETREP2
DETREP3
POST
```

Listing of OVLLINK.LNK:

```
OUTPUT TMMENU.EXE
FI MAIN, UTILITY
LIB CLIPPER, SWASYNC
OVERLAY CODE, $CONSTANTS
BEGINAREA
SECTION INTO TM_UPLD.OVL FILE UPLOAD, DETREP
SECTION INTO TM_DNLD.OVL FILE DOWNLOAD, MAINT
SECTION INTO TM_RPT.OVL  FILE REPORTS
ENDAREA
;
```

Appendix 1-3

Creating TMMAINT.EXE

A. To Create TMMAINT.EXE, type the following:

1. CLIPPER CSD <return>
2. CLIPPER MAINTLIB <return>
3. M1 <return>

B. Listing of all files involved in creating TMMAINT.EXE.

Listing of M1.BAT:

```
CLIPPER TMMAINT
TLINK TMMAINT+CSD+MAINTLIB,TMMAINT,,CLIPPER
```

Appendix 1-4

File Structures

Structure for database:BARCODE.dbf
Number of data records : 1

| Field | Field name | Type | Width | Dec |
|---|---|---|---|---|
| 1 | SERNUM | Character | 6 | |
| 2 | BARCODE | Character | 6 | |
| 3 | ZNUM | Character | 6 | |
| 4 | DESC | Character | 15 | |
| 5 | MUSTCHECK | Character | 1 | |
| ** Total ** | | | 34 | |

| | |
|---|---|
| ZNUM3X | ZNUM+BARCODE |
| BNUMX | BARCODE+ZNUM |
| ZNUM2X | ZNUM+UPPER(DESC) |
| BC1X | UPPER(DESC)+ZNUM |
| BC2X | SERNUM |

Structure for database:CHISTORY.dbf
Number of data records : 1

| Field | Field name | Type | Width | Dec |
|---|---|---|---|---|
| 1 | BARCODE | Character | 6 | |
| 2 | DATE | Character | 3 | |
| 3 | TIME | Character | 2 | |
| 4 | GNUM | Character | 6 | |
| ** Total ** | | | 17 | |

| | |
|---|---|
| CHIST1X | BARCODE+DATE+TIME |
| CHIST2X | GNUM+DATE+TIME |
| CHIST3X | DATE+TIME |

Structure for database:CONFIG.dbf
Number of data records : 1

| Field | Field name | Type | Width | Dec |
|---|---|---|---|---|
| 1 | RCNUM | Character | 4 | |
| 2 | ZHIST | Numeric | 8 | |
| 3 | GHIST | Numeric | 8 | |
| 4 | CHIST | Numeric | 8 | |
| 5 | THISMONTH | Character | 2 | |
| 6 | FIRSTTIME | Logical | 1 | |
| 7 | CBUFFER | Character | 35 | |
| 8 | COMPORT | Character | 1 | |
| 9 | TMCHK1 | Character | 6 | |
| 10 | MWCHK1 | Character | 6 | |
| 11 | PDETAIL | Logical | 1 | |
| ** Total ** | | | 80 | |

Structure for database:DATAFILE.dbf
Number of data records : 26

| Field | Field name | Type | Width | Dec |
|---|---|---|---|---|
| 1 | NFILE | Character | 8 | |
| 2 | SFILE | Character | 41 | |
| 3 | IFILE | Character | 8 | |
| 4 | MOPACK | Logical | 1 | |
| 5 | DRECOVER | Logical | 1 | |
| ** Total ** | | | 60 | |

File Structures (cont.)

```
Structure for database:EXCEPT.dbf                   EXCX      ECODE
Number of data records :       16                   EXCX1     EDESC
Field  Field name  Type        Width      Dec
    1  ECODE       Character       2
    2  EDESC       Character      15
** Total **                       17

Structure for database:GHISTORY.dbf                 GHIST1X   GNUM+DATE
Number of data records :        1                   GHIST2X   DATE+GNUM+RNUM+CHECKIN
Field  Field name  Type        Width      Dec       GHIST3X   GNUM+DATE+RNUM+CHECKIN
    1  GNUM        Character       6
    2  DATE        Character       3
    3  RNUM        Character       6
    4  CHECKIN     Character       2
    5  CHECKOUT    Character       2
    6  ZONES       Numeric         3
    7  POINTS      Numeric         4
    8  PCHECKED    Numeric         4
    9  INZPCHECK   Numeric         4
** Total **                       34

Structure for database:GUARD.dbf                    GRDX      GNUM
Number of data records :        1                   GRDX1     UPPER(GNAME)
Field  Field name  Type        Width      Dec
    1  GNUM        Character       6
    2  GNAME       Character      24
** Total **                       30

Structure for database:OHISTORY.dbf                 OHIST1X   OCODE
Number of data records :        1
Field  Field name  Type        Width      Dec
    1  OCODE       Character       6
    2  COMMENT     Character      15
** Total **                       21

Structure for database:RDET.dbf                     RNUM1X    RNUM
Number of data records :        1                   RDETX     ZNUM
Field  Field name  Type        Width      Dec
    1  RNUM        Character       6
    2  ZNUM        Character       6
** Total **                       12
```

File Structures (cont.)

```
Structure for database:RECORD.dbf                   RCNUMX    RCNUM+DTOS(DATE)+TIME
Number of data records :        1
Field  Field name  Type        Width      Dec
    1  RCNUM       Character       4
    2  TYPE        Character       1
    3  LOGDATA     Character       6
    4  DATE        Date            8
    5  TIME        Character       5
** Total **                       24

Structure for database:ROAMREC.dbf                  ROAM1X    RCNUM+TYPE+ZONE+DTOS(DATE)+TIME
Number of data records :        1
Field  Field name  Type        Width      Dec
    1  RCNUM       Character       4
    2  TYPE        Character       1
    3  LOGDATA     Character       6
    4  DATE        Date            8
    5  TIME        Character       5
    6  ZONE        Character       6
** Total **                       30
```

```
Structure for database:RSUM.dbf                          RNAMX     UPPER(DESC)
Number of data records :        1                        RNUM2X    RNUM
Field  Field name  Type        Width      Dec
    1  RNUM        Character       6
    2  DESC        Character      20
** Total **                       26
```

```
Structure for database:ZHISTORY.dbf                      ZHIST1X   ZNUM+DATE
Number of data records :        1
Field  Field name  Type        Width      Dec
    1  ZNUM        Character       6
    2  DATE        Character       3
    3  ENTER       Character       2
    4  LEAVE       Character       2
    5  GNUM        Character       6
    6  POINTS      Numeric         3
    7  INZPCHECK   Numeric         3
** Total **                       25
```

```
Structure for database:ZONE.dbf                          ZNUM1X    ZNUM
Number of data records :        1                        ZNAMX     UPPER(SDESC)
Field  Field name  Type        Width      Dec
    1  ZNUM        Character       6
    2  SDESC       Character      15
    3  POINTS      Numeric         4
** Total **                       25
```

```
~~~~~~~~~~~~~~~~~~~~~~~~~~~~~~~~~~~~~~~~~~~~~~~~~~~~~~~~~~~~~~~~~~~~~~
^ Copyright 1989, 1989  Computer Systems Design, Inc.
^
^    FILE NAME : SMS2000.UDL
^ PROGRAM NAME : The TourWatch Manager, Version 3.1, Release 1
^
~~~~~~~~~~~~~~~~~~~~~~~~~~~~~~~~~~~~~~~~~~~~~~~~~~~~~~~~~~~~~~~~~~~~~~

PROGRAM AUTOEXEC

USE(CODE39,USERBAR)
! external code39

:CONTROL_REC RECORD
  #ROUTE_NUMBER $6
  #GUARD_NUMBER $6
  #PASSWORD $6
  #ROUTE_POINTER INTEGER
  #LOG_POINTER INTEGER

:ROUTE_REC RECORD
  #ZNUM $6
  #ZDESC $15

:LOG_REC RECORD
  #TYPE $1
  #LOG_DATA $6
  #STAMP $12

:MUST_REC RECORD
  #MUST_ZONE $6
  #MUST_CODE $6
  #MUST_DESC $15
  #CHECKED INTEGER

:FILER FILE
:FILEL FILE
:FILEM FILE
:FILEG FILE
:FILEC FILE
:FILED FILE
:FILER FILE

:RCODE INTEGER
:INSTR $128
:OUTSTR $128
:RETRY INTEGER
:PNUM INTEGER
:IPNUM INTEGER
:LPNUM INTEGER
:PCHR $1
:PTYPE $1
```

```
:PLEN INTEGER
:FPACK #40
:CHECKSUM INTEGER
:PHEAD #3
:C INTEGER
:J INTEGER
:L INTEGER
:RETRY_COUNT INTEGER

:TEMP_LOG_DATA #6
:TEMP_PASSWORD #6
:ZONE_NUMBER #6
:NEXT_ZNUM #5
:OTHER_STR #16
:BARC_STR #12
:NEXT_ZNUM #5
:OTHER_STR #16
:BARC_STR #12
:SEARCH_STR #40
:COMPUNC #8
:A INTEGER
:B BYTE
:X #1
:Y #1
:Z INTEGER
:I INTEGER
:LEN INTEGER
:BCODE INTEGER
:DUMMY #40
:DUMMY1 #16
:DUMMY2 #16
:VOLTAGE REAL
:DUM_NUM INTEGER
:INFO #40
:NEW_GUARD #6
:TEMP_PTR INTEGER
:T #8
:D #8
:HAND_OFF_FLAG INTEGER
CONST SPACES = '


DEFWIN(2,'1YYYYYYYYYYYYYYYN')
CLEARSCREEN
I = PEEK($FFAC)
IF I = 50 THEN
  CALL CODE39ON
  WIN(1)  PUT(DISPLAY,'OS VERSION')
  WIN(2)  PUT(DISPLAY,'2.X')
  PAUSE 20
ELSE
  IF I = 45 THEN
    ! LDX   #code39
    ! STX   $B4
    ! LDAB  #$5
    ! STAB  $B6
    ! BCLR  @BARFLAG1,A4
    WIN(1)  PUT(DISPLAY,'OS VERSION')
    WIN(2)  PUT(DISPLAY,'1.X')
    PAUSE 20
  ELSE
    WIN(1)  PUT(DISPLAY,'OS ERROR')
    WIN(2)  PUT(DISPLAY,I)
    WARNING
    REPEAT
    UNTIL KEY(MODE)
    END
    CLICK
  END
END


CALL FST
CALL AOFF
CALL HORNNP
CALL MARKOFF
CALL PROMPTOFF
TIME FORMAT OFF
FIXPOINT 2
```

```
.INITIALIZE_STUFF
  DEFWIN(2,'[illegible]
.INITIALIZE_STUFF
  DEFWIN(2,'YYYYYYYYYYYYYYYN')
  DEFWIN(4,'NNNNNNNNNYYYYYYN')
  FIVE_ON
  DEFWIN(6, 'NNNNNNNNNYNNNYNN')
  DEFWIN(7,'Neeeeeeeeeeeeeee')
  DEFWIN(8, 'NNNNNYYYYYYYYYYN')
  SETINFO INFO


.OPEN_CONTROL_FILE
CLOSE(FILEC)
OPEN(RANDOM,FILEC,'CONTROL',50)
READLN(REC=1,FILEC,CONTROL_REC)
ROUTE_NUMBER = ROUTE_NUMBER + SPACES
GUARD_NUMBER = GUARD_NUMBER + SPACES
PASSWORD = PASSWORD + SPACES
WRITELN(REC=1,FILEC,CONTROL_REC)


.OPEN_ROUTE_FILE
  CLOSE(FILER)
  OPEN(RANDOM,FILER,'ROUTE',26)
  IF ROUTE_NUMBER = '        ' THEN
    ROUTE_POINTER = -1
    WRITELN(REC=1,FILEC,CONTROL_REC)
  END


.OPEN_MUST_SCAN_FILE
  CLOSE(FILEM)
  OPEN(RANDOM,FILEM,'MUSTSCAN',33)


.OPEN_BARC_FILE
  CLOSE(FILEB)
  OPEN(SEQUENTIAL,FILEB,'BARC')
  CLOSE(FILEB)


.OPEN_LOG_FILE
  CLOSE(FILEL)
  OPEN(RANDOM,FILEL,'LOG',23)
  IF LOG_POINTER = 0 THEN
    LOG_POINTER = 1
    WRITELN(REC=1,FILEC,CONTROL_REC)
  END


.OPEN_OTHER_FILE
  CLOSE(FILEO)
  OPEN(SEQUENTIAL,FILEO,'OTHER')
  CLOSE(FILEO)


.RESUME_ROUTE
  IF ROUTE_POINTER >= 1 THEN
    GOTO DISPLAY_ZONES
  ELSE
    IF ROUTE_POINTER = 0 THEN
      GOTO BEGIN_ROUTE
    END
  END


.TITLE
  CLEARSCREEN
  CLEARKEYS
.TITLE
  CLEARSCREEN
  CLEARKEYS
  FIVE_ON
  WIN(1)  PUT(DISPLAY,' The Tourwatch  ')
  WIN(5)  PUT(DISPLAY,'Manager (c)1989 ')
  PAUSE 30
  CLEARSCREEN
  WIN(1)  PUT(DISPLAY,' Ver [illegible] 3   ')
  WIN(5)  PUT(DISPLAY,'  SMS, Inc.    ')
  PAUSE 30
```

```
.MAINMENU
  CLEARSCREEN
  CLEARKEYS
  FIVE_ON
  WIN(1)  PUT(DISPLAY,'BEGIN  DATA MISC')
  WIN(5)  PUT(DISPLAY,'ROUTE  MENU MENU')
  TYPE = ''
  DEFKEY(1,F1,GOTO BEGIN_ROUTE)
  DEFKEY(3,F3,GOTO DATA_MENU)
  DEFKEY(4,F4,GOTO MISCELLANEOUS_MENU)
  DEFKEY(5,MODE,GOTO SLP)
  WAIT


.DATA_MENU
  CLEARSCREEN
  CLEARKEYS
  FIVE_ON
  COMFUNC = ''
  WIN(1)  PUT(DISPLAY,'LOAD        SEND')
  WIN(5)  PUT(DISPLAY,'ROUTE        LOG')
  DEFKEY(1,F1,GOTO LOAD_ROUTE)
  DEFKEY(2,F2,GOTO DUMP_SHIT)
  DEFKEY(4,F4,GOTO SEND_LOG)
  DEFKEY(5,MODE,GOTO MAINMENU)
  WAIT


.MISCELLANEOUS_MENU
  CLEARSCREEN
  CLEARKEYS
  FIVE_ON
  RCODE = 0
  WIN(1)  PUT(DISPLAY,'BAT        SCAN')
  WIN(5)  PUT(DISPLAY,'CHECK      CODES')
  DEFKEY(1,F1,GOTO BATCHECK)
  DEFKEY(4,F4,GOTO SCAN_CODES)
  DEFKEY(5,MODE,GOTO MAINMENU)
  WAIT


.SLP
  CLEARSCREEN
  CLEARKEYS
  RCODE = 0
  SLEEP
  IF KEY(ENT) THEN
    IF PASSWORD <> '        ' THEN
      CLEARSCREEN
      CLEARKEYS
      FIVE_OFF
      DEFKEY(5,MODE,GOTO SLP)
      TEMP_PASSWORD = ''
      WIN(1)  PUT(DISPLAY,'Enter Password')
      WIN(2)  GET(KEYBOARD,2,TEMP_PASSWORD)
      TEMP_PASSWORD = TEMP_PASSWORD + SPACES
      WIN(1)  PUT(DISPLAY,'Enter Password')
      WIN(2)  GET(KEYBOARD,2,TEMP_PASSWORD)
      TEMP_PASSWORD = TEMP_PASSWORD + SPACES
      CLEARSCREEN
      CLEARKEYS
      IF TEMP_PASSWORD = '        ' THEN
        GOTO SLP
      END
      IF TEMP_PASSWORD <> PASSWORD THEN
        WIN(1)  PUT(DISPLAY,'Invalid Password')
        WIN(2)  PUT(DISPLAY,TEMP_PASSWORD)
        WARNING
        GOTO SLP
      END
    END
    GOTO MAINMENU
  END
  IF TYPE = 'G' THEN
    GOTO GET_GUARD_ID
  ELSE
    IF TYPE = 'F' THEN
      GOTO BEGIN_ROUTE
    ELSE
      IF TYPE = 'R' THEN
        GOTO DISPLAY_ZONES
```

```
      ELSE
        IF TYPE = 'O' THEN
          GOTO GET_OTHER
        ELSE
          IF TYPE = 'M' THEN
            GOTO OUT_OF_RAM
          ELSE
            GOTO TITLE
          END
        END
      END
    END
  END

.BEGIN_ROUTE
  CLEARSCREEN
  CLEARKEYS
  IF ROUTE_POINTER < 0 THEN
    WIN(1)  PUT(DISPLAY,'NO ROUTE LOADED ')
    WIN(2)  PUT(DISPLAY,' CANNOT BEGIN')
    WARNING
    GOTO MAINMENU
  END
  TEMP_LOG_DATA = ''
  HAND_OFF_FLAG = 0
  GOTO GET_GUARD_ID

.GET_GUARD_ID
  CLEARSCREEN
  CLEARKEYS
  FIVE_OFF
  TYPE = 'G'
  DEFKEY(4,F4,GOTO SHOW_ROUTE)
  DEFKEY(5,MODE,GOTO GLP)
  INFO = ''
  NEW_GUARD = ''
  BARCODEON
  IF HAND_OFF_FLAG = 1 THEN
    WIN(1)  PUT(DISPLAY,'Enter Hand-off ')
    WIN(2)  PUT(DISPLAY,'Guard ID>')
  ELSE
    WIN(1)  PUT(DISPLAY,'Enter Guard ID ')
   WIN(2)  PUT(DISPLAY,'Guard ID>')
 ELSE
   WIN(1)  PUT(DISPLAY,'Enter Guard ID  ')
   WIN(2)  PUT(DISPLAY,'to begin>')
 END
 WIN(4)  GET(2,DUMMY)
 BARCODEOFF
 IF INFO <> '' THEN
   BEEPER
 END
 NEW_GUARD = DUMMY + SPACES
 DUMMY = ''
 CLOSE(FILEG)
 OPEN(FILEG,'GUARDS')
 FIND(FILEG,DUMMY,NEW_GUARD)
 CLOSE(FILEG)
 IF DUMMY <> NEW_GUARD THEN
   CLEARSCREEN
   WIN(1)  PUT(DISPLAY,'INVALID GUARD ID')
   WARNING
   GOTO GET_GUARD_ID
 END
 GUARD_NUMBER = NEW_GUARD
 WRITELN(REC=1,FILEC,CONTROL_REC)
 IF HAND_OFF_FLAG = 1 THEN
   GOTO ADVANCE
 ELSE
   GOTO RESET_ROUTE_FILE
 END

.SHOW_ROUTE
  CLEARSCREEN
  CLEARKEYS
  WIN(1)  PUT(DISPLAY,'ROUTE NUMBER: ')
  WIN(2)  PUT(DISPLAY,ROUTE_NUMBER)
  DEBOUNCE
  GOTO GET_GUARD_ID
```

```
.RESET_ROUTE_FILE
  CLEARSCREEN
  CLEARKEYS
  ROUTE_POINTER = 0
  WRITELN(REC=1,FILEC,CONTROL_REC)
  HAND_OFF_FLAG = 0
  TEMP_LOG_DATA = ''
  MUST_ZONE = 'X'
  TEMP_PTR = 1
  REPEAT
  UNTIL MUST_ZONE = ''
    READLN(REC=TEMP_PTR,FILEM,MUST_REC)
    CHECKED = 0
    WRITELN(REC=TEMP_PTR,FILEM,MUST_REC)
    TEMP_PTR = TEMP_PTR + 1
  END
  TYPE = 'S'
  LOG_DATA = ROUTE_NUMBER
  WRITE_LOG
  IF FILEL <> 0 THEN
    GOTO OUT_OF_RAM
  END
  TYPE = 'E'
  LOG_DATA = GUARD_NUMBER
  WRITE_LOG
  IF FILEL <> 0 THEN
    GOTO OUT_OF_RAM
  END
  IF FILEL <> 0 THEN
    GOTO OUT_OF_RAM
  END
  GOTO ADVANCE


.ADVANCE
  CLEARSCREEN
  CLEARKEYS

  IF ROUTE_POINTER > 0 THEN
    TYPE = 'L'
    LOG_DATA = ZNUM
    WRITE_LOG
    IF FILEL <> 0 THEN
      GOTO OUT_OF_RAM
    END
  END

  ROUTE_POINTER = ROUTE_POINTER + 1
  WRITELN(REC=1,FILEC,CONTROL_REC)
  READLN(REC=ROUTE_POINTER,FILER,ROUTE_REC)

  IF (ZNUM = '#EOF# ') OR (ZNUM = '') THEN
    IF ROUTE_NUMBER <> 'ROAM  ' THEN
      WIN(1)  PUT(DISPLAY,' YOU HAVE LEFT')
      WIN(2)  PUT(DISPLAY,' THE LAST ZONE')
      BEEPER
      PAUSE 10
    END
    CLEARSCREEN
    WIN(1)  PUT(DISPLAY,' TOUR COMPLETE')
    BEEPER
    PAUSE 5
    BEEPER
    PAUSE 10
    TYPE = 'F'
    LOG_DATA = ROUTE_NUMBER
    WRITE_LOG
    IF FILEL <> 0 THEN
      GOTO OUT_OF_RAM
    END
    ROUTE_POINTER = 0
    WRITELN(REC=1,FILEC,CONTROL_REC)
    GOTO SLP
  END


  IF HAND_OFF_FLAG = 1 THEN
    TYPE = 'E'
    LOG_DATA = GUARD_NUMBER
    WRITE_LOG
    IF FILEL <> 0 THEN
      GOTO OUT_OF_RAM
```

```
  END
END


 TYPE = 'E'
 LOG_DATA = ZNUM
 WRITE_LOG
 IF FILEL <> 0 THEN
   GOTO OUT_OF_RAM
 END

 MUST_ZONE = 'X
 TEMP_PTR = 1
 REPEAT
 UNTIL MUST_ZONE =
 TEMP_PTR = 1
 REPEAT
 UNTIL MUST_ZONE = ''
   READLN(REC=TEMP_PTR,FILEM,MUST_REC)
   IF MUST_ZONE = ZNUM THEN
     CHECKED = 0
     WRITELN(REC=TEMP_PTR,FILEM,MUST_REC)
   END
   TEMP_PTR = TEMP_PTR + 1
 END
 GOTO DISPLAY_ZONES


.DISPLAY_ZONES
  IF TEMP_LOG_DATA <> '' THEN
    LOG_DATA = TEMP_LOG_DATA
    GOTO PROCESS_MUST_CHECK
  END
  CLEARSCREEN
  CLEARKEYS

  HAND_OFF_FLAG = 0
  TEMP_LOG_DATA = ''

  IF ROUTE_NUMBER = 'ROAM  ' THEN
    WIN(1)  PUT(DISPLAY,'   Roam mode    ')
  ELSE
    WIN(1)  PUT(DISPLAY,ZDESC)
  END
  TEMP_PTR = ROUTE_POINTER + 1
  READLN(REC=TEMP_PTR,FILER,ROUTE_REC)
  NEXT_ZNUM = ZNUM + SPACES
  IF ROUTE_NUMBER = 'ROAM  ' THEN
  ELSE
    IF (NEXT_ZNUM = '*EOF* ') OR (NEXT_ZNUM = '      ') THEN
      WIN(2)  PUT(DISPLAY,' * Last Zone *')
    ELSE
      WIN(2)  PUT(DISPLAY,ZDESC)
    END
  END
  READLN(REC=ROUTE_POINTER,FILER,ROUTE_REC)
  GOTO GET_BAR_CODES


.GET_BAR_CODES
  TYPE = 'R'
  CLEARKEYS
  DEFKEY(1,F1,GOTO REQUEST_ADVANCE)
  DEFKEY(4,F4,GOTO REVIEW_MUST_SCANS)
  DEFKEY(5,MODE,GOTO SLP)
  INFO = ''
  BARCODEON
  WIN(7)  GET(0,DUMMY)
  BARCODEOFF
  BEEPER
  PAUSE 5
  GOTO ANALYZE_BAR_CODE


.ANALYZE_BAR_CODE
  IF DUMMY = 'ZZ' THEN
    GOTO GET_OTHER
  END
  IF DUMMY = 'YY' THEN
    IF ROUTE_NUMBER = 'ROAM  ' THEN
      CLEARSCREEN
      CLEARKEYS
```

```
    WIN(1)  PUT(DISPLAY,'CANNOT HAND OFF')
    WIN(2)  PUT(DISPLAY,' IN ROAM MODE')
    CLEARKEYS
    WIN(1)  PUT(DISPLAY,'CANNOT HAND OFF')
    WIN(2)  PUT(DISPLAY,' IN ROAM MODE')
    WARNING
    GOTO DISPLAY_ZONES
  ELSE
    GOTO REQUEST_HAND_OFF
  END
END
IF DUMMY = 'XX' THEN
  IF (NEXT_ZNUM = '*EOF* ') OR
     (NEXT_ZNUM = '      ') OR
     (ROUTE_NUMBER = 'ROAM  ') THEN
    GOTO REQUEST_ADVANCE
  ELSE
    CLEARSCREEN
    CLEARKEYS
    WIN(1)  PUT(DISPLAY,'  END TOUR IN   ')
    WIN(2)  PUT(DISPLAY,' LAST ZONE ONLY')
    WARNING
    GOTO DISPLAY_ZONES
  END
END
LEN = LENGTH(DUMMY)
IF LEN = 2 THEN
  LOG_DATA = DUMMY + SPACES
  WRITE_LOG
  IF FILEL <> 0 THEN
    GOTO OUT_OF_RAM
  END
  GOTO DISPLAY_ZONES
END
LOG_DATA = DUMMY + SPACES
IF ROUTE_NUMBER = 'ROAM  ' THEN
  GOTO WRITE_CHECKPOINT
END
GOTO PROCESS_MUST_CHECK


.PROCESS_MUST_CHECK
  TEMP_PTR = 1
  MUST_ZONE = 'X'
  REPEAT
  UNTIL ((MUST_ZONE = ZNUM) AND (MUST_CODE = LOG_DATA)) OR (MUST_ZONE = '')
    READLN(REC=TEMP_PTR,FILEM,MUST_REC)
    TEMP_PTR = TEMP_PTR + 1
  END
  IF MUST_ZONE = ZNUM THEN
    TEMP_PTR = TEMP_PTR - 1
    CHECKED = 1
    WRITELN(REC=TEMP_PTR,FILEM,MUST_REC)
  END
  IF TEMP_LOG_DATA <> '' THEN
    TEMP_LOG_DATA = ''
    WRITE_CHECKPOINT
  END
  GOTO PROCESS_CHECKPOINT


.PROCESS_CHECKPOINT
  CLOSE(FILEB)
  OPEN(FILEB,'BARC')
  DUMMY = ''
  SEARCH_STR = ZNUM + LOG_DATA
  FIND(FILEB,DUMMY,SEARCH_STR)
  CLOSE(FILEB)
  IF DUMMY <> SEARCH_STR THEN
   OPEN(FILEB,'BARC')
   SEARCH_STR = (NEXT_ZNUM + LOG_DATA
    FIND(FILEB,DUMMY,SEARCH_STR)
    CLOSE(FILEB)
  IF DUMMY <> SEARCH_STR THEN
    OPEN(FILEB,'BARC')
    SEARCH_STR = NEXT_ZNUM + LOG_DATA
    FIND(FILEB,DUMMY,SEARCH_STR)
    CLOSE(FILEB)
    IF DUMMY <> SEARCH_STR THEN
      CLEARSCREEN
      CLEARKEYS
      WIN(1)  PUT(DISPLAY,'CHECKPOINT OUT  ')
```

```
    WIN(2)  PUT(DISPLAY,'    OF ZONE')
    WARNING
    GOTO WRITE_CHECKPOINT
  ELSE
    TEMP_LOG_DATA = LOG_DATA
    GOTO REQUEST_ADVANCE
  END
ELSE
  GOTO WRITE_CHECKPOINT
END


.WRITE_CHECKPOINT
 TYPE = 'R'
 WRITE_LOG
 IF FILEL <> 0 THEN
   GOTO OUT_OF_RAM
 END
 GOTO DISPLAY_ZONES


.REQUEST_HAND_OFF
 CLEARSCREEN
 CLEARKEYS
 WIN(1)  PUT(DISPLAY,'OK')
 WIN(2)  PUT(DISPLAY,'TO HAND OFF?')
 WIN(6)  PUT(DISPLAY,'YN')
 DEFKEY(3,F3,GOTO HAND_OFF_OK)
 DEFKEY(4,F4,GOTO DISPLAY_ZONES)
 WAIT
 .HAND_OFF_OK
 HAND_OFF_FLAG = 1
 GOTO REQUEST_ADVANCE


.REQUEST_ADVANCE
 CLEARSCREEN
 CLEARKEYS
 TEMP_PTR = 1
 MUST_ZONE = 'X'
 REPEAT
   READLN(REC=TEMP_PTR,FILEM,MUST_REC)
 UNTIL MUST_ZONE = ''
   IF (MUST_ZONE = ZNUM) AND (CHECKED = 0) THEN
     CLEARSCREEN
     WIN(1)  PUT(DISPLAY,'MISSED MUST-SCAN')
     IF HAND_OFF_FLAG = 1 THEN
       WIN(2)  PUT(DISPLAY,'CANNOT HAND OFF')
     ELSE
       IF DUMMY = 'XX' THEN
         WIN(2)  PUT(DISPLAY,'CANNOT END TOUR')
       ELSE
         WIN(2)  PUT(DISPLAY,'CANNOT ADVANCE ')
       END
     END
     WARNING
     FIVE_ON
     WIN(1)  PUT(DISPLAY,'HIT F4 TO REVIEW')
     WIN(5)  PUT(DISPLAY,'MISSED MUST-SCAN')
     WARNING
     WIN(1)  PUT(DISPLAY,'HIT F4 TO REVIEW')
     WIN(5)  PUT(DISPLAY,'MISSED MUST-SCAN')
     WARNING
     GOTO DISPLAY_ZONES
   END
   TEMP_PTR = TEMP_PTR + 1
 END

 IF HAND_OFF_FLAG = 1 THEN
   GOTO GET_GUARD_ID
 ELSE
   IF TEMP_LOG_DATA = '' THEN
     CLEARSCREEN
     CLEARKEYS
     IF (ROUTE_NUMBER = 'ROAM  ') OR (DUMMY = 'XX') THEN
       WIN(2)  PUT(DISPLAY,'DONE WITH TOUR?')
     ELSE
       WIN(2)  PUT(DISPLAY,'TO ADVANCE?')
     END
     WIN(6)  PUT(DISPLAY,'YN')
     DEFKEY(3,F3,GOTO ADVANCE)
     DEFKEY(4,F4,GOTO DISPLAY_ZONES)
```

```
      WAIT '
    ELSE
      GOTO ADVANCE
    END
  END


.GET_OTHER
  CLEARSCREEN
  CLEARKEYS
  FIVE_OFF
  TYPE = 'O'
  OTHER_STR = ''
  DEFKEY(5,MODE,GOTO SLP)
  WIN(1)  PUT(DISPLAY,'Enter Incident:')
  WIN(2)  GET(2,OTHER_STR)
  L = LENGTH(OTHER_STR)
  OTHER_STR = OTHER_STR + SPACES
  OTHER_STR = COPY(OTHER_STR,1,15)
  IF (L = 0) OR (OTHER_STR = '               ') THEN
    CLEARSCREEN
    CLEARKEYS
    WIN(1)  PUT(DISPLAY,'NO INCIDENT WAS')
    WIN(2)  PUT(DISPLAY,'   RECORDED')
    WARNING
  ELSE
    IF L > 15 THEN
      CLEARSCREEN
      CLEARKEYS
      FIVE_ON
      WIN(1)  PUT(DISPLAY,'INCIDENT LIMITED')
      WIN(5)  PUT(DISPLAY,'TO 15 CHARACTERS')
      WARNING
      GOTO GET_OTHER
    ELSE
      TYPE = 'R'
      LOG_DATA = DUMMY + SPACES
      WRITE_LOG
      IF FILEL <> 0 THEN
        GOTO OUT_OF_RAM
      END
      CLOSE(FILEO)
      OPEN(APPEND,FILEO,'OTHER')
      WRITELN(FILEO,OTHER_STR)
      IF FILEO <> 0 THEN
        CLOSE(FILEO)
        GOTO OUT_OF_RAM
      IF FILEO <> 0 THEN
        CLOSE(FILEO)
        GOTO OUT_OF_RAM
      END
      CLOSE(FILEO)
    END
  END
  GOTO DISPLAY_ZONES


.REVIEW_MUST_SCANS
  CLEARSCREEN
  CLEARKEYS

  MUST_ZONE = 'X'
  TEMP_PTR = 1
  REPEAT
    READLN(REC=TEMP_PTR,FILEM,MUST_REC)
  UNTIL (MUST_ZONE = ZNUM) OR (MUST_ZONE = '')
    TEMP_PTR = TEMP_PTR + 1
  END

  IF MUST_ZONE = ZNUM THEN
    REPEAT
    UNTIL MUST_ZONE <> ZNUM
      IF CHECKED = 0 THEN
        CLEARSCREEN
        CLEARKEYS
        WIN(1)  PUT(DISPLAY,'SKIP?')
        WIN(2)  PUT(DISPLAY,MUST_DESC)
        WIN(6)  PUT(DISPLAY,'YN')
        DEFKEY(3,F3,GOTO SKIP_MUST_SCAN)
        DEFKEY(4,F4,GOTO NO_SKIP)
        DEFKEY(5,MODE,GOTO DISPLAY_ZONES)
```

```
      WAIT
    .SKIP_MUST_SCAN
      CLEARSCREEN
      CLEARKEYS
      WIN(1)  PUT(DISPLAY,'Skipping...')
      WIN(2)  PUT(DISPLAY,MUST_DESC)
      CHECKED = 1
      WRITELN(REC=TEMP_PTR,FILEM,MUST_REC)
      PAUSE 20
    .NO_SKIP
    END
    .MUST_CONTINUE
    TEMP_PTR = TEMP_PTR + 1
    READLN(REC=TEMP_PTR,FILEM,MUST_REC)
  END
 END
 CLEARSCREEN
 CLEARKEYS
 FIVE_ON
 WIN(1)  PUT(DISPLAY,'End of must-scan')
 WIN(5)  PUT(DISPLAY,'points this zone')
 BEEPER
 PAUSE 10
 GOTO DISPLAY_ZONES


.WRITE_LOG
 TIME FORMAT OFF
 T = TIME
 DATE FORMAT OFF
 D = DATE
 STAMP = D + T + SPACES
 WRITELN(REC=LOG_POINTER,FILEL,LOG_REC)
 LOG_POINTER = LOG_POINTER + 1
 WRITELN(REC=1,FILEL,CONTROL_REC)
 WRITELN(REC=LOG_POINTER,FILEL,LOG_REC)
 LOG_POINTER = LOG_POINTER + 1
 WRITELN(REC=1,FILEL,CONTROL_REC)
 RETURN


.OUT_OF_RAM
 CLEARSCREEN
 CLEARKEYS
 WIN(1)  PUT(DISPLAY,'  THE WAND IS   ')
 WIN(2)  PUT(DISPLAY,' OUT OF MEMORY')
 WARNING
 CLEARSCREEN
 WIN(1)  PUT(DISPLAY,'SUPERVISOR MUST ')
 WIN(2)  PUT(DISPLAY,' UPLOAD TO PC ')
 WARNING
 TYPE = 'M'
 GOTO SLP


.LOAD_ROUTE
 J = 10
 COMFUNC = 'DOWNLOAD'
 CLEARSCREEN
 CLEARKEYS
 WIN(1)  PUT(DISPLAY,' <ENT>=RECEIVE  ')
 WIN(2)  PUT(DISPLAY,'  <MODE>=QUIT')
 DEFKEY(5,MODE,GOTO DATA_MENU)
 DEFKEY(6,ENT,GOTO GET_PACKET)
 WAIT


.GET_PACKET
 CLEARSCREEN
 CLEARKEYS
 CONNECT
 IF PNUM = 0 THEN
   GOTO DATA_MENU
 END
 LPNUM = PNUM
 ZONE_NUMBER = SPACES
 CLEARSCREEN
 CLEARKEYS
 WIN(1)  PUT(DISPLAY,'LOADING...')
 INSTR = ''
 FPACK = ''
 RETRY = 0
```

```
REPEAT
  GETSTRING
UNTIL (INSTR = '') OR (RETRY >= 5)
  XPNUM = ORD(INSTR,1)
  PTYPE = COPY(INSTR,2,1)
  IF PTYPE = 'F' THEN
    PLEN = ORD(INSTR,3)
    PLEN = PLEN - 32
    CALCHECK
    IF CHECKSUM = C THEN
      IF LPNUM = XPNUM THEN
        ACK
      ELSE
        PNUM = LPNUM
        INCPNUM
        IF PNUM = XPNUM THEN
          ACK
          LPNUM = XPNUM
          FPACK = COPY(INSTR,4,PLEN)
          IF FPACK = 'GUARD' THEN
            CLOSE(FILEG)
            PURGE('GUARDS')
      IF FPACK = 'GUARD' THEN
        CLOSE(FILEG)
        PURGE('GUARDS')
        OPEN(SEQUENTIAL,FILEG,'GUARDS')
        GUARD_NUMBER = '
        WRITELN(REC=1,FILEC,CONTROL_REC)
      ELSE
        IF FPACK = 'MUSTSCAN' THEN
          CLOSE(FILEM)
          PURGE('MUSTSCAN')
          OPEN(RANDOM,FILEM,'MUSTSCAN',33)
          TEMP_PTR = 1
        ELSE
          IF FPACK = 'DATE' THEN
          ELSE
            IF FPACK = 'PASSWORD' THEN
            ELSE
              IF FPACK = 'BARC' THEN
                CLOSE(FILEB)
                PURGE('BARC')
                OPEN(SEQUENTIAL,FILEB,'BARC')
                CLOSE(FILEB)
                OPEN(APPEND),FILEB,'BARC')
              ELSE
                CLOSE(FILER)
                PURGE('ROUTE')
                OPEN(RANDOM,FILER,'ROUTE',26)
                ROUTE_NUMBER = COPY(FPACK,1,6)
                ROUTE_POINTER = 0
                WRITELN(REC=1,FILEC,CONTROL_REC)
                FPACK = 'ROUTE'
                TEMP_PTR = 1
              END
            END
          END
        END
      END
    ELSE
      NAK
    END
  END
  ELSE
    NAK
  END
ELSE
  IF PTYPE = 'D' THEN
  PLEN = ORD(INSTR,3)
  PLEN = PLEN - 32
    CALCHECK
    IF CHECKSUM = C THEN
      IF LPNUM = XPNUM THEN
        ACK
      ELSE
        PNUM = LPNUM
        INCPNUM
        IF PNUM = XPNUM THEN
          ACK
          LPNUM = XPNUM
          IF FPACK = 'ROUTE' THEN
```

```
            ZNUM = COPY(INSTR,4,6)
            ZDESC = COPY(INSTR,10,15)
            WRITELN(REC=TEMP_PTR,FILER,ROUTE_REC)
            TEMP_PTR = TEMP_PTR + 1
          ELSE
            IF FPACK = 'GUARD' THEN
              DUMMY = COPY(INSTR,4,6)
              WRITELN(FILEG,DUMMY)
            ELSE
              IF FPACK = 'MUSTSCAN' THEN
              WRITELN(FILEG,DUMMY)
            ELSE
              IF FPACK = 'MUSTSCAN' THEN
                MUST_ZONE = COPY(INSTR,4,6)
                MUST_CODE = COPY(INSTR,10,6)
                MUST_DESC = COPY(INSTR,16,15)
                CHECKED = 0
                WRITELN(REC=TEMP_PTR,FILEM,MUST_REC)
                TEMP_PTR = TEMP_PTR + 1
              ELSE
                IF FPACK = 'DATE' THEN
                  DUMMY1 = COPY(INSTR,4,6)
                  DATE SET DUMMY1
                  DUMMY2 = COPY(INSTR,10,6)
                  TIME SET DUMMY2
                  TIME FORMAT OFF
                  DATE FORMAT OFF
                ELSE
                  IF FPACK = 'PASSWORD' THEN
                    PASSWORD = COPY(INSTR,4,6)
                    WRITELN(REC=1,FILEC,CONTROL_REC)
                  ELSE
                    IF FPACK = 'BARC' THEN
                      DUMMY1 = COPY(INSTR,4,1)
                      DUMMY2 = COPY(INSTR,11,1)
                      IF (DUMMY1 = '*') AND (DUMMY2 = '*') THEN
                        ZONE_NUMBER = COPY(INSTR,5,6)
                      ELSE
                        DUMMY1 = COPY(INSTR,4,6)
                        DUMMY = ZONE_NUMBER + DUMMY1
                        WRITELN(FILEB,DUMMY)
                      END
                    END
                  END
                END
              END
            END
          END
        ELSE
          NAK
        END
      END
    ELSE
      NAK
    END
  ELSE
    IF FTYPE = 'E' THEN
      IF LPNUM = XPNUM THEN
        ACK
      ELSE
        PNUM = LPNUM
        INCPNUM
        IF PNUM = XPNUM THEN
          ACK
          LPNUM = XPNUM
          IF FPACK = 'ROUTE' THEN
            ZNUM = '*EOF*  '
            ZDESC = SPACES
            WRITELN(REC=TEMP_PTR,FILER,ROUTE_REC)
            TEMP_PTR = TEMP_PTR + 1
            CLOSE(FILER)
          ELSE
            IF FPACK = 'GUARD' THEN
              CLOSE(FILEG)
            ELSE
              IF FPACK = 'MUSTSCAN' THEN
                CLOSE(FILEM)
              ELSE
                IF FPACK = '[illegible]' THEN
                  CLOSE(FILEM)
                ELSE
                  IF FPACK = 'BARC' THEN
```

```
              CLOSE(FILES)
            END
          END
        END
      END
      FPACK = ''
    ELSE
      NAK
    END
  END
ELSE
  IF PTYPE = 'X' THEN
    IF LPNUM = XPNUM THEN
      ACK
    ELSE
      PNUM = LPNUM
      INCPNUM
      IF PNUM = XPNUM THEN
        ACK
        LPNUM = XPNUM
      ELSE
        NAK
      END
    END
  ELSE
    NAK
  END
END
END
END
END
IF PTYPE <> 'X' THEN
  CLOSE(FILER)    PURGE('ROUTE')
  CLOSE(FILEG)    PURGE('GUARDS')
  CLOSE(FILEM)    PURGE('MUSTECAN')
  CLOSE(FILEB)    PURGE('BARC')
  ROUTE_NUMBER = '        '  ROUTE_POINTER = -1
  GUARD_NUMBER = '        '  PASSWORD = SPACES
  WRITELN(REC=1,FILEC,CONTROL_REC)
  GOTO COM_FAILURE
END
WIN(2)  PUT(DISPLAY,'  ...COMPLETE')
BEEPER
PAUSE 20
BEEPER
CLEARSCREEN
CLEARKEYS

DATE FORMAT ON
DUMMY1 = DATE
DUMMY1 = 'Date:' + DUMMY1
DATE FORMAT OFF

TIME FORMAT ON
DUMMY2 = TIME
DUMMY2 = 'Time:' + DUMMY2
TIME FORMAT OFF

WIN(1)  PUT(DISPLAY,DUMMY1)
WIN(2)  PUT(DISPLAY,DUMMY2)
PAUSE 30

RCODE = 1
GOTO BATCHECK
 GOTO BATCHECK


.CALCHECK
   CHECKSUM = 0
   LEN = PLEN + 3
   FOR I = 4 TO LEN
     Z = ORD(INSTR,I)
     CHECKSUM = CHECKSUM + Z
   END
   CHECKSUM = CHECKSUM MOD 96
   CHECKSUM = CHECKSUM + 32
   I = 4 + PLEN
   C = ORD(INSTR,I)
   RETURN
```

```
.SEND_LOG
  J = 6
  CLEARSCREEN
  CLEARKEYS
  WIN(1)  PUT(DISPLAY,' <ENT>=TRANSMIT ')
  WIN(2)  PUT(DISPLAY,'  <MODE>=QUIT')
  DEFKEY(5,MODE,GOTO DATA_MENU)
  DEFKEY(6,ENT,GOTO XMIT_HEADER)
  WAIT


.XMIT_HEADER
  CLEARSCREEN
  CLEARKEYS
  CONNECT
  IF PNUM = 0 THEN
    GOTO DATA_MENU
  END
  CLOSE(FILED)
  OPEN(FILED,'OTHER')
  CLEARSCREEN
  CLEARKEYS
  WIN(1)  PUT(DISPLAY,'SEND HEADER...')
  PTYPE = 'F'
  OUTSTR = 'LOGDATA '
  BUILD_PACKET
  RETRY = 0
  REPEAT
    PUTL(COM,OUTSTR)
    GETSTRING
  UNTIL (INSTR = DUMMY) OR (RETRY >= 5)
    RETRY = RETRY + 1
  END
  IF INSTR <> DUMMY THEN
    GOTO COM_FAILURE
  END


.XMIT_DATA
  CLEARSCREEN
  WIN(1)  PUT(DISPLAY,'SENDING DATA')
  PTYPE = 'D'
  TEMP_PTR = 1
  REPEAT
  UNTIL (TEMP_PTR >= LOG_POINTER)
    READLN(REC=TEMP_PTR,FILEL,LOG_REC)
    OUTSTR = TYPE + LOG_DATA + STAMP

    IF LOG_DATA = ZZ     ' THEN
      READLN(FILED,OTHER_STR)
      OUTSTR = OUTSTR + OTHER_STR
    ELSE
      READLN(FILED,OTHER_STR)
      OUTSTR = OUTSTR + OTHER_STR
    END

    BUILD_PACKET
    RETRY = 0
    REPEAT
      PUTL(COM,OUTSTR)
      GETSTRING
    UNTIL (INSTR = DUMMY) OR (RETRY >= 5)
      RETRY = RETRY + 1
    END
    IF INSTR <> DUMMY THEN
      GOTO COM_FAILURE
    END
    TEMP_PTR = TEMP_PTR + 1
  END


.END_OF_DATA
  INCPNUM
  PTYPE = 'E'
  OUTSTR = PCHR + PTYPE
  DUMMY = PCHR + 'A'
  RETRY = 0
  CLEARSCREEN
  WIN(1)  PUT(DISPLAY,'END [illegible] A')
  CLICK
  REPEAT
  UNTIL (INSTR = DUMMY) OR (RETRY = 5)
```

```
    PUTL(COM.OUTSTR)
    GETSTRING
    RETRY = RETRY + 1
  END
  IF INSTR <> DUMMY THEN
    GOTO COM_FAILURE
  END


.END_OF_TRANSMISSION
  CLEARSCREEN
  WIN(1)  PUT(DISPLAY,'END OF XMIT')
  CLICK
  INCPNUM
  PTYPE = 'X'
  OUTSTR = PCHR + PTYPE
  DUMMY = PCHR + 'A'
  RETRY = 0
  REPEAT
  UNTIL (INSTR = DUMMY) OR (RETRY = 5)
    PUTL(COM.OUTSTR)
    GETSTRING
    RETRY = RETRY + 1
  END
  IF INSTR = DUMMY THEN
    GOTO XMIT_DONE
  END


.COM_FAILURE
  CLEARSCREEN
  CLEARKEYS
  DISCONNECT
  IF COMFUNC = 'DOWNLOAD' THEN
    DEFKEY(5,MODE.GOTO INITIALIZE_STUFF)
  ELSE
    DEFKEY(5,MODE.GOTO DATA_MENU)
    CLOSE(FILEL)
  END
   DEFKEY(5,MODE.GOTO DATA_MENU)
   CLOSE(FILED)
  END
  WIN(1)  PUT(DISPLAY,' COM Error!      ')
  WARNING
  CLEARSCREEN
  WIN(1)  PUT(DISPLAY,' COM Error! Hit ')
  WIN(2)  PUT(DISPLAY,' MODE to reset.')
  WAIT


.XMIT_DONE
  CLEARSCREEN
  CLEARKEYS
  WIN(1)  PUT(DISPLAY,'TRANSMISSION')
  WIN(2)  PUT(DISPLAY,'  COMPLETE')
  BEEPER
  PAUSE 20
  DISCONNECT
  GOTO PURGE_DATA


.PURGE_DATA
  CLEARSCREEN
  CLEARKEYS
  WIN(1)  PUT(DISPLAY,'PURGING DATA...')
  PAUSE 15
  CLOSE(FILEL)
  PURGE('LOG')
  CLOSE(FILED)
  PURGE('OTHER')
  LOG_POINTER = 1
  ROUTE_POINTER = 0
  WRITELN(REC=1,FILEC,CONTROL_REC)
  WIN(2)  PUT(DISPLAY,'   ...COMPLETE')
  BEEPER
  PAUSE 15
  GOTO OPEN_LOG_FILE


.CONNECT
  PNUM = 0
```

```
CALL NOECHO
CLEARSCREEN
FIVE_ON
WIN(1)  PUT(DISPLAY,'Waiting...')
WIN(5)  PUT(DISPLAY,'Hit MODE to quit')
COM(BAUD=1200,PARITY=NONE,BITS=8,XON=OFF) ON
PAUSE 10
REPEAT
  GETCHAR(COM,Z)
UNTIL (Z = 1) OR (KEY(MODE) = 255)
END
IF Z <> 1 THEN
  CLICK
  GOTO ABORT_CONNECT
END
WIN(2)  PUT(DISPLAY,'  ...CONNECTED')
CLICK
PUT(COM,#02)
PNUM = 31
RETURN


.ABORT_CONNECT
  COM(CLEAR) OFF
  RETURN
  [illegible] OFF
  RETURN


.INCPNUM
    PNUM = PNUM + 1
    IF PNUM = 128 THEN
      PNUM = 32
    END
    ! LDAA PNUM + 1
    ! STAA PCHR
    RETURN


.GETSTRING
  RETRY_COUNT = 0
  INSTR = ''
  REPEAT
    Z = 0
    GETCHAR(COM,Z,A)
    ! LDAA Z+1
    ! STAA Y
  UNTIL ((A = 0) AND (RETRY_COUNT >= J)) OR (Z = 13)
    IF A = 0 THEN
      RETRY_COUNT = RETRY_COUNT + 1
      PAUSE 5
    ELSE
      RETRY_COUNT = 0
      IF Z >= 32 THEN
        INSTR = INSTR + Y
      END
    END
  END
  RETURN


.BUILD_PACKET
  INCPNUM
  LEN = LENGTH(OUTSTR)
  PLEN = LEN + 32
  ! LDAA PLEN + 1
  ! STAA Y
  PHEAD = PCHR + PTYPE + Y

  CHECKSUM = 0
  FOR I = 1 TO LEN
    Z = ORD(OUTSTR,I)
    CHECKSUM = CHECKSUM + Z
  END
  CHECKSUM = CHECKSUM MOD 96
  CHECKSUM = CHECKSUM + 32

  ! LDAA CHECKSUM + 1
  ! STAA Y

  OUTSTR = PHEAD + OUTSTR + Y
  INSTR = ''
```

```
DUMMY = PCHR + 'A'
RETURN

.ACK
 ! LDAA XPNUM + 1
 ! STAA PCHR
OUTSTR = PCHR + 'A'
PUTL(COM,OUTSTR)
RETRY = 0
RETURN
RETURN

.NAK
 ! LDAA XPNUM + 1
 ! STAA PCHR
OUTSTR = PCHR + 'N'
PUTL(COM,OUTSTR)
RETRY = RETRY + 1
BUZZER
RETURN

.BARCODEON
 BCODE = 1
 BARCODE ON
 RETURN

.BARCODEOFF
 BCODE = 0
 BARCODE OFF
 RETURN

.CLICK
 SIGNAL(600,2,B)
 RETURN

.BEEPER
 SIGNAL(800,15,B)
 RETURN

.BUZZER
 SIGNAL(200,15,B)
 RETURN

.WARNING
 BUZZER PAUSE 5
 BUZZER PAUSE 10
 RETURN

.DEBOUNCE
 REPEAT
 UNTIL SCANCODE(0) = 255
 END
 RETURN

.FIVE_ON
 DEFWIN(5,':YYYYYYYYYYYYYYYY')
 RETURN

.FIVE_OFF
 DEFWIN(5,':YYYYYYYYYYYYYYYN')
 RETURN

.DISCONNECT
 A = 0
 REPEAT
 UNTIL A >= 10
   IF NOT KEY(CIS) THEN
     A = 11
```

```
  UNTIL A >= 10
    IF NOT KEY(CTS) THEN
      A = 10
    END
    PAUSE 10
    A = A + 1
  END
  COM(CLEAR) OFF
  RETURN


.DUMP_SHIT

  COM(BAUD=2400,PARITY=NONE,XON=OFF) ON
  PAUSE 10
  IF KEY(F3) <> 255 THEN
    GOTO DUMP_DONE
  END
  CLEARSCREEN
  WIN(1)  PUT(DISPLAY,'DUMPING...')
  BEEPER

  PUTL(COM,'ROUTE FILE:')
  TEMP_PTR = 1
  REPEAT
    READLN(REC=TEMP_PTR,FILER,ROUTE_REC)
    PUTL(COM,ZNUM,ZDESC)
  UNTIL (FILER <> 0) OR (ZNUM = '')
    TEMP_PTR = TEMP_PTR + 1
  END
  TEMP_PTR = TEMP_PTR - 1
  DUMMY = STRING(TEMP_PTR)
  PUTL(COM,'ROUTE FILE TOTAL:  ',DUMMY,' RECORDS')
  PUTL(COM,'')

  PUTL(COM,'MUST-SCAN FILE:')
  TEMP_PTR = 1
  REPEAT
    READLN(REC=TEMP_PTR,FILEM,MUST_REC)
    DUMMY = STRING(CHECKED)
    PUTL(COM,MUST_ZONE,MUST_CODE,MUST_DESC,DUMMY)
  UNTIL (FILEM <> 0) OR (MUST_ZONE = '')
    TEMP_PTR = TEMP_PTR + 1
  END
  TEMP_PTR = TEMP_PTR - 1
  DUMMY = STRING(TEMP_PTR)
  PUTL(COM,'MUST-SCAN FILE TOTAL:  ',DUMMY,' RECORDS')
  PUTL(COM,'')

  PUTL(COM,'GUARD FILE: ')
  CLOSE(FILEG)
  OPEN(SEQUENTIAL,FILEG,'GUARDS')
  TEMP_PTR = 0
  REPEAT
    READLN(FILEG,DUMMY)
  UNTIL DUMMY = ''
    PUTL(COM,DUMMY)
    TEMP_PTR = TEMP_PTR + 1
  END
  CLOSE(FILEG)
  DUMMY = STRING(TEMP_PTR)
  PUTL(COM,'GUARD FILE TOTAL: ',DUMMY,' RECORDS')
  PUTL(COM,'')

  CLOSE(FILEB)
  OPEN(FILEB,'BARC')
  PUTL(COM,'CHECKPOINT FILE: ')
  TEMP_PTR = 0
  REPEAT
PUTL(COM,'CHECKPOINT FILE: ')
TEMP_PTR = 0
REPEAT
  READLN(FILEB,BARC_STR)
UNTIL BARC_STR = ''
  PUTL(COM,BARC_STR)
  TEMP_PTR = TEMP_PTR + 1
END
CLOSE(FILEB)
DUMMY = STRING(TEMP_PTR)
PUTL(COM,'CHECKPOINT FILE TOTAL:  ',DUMMY,' RECORDS')
PUTL(COM,'')
```

```
PUTL(COM,'LOG FILE:')
TEMP_PTR = 1
REPEAT
  READLN(REC=TEMP_PTR,FILEL,LOG_REC)
  PUTL(COM,TYPE.LOG_DATA.STAMP)
UNTIL (FILEL <> 0) OR (TYPE = '')
  TEMP_PTR = TEMP_PTR + 1
END
TEMP_PTR = TEMP_PTR - 1
DUMMY = STRING(TEMP_PTR)
PUTL(COM,'LOG FILE TOTAL:  '.DUMMY.' RECORDS')
PUTL(COM,'')

CLOSE(FILEO)
OPEN(FILEO,'OTHER')
PUTL(COM,'OTHER FILE:')
TEMP_PTR = 0
REPEAT
  READLN(FILEO.OTHER_STR)
UNTIL OTHER_STR = ''
  PUTL(COM.OTHER_STR)
  TEMP_PTR = TEMP_PTR + 1
END
CLOSE(FILEO)
DUMMY = STRING(TEMP_PTR)
PUTL(COM,'OTHER FILE TOTAL:  '.DUMMY.' RECORDS')
PUTL(COM,'')

PUTL(COM,'CONTROL FILE:')
READLN(REC=1,FILEC,CONTROL_REC)
PUTL(COM,'ROUTE_NUMBER:'.ROUTE_NUMBER)
PUTL(COM,'GUARD_NUMBER:'.GUARD_NUMBER)
PUTL(COM,'PASSWORD:'.PASSWORD)
PUTL(COM,'ROUTE_POINTER:'.ROUTE_POINTER)
PUTL(COM,'LOG_POINTER:',LOG_POINTER)
PUTL(COM,'')
CLEARSCREEN

.DUMP_DONE
  COM(CLEAR) OFF
  BEEPER
  GOTO DATA_MENU


.BATCHECK
  CLEARSCREEN
  CLEARKEYS

  ' BCLR @PORTA.$1E
  PAUSE 1
  VOLTAGE = BATTERY(0)
  ' BSET @PORTA.$1E


  VOLTAGE = VOLTAGE/100
  DUMMY1 = STRING(VOLTAGE)
  VOLTAGE = VOLTAGE/100
  DUMMY1 = STRINS(VOLTAGE)
  DUMMY1 = 'Voltage = ' + DUMMY1
  WIN(1)  PUT(DISPLAY,DUMMY1)
  IF VOLTAGE < 7.8 THEN
    WIN(2)  PUT(DISPLAY,'Battery is low.')
  ELSE
    WIN(2)  PUT(DISPLAY,'Battery is ok.')
  END
  PAUSE 30
  IF RCODE = 1 THEN
    GOTO OPEN_ROUTE_FILE
  ELSE
    GOTO MISCELLANEOUS_MENU
  END


.DATE_TIME

.SCAN_CODES
  CLEARSCREEN
  CLEARKEYS
  DEFKEY(5,MODE,GOTO MISCELLANEOUS_MENU)
  DUMMY1 = ''
  .SCAN_CODES_LOOP
    WIN(1)  PUT(DISPLAY,'Scan Checkpoint>')
```

```
DUMMY1 = DUMMY1 + SPACES
DUMMY1 = COPY(DUMMY1,1,16)
WIN(2)  PUT(DISPLAY,DUMMY1)
BARCODEON
INFO=''
DUMMY2=''
WIN(7)  GET(0,DUMMY2)
BARCODEOFF
IF INFO='' THEN
  GOTO SCAN_CODES_LOOP
END
BEEPER
DUMMY1 = DUMMY2
GOTO SCAN_CODES_LOOP


END.


PROGRAM WARMEXEC

repeat
until not key(on)
end

! LDAA $B7
! ANDA #1
! STAA @INPUT_DEV
! LDX #$DXXX
!FIND_LOOP:
! INX
! LDD 0,X
! SUBD #$8602
! BNE FIND_LOOP
! LDY 3,X
! LDAA 0,Y
! CMPA #$0E
! BNE NOT_CURSOR
! JSR 0,X
! LDX @TIME_OUT_INTERVAL
! BNE NOT_CURSOR
! JSR 0,X
! LDX @TIME_OUT_INTERVAL
! STX @TIME_OUT_VAL
!NOT_CURSOR:

IF BCODE = 1 THEN
  BARCODE ON
END
RETURN

END.
```

What is claimed is:

1. A portable tour monitor and checkpoint designating system comprising:

a modular, portable device adapted to be carried through a tour, said tour comprising a plurality of single visit checkpoints, each labeled with a respective checkpoint code and each included only once in the tour;

sensor means, included in the portable device, for reading the checkpoint codes during the tour and for generating time stamped sensor signals in response thereto;

memory means for storing the time stamped sensor signals;

means for designating first ones of the single visit checkpoints as higher priority checkpoints and second ones of the single visit checkpoints as lower priority checkpoints;

means, included in the portable device, for storing a tour defining record comprising a plurality of entries at least one of which corresponds to a respective one of said higher priority checkpoints;

means for advancing through the tour defining record at least in part in response to said sensor means;

means, included in the portable device, for comparing the sensor signals with the tour defining record and for selectively impeding advancement in the tour defining record when the sensor signals indicate that one of the higher priority checkpoints has been missed while allowing advancement in the tour defining record when one of the lower priority checkpoints has been missed.

2. The invention of claim 1 wherein the tour comprises a plurality of zones and each zone comprises a set of the checkpoints, wherein the tour defining record comprises an ordered sequence of zone records, each associated with a respective set of the checkpoints, and wherein at least some of the zone records are associated with a plurality of the checkpoints.

3. The invention of claim 1 wherein the comparing and selectively impeding means further comprises means for selectively displaying a warning message when the sensor signals indicate that one of the higher priority checkpoints has been missed and for displaying no warning message when one of the lower priority checkpoints has been missed.

4. The invention of claim 2 further comprising means for storing a plurality of zone identifying messages, each associated with a respective one of the zone records; and means, included in the portable device and operative when the sensor means has read all of the checkpoint codes associated with the higher priority checkpoints in a selected zone, for displaying the zone identifying message associated with the next successive zone.

5. The invention of claim 4 further comprising:

means, included in the comparing and selectively impeding means, for displaying a warning message when the sensor signals indicate that one of the higher priority checkpoints has been missed;

means, included in the portable device, for registering an override signal; and means, included in the portable device and operative after display of the warning message, for displaying the zone identifying message associated with the next successive zone in response to the override signal.

6. The invention of claim 4 wherein each of the checkpoint codes comprises a respective bar code.

7. The invention of claim 4 further comprising means for transmitting the stored time stamped sensor signals from the portable device to a report generating computer.

8. The invention of claim 4 wherein each of the checkpoints comprises a security checkpoint, and wherein the tour is a guard tour.

9. The invention of claim 4 wherein each of the checkpoints comprises a janitorial checkpoint, and wherein the tour is a janitorial tour.

* * * * *

UNITED STATES PATENT AND TRADEMARK OFFICE

CERTIFICATE OF CORRECTION

PATENT NO. : 5,166,499

DATED : November 24, 1992

INVENTOR(S) : Richard F. Holland et al.

It is certified that error appears in the above-indentified patent and that said Letters Patent is hereby corrected as shown below:

On the title page, item [54], Title of the Invention,

Delete "FOUR" and substitute --TOUR-- therefor.

In column 1, line 2, delete "FOUR" and substitute --TOUR-- therefor.

In column 2, line 65, after "zone" delete ",".

In column 3, lines 8-9, after "checkpoints" insert --.--.

In column 3, after line 41 please add the following:

--Figure 6 is a flow chart of the Data Menu Routine executed by the tour monitor 30.

Figure 7 is a flow chart of the Miscellaneous Menu Routine executed by the tour monitor 30.

UNITED STATES PATENT AND TRADEMARK OFFICE
CERTIFICATE OF CORRECTION

PATENT NO. : 5,166,499
DATED : November 24, 1992
INVENTOR(S) : Richard F. Holland et al.

It is certified that error appears in the above-indentified patent and that said Letters Patent is hereby corrected as shown below:

Figure 8 is a flow chart of the Begin Tour Routine executed by the tour monitor 30.

Figure 9 is a flow chart of the Advance to Next Zone Routine executed by the tour monitor 30.

Figure 10 is a flow chart of the Display Zones Routine executed by the tour monitor 30.

Figure 11 is a flow chart of the Request Advance Routine executed by the tour monitor 30.

Figure 12 is a flow chart of the Review Missed Must Scans Routine executed by the tour monitor 30.

Figure 13 is a flow chart of the Process Scanned Checkpoint Routine executed by the tour monitor 30.

Figure 14 is a flow chart of the program executed by the computer 12 of Figure 1.

UNITED STATES PATENT AND TRADEMARK OFFICE

CERTIFICATE OF CORRECTION

PATENT NO. : 5,166,499

DATED : November 24, 1992

INVENTOR(S) : Richard F. Holland et al.

It is certified that error appears in the above-indentified patent and that said Letters Patent is hereby corrected as shown below:

Figure 15 is a flow chart of the Print History Reports Routine of Figure 14.

Figure 16 is a flow chart of the File Maintenance Routine of Figure 14.--

In column 4, line 5, after "30" insert --.--.

In column 4, line 45, delete "Within" and substitute --within-- therefor.

In column 6, line 8, delete "int he" and substitute --in the-- therefor.

In column 6, line 47, after "error" delete ",".

UNITED STATES PATENT AND TRADEMARK OFFICE

CERTIFICATE OF CORRECTION

PATENT NO. : 5,166,499
DATED : November 24, 1992
INVENTOR(S) : Richard F. Holland et al.

It is certified that error appears in the above-indentified patent and that said Letters Patent is hereby corrected as shown below:

In column 8, line 14, delete "cheokpoints" and substitute --checkpoints" therefor.

In column 11, line 8, delete "usihg" and substitute --u3ing-- therefor.

Signed and Sealed this

Twenty-fifth Day of October, 1994

Attest:

BRUCE LEHMAN

Attesting Officer

*Commissioner of Patents and Trademarks*